(12) United States Patent
Werbos

(10) Patent No.: US 6,581,048 B1
(45) Date of Patent: Jun. 17, 2003

(54) 3-BRAIN ARCHITECTURE FOR AN INTELLIGENT DECISION AND CONTROL SYSTEM

(76) Inventor: Paul J. Werbos, 1050 N. Taylor, Apt. 107, Arlington, VA (US) 22202

(*) Notice: Subject to any disclaimer, the term of this patent is extended or adjusted under 35 U.S.C. 154(b) by 0 days.

(21) Appl. No.: 09/147,338

(22) PCT Filed: Jun. 4, 1997

(86) PCT No.: PCT/US97/09724

§ 371 (c)(1),
(2), (4) Date: May 10, 1999

(87) PCT Pub. No.: WO97/46929

PCT Pub. Date: Dec. 11, 1997

Related U.S. Application Data

(60) Provisional application No. 60/019,154, filed on Jun. 4, 1996.

(51) Int. Cl.$^7$ ................................................. G06N 3/04
(52) U.S. Cl. ........................... 706/23; 706/16; 250/369
(58) Field of Search ...................... 706/16, 23; 250/369

(56) References Cited

U.S. PATENT DOCUMENTS

| | | | |
|---|---|---|---|
| 4,831,580 A | * 5/1989 | Yamada | ........................ 717/2 |
| 5,187,788 A | * 2/1993 | Marmelstein | .................. 717/3 |
| 5,448,681 A | 9/1995 | Khan | |
| 5,461,699 A | 10/1995 | Arbabi et al. | |
| 5,488,714 A | * 1/1996 | Skidmore | ....................... 717/7 |
| 5,576,548 A | * 11/1996 | Clarke et al. | ............... 250/369 |
| 5,606,698 A | * 2/1997 | Powell | ........................... 717/9 |
| 5,953,713 A | * 9/1999 | Behbehani et al. | ........... 706/16 |

OTHER PUBLICATIONS

Lisboa, P.; Lee, C.; O'Donovan, K., Orientation detection: Comparison of moments with back propagation, Neural Networks, 1991. 1991 IEEE International Joint Conference on, Nov. 18–21, 1991, pp. 287–292 vol. 1.*

Robert L. Stites, Bryan Ward and Robert V. Walters; Defect prediction with neural networks; Proceedings of the conference on Analysis of neural network applications, May 29–31, 1991, pp. 199–206, Nov. 1991.*

Balakrishnan et al,, "Hamiltonian Based Adaptive Critics for Aircraft Control", Wescon 95: Conference Record 1995, pp. 724–729.

Werbos et al., "Neurocontrol and Neurobiology: New Developments and Connections", Neural Networks, 1992, International Conference 1992, vol. 3, pp. 373–378.

Werbos et al., "Neural Networks & the Human Mind: New Mathematics Fits Humanistic Insight", Systems, Man. and Cybernetics 1992, International Conference 1992, pp. 78–83.

Tarraf et al., "A Neural Network Controller Using Reinforcement Learning Method for ATM Traffic Policing", Milcom '94, pp. 718–722.

Werbos, "Optimization Methods for Brain–Like Intelligent Control", Decision and Control, 34$^{th}$ Annual Conference, Dec. 1995, pp. 579–584.

* cited by examiner

Primary Examiner—Mark R. Powell
Assistant Examiner—Wilbert L. Starks, Jr.
(74) Attorney, Agent, or Firm—Oblon, Spivak, McClelland, Maier & Neustadt, P.C.

(57) ABSTRACT

A method and system for intelligent control of external devices using a mammalian brain-like structure having three parts. The method and system include a computer-implemented neural network system which is an extension of the model-based adaptive critic design and is applicable to real-time control (e.g., robotic control) and real-time distributed control. Additional uses include data visualization, data mining, and other tasks requiring complex analysis of inter-relationships between data.

4 Claims, 27 Drawing Sheets

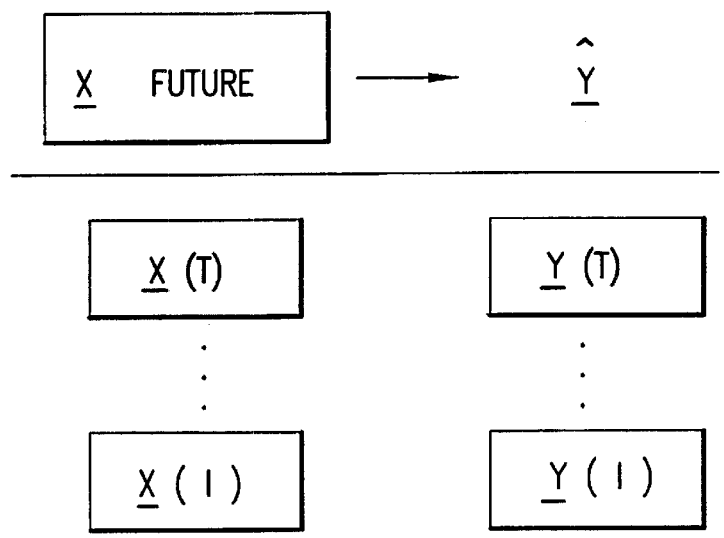
FIG.2
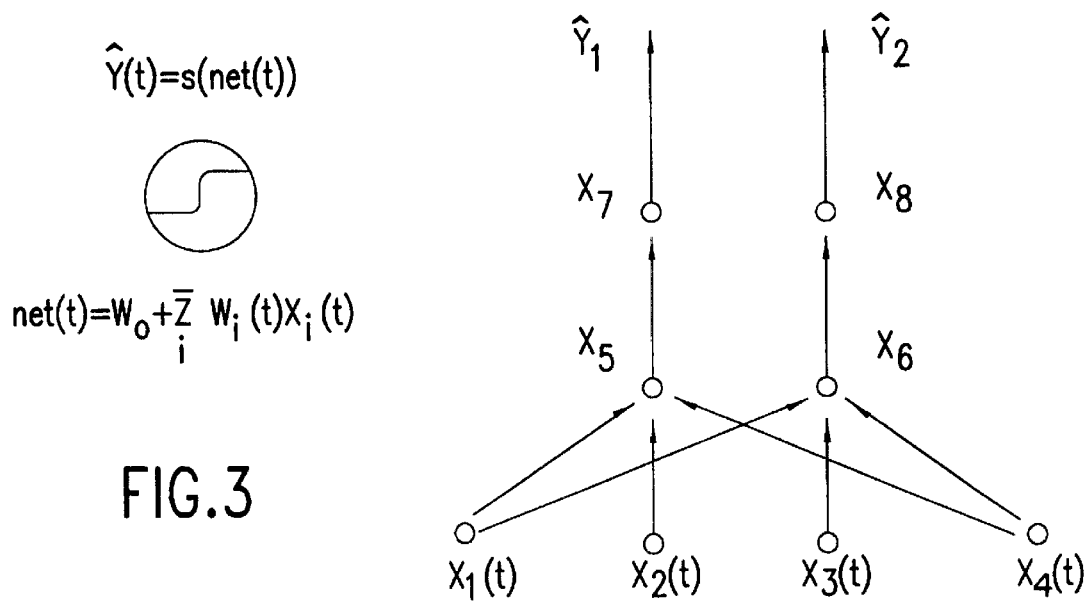
FIG.3
FIG.4

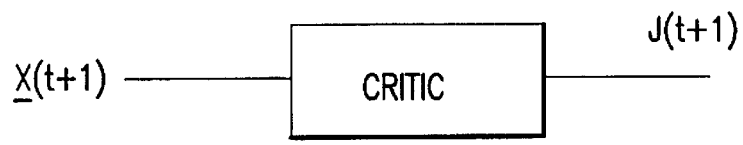
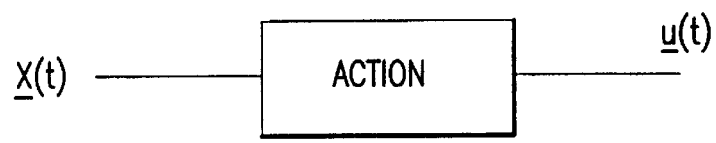
FIG.7
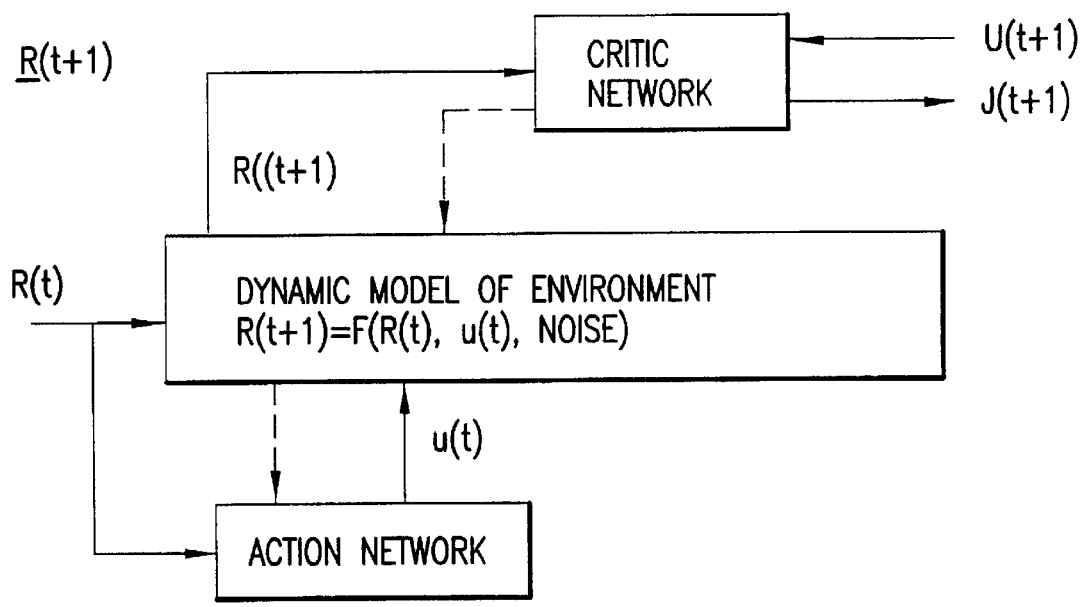
FIG.8

INPUT ENTIRE GRID OUTPUT NEXT MOVE

TIME LAGGED RECURRENT NETWORK (TLRN)

SIMULTANEOUS RECURRENT NETWORK (SRN)

TIME DELAYED RECURRENT NETWORK (TDRN)

TYPES OF SRN TRAINING

TRUNCATION

BACKPROPAGATION THROUGH TIME

SIMULTANEOUS BACKPROPAGATION

ERROR CRITICS

FORWARD PROPAGATION

TYPES OF SRN TRAINING

FIG.17

ERROR CRITIC

BACKPROPAGATION THROUGH TIME (BTT)

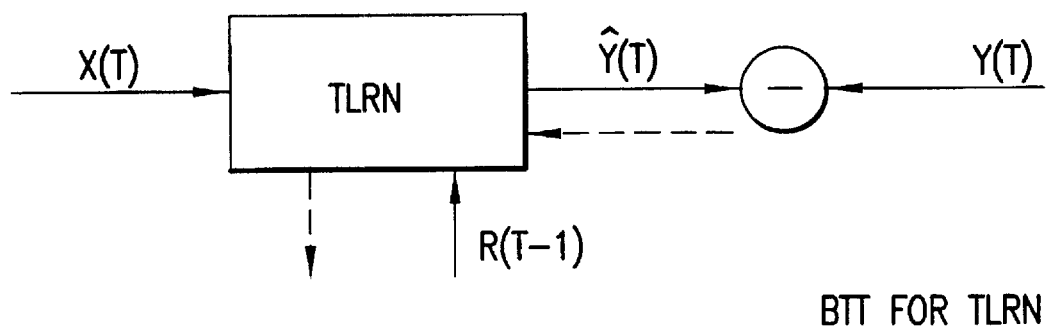
BTT FOR TLRN
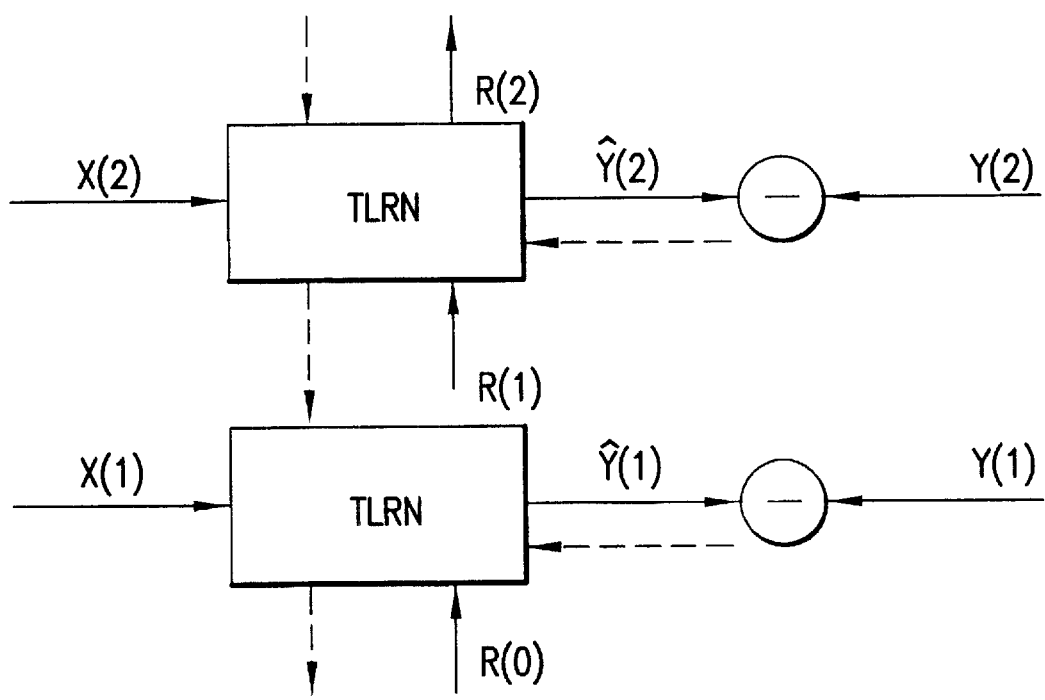
FIG. 20

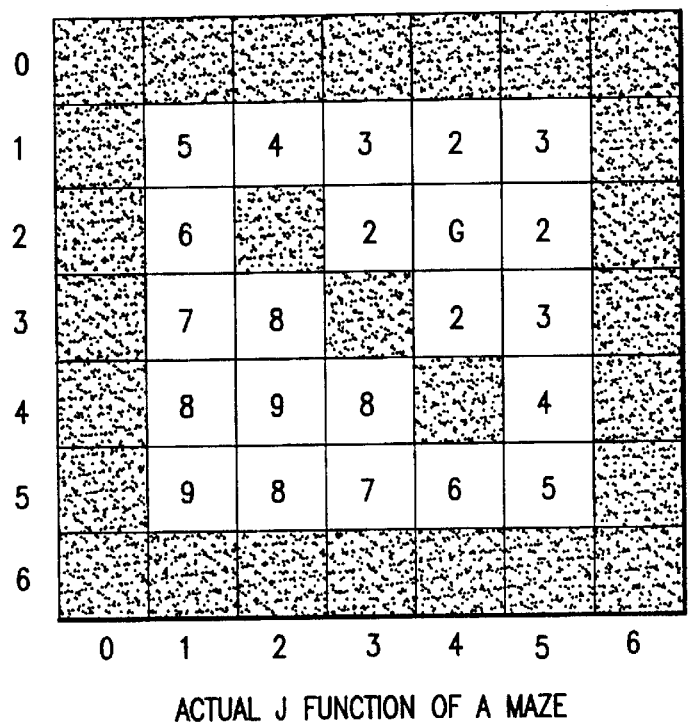
ACTUAL J FUNCTION OF A MAZE
FIG.24
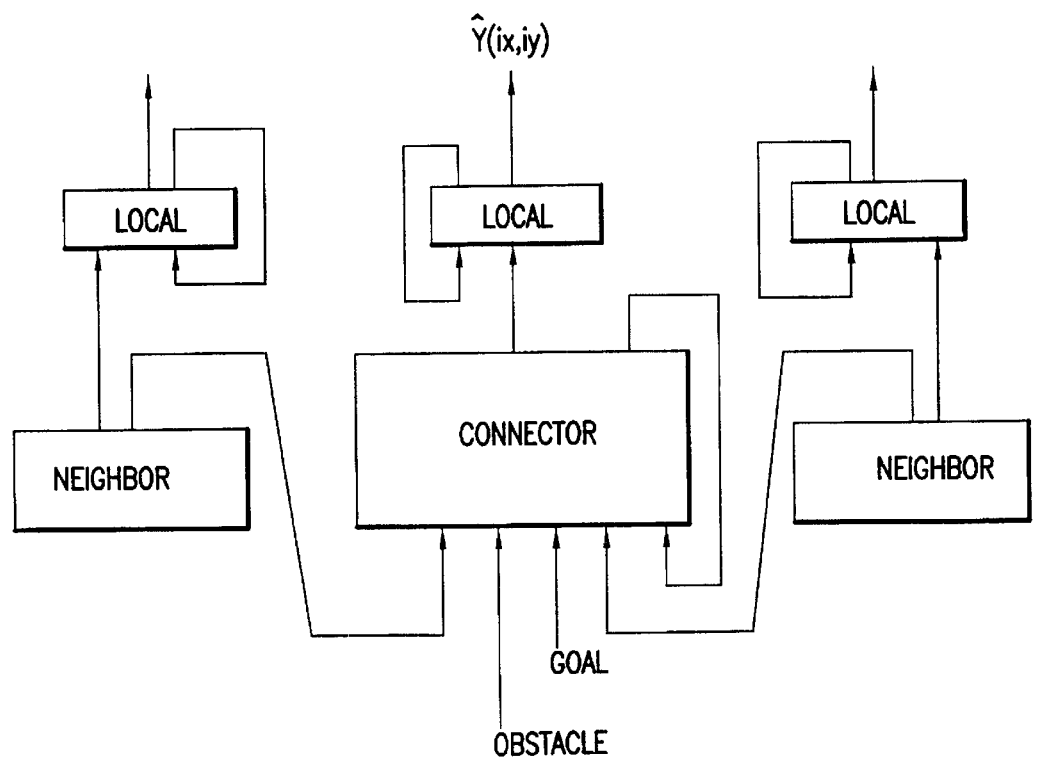
FIG.25   GENERAL IDEA OF CELLULAR NETWORKS

J FUNCTION AS PREDICTED BY SRN-BTT

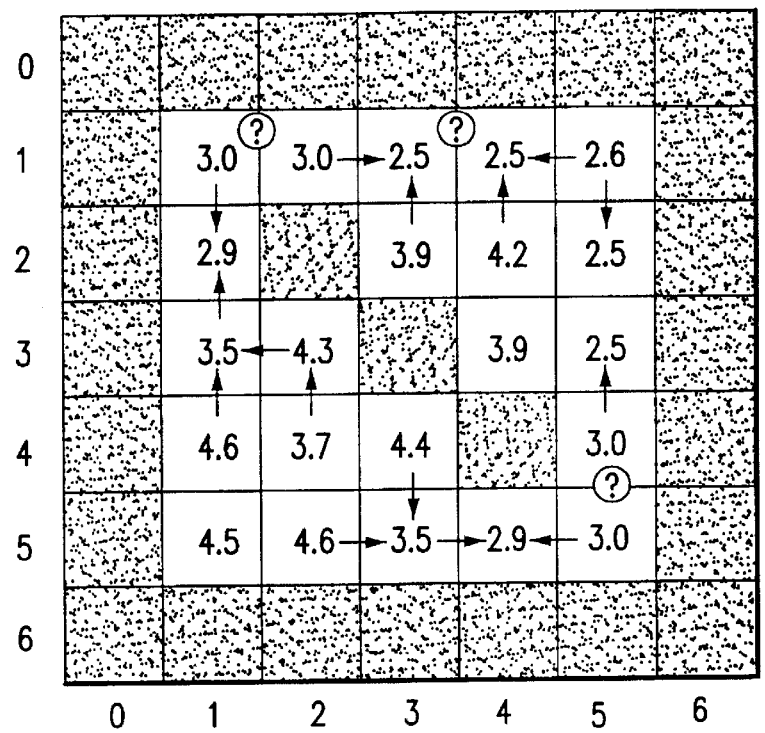
FIG.32  J FUNCTION AS PREDICTED BY SRN-TRUNCATION
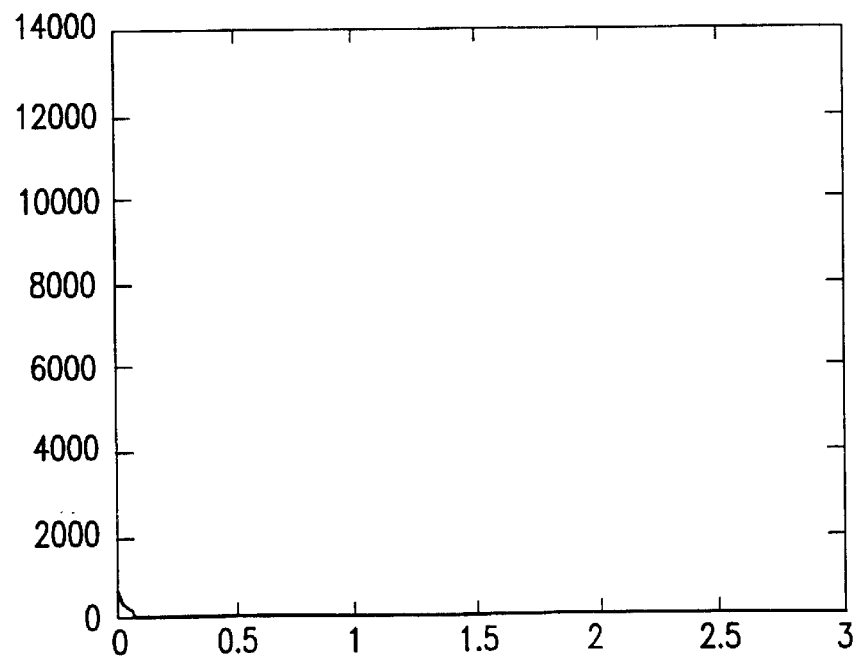
FIG.33  ERROR CURVE OF J FUNCTION AS PREDICTED SRN-BTT

FIG. 36 ERROR CURVE OF J FUNCTION AS PREDICTED BY SRN-TRUNCATION

ERROR CURVE OF J FUNCTION AS PREDICTED BY MLP

ERROR CURVE OF J FUNCTION AS PREDICTED BY MLP

3-BRAIN ARCHITECTURE FOR AN INTELLIGENT DECISION AND CONTROL SYSTEM

CROSS-REFERENCE TO COPENDING APPLICATIONS

The present application claims priority to application ser. No. 60/019,154, filed on Jun. 4, 1996, the contents of which are incorporated herein by reference.

BACKGROUND OF THE INVENTION

1. Field of the Invention

The present invention is directed to a neural network control system including, in one embodiment, a computer-implemented method and apparatus using a computer-readable medium to control a general-purpose computer to perform intelligent control.

2. Description of the Background

Science has been fascinated by the capabilities of the human mind, and many have hypothesized on the process by which mammalian brains (and human brains in particular) learn. When NSF first set up the Neuroengineering program in 1987, it was not motivated by any kind of desire to learn more about the brain for its own sake. The program was set up as an exercise in engineering, as an effort to develop more powerful information processing technology. The goal was to understand what is really required to achieve brain-like capabilities in solving real and difficult engineering problems, without imposing any constraints on the mathematics and designs except for some very general constraints related to computational feasibility. In a sense, this could be characterized as abstract, general mathematical theory; however, these designs have been subjected to very tough real-world empirical tests, in proving that they can effectively control high-speed aircraft, chemical plants, cars and so on—empirical tests which a lot of "models of learning" have never been confronted with.

More precisely, the Neuroengineering program began as an offshoot of the Lightwave Technology (LWT) program at NSF. LWT was and is one of the foremost programs in the U.S. supporting the most advanced research in optical technology. It furthers the development and use of advanced optical fibers, lasers, holography, optical interface technology, and so on, across a wide range of engineering applications—communication, sensing, computing, recording, etc. Years ago, several of the most advanced engineers in this field came to NSF and argued that this kind of technology could be used to generate computing systems far more powerful than conventional electronic computers.

The desktop computer has advanced remarkably over the computers of twenty years ago. It is called a "fourth generation" computer, and its key is its Central Processing Unit (CPU), the microchip inside which does all the real substantive computing, one instruction at a time. A decade or two ago, advanced researchers pursued a new kind of computer—the fifth generation computer, or "massively parallel processor" (MPP) or "supercomputer." The MPP may contain hundreds or thousands of CPU chips, all working in parallel, in one single box. In theory, this permits far more computing horsepower per dollar; however, it requires a new style of computer programming, different from the one-step-at-a-time FORTRAN or C programming that most people know how to use. The U.S. government has spent many millions of dollars trying to help people learn how to use the new style of computer programming needed to exploit the power of these machines.

In the late 1980's, the optical engineering seemed to be a viable basis for developing a sixth generation of computing, as far beyond the MPP as the MPP is beyond the ordinary PC. Using lasers and holograms and such, it was believed that a thousand to a million times more computing horsepower per dollar could be produced compared to the best MPP. However, although skeptics agreed that optical computing might be able to increase computing horsepower as claimed, it would require a price. Using holograms, huge throughput can be achieved, but very simple operations are required at each pixel of the holograms. This requires replicating very simple operations performed over and over again in a stereotyped kind of way, and the program is not easily replaced like a FORTRAN program can be replaced or changed.

Carver Mead, from CalTech, then pointed out that the human brain itself uses billions and billions of very simple units—like synapses or elements of a hologram—all working in parallel. But the human brain is not a niche machine. It seems to have a fairly general range of computing capability. Thus the human brain becomes an existence proof, to show that one can indeed develop a fairly general range of capabilities, using sixth generation computing hardware. The Neuroengineering program was set up to follow through on this existence proof, by developing the designs and programs to develop those capabilities. In developing these designs, advances in neuroscience are used, but they are coupled to basic principles of control theory, statistics and operations research.

However, sometimes terminology clouds advances in one area that are applicable in another area. Some computational neuroscientists have built very precise models that look like neural nets and use little circles and boxes representing differential equations, local processing and so on. Other people use artificial neural nets to accomplish technological goals. Further other scientists, including psychologists, use yet another set of terminology. What is going on is that there are three different validation criteria. In the computational neuroscience people are asking, "Does it fit the circuit?" In connectionist cognitive science they are asking, "Does it fit the behavior?" In our neuroengineering, people are asking, "Does it work? Can it produce solutions to very challenging tasks?" But in actuality, whatever really goes on in the brain has to pass all three tests, not just one. Thus logic suggests a combination of all three validation criteria is needed.

Present models must go beyond the typical test of whether or not a model can produce an associative memory. The bottom line is that a new combination of mathematics is needed.

Most of the engineering applications of artificial neural nets today are applications of a very simple idea called supervised learning, shown in FIG. 2. Supervised learning is a very simple idea: some inputs (X), which are really independent variables, are plugged into a neural network, and a desired response or some target (Y) is output. Some weights in the network, similar to synapse strengths, are adapted in such a way that the actual outputs match the desired outputs, across some range of examples. If properly trained, good results are obtained in the future, when new data is applied to the network. These systems do have practical applications, but they do not explain all the functioning of the brain. To make things work in engineering a few components have to be added, above and beyond cognition. A robot that does not move is not a very useful robot. But even supervised learning by itself does have its uses.

For historical reasons, a majority of ANN applications today are based on the old McCulloch-Pitts model of the neuron, shown in FIG. 3. According to this model, the voltage in the cell membrane ("net") is just a weighted sum of the inputs to the cell. The purpose of learning is simply to adjust these weights or synapse strengths. The output of the cell is a simple function ("s") of the voltage, a function whose graph is S-shaped or "sigmoidal." (For example, most people now use the hyperbolic tangent function, tanh.) Those ANN applications which are not based on the McCulloch-Pitts neuron are usually based on neuron models which are even simpler, such as radial basis functions (Gaussians) or "CMAC" (as described in D. White and D. Sofge, eds., "Handbook of Intelligent Control," published by Van Nostrand, 1992; and W. T. Miller, R. Sutton & P. Werbos (eds), "Neural Networks for Control," published by MIT Press, 1990).

Although in most applications today, the McCulloch-Pitts neurons are linked together to form a "three-layered" structure, as shown in FIG. 4, where the first (bottom) layer is really just the set of inputs to the network, it is known that the brain is not so limited. But even this simple structure has a lot of value in engineering. Further, there are some other concepts that have arisen based on the study of neural networks: (1) all neural networks approximate "nice" functions, (2) a four-layer MLP can be used for limited tracking control, (3) as the number of inputs grow, the MLP does better, and (4) there is a speed versus generalization dilemma. In "Universal approximation bounds for superpositions of a sigmoidal function," IEEE Trans. Info. Theory 39(3) 930–945, 1993, A. R. Barron showed that a simple three layered MLP can approximate any smooth function, in an efficient way. Most people in engineering today will say that is the end of the story, any smooth function, nothing else is needed. However, this structure is not powerful enough to do all jobs. A broader concept of reinforcement learning is needed.

Reinforcement learning has been a controversial idea in psychology. The reasons for this are very strange. Back in the days of Skinner, he used to say that this idea is too anthropomorphic, that it ascribes too much intelligence to human beings and other animals. Nowadays many people are saying just the opposite—that it's not purely cognitive enough (because it has motivation in there) and that it's also too mechanistic. But in reality, it may be a good thing to pursue an idea which is halfway between these two extremes. In any case, the problem here for an engineer is straightforward. Assume there is a little person who has a bunch of levers (labeled $u_l$ to $u_n$) to control. The set of n numbers forms a vector. Likewise, the person sees a bunch of light bulbs labeled $X_l$ through $X_m$, representing sensory input. Finally, there is something that looks like a big thermometer which measures utility, U (not temperature). The problem to be solved is as follows: find a computer program or neural net design which can handle the job of the little person in this hypothetical. The little person starts out knowing nothing at all about the connection between the lights, the levers and the thermometer. He must somehow learn how these things work, enough to come up with a strategy that maximizes the utility function U over the long term future. This kind of reinforcement learning is not the same as self-gratification. Although the function U can be thought of as a measure of gratification, the problem here is more like a problem in delayed gratification. The essence of the problem is not just to maximize this in the next instant. The problem is to find a strategy over time to achieve whatever goals are built into this U; these could be very sophisticated goals.

Almost any planning or policy management problem can be put into this framework. An economist would say that this connection is very straightforward. If U is chosen to represent net profits, then the learning task here—to maximize profits over the long-term—encompasses quite a lot. The hypothetical may not be a good higher order description of the brain, but it has been extremely productive as a good first order motivator of engineering research.

There are a few other aspects of reinforcement learning of some importance to understanding the brain. It turns out that a really powerful reinforcement learning system can't be built if there is only one simple neural net. Modules within modules within modules are needed, which is exciting, because that is also the way the brain is believed to work. This is not like the AI systems where you have an arbitrary kind of hierarchy. Instead, you have a lot of modules because there are a lot of pieces that need to do this kind of task effectively over time. Further, if a real engineering system is built that tries to learn how to do this maximization task over time, then in order to make it work, human-style control has to be added. For example, exploratory behavior appears necessary. Without exploratory behavior, the system is going to get stuck; and it will be a whole lot less than optimal. So there is a lot of behavior that people do which is exploratory. Exploratory behavior is often called irrational, but it appears useful if a human-like control system is to be built.

Another issue is that human beings sometimes get stuck in a rut. There are many names for the ruts that humans get stuck in. Humans get stuck in less than optimal patterns of behavior. Unfortunately, the same thing happens to ANNs as well. They get stuck in things called local minima. If there were a mathematical way to avoid local minima, in all situations, then it would be used. If there were a mathematical way or a circuit way to keep the human brain from getting stuck in a rut, nature would have implemented it too, but there isn't. It's just the nature of complex nonlinear systems that in the real world have a certain danger of falling into a local minimum, a rut. A certain amount of exploratory behavior reduces that danger.

The bottom line here is that nobody needs to worry about an engineer building a model so optimal that it is more optimal than the human brain could be. That's the last thing to worry about, even though reinforcement learning may still be a plausible first-order description of what the brain is doing, computationally.

A neurocontroller will be used hereinafter as a well defined mathematical system containing a neural network whose output is actions designed to achieve results over time. Whatever else is known about the brain as an information processing system, clearly its outputs are actions. And clearly the function of the brain as a whole system is to output actions.

For the brain as a computer, control is its function. To understand the components of a computer, one must understand how they contribute to the function of the whole system. In this case, the whole system is a neurocontroller. Therefore the mathematics required to understand the brain are in fact the mathematics of neurocontrol. Neurocontrol is a subset both of neuroengineering and of control theory—the intersection of the two fields. The book, "Neural Networks for Control", discussed supra, came from a workshop back in 1990 and really was the start of this now organized field called neurocontrol. Later followed "Handbook of Intelligent Control," discussed supra, which is still the best place to go to find the core, fundamental mathematics, including all the equations. Also useful as an introduction is "The Roots of Backpropagation: From Ordered Derivatives to Neural Networks and Political Forecasting," by P. Werbos and published by Wiley, 1994. Basically, it includes tutorials in the back explaining what backpropagation is and what it really does. Backpropagation is a lot more general than the popularized stuff. The book can help explain the basis for designs which use backpropagation in a very sophisticated way. (Also, an abbreviated version of some of this material appears in the chapter on back propagation in P. Werbos, Backpropagation, in M. Arbib (ed) Handbook of Brain Theory and Neural Networks, MIT Press, 1995.)

Since 1992, there has been great progress in applying and extending these ideas. See E. Fiesler and R. Beale, eds, Handbook of Neural Computation, Oxford U. Press and IOP, 1996 for some of the developments in neurocontrol in general. See P. Werbos, Intelligent control: Recent progress towards more brain-like designs, Proc. IEEE, special issue, E. Gelenbe ed., 1996. for a current overview of the more brain-like designs (and of some typographic errors in "Handbook of Intelligent Control").

Neural networks have found three major uses: (1) copying expert using supervised control, (2) following a path, setpoint, or reference model using direct inverse control or neural adaptive control, and (3) providing optimal control over time using backpropagation of utility (direct) adaptive critics. Thus cloning, tracking and optimization make up the trilogy. Those are the kinds of capabilities that can be used in engineering.

Cloning means something like cloning a preexisting expert, but this is not what the brain does. There is some kind of learning in the brain based on imitating other people, but it's nothing like the simple cloning designs used in engineering. In fact, imitative behavior in human beings depends heavily on a lot of other more fundamental capabilities which need to be understood first.

Tracking is the most popular form of control in engineering today. In fact, many classical control engineers think that control means tracking, that they are the same thing. This is not true. But a narrowly trained control specialist thinks that control means tracking. An example of tracking is the monitoring of a thermostat. There is a desired temperature, and you want to control the furnace to make the real temperature in the room track the desired setpoint. (The "setpoint" is the desired value for the variable which you are trying to control.) Or you could have a robot arm, and a desired path that you want the arm to follow. You want to control the motors so as to make the arm fit (track)the desired path. A lot of engineering work goes into tracking. But the human brain as a whole is not a tracking machine. We don't have anyone telling us where our finger has to be every moment of the day. The essence of human intelligence and learning is that we decide where we want our finger to go. Thus tracking designs really do not make sense as a model of the brain.

FIG. 5 gives a simple-minded example of what is called direct inverse control—direct tracking. The idea here is very simple: you want the robot hand to go to some point in space, defined by the coordinates $x_1$ and $x_2$. You have control over $\theta_1$ and $\theta_2$. You know that $x_1$ and $x_2$ are functions of $\theta_1$ and $\theta_2$. If the function happens to be invertible—and that's a big assumption!—then $\theta_1$ and $\theta_2$ are a function of $x_1$ and $x_2$. So what some robot people have done is as follows; they will take a robot, and flail the arm around a little bit. They will measure the x variables and the $\theta$ variables, and then they try to use simple supervised learning to learn the mapping from the x's to the $\theta$'s.

This approach does work—up to a point. If you do it in the obvious way, you get errors of about 3%—too much for anybody to accept in real-world robotics. If you are sophisticated, you can get the error down a lot lower. There are a few robots out there that use this approach. But the approach has some real limitations. One limitation is this assumption that the function has to be invertible; among other things, this requires that the number of $\theta$ variables (degrees of freedom) has to be exactly the same as the number of x variables. The other thing is that there is no notion of minimizing pain or energy use. There have been lots of studies by people like Kawato and Uno, and also a lot of work by Mahoney from Cambridge University, who has done work on biomechanics. There is lots and lots of work showing that the human arm movement system does have some kind of optimization capability.

There are lots of degrees of freedom in the human arm, and nature does not throw them out. Nature tries to exploit them to minimize pain, collision damage, whatever. The point is that direct tracking models are simply not rich enough to explain even the lowest level of arm control.

An interesting aspect of this is that there are lots of papers still out there in the biology literature talking about learning the mapping from spatial coordinates to motor coordinates. What I am saying is that this is only a metaphor. It is not a workable system. Perhaps it is useful at times in descriptive analysis, but it would be totally misleading to incorporate it into any kind of model of learning.

In actuality, in neuroengineering, most people do not use direct inverse control, even when they are trying to solve very simple tracking problems. There is another approach called indirect adaptive control, where you try to solve a tracking problem by minimizing tracking error in the next time period. This myopic approach is now extremely popular in neuroengineering. But this approach tends to lead to instabilities in complex real-world situations (using either ANNs or classical nonneural designs). There are lots of theorems to prove that such designs are stable, but the theorems require a lot of conditions that are hard to satisfy.

Because of these instability problems, I don't think that indirect adaptive control is a plausible model of arm movement either. Furthermore, it still doesn't account for the work of Kawato and Mahoney and such, who show some kind of optimization capability over time. Therefore, I would claim that optimization over time is the right way to model even the lowest level of motor control.

If you look back at the list of uses for neural networks, you will see that there are two forms of optimization over time which have been used in practice for reasonably large-scale problems in neuroengineering. (There are also a few brute-force approaches used on much smaller-scale problems; these are obviously not relevant here.) One of them is a direct form of optimization based entirely on backpropagation. Direct optimization over time leads to a very stable, high-performance controller. It has been used a whole lot in classical engineering and in neuroengineering both. For example, I suspect that you will see it in ANNs in some Ford cars in a couple of years. Nevertheless, the kind of stuff that you can do in the brain is a little different from what you can do with microchips in a car. The direct form of optimization requires calculations which make no sense at all as a model of the brain. This leaves us with only one class of designs of real importance to neuroscience—a class of designs which has sometimes been called reinforcement learning, sometimes called adaptive critics, and sometimes called approximate dynamic programming (ADP). Actually, these three terms do have different histories and meanings; in a strict sense, the designs of real relevance are those which can be described either as adaptive critics or as ADP designs.

The kind of optimization over time that I believe must be present in the brain is a kind that I would call approximate dynamic programming (ADP). There is only one other kind of optimization over time that anybody uses (the direct approach), and that's not very brain-like. So this is the only thing we have left. But what is dynamic programming?

Dynamic programming is the classic control theory method for maximizing utility over time. Any control theorist will tell you that there is only one exact and efficient method for maximizing utility over time in a general problem and that is dynamic programming. FIG. 6 illustrates the basic idea of dynamic programming. The incoming arrows represent the two things that you have to give to dynamic programming before you can use it. First, you must give it the basic utility function U. In other words, you must tell it what you want to maximize over the long-term future. This is like a primary reinforcement signal, in psychology. Second, you have to feed it a stochastic model of your environment. And then it comes up with another function called a strategic utility function, J.

The basic theorem in dynamic programming is that this J function will always exist if you have a complete state model. Maximizing J in the short term will give you the strategy which maximizes U in the long term. Thus dynamic programming translates a difficult problem in planning or optimization over time into a much more straightforward problem in short term maximization.

If dynamic programming can solve any optimization problem over time, and account for all kinds of noise and random disturbance, then why don't we use it all the time? The real answer is very simple: it costs too much to implement in most practical applications. It requires too many calculations. To run dynamic programming on a large problem is too expensive. It just won't work. But there is a solution to that problem, called approximation.

In Approximate Dynamic Programming (ADP), we build a neural net or a model to approximate this function J. Thus instead of considering all possible functions J, we do what you do if you are an economist building a prediction model. You build a structure with some parameters in it and you try to adapt the parameters to make it work. You specify a model or a network with weights in it, and you try to adapt the weights to make this a good approximation to J. A neural network which does that is called a Critic network. And if it adapts over time, if it learns, we call it an adaptive critic. So right now in engineering we have almost three synonyms. Approximate dynamic programming, adaptive critics, and reinforcement learning—those are almost the same thing.

Based on all of this logic, I would conjecture that the human brain itself must essentially be an adaptive critic system. At first glance, this may sound pretty weird. How could there be dynamic programming going on inside the brain? What would this idea mean in terms of folk psychology, our everyday experience of what it feels like to be human? A good model of the brain should fit with our personal experience of how the brain really works. That's part of the empirical data. We don't want to ignore it. So does this theory make sense in terms of folk psychology? I will argue that it does. I would like to give you a few examples of where this J versus U duality comes in, in different kinds of intelligent behavior.

Those of you who have followed artificial intelligence (AI) or chess playing probably are aware that in computer chess the basic goal, the U, is to win the game, and not to lose it. This is in computer chess, not in real chess, in computer chess. But there is a little heuristic they teach beginners. They teach you that a queen is worth 9 points, a castle is worth 5, and so on. You can compute this kind of score on every move. This score has nothing to do with the rules of the game. But people have learned that if you maximize your score in the short term, that's the way to win in the long term.

When you get to be a good chess player, you learn to make a more accurate evaluation of how well you are doing. For example, you learn to account for the value of controlling the center of the board, regardless of how many pieces you have. Studies suggest that the very best chess players are people who do really sophisticated stuff, a really high quality strategic analysis of how good their position is one move ahead. Those are the studies I've seen. So basically, this evaluation score is like a J function. It's a measure of how well you are doing.

In animal learning, U is like primary reinforcement, the inborn kind of stuff. It reminds me of the hypothalamus and the epithalamus. And J is like secondary reinforcement, the learned stuff, learned reinforcers. U is like pleasure or pain, an automatic kind of response, while J is like hope and fear. And in a way all of this fancy theory is just saying hey, I think hope and fear is hard-wired into the brain. We respond to hopes and fears from day one. Hopes and fears drive everything we do and learn.

It turns out that this model also has parallels in physics. In fact, the Bellman equation we use in dynamic programming is exactly what is called the Hamilton-Jacobi equation in physics. If you read Bryson and Ho, Applied Optimal Control, Ginn, 1969, they even call it the Hamilton-Jacobi-Bellman equation. In physics, they would say that the universe is maximizing a Lagrangian function instead of calling it a utility function; thus they use the letter L instead of the letter U, but it's the same equation. And it turns out that our J refers to something they call "action." And the things we call "forces" in physics turn out to be the gradient of the J function. (See F. Mandl, Introduction to Quantum Field Theory, published by Wiley, 1959; and V. G. Makhankov, Yu. P. Rybakov and V. I. Sanyuk, The Skyrme Model: Fundamentals, Methods, Applications, published by Springer-Verlag (800-777-4643), 1993.)

SUMMARY OF THE INVENTION

It is an object of the present invention to address at least one deficiency in the intelligent control of external devices by using a new brain-like control system.

DESCRIPTION OF THE DRAWINGS

A more complete understanding of the invention and many of the attendant advantages thereof will be readily understood by reference to the following detailed description when considered in connection with the accompanying drawings, wherein:

FIG. 2 is a block diagram of pairs of inputs and outputs showing that a future output is to be calculated for a future input;

FIG. 3 is a diagram showing one method of calculating an output value for a specified time;

FIG. 4 is an interconnection diagram showing a four-input, two-output interconnect;

FIG. 7 is a block diagram of action and critic networks;

FIG. 8 is a block diagram of a critic network and an action network that combine with a dynamic model of an environment;

FIG. 17 is a block diagram of different methods of training a SRN;

FIG. 20 is a block diagram showing backpropagation through time using a time lagged recurrent network;

FIG. 24 is a block diagram of an exemplary J function for a maze problem;

FIG. 25 is a block diagram of a cellular network;

FIG. 32 is a J function as predicted by a SRN using truncation; and

FIGS. 33–38 are graphs showing error versus training iterations.

DESCRIPTION OF THE PREFERRED EMBODIMENTS

Figure 1:
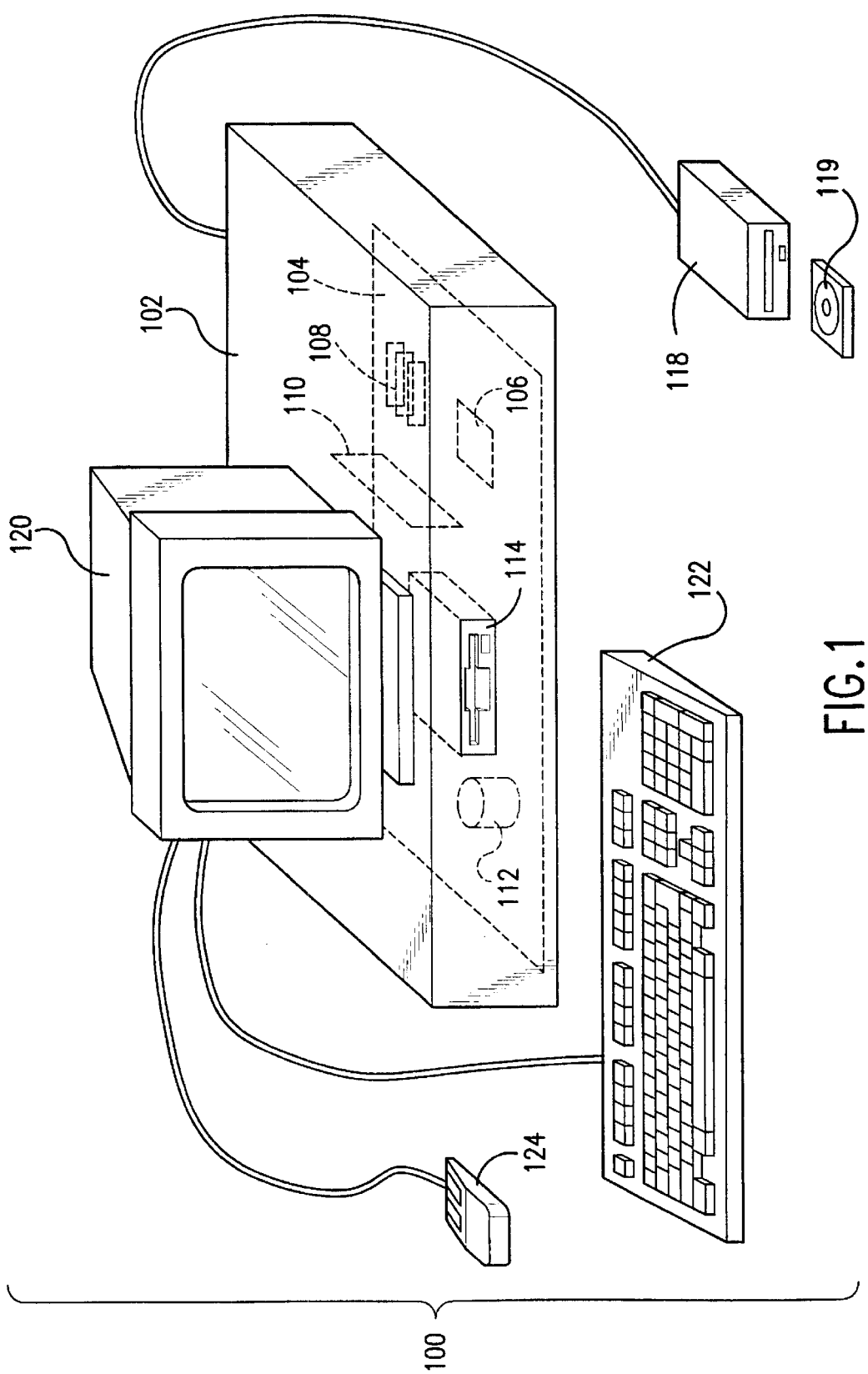
FIG. 1 is a schematic illustration of a computer system for performing the method of the present invention.
Figure 5:
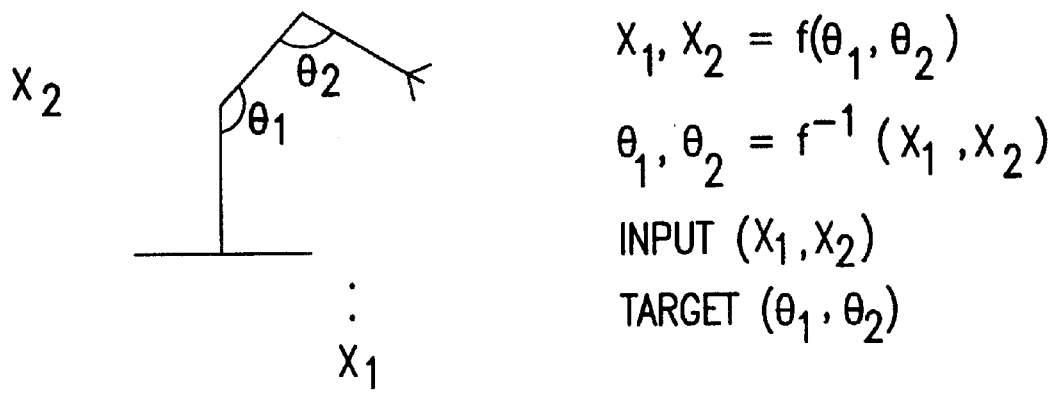
FIG. 5 is a schematic illustration of calculating intercept angles for a target.
Figure 6:
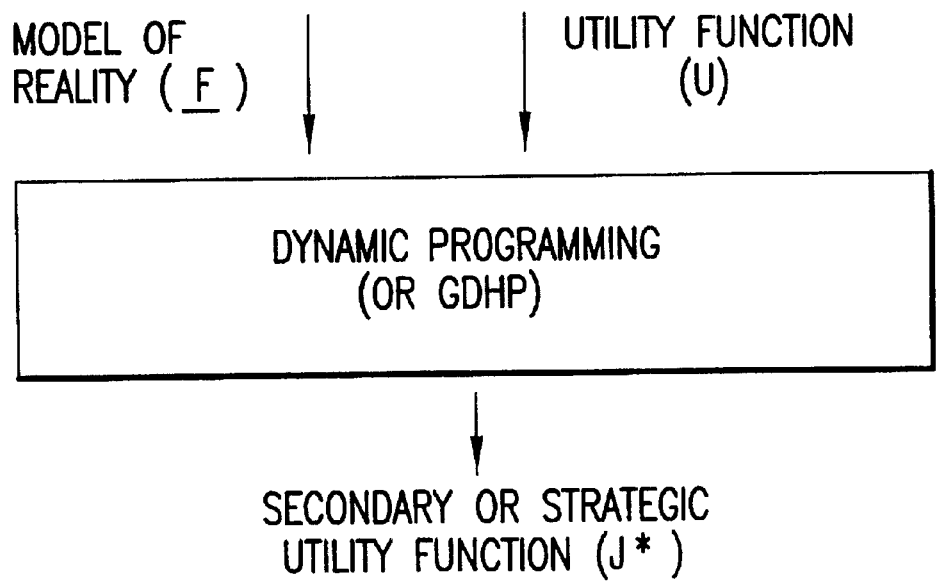
FIG. 6 is a block diagram of a Dynamic programming technique.

Referring now to the drawings, wherein like reference numerals designate identical or corresponding parts throughout the several views, FIG. 1 is a schematic illustration of a computer system for providing intelligent control. A computer 100 implements the method of the present invention, wherein the computer housing 102 houses a motherboard 104 which contains a CPU 106, memory 108 (e.g., DRAM, ROM, EPROM, EEPROM, SRAM and Flash RAM), and other optional special purpose logic devices (e.g., ASICS) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus or an Enhanced IDE bus). Although compact disc 119 is shown in a CD caddy, the compact disc 119 can be inserted directly into CD-ROM drives which do not require caddies. Also connected to the same device bus or another device bus as the high density media drives, the computer 100 may additionally include a compact disc reader 118, a compact disc reader/writer unit (not shown) or a compact disc jukebox (not shown). In addition, a printer (not shown) also provides printed listings of any of the models or outputs developed or produced by the neural network of the present invention.

The system further includes at least one computer readable media. Examples of such computer readable media are compact discs 119, hard disks 112, floppy disks, tape, magneto-optical disks, PROMs (EPROM, EEPROM, Flash EPROM), DRAM, SRAM, etc. Stored on any one or on a combination of the computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for providing intelligent control, e.g. for providing a computer-implemented control implementing a neural network.

The specification includes two major parts: (1) a technical specification of the new three brain architecture; and (2) a description of the techniques for actually using this architecture and related methods across a wide range of possible applications. However, first some of the important characteristics of the architecture and the techniques will be highlighted, and a few near-term practical examples of how they might be exploited will be described.

A goal of the architecture is to implement the same kind of capability and complexity one sees in the highest parts of the mammalian brain, in an intelligent system which can learn to handle a very wide range of tasks, just the brain itself can do. The specification is made even more complex, because of two additional considerations: (1) it is essential to accommodate a variety of physical embodiments, ranging from early software simulations through to full-fledged dedicated circuitry analogous to the circuitry of the brain; (2) the working systems must provide for a step-by-step transition from conventional control designs through to a full-fledged brain-like approach, as described in the paper on techniques. In order to limit the physical size of this disclosure, some of the key new subsystems are described in more detail in new papers included by reference with this disclosure. Some other subsystems are fully specified in a formal mathematical or logical sense, but without the sort of explanatory detail and exposition one would expect in a textbook presentation.

The description of techniques of use was actually written (but not yet published) as a draft encyclopedia article, covering the entire field of neurocontrol and related technology. Thus the strategies of how to use such techniques would apply both to the new architecture and to other architectures developed in the past by this inventor and others. The article makes it clear, however, that it provides a strategy for upgrading existing control and decision-making systems, in a step-by-step manner, towards a more truly brain-like architecture, which is what this disclosure provides. Some further details of the techniques of use are described in the new papers included by reference.

The range of possible applications is truly enormous, as can be seen in the techniques section. There are four possible examples which the inventor happens to be looking at very closely at the present time: (1) an intelligent machine to play Go; (2) a missile interception system; (3) a controller for complex heat exchange systems, such as precoolers for hypersonic engines or possible even fuel processors for fuel-cell cars and trucks; (4) control of distributed networks, such as electric power grids or communication networks. These will be discussed in that order.

At this time, an artificial intelligence, Deep Blue, has already defeated the world's chess champion in a well-publicized tournament. However, the Chinese/Japanese game of Go or Wei Qi has yet to be defeated by an artificial intelligence. Machines exist to play Go, but they perform very badly.

Go and chess have historically been the world's most popular serious games of strategy, studied quite seriously by many military strategists and by millions of other players. Unlike chess, Go has proven intractable to the conventional brute-force search approaches used by conventional artificial intelligence. It requires a combination of longer-range foresight and complex, spatial pattern recognition in which humans now excel over machines. The three brain architecture is intended to provide unique new capabilities in both of these areas—more effective long-term foresight, combined with full use (and extension) of the kind of pattern recognition capability one obtains from neural networks. Thus to demonstrate the capabilities of the new architecture, the game of Go could be an excellent early application area.

In this area, the initial effort would be a step-by-step effort to demonstrate, in software, that the new architecture can handle Go better than prior approaches. This testbed problem would help in developing further the art of how best to use the architecture. Ideally, dedicated neural network boards could be obtained, to permit high computational throughput during training. (Computational costs and constraints will, in general, be the key driving factor which determines how quickly we make the transitions from software simulations to use of full dedicated circuitry which directly implements three-brain designs.) Hopefully, the trained system will be simple enough to be implemented on the next generation of conventional PCs (with the training/learning parts removed or reduced), so that the software could actually be embedded into a computer game to be sold to a large market. A dedicated version of this system, using dedicated neural network hardware (perhaps even new hardware specifically embodying this architecture) might allow a showcase demonstration, analogous to the Deep Blue demonstration, which would be of great value in marketing the architecture and in developing the interest of more practical commercial users, such as factory controllers and management planners who also face complex, diffusely structured, multi-level decision problems.

The missile interception problem is a more near-term opportunity which would stress/test other aspects of the architecture. Almost certainly it would involve a parallel development of algorithm testing and hardware implementation. Because the architecture here is LEARNING-BASED and inherently flexible, it is possible to begin the hardware efforts even before the software-based evaluations have run their course. In effect, the key purpose of the software efforts would be to carry out the neural network learning required for the particular application—to learn the various parameters, and demonstrate the overall level of performance. The mathematical architecture as such is sufficiently well specified already that hardware development can proceed now. After sufficient performance is demonstrated in simulations, then the relevant parameter values can be downloaded to the hardware, and integrated flight testing can begin. This approach is particularly interesting, because it would allow a relatively rapid retrofit of existing missile interceptors, to substantially improve their accuracy, assuming that the new hardware can be installed rapidly.

The software effort would have several aspects. First, a "multistream model" of the interception task would have to be obtained. (The concept of a multistream model is described in the techniques paper.) This would require a close interaction between domain experts on missiles (such as military folks who have developed simulators for this problem) and experts on the subject of this disclosure. Second, several of the existing model-based adaptive critic designs (such as the DHP design disclosed by this inventor as part of a previous patent) would be applied to this model, using multistream training, with the (novel) inclusion of time-lagged recurrence into this kind of structure. It is expected that the multistream model would probably be used directly, along with its dual subroutine, which requires careful attention to the proper handling of stochastic terms (as described in Handbook of Intelligent Control). These simpler control designs (embedded in the initial 3-brain software, already under construction) would initially be implemented using the usual feedforward neural network components, for purposes of comparison, evaluation and initialization of later designs. However, as soon as possible, a version would be implemented based entirely on SRN components, using new training procedures, and perhaps even SRN/TLRN hybrids trained by an error critic. This would not only improve performance, but would actually simplify the hardware implementation aspects.

The hardware implementation, in this application, would probably consist of a modification of the 3DANN hardware already being built by the Jet Propulsion Laboratory (JPL). That hardware permits extremely high computational throughput, in a form suitable for use in small missiles, but only for the implementation of Hopfield networks. However, for trained networks especially, there is a great similarity between the connectivity of a Hopfield network and the connectivity of an SRN or SRN/TLRN hybrid. If the software tests show that a cellular or systolic SRN can do the job, this would make it possible to dramatically and immediately reduce the required complexity of this modified hardware. The key idea here is to build the required SRN-based components, by the modification of the existing 3DANN designs implied by this requirement, and by also providing the higher level connections and controls required by the overall architecture. Because the main challenge to providing enough computational throughput would come in the "inner loop"—the SRN components—it would be possible to use more conventional hardware to implement the higher-level aspects, if necessary.

This approach would test key components of the three-brain architecture, and begin to provide a very powerful dedicated hardware embodiment. Perhaps the existence of multiple time scales and domains in this application would allow a further improvement in performance by using a more complete form of the architecture, including the temporal chunking aspects as well. Complete theator control of missile interception, such as the supervision of an entire array of missiles from an Aegis cruiser, could then provide a testbed for the entire there-brain architecture. However, before deploying such extended systems, it would be essential to evaluate the "Terminator 2" kinds of risks, which could be quite serious.

Another application of near-term interest is the control of complex heat-exchange systems, such as precoolers for hypersonic engines, fuel processors for fuel-cell/electric vehicles, advanced heat pumps and air conditioners, or fuel processors (probably based on partial oxidation) for use in exploiting unwanted heat from the flight surfaces of a high-speed aircraft. For example, in the case of engines, there is only one air-breathing engine ever built designed to carry an airplane all the way from Mach 0 to Mach 6—the Atrex engine, based on thermodynamic principles and ideas from V. Belapin from Russia, implemented through the ISAS agency under the ministry of education in Japan. Efforts may be expected elsewhere to build other new engines based on the same principles. Crucial to the efficiency and speed of the engine is the efficiency of the precoolers, which implement the fundamental thermodynamic principles involved. Despite huge efforts, involving millions of dollars, the present controllers are not sufficient to allow this engine to live up to its intended performance. Theoretical efficiency might be improved still further by using new precoolers based on microelectromechanical manufacturing (either ordinary MEMS or newer forms based on fullerene-like carbon tubes); however, this would make the control problem even more difficult.

The essential problem here is the need to maintain control within tight tolerances, in a rapidly changing, nonlinear stochastic environment. Based on our articles on techniques, this should be an excellent testbed for model-based adaptive critic designs such as DHP. However, this application is so challenging that even DHP by itself may not be enough. With a very complex network of tubes, and a large number of valves to control, the approximation power of ordinary neural networks (such as MLPs) may not be good enough to permit the most efficient implementation of DHP in this application. DHP and similar designs may only work if they are implemented using different sorts of neural network components, such as some of the components discussed here for implementing the three-brain architecture.

The included papers on SRNs give an example where SRNs—but not MLPs—have the ability to approximate a key function which MUST be approximated as part of an adaptive critic controller. By using SRNs instead of MLPs as components, in key blocks of adaptive critic architectures, we may expect better performance in challenging applications like this.

However, in this application, even the use of SRNs as such may not be enough to really optimize performance. As with the maze problem (in the papers included here by reference), the sheer number of variables (valves and tubes) may make it difficult to obtain adequate performance, without additional steps to improve the parsimony of the networks. In the included papers, a novel form of cellular structure was used, based on the mathematical principle of Euclidean translational symmetry. The tubes in this problem do not form a regular spatial grid like that; therefore, the Euclidean cellular structure is not applicable. However, we can modify that SRN design to use object-oriented symmetry instead, as described in the section on spatial symmetry and chunking in our technical specifications. In fact, this is a key aspect of the full preferred form of the three-brain architecture, required in order to mimic certain aspects of the mammalian brain. Therefore, this particular application may be an excellent testbed in which to prove that a three-brain architecture can perform better than earlier designs.

In this application, the stages of development might involve: (1) obtaining a multistream model of the engine, by cooperation between experts in the three-b rain architecture and experts on the engine, using some combination of prior modeling work and neuroidentification based on test data; (2) demonstration of improved engine efficiency in simulations, using dedicated neural network boards on PCs if computational throughput turns out to be a problem at this stage; (3) demonstration that the software can be implemented so as to exploit dedicated neural network boards (such as the Accurate Automation or Mosaix/JPL boards, already designed for use on vehicles) with realistic real-time operating kernels; (4) full-up hardware demonstration, initially in ground and then wind-tunnel tests. If computational throughput should turn out to be a problem, the novel hardware proposed for the missile interception application could be developed or used for this application, so as to provide maximum computational throughput.

Finally, the same kind of design considered for the heat exchanger applications could also be applied to large, distributed control applications which are similar in character except that the plant or network to be controlled is physically large and dispersed. (In fact, this might even be an efficient way to address the application of fuel processing in flight surfaces.) The mathematics of such applications are not different, in principle, from the mathematics of controlling networks of tubes and the like; however, there are two additional features which must be accounted for: (1) there may be more variables involved (in a full representation of the control problem, which is desirable); (2) because of the physical dispersal, it may be desirable to disperse the controller itself, in a kind of distributed architecture parallel to the plant itself. The large number of variables does not require a change in the underlying design mathematics; however, it does provide an additional motivation to consider a distributed hardware implementation of the control system, in order to obtain the necessary computational throughput.

In the past, many researchers have noticed that neural network designs are inherently massively parallel or distributed systems. They have gone on to wonder whether distributed implementations of neural networks might be built, linked to the distributed structure of the actual physical plants or networks being controlled. Unfortunately, the distribution of efforts between neurons does not match the structure of the physical plant, for ordinary neural network designs; for example, the most useful ordinary networks tend to be feedforward in structure, whereas the plats themselves tend to be dynamic and recurrent. However, the SRNs with object-oriented symmetry—key new components proposed for use in the there-brain architecture—DO involve as assignment of computations to specific objects or subsystems of the physical plant. It would be straightforward, then, to decompose the main networks used in such a controller into pieces which could be physically embodied in computer hardware located near the corresponding components of the plant. In other words, the new design translates automatically into a design for distributed intelligence.

There are certain caveats here. First, the fullest possible exploitation of symmetry does require that certain key information—such as parameter estimates and revisions be shared between computational sites for similar objects; however, this would not interfere with parallel operation in real-time plant management, which places the heaviest unavoidable demand on communication throughput. Second, if there are delays which permit/require higher-speed operation within computational sites rather than between computational sites, this can simply be represented as an attribute of the global neural networks to be adapted; it would be automatically accounted for in a proper use of these design procedures. Third, for use of the full, preferred three-brain, one would actually need something like a hierarchy of regional and national "coordination centers," though the computational scheme involved would be far smoother and less rigidly hierarchical than a conventional hierarchical control structure.

Once again, these four application opportunities are only a few selected examples from a much larger universe. Other possible examples are mentioned below.

Returning to the discussion of how learning parallels physics, the brain acts as if there are circuits in the brain that are computing forces. But there are two major levels of learning in this theory. There is the level of learning where behavior changes in response to hopes and fears, in response to emotional forces. But then there is also the level where the forces themselves change because of secondary reinforcement. And these two levels of learning work together.

This mathematics also has some interesting implications for motor control. In recent years, Hogan and his collaborators have claimed that they can best describe motor behavior by using concepts like force fields. Hogan's people have argued very strenuously with Kawato's group about the idea of optimization; however, the mathematics of forces and the mathematics of optimization turn out to be the same underneath if you pursue it to this level.

A brief review of the uses of U and J is now in order. In economics, there is utility and there is price; these are different things. These functions U and J are global measures of how happy you are. But what if you want to know what is the value of a specific object? For example, what is the market value of a peanut? An economist would say that this is an easy question. The value of a product is equal to its marginal utility. The marginal utility refers to the increase in your U function which would result if you had one extra peanut. It is the derivative of U with respect to peanut consumption. Thus the derivatives of U represent values. The derivatives of J are what give you market values and forces. Thus values are the derivatives here, and we have some adaptive critic designs where the network outputs the derivatives, the values, rather than the raw quantities U and J.

Just as there are lots and lots of ANN designs in general, so too are there lots and lots of adaptive critic designs. I like to think of these designs as forming a kind of "ladder," rising up from the simplest and most popular designs, which are easy to implement, through to more complex and more powerful designs, ultimately including the human brain itself. The designs now used in engineering can be classified as level zero up to level five.

The most popular design of all, at present, is the Barto-Sutton-Anderson (BSA) design, shown in FIG. 7. Strictly speaking, this design is more popular in computer science than in engineering. It was first published back in 1983 by A. Barto, R. Sutton and C. Anderson, and entitled "Neuron like adaptive elements that can solve difficult learning control problems," Vol. 13, No.5, p.834–846. Barto and Sutton have written many papers on this kind of design, showing how it can implement theories of animal learning like the Rescorla-Wagner theory and so on. In fact, the animal psychologist Harry Klopf and the engineer Bernie Widrow really developed a lot of the ideas which went into this design. It was actually Bernie Widrow who coined the word "Critic," and implemented the first ANN adaptive critic system. (See B. Widrow, N. Gupta & S. Maitra, Punish/reward: learning with a Critic in adaptive threshold systems, IEEE Trans. SMC, 1973, Vol. 5, p.455–465.)

In any event, the BSA design is very simple, as you can see in FIG. 7. There is one network—the Action network—which really does the control. It inputs the sensor data X and it outputs the actions u. Then the Critic network gives a kind of gross reward and punishment to the Action network. So the Action net does the real work, and the job of the Critic is just to help train the Action net.

There are convergence theorems for this kind of design. But there is also a problem. It only works on very small systems. It works very well on small systems. And Barto would be quick to add that the world's best backgammon player is based on this kind of system (with some special features added (see G. J.Tesauro, Practical issues in temporal difference learning. Machine Learning, 1992, 8: p.257–277)). Backgammon is not entirely a small problem, but it is small in one respect: at each prove, it only requires a choice between a few choices of action, only a few action variables. The reason why this design doesn't work well on truly large problems is that the feedback from the teacher to the Action net is very limited. It's just one gross scalar measure.

Suppose that you are a student trying to learn, say, a hundred numbers. You write down a hundred numbers, and you know they are probably wrong and you give them to the teacher. And the teacher looks and says, "No good." You do it again. "No good." How long will it take for you to find the right hundred numbers? But suppose instead that the teacher told you; for each number, "Make that bigger; make this smaller; this is really important, turn this up." Then it might be possible for you to find the numbers. So the point is this: if there are a lot of weights, if there are a lot of action variables, then the scalar kind of feedback won't work very well. What you really need to have here is feedback to each action variable, indicating which way to adjust it.

Strictly speaking, of course, this design will still converge for large problems—theoretically. The practical problem is that the speed of learning or convergence gets to be slower and slower as problems get more and more complex. For middle-sized problems (about 10 variables) involving continuous variables in engineering, everyone I know who has tried this method says that it is unacceptable. There are even a few engineers who extrapolate too far and say that "reinforcement learning is slow in general." But those engineers should wake up to the fact that there are other reinforcement learning designs available here.

There are some other limitations with the BSA design, including (1) X(t) versus R(t), (2) $U_0$ and tantrums, and (3) multicolinearity. The most important limitation has to do with X versus R—two concepts or vectors which merit a lot of explanation. You may recall, the letter X is used to represent the external sensory data. By contrast, R represents something more like an internal representation of external reality. Engineers would call it an "estimated state vector." Intuitively, it could also be seen as a kind of short-term memory or working memory.

To make these systems work, you really have to have a representation of reality. It turns out that all of the theorems for dynamic programming require that you have what is technically called a Markov Model or a state space model of the environment you are trying to influence or control. In practice, what this means is that you can't just use sensor input data. You have to reconstruct an estimated state vector.

You have to build up a representation of the external world. And I like to use the letter R to represent the reconstructed representation of reality through recurrent networks. Thus the biggest problem with the BSA design is that we really need a way to build up that kind of representation and feed it into the network.

It should be noted that there is some recent research in control theory which argues that our estimated state vector should not be based purely on a cognitive, value-free model of the world; instead, to get the right solution to the control problem, we need to use some kind of value-weighted model or procedure. (See J. S. Baras and N. S. Patel, Information state for robust control of set-valued discrete time systems, Proc. 34th Conf. Decision and Control (CDC), IEEE, 1995. p.2302.) This fits in very well with the adaptive critic approach, and with our knowledge of how salience measures from the limbic system (a Critic) influence our learning of representations in the neocortex.

From the viewpoint of animal learning, Grossberg has criticized the BSA model severely and justifiably. He has argued that the lack of an expectations system makes this model fundamentally unable to address the huge literature on classical or Pavlovian conditioning, which shows how animals change their expectations through learning. The need for an expectations system leads us naturally up to the next design.

In 1977, before Barto, Sutton and Anderson, I came up with another design that was based on three networks (See P. Werbos, Advanced forecasting for global crisis warning and models of intelligence, General Systems Yearbook, 1977 issue. Strictly speaking, this design also appeared in more detail in my 1972 Ph.D. thesis proposal to Harvard U.—which was rejected as being too complex—and was presaged by the discussion in 1968 of "The elements of intelligence." Cybernetica (Namur), No.3, 1968, by P. Werbos.) I call this design Heuristic Dynamic Programming (HDP) with a Backpropagated Adaptive Critic (BAC).

If you compare FIG. 8 with FIG. 7, you can see that we now need a third network—a Model network. The Model network serves as a kind of predictive model of the external world. It also serves to build up a representation of reality to use in making predictions. You could also think of it as an expectations system. So now we have three networks, all of which should be adapted concurrently in real time, if we really want to imitate the brain.

But how is this adaptation done? In particular, how can we adapt the Model network, the new part of this design? In actuality, engineers have spent a lot of time on this kind of issue. They call it the "system identification task." Even before ANNs were used, engineers spent decades building up a complex theory of how to do system identification for dynamic systems.

Where does this idea of a Model network fit in with neuroscience? M. Nicolelis, C. Lin, D. Woodward & J. Chapin, describe in "Induction of immediate spatiotemporal changes in thalamic networks by peripheral block of ascending cutaneous information," Nature, Vol.361, 11 February 1993, p.533–536, some new experiments on the thalamus. More precisely, they described how different cells in the thalamus respond to different ways of stimulating the whiskers of a rat. They showed how some cells in the thalamus tend to act as advance predictors of other cells, the cells which register the primary sensory events. Then they described experiments in which they used lesions to make the predictor cells into bad predictors. After learning, however, the predictor cells would somehow learn to use different inputs, and learn a way to become good predictor cells again. This strongly supports the theory that the underlying learning mechanism here is one which tries to minimize prediction errors. Nicolelis and Chapin, and Pribram's group at Radford, were beginning to undertake new experiments, last year, to strengthen these results, by changing the correlations between different inputs coming into the rat (rather than using lesions), to test the ability of this system to learn a new model.

Strictly speaking, our neuroengineering designs for system identification have some aspects which sound rather strange, at first. We need one subsystem which predicts X (i.e., these cells in the thalamus, supported by inputs from layer VI of the neocortex). We need a subsystem which reconstructs R (the neocortex, especially layer V). But to adapt this kind of system, we require some kind of clocked control, and an alternation between a phase of forward calculation when real predictions are made, and a backward phase when adaptation takes place. (See the discussions of Time-Lagged Recurrent Networks in chapters 10 and 13 of Handbook of Intelligent Control.)

Barry Richmond of NIH and his group have done new studies involving synchronization in the cortex. This is not the kind of synchronization that neuroscientists talk about when they discuss epilepsy; it's not the kind of synchronization where all the cells fire at once. Rather, it's the kind of synchronization engineers would think about, where all the cells send a meaningful signal at the same time—a signal which may be an on signal or an off signal. Richmond describes it as a kind of "window" in time. He said that he found that the usual 100-millisecond-or-so sampling time of the neocortex actually contains only a 30–40 millisecond "window" for the forward calculations which generate the output of the neocortex. There is another 30–40 millisecond window of active calculations which somehow do not lead to a change in outputs, which seems relatively mysterious. Richmond speculated—with some idea of how to test this further—that this mysterious second window is the cycle which leads to adaptation. If so, then the neocortex may well share exactly those features of our engineering designs which modellers have been most troubled by.

Coming back to FIG. 8, however, it's not enough for us to explain how the Model network is adapted. We also need to specify the learning rules used to adapt the Critic network and the Action network, in order to complete our mathematical design or model. The way we adapt the Action network is by calculating the derivatives of J, by propagating these derivatives back on through the Model network, and then using those derivatives to adapt the Action network. The backwards broken arrows in FIG. 8 represent this backwards flow of derivative calculations.

Immediately you may ask,"A backwards flow of information? Where does this come from and what sense does it make?" Well, this is a form of backpropagation. Backpropagation, in its simplest form, is used in the vast majority of ANN applications today. But the form of backpropagation shown in FIG. 8 is not the simplest form of backpropagation. It is not error backpropagation. It is not supervised learning. It is something else.

The form of backpropagation used in FIG. 8 is the original first form of backpropagation, which I developed well before my well-known 1974 thesis. The idea really came from Sigmund Freud. To develop backpropagation, all I did was to translate an idea from Sigmund Freud into mathematics. So anyone who says that Freud doesn't have applications should learn about this causal link.

Freud did not start out his career by diagnosing hysterical patients. He started out by trying to understand the dynamics of learning in the brain. He started out with an idea of neurodynamics which he returned to again in the later part of his life. It seemed very obvious to Freud at least that emotions are dominant in human behavior. And it seemed very clear that we place emotional loadings on objects in our environment. We like this; we don't like that; Freud called this phenomenon "cathexis," an emotional charge. I would say that we place a value on a variable, where he would say that we place a charge on an object. But these are just the same idea expressed in different words.

Freud then asked, "Where does emotional charge come from? How does it work?" He said, "Well, first of all, it's clear that we have to learn something about cause and effect in our lives. So let's say, for example, that we learn that object A causes B. We learn to associate A with B. We see A at one time followed by B later. But how is that represented in the brain?" Freud said that there must be a cell representing A and a cell representing B. He proposed that a forward causal association would be represented by a connection from A to B somehow, with a strength W representing a synapse strength, a connection strength. Now if A causes B with strength W, then if you place a value on B you should place a value on A. If A causes B and you want B, then you should want A. I don't see any way you can avoid that. No matter how fancy you get, you can't develop a system that learns to do complicated strategies unless it can learn that A causes B. And it has to exploit the fact that if A causes B, then if you want B, then you want A. You have to have a mechanism that does that. I don't see any way you can avoid that in engineering or in any other way.

So what is the mechanism here? Freud went on to reason: "If A causes B with strength W, then there must be a flow of cathexis or emotional charge from B back to A. That flow," he said, "must be proportional to the cathexis on B and to the strength of the association." This is something that I could write down as a mathematical equation. And in fact, this is the basic equation of backpropagation. All I did was to write down the equation, dress it up a little and prove that it is a theorem. It is simply an equation for calculating derivatives (values), and it makes perfect mathematical sense as such.

This is a new form of the chain rule. It works. You can use it in a lot of different ways in practical applications. But it really comes from Freud. Back in the 1970's, when I first proposed the HDP/BAC design and some further improvements, I found it hard to generate a lot of interest. The papers I published back then were very hard papers. And I didn't have a feeling for how to simplify and explain this kind of stuff. But just since November 1993, the engineers have finally caught up with this kind of design. Just in the last two years, people have gone ahead and implemented adaptive critic designs which have at least these three basic components—a Model, a Critic and an Action net—where you really use the Model to adapt the whole system. (See D. Prokhorov, R. Santiago & D. Wunsch, Adaptive critic designs: a case study for neurocontrol, Neural Networks, Vol.8, No.9, 1995. They have demonstrated that this kind of design gives you more accurate control in difficult simulated engineering problems than anything else that exists.)

Balakrishnan has done it with missile interception. Would you want to bet that people have spent money on how to do missile interception? Balakrishnan had worked with McDonnell-Douglas, and knew the existing methods. He tried a benchmark test, a very simple simulation benchmark test. He tested ten of the standard methods against one of these three-net kinds of critics, and he was able to reduce error by an order of magnitude on missile interception.

Prokhorov, Santiago and Wunsch have studied two difficult benchmark problems taken from Neural Networks for Control: a bioreactor problem and the autolander problem.

Many of the biologists in the room may already know what a bioreactor is. It is little vessel you use to grow cells in. You use it to grow cells which produce some kind of useful chemical product. The problem here is that cells are nasty little creatures. If you try to use conventional control, the whole thing blows up, becomes unstable, at least for the system described in Neural Networks for Control. But if you use optimizing neural net control, it is possible to stabilize and optimize this thing. Likewise, the autolander problem was suggested by NASA Ames. It is a very difficult problem of automatically landing an airplane on a short runway The problem that Prokhorov et al had was that a very simple adaptive critic could solve the original problem easily. Thus they made the problem harder; they multiplied the random wind shear by a factor of four or ten. They shortened the runway by a factor of four. And at that point even the conventional adaptive critics were crashing every time. The conventional classical controllers were also crashing every time. And at least the brain-like stuff could come in 80% of the time. Thus they achieved much higher performance in noisy nonlinear problems with this kind of architecture.

More recently, in late 1995, Wunsch and Prokhorov have reported the first successful implementations of a level 5 adaptive critic system which, as expected, performed better than the level 3 system. Prokhorov has also done some work with Feldkamp, Puskorius and others at Ford. See "Intelligent control: Recent progress towards more brain-like designs" for an update on these kinds of engineering applications, and for an updated discussion of the plausibility of backpropagation in the brain.

Figure 9:
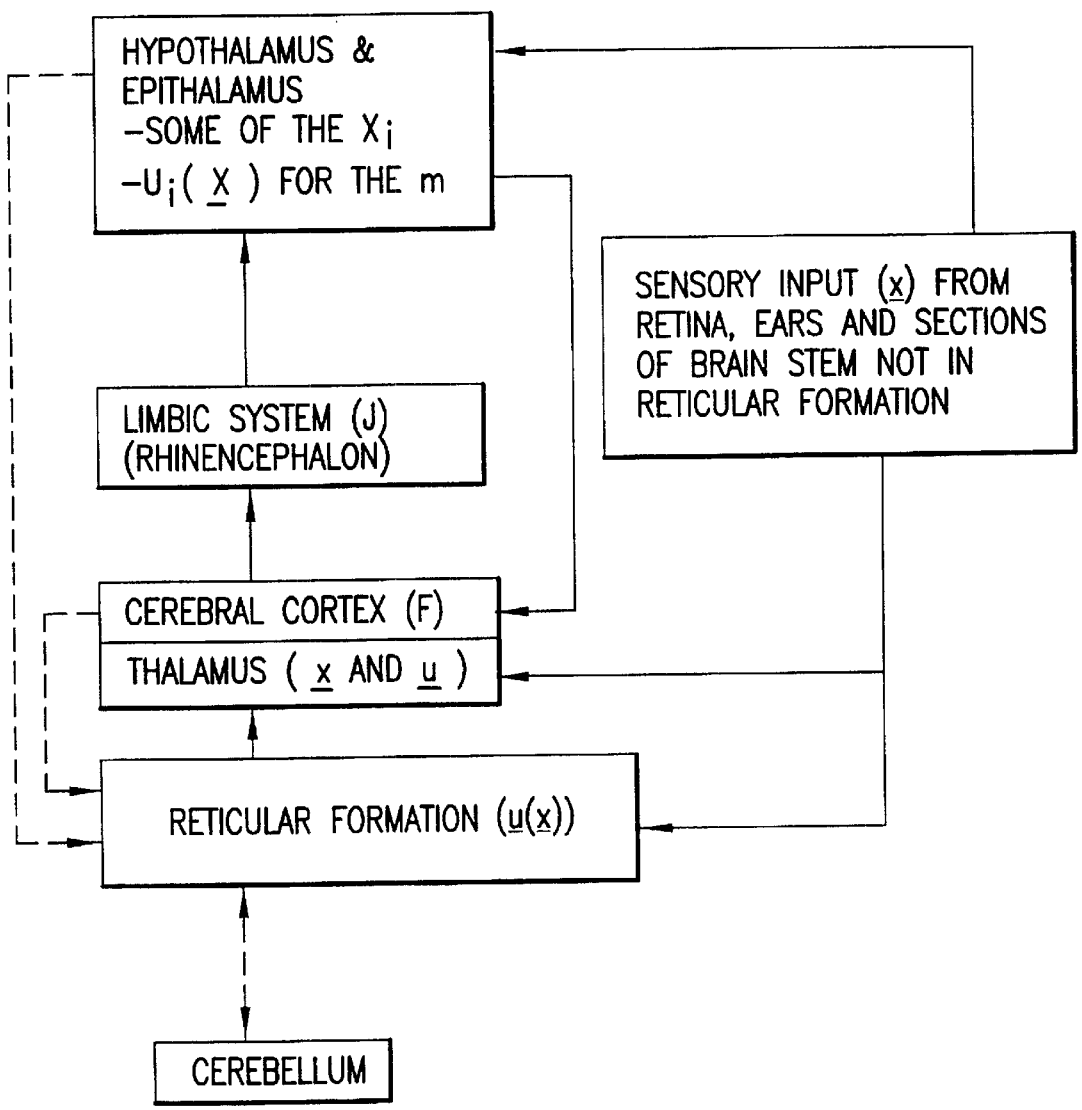
FIG. 9 is block diagram of a brain-like control system.

In 1987 I published "Building and understanding adaptive systems: a statistical/numerical approach to factory automation and brain research," in IEEE Transactions on Systems, Man and Cybernetics, Vol. 17, No. 1, 1987. The basic idea is shown in FIG. 9. In this picture, the hypothalamus and the epithalamus provide the raw utility function U. The limbic system calculates the J function discussed at length above. In other words, the limbic system acts as the emotional system of the brain. There is work due to Olds and Papez going back for decades showing the importance of the limbic system in generating secondary reinforcement signals. And then we have some system identification going on in the cerebral-thalamic system, as discussed above. I know that the cerebral cortex has other functions as well—i.e. that learning in the neocortex is based on the sum of several sources of feedback, not just prediction errors—but system identification appears to be the primary function. And then, down at the bottom of the figure, we have some Action or motor circuits.

Even in 1987, however, I recognized that the cerebellum does not entirely fit this simple picture. This was a nice first cut model, but it took a long time before I began to understand the role of the cerebellum here.

Earlier it was mentioned how simple ANNs can approximate any smooth function. But what if it's not a smooth function? Sontag at Rutgers has studied the problem of tracking control. (See E. D. Sontag, Feedback stabilization using two-hidden-layer nets, IEEE Trans. Neural Networks, Vol. 3, No.6, 1992.) He has asked what kind of networks do you need to solve a tracking problem, where the response pattern you need is not always a smooth function. Sontag found out that a 4 layer feedforward net with just 2 hidden layers can do well enough in simple tracking control. One hidden layer is not enough, but with two hidden layers you can do OK on tracking control. But then it turns out for really tough problems, you need something I call a simultaneous recurrent net (SRN). (See P. Werbos, The brain as a neurocontroller: New hypotheses and new experimental possibilities. In K. Pribram, ed., Origins: Brain and Self-Organization, Erlbaum, 1994; P. Werbos, Supervised learning: can it escape its local minimum, WCNN93 Proceedings, Erlbaum, 1993, reprinted in V. Roychowdhury et al (eds), Theoretical Advances in Neural Computation and Learning, Kluwer, 1994; and X. Pang and P. Werbos, New type of neural network learns to navigate any maze, Proc. IEEE Conf. Systems, Man and Cybernetics (Beijing), IEEE, 1996.)

A key feature of these SRNs is that they are very expensive in a certain sense. They take a long time to settle down. You can't just plug in the inputs, and then read out the outputs a millisecond later. You've got to plug in the inputs, and then let the thing settle down, and that takes a little bit of time. But when you do fast motor control you want maximum speed; you want 100 Hz or 200 Hz. What can you do?

Figure 10:
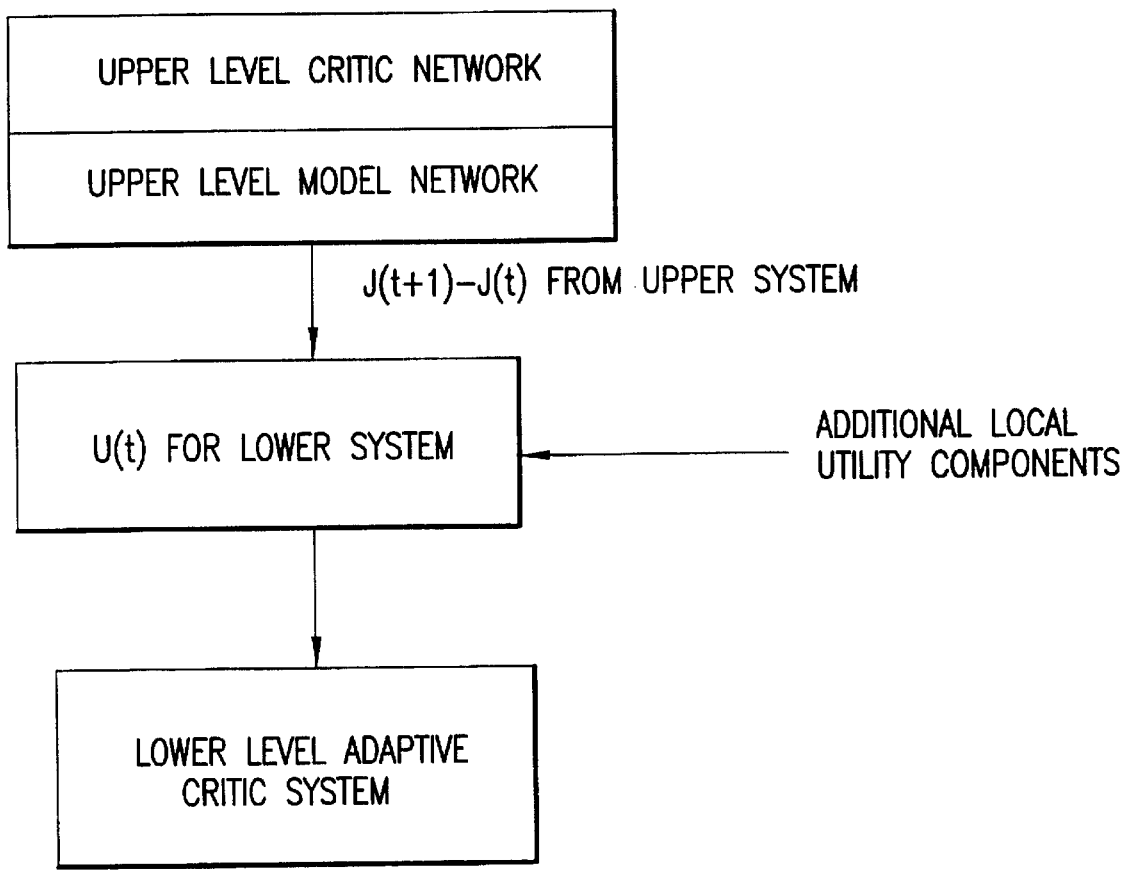
FIG. 10 is a block diagram of a multi-level, adaptive critic network.

For tracking control—or for lower-level control in general—a two-hidden-layer feedforward net is good enough. It turns out that the cerebellum, this relatively lower level part of the brain, is basically a feedforward network with two hidden layers. You've got a granule layer, a Purkinje cell layer, and then your output layer is actually the cerebellar nucleus and the vestibular nucleus together. Those two nuclei together really form the output layer. You need a lot of neurons to make this kind of feedforward net work, but there really are a lot of neurons in the granule layer. This leads up to the picture in FIG. 10.

The basic idea here is that we have not one brain but two brains. We have two entire adaptive critic control systems, an upper system and a lower system. The upper system is like the system shown in FIG. 9, with the limbic system acting as a Critic and the neocortex as a Model. The upper system, made up of SRN, components, requires a long computational cycle but has the ability to solve very difficult problems. The lower level system uses feedforward networks, primarily, to achieve fast operation at the cost of less sophisticated planning abilities. The lower-level system clearly includes the cerebellum as an Action network, and the inferior olive as the Critic network to train that Action network. The values or forces calculated in the upper system, the delta J from upstairs, becomes the U for the lower system. The upstairs J function becomes the downstairs U function. This is one way to chain a pair of controllers in a master-slave kind of arrangement. (More precisely, the U(t) which the lower system tries to maximize may be defined as something like the upstairs J(t+1)−J(t) plus a local downstairs U(t) component calculated at a higher sampling rate; the actual feedback may involve derivatives of all these quantities. The local U(t) might include terms like finger pain and so on.)

The basic idea here is that we have two entirely different systems coupled together in one brain. There is real reason to believe the inferior olive acts as a critic here, but there are also some crucial experiments that have never been done. The next most critical experiment, in my view, is to demonstrate that the inferior olive is capable of learning. (After that comes an understanding of the learning equations, in effect, starting from experiments suggested in Neurocontrol and neurobiology: new developments and connections.) To do this, you could culture some olive cells together with some Purkinje cells and maybe some spinal cells, and then start studying plasticity in those olive cells. Nobody is doing those experiments, and it's kind of scary why they aren't.

But this is an example where engineering can motivate exploring where people haven't looked yet.

By the way, there is another aspect of the lower control system, discussed in chapter 13 of Handbook of Intelligent Control. My theory here is that the cerebellum builds up its reconstruction of reality, R, using an approach rather different from what has been used before in engineering. Instead of using system identification, it simply uses time-lagged recurrence in the Purkinje layer. This requires the existence of what I call an Error Critic embedded in that layer, perhaps involving the basket cells. This approach would not allow such rapid learning as the conventional approach allows, in theory, but it does allow very fast operation—the critical issue in the lower system.

Figure 11:
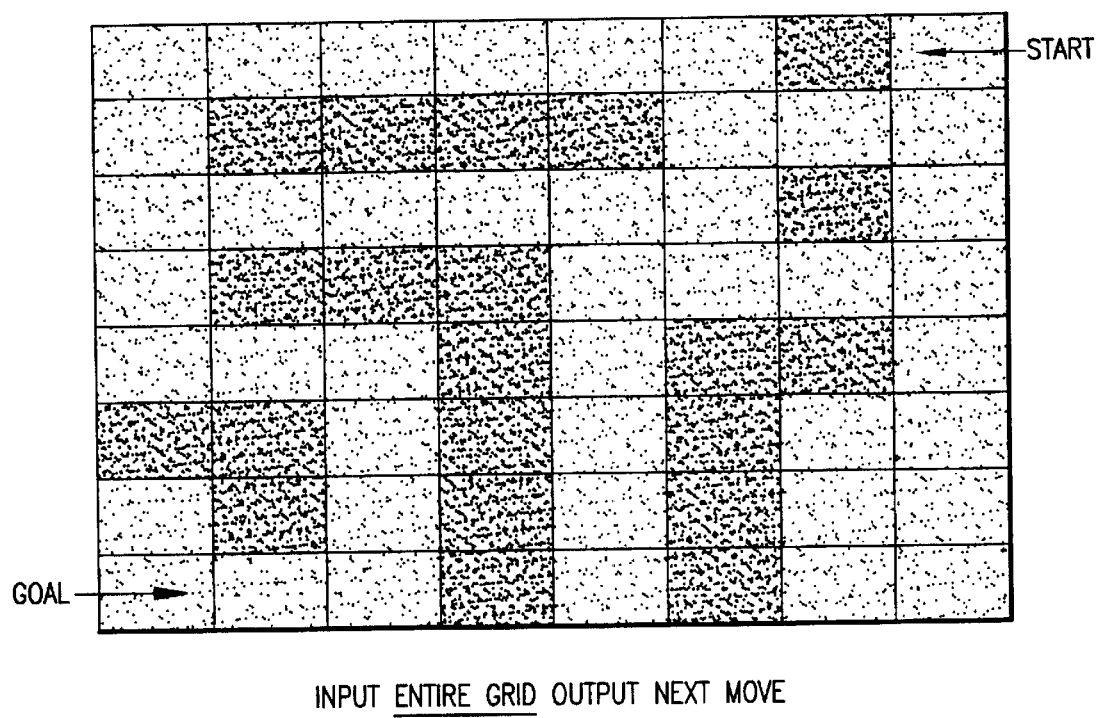
FIG. 11 is a block diagram of a maze to be solved.

FIG. 11 illustrates an example of a mapping problem that you can't solve with a feedforward net. Actually, this problem is similar to some other problems that Minsky discussed back in 1969 that the world forgot. A group of Frenchmen posed this particular problem. It's a problem in robot navigation: you want to go from the start to the goal by the fastest possible route. Now when most computer scientists study this problem, they say, "Here is a maze, and I'll train my neural net to learn the maze." But that's not the way human beings do it. If we see a new room with new obstacles in it, we don't bounce through the room a hundred times in order to learn the room. If you do it like that, you are going to smash a lot of machinery. In real-world robot navigation, you want to build a robot that looks at the room and sees the pathway through. So the task is this: the robot has to learn to see the room and respond with a path for that room.

When this problem was originally set up, a whole bunch of mazes were set up at random. The system was asked to learn the mapping for which the input vector is the pixels (i.e., they see a picture of the room from overhead), and the output is the desired behavior. It turns out a feedforward net can't learn that. It cannot even represent the mapping accurately when you hard-wire the weights. But in our recent work, we have shown that an SRN can represent this mapping exactly, for an arbitrarily large maze. (See New type of neural network learns to navigate any maze.)

The structure of the SRN appears to include the kind of nets that Grossberg and Hopfield have talked about. But the kind of learning that they have used will not produce this kind of mapping. The kind of Hebbian learning they have used will only produce associative memory. And to solve robot navigation, that's not a memory task, that's an analytical kind of task. And the only way I know to adapt a network to be able to solve that kind of tough mapping problem is with some form of backpropagation.

In Handbook of Intelligent Control, I suggested that we might use simultaneous backpropagation, a method which I first proposed and implemented back in 1981, closely related to some of the later work of Pineda and Almeida. However, as I re-examine some of the observations of Walter Freeman regarding "searching behavior" in the olfactory system, and as I consider some very complex learning problems, I begin to worry that the highest levels of intelligence may instead require the use of an Error Critic design. (In essence, the Error Critic design can provide a real-time approximation to the methods proposed by Rumelhart, Hinton and Williams for adapting associative-memory recurrent networks.). Complex as they are, these kinds of network should open the door to solving very complex planning and scheduling problems in industry, problems that could not be solved with simpler ANNs.

Finally, over the past four years, I have begun to realize the need to go beyond even the two-brain model discussed above. I am beginning to think that the basal ganglia really form a third entire brain, or, more precisely, a third entire adaptive critic control system. The evidence here comes from many sources, both from neuroscience and from engineering. On the biological side, for example, James Houk claims that the substantia nigra pars compacta, the dopamine system in the basal ganglia, serves as an adaptive critic. (See J. Houk, J. Davis & D. Beiser (eds), Models of Information Processing in the Basal Ganglia, MIT Press, 1995.) He has shown how the learning mechanisms in that organ seem to follow the mathematical rules that we have derived for how to adapt a Critic network. In fact, he claims that this is the best empirical evidence we have for a Critic network anywhere in the brain.

On the engineering side, there are many limitations in the two-brain model, which a third major system can remedy. For example, there is the issue of discrete versus continuous variables. In neuroengineering, we have mainly been dealing with continuous variables. At the highest level of human learning, we are dealing with emotions, which are also continuous variables. At the lowest level, the important variables are again mainly continuous. But in-between the highest level and the lowest level, there is a kind of AI 1/0 world that we also have to live in. Furthermore, the idea of sending reinforcement back to the representation as opposed to the output fits beautifully with some of the possibilities on the engineering side. This may be an area where three-way collaborations between psychology, neuroscience and engineering will be critical.

Another key role for the basal ganglia would involve the problem of temporal chunking, which relates to the effective-foresight problem I mentioned in Neural Networks for Control. If we postulate that the basal ganglia basically evolve a "menu" of action schemata, we may use them to address both the discrete choice problem and the chunking problem, together. Each schema would have to include its own "membership function" or "confidence measure," perhaps adapted in a way similar to what is used with mixture-of-experts systems. It would also have to involve its own local critic, able to translate directly from goals at the end of a task to values at the start. It turns out that the development of such a local critic can be equivalent to the development of a local forecasting system, which tries to predict the result of the task directly from its initial state, with appropriate constraints on the structure.

An interesting problem in designing such a system is the choice between digital all-or-nothing choice versus fuzzy choice. Even when there are strict, mutually exclusive choices to be made between action schemata, a fuzzy system may work better, for a variety of reasons, involving flexibility, learnability, and the ability to learn to do two things at once and so on. Nevertheless, the choice of which schema to "turn on", to what degree, is related to the problem of discrete choice. It suggests the need for explicit decision-making cells, perhaps in layer V of neocortex, with a certain kind of stochastic aspect, analogous to the "temperature" mechanism discussed by Dan Levine and others. To create an efficient, functional neural net embodying this idea, one can use either the Stochastic Encoder-Decoder-Predictor (SEDP) architecture or some recent extensions of that architecture. In the SEDP architecture, there is an interesting duality between "predicted $R_i$" and "estimated $R_i$" variables, which might possibly be reflected in the duality between calculations in the apical dendrites of giant pyramid cells and calculations in the cell body. This architecture may also make it natural to train layer V as a "dual-use" structure, making decisions and reconstructing reality at the same time, and learning based on the sum of feedbacks from both activities. Alternatively, one might ascribe the decision-making to the striatum itself, albeit still with feedback that affects learning in layer V.

A very interesting test problem for some of these designs would be the Chinese/Japanese game of Wei Chi or Go, which combines elements of large-scale continuous decision-making with local discrete choice and exploration, plus a need for some of the special tricks in New type of neural network learns to navigate any maze.

The above model of a two-brain architecture eventually evolved into a 3-brain architecture for artificial intelligence. A method for building a new type of general-purpose artificial intelligence which will be called a "3-brain system" or "3-brain architecture" is described hereinafter.

This architecture was originally motivated by an effort to understand and replicate the kinds of problem-solving capability and learning which exist in the brains of mammals (See P. Werbos, Learning in the brain: an engineering interpretation. The details of these efforts are described in several papers filed with the preliminary patent applications and included as part of this disclosure. An additional paper describes some of the underlying engineering principles and ideas for how to use these designs in practice. (See P. Werbos, Neurocontrollers, in J. Webster, ed, Encyclopedia of Electronics and Electrical Engineering, Wiley, forthcoming. (Draft version incorporated here.)

The 3-brain architecture is not, strictly speaking, a single design. It is a design methodology, whch can be implemented in a variety of ways, on a variety of platforms. The architecture can be embodied in chips, in optoelectronic hardware, in biomolecular hardware, or in software. As a practical matter, the software emulation will probably come first, in order to permit the careful evaluation and tradeoff studies necessary to justify the more expensive step of building dedicated hardware.

This design methodology may be thought of as an improvement to certain architectures previously developed (and partly patented) by this author. More precisely, it is an extension of the model-based adaptive critic (MBAC) or "brain-like intelligent control" designs described in the attached papers. Those designs, in turn, may be seen as extensions of Ron Howard's methods of dynamic programming. (See R. Howard Dynamic Programming and Markhov Processes, MIT Press, 1960.)

In general, all of these designs can be expressed as designs for learning-based maximization of utility over multiple time periods into the future. This includes "reinforcement learning" as a special case. (See P. Werbos, The cytoskeleton: Why it may be crucial to human learning and to neurocontrol, Nanobiology, Vol. 1, No.1, 1992.) In reinforcement learning, an intelligent system is given access to a set of sensor inputs, a set of actuators which it controls (i.e. its outputs are wired up to the actuators), and to a monitor which evaluates its performance or "utility" (U). Through learning and/or exploration, it develops a strategy or "policy" of action which enables it to maximize (or minimize) total utility in the future. These reinforcement learning systems are intended to be general-purpose systems, because the same learning system can be applied to different applications, simply by having it learn to adapt to these various applications separately. The 3-brain architecture is a major, qualitative improvement over the earlier designs, insofar as it has the potential ability to learn to cope with far more difficult applications. In effect, it is a general purpose system for making intelligent decisions.

This paper will describe how to build a 3-brain system, by a series of progressive improvements, starting from incremental dynamic programming, which will be reviewed. The first part of the paper will describe new designs for "temporal chunking" with reinforcement learning, in a classical context. The second part will describe how to replace the matrices in these new designs with neural networks (or similar structures), in order to permit larger-scale applications based on the ability of neural networks to approximate complex nonlinear relations in a parsimonious way. The third part will describe new, more sophisticated neural networks (and their nonneural generalizations) which should perform better than conventional neural networks as components of these designs; in addition, it will describe some possible hardware implementation of the most critical, computationally expensive components, and address the extension of this system to incorporate aspects of "spatial chunking."

Crudely speaking, the first three parts of this paper will describe how to construct the "upper brain" and the "middle brain" as described in Learning in the brain: an engineering interpretation. The fourth part will describe briefly how to attach such a higher-level intelligent system to a lower level "brain" so as to construct a complete "3 brain" system.

The technological intention here is to first build up a modular software package, in which a full three-brain system can be obtained by linking together the appropriate modules. (Before this is fully completed, however, some of the hardware development recommended in part 3 will be started, if possible.) However, for practical purposes, the user of this software will also be able to use simpler modules, or alternative modules, to fill in the various components, if he or she chooses. The step-by-step approach to constructing this kind of intelligent system is intended to provide additional flexibility in the overall package, flexibility which a monolithic implementation would not possess.

Notice that this paper will suggest several alternate designs, based on the same general approach or method, to perform subsystem tasks. In earlier research, in past years, the author often tried to specify one best alternative for each subsystem. But experience showed that different alternatives worked better in different applications. Thus the intention is to build a general system which provides the user a choice of subsystems, so as to allow extensive tradeoff studies.

1. Time-chunked Approximate Dynamic Programming
1.1. Notation and Classical Results In the simplest forms of dynamic programming, we assume that the environment or the plant to be controlled can only exist in one of a finite number of possible states. These possible states may be denoted as $s_1, \ldots, s_i, \ldots, s_n$, where n is the number of states. At each time t, the intelligent decision-making system observes the state s(t) (where s is an integer between 1 and n), and then outputs a vector containing decisions or control variables, u(t). Usually the intelligent system will choose u(t) based upon a "policy" n which is simply a collection of rules of how to behave (to choose u) in different states s.

This may be written conceptually as:

$$u(t) = u(s(t), \pi) \tag{1}$$

Normally the user of the system provides a utility function U and an interest rate r. We are asked to design an intelligent system which can learn the optimal policy, the policy which at any time t will maximize:

$$\left\langle \sum_{\tau=t}^{\infty} \frac{U(s(\tau), u(\tau))}{(1+r)^{\tau-t}} \right\rangle, \tag{2}$$

where the angle brackets denote expectation value. (It is a straightforward well-known extension of this to consider finite horizon problems, in which τ goes to some finite maximum T. Also, it is common to build designs in which τ is initially set to a high value—even infinity—in the first few iterations, and lowered slowly to the user-specified value, as a method for improving learning.)

Normally it is assumed that we know the transition probabilities as a function of action, which may be written:

$$P_{ji}^\pi = Pr(s_j(t+1) | s_i(t), u(t)) \tag{3}$$

For a particular policy π, we may define the classic J function as:

$$J^\pi(s(t)) = \left\langle \sum_{\tau=t}^{\infty} U(s(\tau), \underline{u}(\tau))/(1+r)^{\tau-t} \right\rangle \tag{4}$$

and:

$$J(s(t)) = \max_\pi J^\pi(s(t)) \tag{5}$$

The basic theorems of incremental dynamic programming describe the properties of this function J, which must normally obey the Bellman equation:

$$J(s(t)) = \max_{u(t)} (U(s(t), \underline{u}(t)) + \langle J(s(t+1)) \rangle) \tag{6}$$

Note that this equation also provides a basis for actually choosing u(t) at any time t.

In the case where there are only a finite number of possible states s, we may define a state probability vector p by defining its components $P_1, \ldots, p_i, \ldots, p_n$ as:

$$p_i = Pr(s_i) \tag{7a}$$

$$p_i(t) = Pr(s(t) = i) \tag{7b}$$

In this notation, we have, for any policy π:

$$p(t+1) = P^\pi p(t) \tag{8}$$

Likewise, we may define the vectors $J^\pi$ and $U^\pi$ by defining their components:

$$U_i^\pi = U(s_i, u(s_i, \pi)) \tag{9b}$$

In this notation, equation 4 takes the form:

$$J^\pi = U^\pi + M^\pi J^\pi, \tag{10}$$

where we define:

$$M^\pi = (P^\pi)^T/(1+r) \tag{11}$$

1.2. Classical Approaches

In traditional incremental dynamic programming, the optimal policy is found by some kind of alternation between "value updates" and "policy updates." (See D. P. Bertsekas and J. N. Tsitsiklis, *Neurodynamic Programming,* Belmont. Mass: Athena Scientific,1996, and R. Sutton, TD Models: Modeling the World at a Mixture of Time Scales. CMPSCI Technical Report 95–114. U. Mass. Amherst, December 1995, later published in *Proc. 12th Int. Conf. Macjine Learning,* 531–539, Morgan Kaufmann, 1995.) One starts with something like an arbitrary policy n and an arbitrary estimate of the value vector J. One learns the optimal policy simply by progressive improvements in the policy and in the estimated value vector. The value updates are generally based on equations 6 and 10, translated into:

$$J^{(\pi+1)} = U^{\pi} M^{\pi} J^{(\pi)} \quad (12)$$

In other words, for the current policy $\pi$, one replaces the old estimate of J ($J^{(\pi)}$) with this new estimate ($J^{(\pi+1)}$). In a policy update, one simply picks u(t) at each time t so as to maximize the right-hand side of equation 6, using the current estimate of J. In particular, one may do all this for the entire set of states (as implied by equation 12) or for one state at a time. The MBAC designs mentioned above provide neural network approximations to these kinds of updates.

Broadly speaking, there is another important choice of strategies in making these kinds of updates. In a passive strategy, one simply assumes the current policy n, and carefully works out J in detail. In the active approach, one explicitly designs the value-updating system so as to permit more frequent changes in the policy n and more explicit allowance for the effects of such changes.

1.3. Temporal Chunking: Multiresolutional Designs

Traditional approaches to dynamic programming and to approximate dynamic programming (ADP) are generally based on "backups" or "value updates" from time t+1 to time t, as implicitly assumed in equation 12. But in a real-time control system, the interval between time t and time t+1(the sampling interval) may be very short. The literature on artificial intelligence has stressed the need to jump over longer time intervals however, this kind of "temporal chunking" has yet to be implemented in effective learning-based ADP designs.

In theory, the usual ADP designs should all converge to the correct policy, anyway, if given enough time. But there is a problem here with computational cost and computational complexity. To put it another way, new designs which inject time chunking into ADP should lead to reductions in computational cost and complexity, which in turn should make it possible to handle more complex applications at acceptable cost.

To understand these cost issues, return to equation 12. For simplicity, assume a purely passive approach, in which we try to find the correct J function ($J^{\pi}$, in effect) for a fixed policy $\pi$. Assume that the initial estimate of J—$J^{(0)}$—is simply set to equal U. In that case, it is easy to see that:

$$\underline{J}^{(n)} = \sum_{i=0}^{n} (M^{\pi})^n \underline{U}. \quad (13)$$

Thus after n complete value updates, the "critic" (the estimate of J) "sees" only n periods of time into the future, in effect. Equation 13 is just an estimate of the true value:

$$J^{\pi} = (I - M^{\pi})^{-1} U \quad (14)$$

In order to learn the true J much more quickly, one may exploit the following numerical identity (for the limiting case, assuming no singularities, as usual):

$$J^{\pi} = \ldots (I + (M^{\pi})^{16})(I + (M^{\pi})^{8})(I + (M^{\pi})^{4})(I + (M^{\pi})^{2})(I + M^{\pi}) U \quad (15)$$

Using this approach, after only n steps of calculation, one "sees" $2^n$ periods of time into the future. There are two ways to implement this approach:

1. For each number j, from j=1 to "infinity", multiply $J^{(j-1)}$ on the left by $M^{\pi}$ $2^j$ times, and then add the result to $J^{(j-1)}$, in order to calculate $J^{(j)}$.
2. To start with, set $M_0 = M^{\pi}$. Then for each iteration j: first set $M_j = M_{j-1} M_{j-1}$; then calculate:

$$J^{(j)} = J^{(j-1)} + M_{j-1} J^{(j-1)} \quad (16)$$

There are many possible extensions of this, such as the obvious generalizations based on the repeated application of:

$$J_{\pi k} = (I + (M^{\pi})^{\pi} + (M^{\pi})^{2\pi} + \ldots + (M^{\pi})^{\pi(k-1)}) J_{\pi}, \quad (17)$$

where I now define (just for equation 17):

$$\underline{J}_n \equiv \sum_{i=0}^{n-1} (M^{\pi})^i \underline{U} \quad (18)$$

and where the parameter k can be set to any integer >1, and even varied from iteration to iteration if desired.

These methods, collectively, will be henceforth called Multiresolutional ADP. In conventional artificial intelligence, they would correspond to systems based on "clock-based synchronization."

It should be noted that the n-step methods described by Sutton have some relation to these methods. However, Sutton's designs permit a foresight extension of only a factor of 2 (or of k), rather than $2^{\pi}$ or $k^{\pi}$! He does not demonstrate any awareness of the crucial tricky relation in equation 15.

Both in Multiresolutional ADP and in other temporal chunking designs, it can be extremely useful (when possible and appropriate) to represent a utility function as a growth process, i.e. as:

$$U(s(t), u(t)) = V(s(t)) - V(s(t-1)), \quad (19)$$

for some reasonable function V, in the case where r=0. This can permit a substantial reduction in the apparent complexity of the calculations.

1.4. Temporal Chunking: Two-Level Event-Based Designs

If the matrix $M^{\pi}$ were a fully populated (fully connected) matrix, it would be very difficult, in principle, to improve upon these multiresolutional methods. However, as a practical matter, the matrix $M^{\pi}$ will usually be extremely sparse, in large real-world applications. To reduce the costs still further, in the finite state situation, one can use a domain decomposition approach, in order to exploit this sparsity.

To begin with, let us consider a simple partition design for implementing this approach. Let us assume that the possible states of the plant have been partitioned into blocks. Thus every state s will be denoted by $S_{A,i}$, where A is the block number and i is the number of the state within the block. The key to this approach is to find a partition such that Pr(B(t+1), j(t+1)|A(t), i(t)) will equal zero, except when block B happens to be one of a very small set of blocks "near to" A. More precisely, if n(A) is the set of blocks B such that a direct transition from A to B is possible, then the key is to find a partition such that n(A) is as small as possible for the "average" block A. This is a two-level design, where the upper level involves the choice of blocks A or B, and the lower level involves the choice of states i and j.

Starting from any block A, for a fixed policy $\pi$, we now have two sets of transition matrices to consider: $P^A$, which represents transitions within block A, and $P^{BA}$, which represents transitions from block A to a different block B. Mirroring equation 11, we then arrive at the matrix $M^A$ and the matrices $M^{AB}$.

For any vector v defined over all of the possible states of the plant, let us write "$v|_A$" to represent that portion of the vector v which applies to states within block A. For example, if there are 100 possible states of the system, of which 15 are in block A, then v will be a vector with 100 components, and $v|_A$ will be a vector 15 components, extracted from v. In this notation, the Bellman equation (equation 10) implies, for each block A:

$$\underline{J}^\pi|_A = \underline{U}^\pi|_A + (M^\pi \underline{J}^\pi)|_A \qquad (20)$$

$$= \underline{U}^\pi|_A + M^A \underline{J}^\pi|_A + \sum_{B \in n(A)} M^{AB}(\underline{J}^\pi|_B)$$

By matrix algebra, this implies:

$$\underline{J}^\pi|_A = (I - M^A)^{-1}(\underline{U}^\pi|_A) + \sum_{B \in n(A)} ((I - M^A)^{-1} M^{AB})(\underline{J}^\pi|_B) \qquad (21)$$

Let us define:

$$J^A = (I-M^A)^{-1}(U^\pi|_A) \qquad (22a)$$

$$J^{AB} = (I-M^A)^{-1} M^{AB} \qquad (22b)$$

With these definitions, equation 21 reduces to the following fundamental equation for event-based chunking:

$$\underline{J}^\pi|_A = \underline{J}^A + \sum_{B \in n(A)} J^{AB} * (\underline{J}^\pi|_B) \qquad (23)$$

where the asterisk indicates matrix multiplication. Equations 22a and 22b imply the following recurrence relations, similar to the Bellman equation:

$$J^A = U^\pi|_A + M^A J^A \qquad (24)$$

$$J^{AB} = M^{AB} + M^A J^{AB} \qquad (25)$$

The simple partition design is defined as any incremental dynamic programming design in which:
1. $J^A$ and $J^{AB}$ are updated by some sort of use of equations 24 and 25;
2. The global estimate of J is updated or calculated by use of equation 23, in some way;
3. Policies or actions are updated based on J, as usual.

As with ordinary incremental dynamic programming, value updates (updates of J, $J^A$ or $J^{AB}$) or policy updates may be global (all states at once) or local (e.g. state-by-state), and may be scheduled in a variety of ways.

Furthermore, one can reduce computational cost (or architectural complexity) by a considerable amount, by performing only the most essential calculations at appropriate times. For example, in order to develop long-term foresight most efficiently, one can use equation 23 very often only to update J for those states in blocks A which can be reached directly, in one step from states in other blocks. Values of J in other states are needed only when updating actions; such updates typically require the calculation of only a few J values, for the block in which action decisions are currently being updated. Formally, if a state i in block A can be reached directly in one step from block B, then state i will be called a "post-exit" state of block B. Global foresight requires only that J be updated in post-exit states, because those are the states whose J values are actually used in the far right term of equation 23.

1.4.1. Variations to the Simple Partition: Focused Partition and ADAC

There is a very straightforward variation of the simple partition design which has many of the same properties. This variation may be called the focused partition design. In this variation, we define the exit states of any block A as the states from which a direct transition to other blocks is possible. One tries to find a partition which minimizes the number of exit states. In the simple partition design, we always consider those components of a vector v which apply to states within the block A.

In the focused partition variant, we consider those states in A which are not exit states, plus those states of other blocks which can transition to block A in a single step. The resulting changes in structure are straightforward, but of some significance. For example, in equation 23, instead of considering J values for state in other blocks B on the far right, we consider only J values for the exit states of block A. But the matrices $J^A$ and $J^{AB}$ are extended, so as to provide components of the J values for exit states of some other blocks. In fact, it is most convenient simply to update additional vectors, $J^+_A$, which estimate the values of J for the exit states of each block A. It is not necessary to maintain estimates of J for other states. The major value of this variant is to reduce the size of the rightmost term in equation 23. This is especially useful in the completely active variant, where it is important to minimize the number of inputs to the various neural networks.

There is another variant here which should be mentioned, for the sake of completeness, even though it is not a preferred variant. It is possible to define:

$$J'^A(i,u) = U(i,u) + (M^A(U)J^A), \qquad (26)$$

in rough notation, where "I" represents a state within block A. This is the most natural way to apply the notion of "Action Dependent HDP" or "Q learning" in this context. ADHDP and Q-learning are both examples of what is called "ADAC," the Action-Dependent Adaptive Critic. (See D. White and D. Sofge, eds, *Handbook of Intelligent Control*, Van Nostrand, 1992.)

One can adapt $J'^A$ based on transitions within block A, using essentially the same kind of update we would use for $J^A$, just as the classic method ADHDP is essentially the same as HDP, with the same minor variations. This is not the preferred version for large-scale problems, because it entails the same sort of weaknesses (with a few advantages) of ordinary ADHDP and Q learning. However, when the choice of actions is actually very limited an state variables are very complex, this variation can be useful. For low-level control, the choice of actions is usually more continuous, but for higher-level decisions the important choices sometimes are more discrete.

1.4.2. Step-by-Step Approaches to Learning J, $J^A$, $J^{AB}$ or $J'^A$

In a pure finite-state problem, direct matrix updates of J, $J^A$, $J^{AB}$ or $J'^A$ based on these equations can be very efficient. However, the ultimate purpose of describing the finite-state case in this paper is to set the stage for the full preferred form of the 3-brain architecture, which involves neural networks and learning for large-scale problems. For the sake of simplicity (and step-by-step implementation), the neural net designs will be presented as extensions of finite-state methods.

For neural network designs, especially, it is important to consider methods for updating J, etc., on a step-by-step basis. Such methods can be studied and used in the finite-state case as well. Even in the finite-state case, there are several choices for how to update $J^A$ and $J^{AB}$, essentially the same as the usual choices in updating J in ordinary ADP. One choice is simply to use the matrix equations, as written (or restricted to exit states, where applicable), for global value or policy updates. Another is to use state-by-state updates. In conventional state-by-state updates, for example, it is common to change the estimate of J(s(t)) in proportion to:

$$J(s(t+1))/(1+r)+U(s(t),u(t))-J(s(t)), \quad (27)$$

where s(t+1) may be the state actually observed after state s(t), as we observe the actual plant, or where s(t+1) may be simulated based on the correct transition probabilities (P). In our case, we may apply exactly the same approach to updating $J^A$. In rough notation, we may update our estimate of $J^A$ in any state s(t) as follows:

$$\text{new } J^A(s(t)) = \text{old } J^A(s(t)) + LR* \quad (28)$$
$$(\text{``}J^A(s(t+1))\text{''}/(1+r) + U(s(t)\cdot \underline{u}(t)) - \text{old } J^A(s(t)))$$

where LR is some kind of learning rate. (LR will usually be less than zero because of the stochastic nature of this process.) In this equation, "$J^A(s(t+1))$" usually represents our estimate of $J^A(s(t+1))$, which we are not updating here, unless s(t+1)=s(t), in which case we use the old estimate.

However, in the case where s(t+1) is not in block A, $J^A(s(t+1))$ is not defined; in that case, we use zero instead of $J^A(s(t+1))$ in equation 28. This is not an ad hoc fix; instead, it follows directly from analyzing equation 24. This same approach can also be applied in updating the $J^{AB}$ matrices. Notice that $J_{ij}^{AB}$ has an important intuitive interpretation: if the system starts out in state i in block A, then $J_{ij}^{AB}$ represents the probability that the next future state outside of block A will be state j in block B, discounted by the interest rate r (if r≠0). The simplest appropriate update rule is:

$$\text{new } J_j^B(s(t)) = \text{old } J_j^B(s(t)) + LR*(\text{``}J_j^B(s(t+1))\text{''}/(1+r) - \text{old } J_j^B(s(t)), (29)$$

where the additional indices (i and A) representing state s(t) are omitted, and where "$J_j^B(s(t+1))$" represents the old estimate of $J_{ij}^{AB}$ except in the case where s(t+1) is no longer in block A. In that case, "$J_j^B(s(t+1))$" is defined as 1, if s(t+1) is state j in block B, but otherwise zero.

Actually, there is a further variation of this adaptation procedure for $J^{AB}$ which—though more complex—may improve convergence in some cases. One may define a new global transition probability:

$$\Pi_i^{AB} = \sum_j J_{ij}^{AB} \quad (30)$$

One can then adapt this transition probability using an update rule essentially identical to equation 29, except that it uses a term "$\pi_i^{AB}$", which equals 1 if and only if s(t+1) is in block B. One can adapt a conditional J value, $J'_j{}^B$, using the same adaptation rule as equation 29, with J replaced by this J', except that adaptation is skipped whenever s(t+1) is not in block A or block B. In this variation, one continually updates $\pi^{AB}$ and $J'^{AB}$ instead of $J^{AB}$, and one replaces the use of $J^{AB}$ by exploiting the relation:

$$J_{ij}^{AB} = \pi_i^{AB} r_{ij}^{AB} \quad (31)$$

All of these state-by-state update procedures are adaptations of the classic methods first proposed as Heuristic Dynamic Programming and later elaborated under the name Temporal Difference methods.

As an alternative to such methods, there are of course more classical methods (usually less efficient) for estimating transition probabilities in this kind of situation. For example, in each transit through block A, one may simply record every state visited. For every state in block A, one maintain a description of the distribution of the corresponding eventual exit state. One may then update each such description as soon as one exits A again, and then one can delete the record of this transit. It is straightforward to adapt this method to a neural network approach as well, similar in spirit to Widrow's original adaptive critic blackjack player, briefly discussed in Neurocontrollers. Although these approaches are expected to be less robust than the state-by-state update methods, they may be useful as part of a more complex hybrid approach combining both.

Finally, it is also possible to use step-by-step learning procedures to update the global estimates of J, based on equation 23. It has already been noted that we do not actually need to update estimates of J for every state. It is enough simply to update estimates of post-exit states (in the simple partition case) or of exit states (in the focused partition case). For updating action policies it is enough, in effect, to use equation 23 directly to calculate J(s(t+1)) for particular states s(t+1) which might result from u(t).

For updating the essential J values, consider the analogy between equation 23 and the Bellman equation (equation 10), for the simple partition case. Equation 23 is like the Bellman equation, except that s(t) in the Bellman equation corresponds to the first state encountered when entering block A, while s(t+1) corresponds to the first state (j) encountered when exiting the entire block A. This suggests three natural ways to update J on a state-by-state basis. First, we can remember the initial state i encountered when entering block A, and then, upon exiting block A, adapt the estimate of $J_i$ so as to be closer to:

$$J_i^A + (J_j/(1+r)^\tau), \quad (32)$$

where τ is the number of time periods between entry and exit, which must be remembered as well unless r=0. This is a reality-based update. A reality-based update can only be undertaken once per τ time periods, roughly, because it requires that we wait from the start to the exit from the block. Second, we can store i, j and τ in some kind of memory, and do a memory-based update at some later time. (This is an example of the learning strategy called "syncretism" in Chapter 3 of Handbook of Intelligent Control.) Third, we can pick a possible or remembered (or just conceivable) value for i, and then simulate j (and τ, if r does not equal zero). Notice that the matrices $J_{ij}^{AB}$, made up of transition probabilities, can be used to perform this kind of simulation, without any need to simulate intermediate states. Simulation-based updates and memory-based updates of J can be done much more frequently than reality-based updates, because they require only one cycle time of computation. Therefore, the preferred variation for a full, efficient, parallel 3-brain design would involve frequent simulation-based updates and memory-based updates of J, especially for calculations involving large chunking intervals T, even during normal real-time operation of the system.

In actuality, for a neural-network approximation of this system, to be described in section 3, there is an easier step-by-step adaptation rule for these post-exit J estimates. We can simply set:

$$\text{new } J_i = \text{old } J_i + LR(J^A(i) + \text{``}J^B(i,J|_B)\text{''} - \text{old } J_i), \quad (33)$$

where the term in quotations refers to the output of a neural network (or other supervised learning system) which is trained to input the J estimates for the post-exit states of block A and a specification of a state i in block A, and to output the complete $J^{AB}$ term for that state i (i.e., to output the summation in equation 23.)

Equation 33 may be called a backwards value update, to contrast it against the update procedure related to equation 32, which may be called a forwards value update. (In similar language, equation 23 is used in the classical approach to provide a backwards value update, but a matrix-based update rather than a state-by-state update. Later, neural network approximations provide still another choice between "pattern learning" and "batch learning" alternatives.) The tradeoff between forwards value updates and backwards value updates is a recurrent issue, even in more complex designs. In this context, however, the backwards value updates have an advantage, because they are exact; by contrast, equation 32 involves the usual random disturbances associated with any statistical sampling method, without any real cost advantage.

1.4.3. From Passive Design to Active Design: Locality and Decision-Making

This section will describe further variants of these designs, also motivated by the desire to provide a basis for neural network learning extensions.

The simple partition and focused partition designs, as described above, were both derived as passive methods—as methods for efficiently calculating J for a given action policy. To develop more active designs, one can employ two general strategies which will be explained in this section: (1) increased "locality"; (2) explicit "decision-making." In the full, preferred version of the 3-brain architecture, both of these are used.

In locality, the idea is to make sure that the things one is learning in any region of state space (here, a block) do not depend strongly on what is observed and learned in other regions of space. Locality is already widely used as a strategy in ordinary supervised learning. In that context, it is well known that local designs lead to faster and more robust learning (though often with poor generalization, for reasons which do not apply here), in part because there is no need to unlearn or relearn things as one moves from one block to another.

The simple partition and focused partition designs already provide a reasonable degree of locality. The $J^A$ and $J^{AB}$ matrices for a block A depend only on transition probabilities from that block . Thus the crosstangled global learning problem is decomposed into smaller local parts, such that the required foresight horizon in each part is usually very limited. (In principle, one could also apply multiresolution methods within each block, so as to accelerate equations 24 and 25; this is a straightforward application of what we have discussed so far, but it is questionable whether the brain uses such a complex design.) Equation 23 allows one to update the global values by jumping over an entire block in a single step of calculation, in effect. This is a form of event-based chunking, because equation 23 provides temporal chunking, and the chunks are defined by events (exiting from a block) rather than by predetermined time intervals.

This design is actually somewhat active, in the following sense. Actions within any block A should affect only the transition probabilities—and hence the $J^A$ and $J^{AB}$—in that block. However, the design is not completely active or local, because the J values used when selecting actions u are the J values for the relevant block, calculated by equation 23; this calculation in turn, does depend on some J values for states in blocks B. Thus any change in those global J values would change the actions within the block. This in turn implies that the action policy within the block will depend on global variables outside the block. Thus the action policy within the block, the transition probabilities within the block, and even $J^A$ and $J^A$ themselves, are all subject to change to some degree, depending on things outside of the block.

In order to upgrade the design to make it completely local, one can replace the matrices $J^A$ and $J^{AB}$ and the local action policy with neural networks or the like. Section 2 will describe this kind of process in more detail. In the classical context, $J^A$ is essentially just a lookup table which, for each state in block A, yields an estimate of $J^A$ (a component of the J function of dynamic programming). However, one can replace $J^A$ with either a neural network or a lookup table full of neural networks, which inputs both the state and the specific J values for blocks B which affect block A via equation 23. Those specific J values are the J values for the "post exit states" of block A, the states which can be reached from block A directly in a single transition. Equation 24, for example, provides the target which can be used to train that neural network (or any other supervised learning system) used for that purpose. Essentially the same choice of representations also applies to the network(s) which represent $J^{AB}$, although, as discussed before, there are some further variants possible for $J^{AB}$ to improve convergence. Even in the passive case, there are several ways to represent an action policy (exactly as in ordinary incremental or approximate dynamic programming); for the completely local variant of the simple partition design, the action policy itself would also be represented either as a neural network or something similar, or a lookup table of separate neural networks for each state. The preferred embodiment for large-scale control tasks would involve a single neural network for each of these components. Because the dependence on information outside of block A can be accounted for by these networks, they should make it possible to learn the relevant information (the three networks, normally) depending only on information within the block itself; in principle, changes outside of the block should not require any change in these networks. This kind of complete locality has many advantages.

Experts in AI may ask how this kind of structure could accommodate rapid changes in estimates of "J" within a block, which exploit the power of local search activities. The answer, in brief, is that the neural networks used to approximate $J^A$ and $J^{AB}$ can have fast-learning local components (i.e. local components as in supervised learning.) There is no inherent conflict between locality as described here, and the ability to exploit the power of local search. For a full-fledged system of brain-like intelligence, one must go even further and in notion which may be called "decision-making" (or "decisiveness" or "action chunking.")

The partitions described above are very passive in nature. They do apply to large-scale decision problems in the real world, even more than they apply to abstract finite-state problems. They reflect the fact that the state of our world does not often change in a split second from one state to something radically different. The possibilities of transition from one state to another are very constrained, regardless of what actions we take. For a strict application of the designs discussed so far, the partitions and blocks must be defined so that they allow for any possible choice of actions. (In practice, however, if we have ruled out certain kinds of actions, we need only focus on transitions which are possible for the currently-considered choice of actions.)

In larger, more realistic problems, we can achieve a tighter partition, and therefore more efficient calculation, by using a concepts of decisions or action schemata or task modules or verbs in place of these large, passive blocks. (Sutton refers to "abstract actions" in an intuitive way, which does not relate to the machinery here.)

There are several ways of implementing this idea of "decision-making." In the pure finite-state case, one would usually require that the decision options—like the simple partitions above—must be specified in advance, at least in terms of an initial local action policy and in terms of the entry states and exit states. The best techniques for learning the set of options (entries, exits.) involve fuzzy chunking and such, to be discussed in a later section.

In the simplest variant, we assume that the user has supplied a list of decision-blocks, rather than a set of simple blocks. But within each decision block, there is still a choice of actions, and a definite pre-specified set of exit states and post-exit states. The one new feature is that, whenever we encounter a post-exit state, we have a choice of several possible decision blocks to enter. Thus, in any post-exit state x, we have a choice of D decision blocks we can choose from (a subset of all the decision-blocks in the system).

For each block number d (where 1<d<D), there should be block-specific matrices $J^d$ and $J_d^{dB}$, exactly analogous to the matrices $J^A$ and $J^{AB}$ discussed before. But then, if we use equation 23, we would have D different estimates of the value of J(x,d), depending on the choice of decision, without even considering how to handle $J|_B$. Of course, the proper procedure is that, upon entering x, we choose the decision d which maximizes:

$$\tilde{J}(x, d) = J^d(x) + \sum_{B \in n(d)} J^{dB} * (J|_B) \qquad (34)$$

Strictly speaking, we do not really need to identify blocks B as such; this is really a short-hand way of saying that the sum is to be taking over the post-exit states of decision block d. To perform this summation, we need to know the estimates of J in all the post-exit states, just as before. Note that when we decide on the decision block for state x, we can at that time update the estimate of J in that state to be closer to the estimate indicated by equation 34! Thus equation 34 is both a recipe for making decisions, and for updating global J estimates. It is a kind of higher-level Bellman equation, even more than equation 23 is!

Once we have made a decision—i.e., entered a particular decision block—it is appropriate to update $J^d$ and $J^{dB}$ only for that decision d (not for the alternative decisions we might have made!) based on current real experience, until we have exited from that decision block.

Unfortunately for the control theorist, the simplest variant here is still not quite enough to explicitly capture the full process of decision-making by mammalian brains. Even after a decision is made, it is sometimes useful or necessary to abort the decision before the normal post-exit states are reached. There are three phenomena to be considered here: (1) failure to complete the task; (2) changing one's mind, sometimes because of new opportunities arising, sometimes due to incipient failure, etc.; and (3) modification of the goals of the task. The third of these is beyond the scope of this section. For strict locality, we can and must account for the first two simply by redefining the post-exit states to include failure states and states of changed mind. (To allow changing of minds, one applies equation 34 to all possible states where it may be reasonable to consider changing one's mind.) But as a practical matter, it is more reasonable to build a system which tries to learn all the important exit modes, in a purely active/local manner, but which remains somewhat consistent by using equation 23 in the older passive mode (as per section 1.4.2) when unexpected exits occur. In either case, equations 23, 24, 25 and 34 remain the basis of system adaptation, both for expected post-exit states and unexpected ones.

In the limit, one might imagine using equation 23, as in section 1.4.3 and above, for all the possible decision blocks within a larger, passive block of possible states. But this simply reduces to the lower-level ADAC design (equation 26), using the larger passive block as the basis for partition. The decision-based additional locality is simply lost altogether. This analysis leads to two observations of relevance to further design work: (1) use of lower-level ADAC or mixture of expert designs to output actions can be a useful first step in suggesting initial possibilities for decision blocks, i.e. a useful part of the growing/pruning process for these systems; (2) because the ADAC approach does not fully capture the local approach, it is better, when possible, to try to learn the unexpected post exist states, so that they will not be unexpected in the future.

1.5. Temporal-Chunking: Multi-level Task-Based Designs

The previous discussion in section 1.4 only referred to two levels of organization—the block level and the state level. How far does this extend our effective vision into the future—the key problem discussed in section 1.3? If the system tends to stay in the same block for k periods of time, then we extend our vision only by a factor of k. Thus the extension of foresight is only like Sutton's k-step-ahead approach discussed in section 1.3, not like the full $k^\pi$ approach. There are still some advantages over multiresolutional methods, because of the sparsity of matrices here, but the benefit to foresight is more limited.

In order to achieve a $k^\pi$ improvement in foresight, with an event-based architecture, we can extend the designs of the previous section in order to build a multilevel hierarchy. This section will show how to do this, in the example of a three-level hierarchy. In order to extend this result to a hierarchy of more levels, one can simply use the same adaptation rules used here for the middle level, connecting it to the levels immediately above and below, and apply those rules to each one of the middle levels of the larger hierarchy, connecting each of them to the level immediately above and below. This is a straightforward process, but this section will only present the three-level case, simply in order to keep the equations from appearing truly horrendous.

This section will present a decision-making formulation based on a three-level extension of the simple partition design, with backwards value updates. Other variations discussed in section 1.4 carry over in a straightforward way. (For example, a purely passive block design may be obtained simply by providing only one choice of allowed decision blocks at each postexit state.)

1.5.1. Changes in Notation

This section will use slightly different notation from section 1.4, in order to reduce the complexity of the equations. As before, we will assume a finite number of possible states i or j of the environment. But now, the letters A and B will refer to decision blocks. Decision blocks are essentially made up of states, plus local action policies $u_i^A$ specifying the actions u to take in each state i of A, an internal critic $j_i^{A0}$, and an interaction critic $J_{ij}^{A1}$. $J_i^{A0}$, is essentially the same as $J^A$ of section 1.4, and is defined for all i∈A. $J_{ij}^{A1}$ is essentially the same as $J^{AB}$ of section 1.4, and is defined for all i∈A and j∈p(A), where p(A) is the set of all post-exit states of A. The superscript symbols "0" and "I" are chosen by analogy to the symbols $H_0$ and $H_I$ in quantum physics, symbols which represent the autonomous versus interactive components of the operator H which governs the dynamics of the universe.

Here we will also consider higher-order decision blocks, α and β. Higher-order decision blocks are made up of decision blocks. Just as the same state, i, may appear in multiple competing decision blocks, so too may the same decision block A appear in multiple competing higher-level decision blocks.

The union of p(A), across all blocks A in α, will be denoted as p(α). The set of all block-post-exit states in the entire system, i.e. the union of p(α) across all higher-order blocks a, may be written as po. The post-exit states of a itself will be written as P(α). The union of P(α) over all higher-order blocks α will be written as P( ). Each higher-order decision block must contain a set of decision blocks, plus an internal critic $J_i^{\alpha 0}$ and an interaction critic $J_{ij}^{\alpha 1}$. These critics are defined for all i∈a which are also in p( ). and for all j in p(α).

In general, for any state i, let d(i) be the set of decision blocks which can be selected from at state i. Let D(i) be the set of higher-order decision blocks which can be selected at state i. In a simple decision scheme (as described in section 1.4.3), D(i) is only defined for i∈P( ), and d(i) is defined only for i∈p( ); however, the discussion below will also allow for the possibility of allowing a change of minds and unexpected exits (as discussed in 1.4.3).

For the sake of computational efficiency, we will need to implement an additional "critic" for each decision block A, which may be written as $J_j^{A+}$, defined for j∈p(A).

Note how this change in notation simplifies the description of decision-making designs. For example, in this notation, if state i is a state in which a decision is required, in the two-level design of section 1.4, equation 23 becomes:

$$J_i = \max_{A \in d(i)} \left\{ J_i^{A0} + \sum_{j \in p(A)} J_{ij}^{A1} J_j \right\} \quad (35)$$

If i is a state in which no decision is required, then A should be already specified for that state, and $J_i$ simply equals the term within the curly brackets in equation 35.

Finally, for the sake of generality and readability, we need to replace the awkward notation used for learning used in equations 28, 29 and 33. In each of those equations, an old estimate is replaced by a new estimate, based upon a new example. The precise update rules given in those equations were really just the simplest example of a way to do that kind of learning. More generally, in each of those situations there was an old estimate (or network), which is updated in response to a new desired value or output, which may be called a "target value." Learning methods or architectures which can perform this kind of task are called supervised learning systems. For the full three-brain system, in the software version, the user will be given a choice of supervised learning systems; the ultimate preferred choice for a supervised learning system will be far more complex than the simple fixed linear learning scheme shown in the previous equations. Thus to indicate a supervised-learning update in a more general fashion, we will use the notation:

estimate←target (36)

For example, equation 29 is replaced by the more general update rule:

$$J_i^B(s(t)) \leftarrow "J_j^B(s(t+1))"/(1+r) \quad (37)$$

1.5.2. The Three-Level Design Itself

The state-by-state update rules for $J^{A0}$ and $J^{A1}$, within any decision block A, are essentially the same as in section 1.4, i.e.

$$J_i^{A0} \leftarrow U(i, u_i^A) + "J^{A0}(s(t+1))"/(1+r), \quad (38)$$

where "$J^{A0}$ (s(t+1))" is $J_{s(t+1)}^{A0}$ in the case where s(t+1)∈A, $J_{s(t+1)}^{B0}$ in case of an unexpected exit to decision block B, and 0 otherwise; and:

$$J_{ij}^{AI} \leftarrow "J_{ij}^{AI}(s(t+1))"/(1+r) = J_{s(t+1)j}^{AI}/(1+r) \quad \text{(if } s(t+1) \in A) \quad (39)$$

$$= 1/(1+r) \quad \text{(if } s(t+1) = j)$$

$$= J_{s(t+1)j}^{BI}/(1+r) \quad \text{(if } s(t+1) \in B$$

by unexpected exit)

$$= 0 \quad \text{(otherwise)}$$

When a state i demands that a decision be made, these updates are inapplicable until after the appropriate data block has been chosen. Updates are made only for the chosen decision block, not for other blocks containing a state. For a simple decision-making scheme, as discussed in section 1.4.3, unexpected exit modes do not occur; however, for the general case, one must allow for their possibility.

When a state i requires that a higher-level decision be made, that decision should be made first before any lower-level decision is made in that state. The higher-level decision is made based upon the relation:

$$J_i = \max_{\alpha \in D(i)} \left\{ J_i^{\alpha 0} + \sum_{j \in p(\alpha)} J_{ij}^{\alpha I} J_j \right\} \quad (40)$$

After this higher-level decision is made (based on this maximization), we update $J_i$ so as to match the target value of the right-hand side of this equation, which yields a backwards value update. (Actually, as in equation 32, a forwards value update could be used instead, but would not appear to be preferable in most cases.)

When a state i requires that a decision be made, and when state i is already in a definite higher-order decision block α, the decision is made based on:

$$\tilde{J}_i = \max_{A \in d(i)} \left\{ J_i^{A0} + \sum_{j \in p(A)} J_{ij}^{AI} J_j^{A+} \right\} \quad (41)$$

For strict accuracy, we may first update each of the $J_j^{A+}$ values used in equation 41, for j∈α, by using the equation:

$$J_j^+ = J_j^{\alpha 0} + \sum_{k \in p(\alpha)} J_{jk}^{\alpha I} J_k \quad (42)$$

(However, to reduce calculations, we may maintain flags or recency factors on each of the $J^+$ values, and perform this calculation only when the flags indicate that an update is overdue.) After the decision has been made (i.e., after a block A has been selected for state i), then two further updates should be carried out if i∈p( ):

$$J_i^{\alpha 0} \leftarrow J_i^{A0} + \sum_{j \in p(A)} J_{ij}^{AI\text{"}} J_j^{\alpha 0\text{"}} \qquad (43)$$

where "$J^{\alpha 0}$" is $J^{\alpha 0}$ if j∈A, or 0 otherwise; and $$J_{ik}^{\alpha I} \leftarrow \sum_{j \in p(A)} J_{ij}^{AI\text{"}} J_{jk}^{\alpha I\text{"}} \qquad (44)$$

where "$J_{jk}^{\alpha I}$" is $J_{jk}^{\alpha I}$ if j∈A, or 1 if j=k, or 0 otherwise. Similar to equations 38 and 39, the terms in quotations in equations 43 and 44 are replaced by $J_j^{B0}$ or $J_{jk}^{B1}$, respectively, if j∈β as the result of an unexpected exit from the higher order block α. (Again, recall from section 1.4.3 that unexpected exits do not represent "failure," if failure corresponds to one of the possible, anticipated but not desired states. These special provisions apply to exits which were not even considered on this list of possibilities p(α).)

After the decision has been made in state i, we also have the option of performing a third update:

$$J_i^+ \leftarrow \bar{J}_i \qquad (45)$$

Again, these updates are generally backwards value updates, as discussed in section 1.4.2; the forwards equivalents are generally straightforward, by analogy to that section.

Finally, in order to complete the basic design, we must specify how to pick the actions u at any time i, after the relevant decision A and higher-level decision α have been made. In this case, we simply choose u(i) so as to maximize:

$$U(i, u) + \sum_j M_{ij}(u)\text{"}J_j\text{"} \qquad (46)$$

where:

$$\text{"}J_j\text{"} = J_j^{A0} + \sum_{k \in p(A)} J_{jk}^{AI} J_k^{A^+} \quad (\text{if } j \in A) \qquad (47)$$

$$= J_j^{A^+} \quad (\text{if } j \in p(A))$$

Recall, from section 1.3, that all of these equations and the corresponding designs are simplified substantially in the special case where the utility function U is a growth process.

1.5.3. Action Networks, Decision Networks and Other Extensions of the Design

As previously mentioned, the various variants mentioned in section 1.4, like the focused partition design, can also be applied here in a straightforward manner.

In addition, it is straightforward to modify this system to permit the use of trees of decision blocks or task modules of varying depth. For example, one can define a "higher level" block α which contains only one decision block A. In effect, then, α becomes a kind of alias for A. In this way, we can design still-higher-level decision blocks for which, in some states i, one has a choice between initiating a truly high-level task β (a higher-level decision block) or lower-level task (A, appearing under the alias of α). The design above still goes through, without significant computational overhead involved in the "aliasing." Using this procedure, i is then straightforward to handle this more general form of hierarchy of tasks or decision modules.

The most important extensions are those which lay the groundwork for the use of neural networks, to be discussed in section 2. Of these extensions, the most important is the use of action networks and/or decision networks instead of optimal actions and decisions. In the simplest designs—as above—we always choose the best possible action u in any state i, the best possible decision A when there is a decision to be made, and the best possible higher-level decision α. This always gives the optimal result. When the number of choices is discrete and few, it is a reasonable way to go. However, when the number of choices is large, the computational cost of finding the true optimum in all cases becomes unrealistic. In that case, we can build some sort of network—deterministic or stochastic—to output actions or decisions as a function of the state and of other information.

There is a wide variety of such "action network" designs available in the adaptive critic literature, all of which can be applied here in a straightforward way, both to actions and to decisions. In addition, one can build action or decision networks which simulate several alternative possibilities at each time, and then: (1) select the best of the few; (2) adapt the network, based on these results.

A slight variation of this is to maintain a buffer containing the "best action/decision possibility found so far," and to update the buffer only when the stochastic action/decision network finds something better for the current state. Section 3 will discuss some new possibilities for implementing these subsystems, which are part of the preferred embodiment of the full neural 3-brain architecture. All of these adaptive designs also require some choice between the many, many possibilities available for initializing the various networks.

Once we extend the design by using action networks and decision networks, we can go one step further by allowing modifiers to decisions. Intuitively, then, we may think of the decision choices as something like subroutines or verbs. The modifiers are something like input arguments or adverbs. (Objects will not be discussed until a later section.) Given a decision block A, we may specify an associated vector, $u_A$, which contains the adverbs.

The adverbs may be discrete or continuous or a combination of both. There are two major kinds of adverbs, passive and active. For passive adverbs, the postexit states are still a function p(A) of A alone. For active adverbs, they depend on the adverbs; in other words, we have p(A,$u_A$)

The extension to passive adverbs is fairly easy, in principle. We expect that the decision block will be initialized to allow for some variation in its actions depending on $u_A$. We set up the action network, the internal critic network, and the interconnection critic network to receive $u_A$ as part of their input vectors. We set up the decision network to output first A and then $u_A$. (The obvious way to structure this is to add an adverb-generating network which outputs $u_A$ whenever A has just been decided upon.) Then we train the various networks just as we normally would do.

For the full version of the system, we would expect a combination both of passive adverbs and of active adverbs. With active adverbs, it is no longer practical to implement the various calculations above which require explicit consideration of all possible decisions, because the choice of adverbs allows many possible decisions, in effect. (Mathematically, the equations above then remain valid, but with "decision" replaced by "combination of decision and active adverb".) Again, however, the use of decision networks instead of exact optimization leads to a straightforward approximation of the equations above.

The choice of words "verb" and "adverb" is not just an analogy here. Our speculation is that these sorts of computational structures, as implemented in the mammalian brain, do provide the deep structure which underlies the way we talk about our lives in human language.

1.5.4. Learning of the Underlying Partitions

The previous discussion has assumed a fixed, known partition of the set of possible states. In other words, the sets of states labeled A, α, etc., are all assumed to be known.

For tasks which truly involve a finite list of possible states, this is a reasonable assumption. There is a large body of methods already in existence on sparse matrices and domain decomposition techniques; thus, if useful partitions of the matrix P are not obvious by inspection, we can simply borrow methods from that well-established literature to find them. The case where P($\pi$) depends on $\pi$ can be addressed as an extension of these methods.

On the other hand, for a truly brain-like intelligent control system, one would prefer to augment such initial techniques by adding a learning capability, which can adjust the partitions based on learning, either real-time learning or off-line learning. This becomes more important for the neural network extension/approximation of this design, to be described in section 2. However, the approaches to be described in that section can be seen as extensions (roughly) of approaches which can be used even in the case where there is a finite list of possible states.

The most important requirement, to permit learning, is to carry out some re-evaluation of decisions in mid-stream, on some sort of random or regular or event-driven basis. (As with many of the adaptation methods in the adaptive critic literature, one can use—in theory—"almost any" sampling strategy which is mixed and diverse enough to eventually touch base with all relevant states. Measures of new opportunity or of surprise could be used, for example, to trigger higher probabilities of reconsideration, above a lower but nonzero baseline probability which always applies.)

When such reconsideration is allowed, one can keep track of the unexpected exit states for each block A, and, when certain unexpected exit states are both frequent and important, add them to the set p(A). Likewise, one can prune the set p(A) by deleting states which are rare or unimportant, as measured, again, by the statistical experience of the system. Whenever a state outside of A frequently exits into A, one can add that state to A, on a trial basis, even though this would permit an overlap with a previous decision block. Section 1.4.3 has mentioned some additional adjustment rules which would also be added, to construct a full 3-brain system.

In some previous work, it was speculated that a true, flexible learning of partitions in the neural network version would require the use of fuzzy partitions, in which crisp sets like A and $\alpha$ are replaced by fuzzy sets. Based on the more detailed design work of the past year, this no longer seems to be the case, for two main reasons: (1) decision blocks, unlike the passive blocks of section 1.4, can be overlapping sets anyway, which opens the door to the procedures of the previous paragraph; (2) the key to the optimal adaptation of a decision block is to know when the intelligent system is committed to a particular decision. Because each individual decision block can normally find the local optimum "within its own domain," and because the choice between decision blocks is essentially a discrete choice rather than the incremental kind of choice where compromise methods are useful, the value of fuzzy partitions now seems questionable here. Thus the preferred 3-brain design to be given in section 2 will be an extension of the design here in section 1.5. However, for the sake of generality, the principles necessary to creating a fuzzy extension of this design will be described in section 1.6.

Note that in section 2, it will not be necessary for the neural network system to know the sets A or p(A) as such. It will be good enough to know which decision is in effect at any time, and to know when there is a transition from one decision block to another.

1.6. Fuzzy Partitions: A Possible Extension of the Design

Equation 10 may be written in slightly different form as:

$$J_i^\pi = U_i^\pi + \sum_j M_{ij}^\pi J_j^\pi \tag{48}$$

Starting from this equation, we may choose any array $\beta_{ij}$ and derive the following equation by substitution:

$$J_i^\pi = U_i^\pi + \sum_j M_{ij}^\pi \left\{ (1-\beta_{ij})J_j^\pi + \beta_{ij}\left(U_j^\pi + \sum_k M_{jk}^\pi J_k^\pi\right) \right\} \tag{49a}$$

$$= A_i^\pi + \sum_j M_{ij}^\pi (1-\beta_{ij})J_j^\pi + \sum_k C_{ik}^\pi J_k^\pi$$

where:

$$A_i^\pi = U_i^\pi + \sum_j M_{ij}^\pi \beta_{ij} U_j^\pi \tag{49b}$$

$$C_{ik}^\pi = \sum_j M_{ij}^\pi \beta_{ij} M_{jk}^\pi \tag{49c}$$

This equation looks very similar, at first, to some equations proposed by Sutton. However, there are several differences which are crucial and not obvious. First, instead of assuming an array $\beta_{ij}$, he assumed only a vector of values $\beta_i$, for any given "abstract action." Adding a dependence on j is crucial, for reasons to be discussed. Second, while Sutton did discuss the idea that a given weight vector $\beta$ might be associated with a particular "abstract action," he did not describe any procedure for choosing different abstract actions or decisions at different states; in effect, he only considered the problem of choosing a single abstract action or policy to be applied to all states. The generalization to our situation is not trivial, since it requires consideration of how handle the transitions from one decision block to another, which is central to the discussion above.

When Sutton's discussion is assimilated into our context, he seems to be suggesting that $\beta_i$ should be set equal to the degree of membership $\mu_i$ of a given state i in a given decision block. However, his equations then show value weights converging to zero over time, when the state of the system merely stays put in a fixed state which has a membership value less than one! This is radically different from the kind of behavior we have seen and sought in sections 1.4 and 1.5! When we use a $\beta_{ij}$ array, we then have two other obvious possibilities: (1) the preferred possibility, to set $\beta_{ij}$, to $\mu(j)/\mu(i)$ (in the case where this is less than 1, or 1 if not); (2) to set $\beta_{ij}$ to $1+\mu(j)-\mu(i)$ (again limited to a maximum of 1.).

When our preferred version is used on the problem in section 1.4, in the limit where p is always 1 or 0, it reproduces the equations of 1.4(and their extensions in 1.5), with only the minor point that it allows the calculation of internal critics for states which extend beyond the entry to the block. (These can be simply thrown out as unnecessary calculations.) In the general case, we get back essentially the same adaptation rules as in section 1.5.2, except that the discrete choice of alternative targets is replaced by weighted sums which depend on the change in the membership function from time t to t+1. This follows from simple substitution of equation 49 into the derivations. The details are not shown here, however, because this extension is not the preferred embodiment of the 3-brain approach.

2. Temporal Chunking With Neural Networks
2.1. Goals

The purpose of this section is to describe how to build an intelligent system using neural networks (or other similar learning components) to perform optimization over time, using a learning-based approximation of the structure in section 1.5.2, with the associated methods already discussed in section 1.

In a formal sense, the details in section 1 are strictly precise even for the most general range of tasks. (Even when a task involves continuous variables, the system normally can be approximated to any desired degree of accuracy using a large but finite number of states, in principle, if one is careful.) The purpose of building a neural network system to approximate section 1.5.2 is toe reduce the number of calculations needed, particularly in the case where there are many continuous variables present in the external environment or the plant to be controlled; this reduction, in turn, makes it possible for the resulting intelligent system to cope effectively (though approximately) with a larger variety of more complex tasks, within the limits of what is computationally feasible. By using neural network approximation methods, instead of other learning-based approximators, we can extend the range of what is computationally feasible because we can use special-purpose hardware dedicated to implementing these particular architectures.

Many aspects of how to approximate dynamic programming with neural networks have already been established in the literature and in a previous patent disclosure by this inventor. For example, the methods called HDP, DHP and GDHP have all been defined in great detail as methods of approximating the original Bellman equation; for the modified Bellman equations, as expressed in sections 1.4 and 1.5, the corresponding changes in these 3 methods follow in a straightforward way. This novel combination is a major part of this disclosure.

On the other hand, certain aspects of the neural network extension are much more difficult. This section will describe the overall structure of the new architecture, emphasizing the critical novel details necessary to make it work.

This section will mainly address the issue of temporal chunking—i.e., the design of a system aimed at solving problems where partitions over time are very useful, but there are no special assumptions made about the structure of space, or even about decomposition between different groups of variables at the same time. For a full brain-like structure, such issues of spatial chunking must also be exploited. This section will occasionally mention design details aimed at exploiting spatial chunking; however, the main discussion of such further design extensions will be postponed until section 3.

2.2. Overall Structure of the System

First of all, we will assume that the intelligent system is made up of a multilevel hierarchy of decision blocks, as in section 1.5. As in section 1.5, a particular decision block may have "aliases" at higher levels. The highest level of all is not a decision block, but a kind of global critic network (or J estimator), again as in section 1.5. Thus by specifying the learning and dynamics within a general mid-level decision block (as in section 1.5), we essentially specify the entire system.

In effect, each level or stratum of the hierarchy contains a discrete "library" of decision blocks. The main goal of this section is to describe how individual decision blocks are adapted over time. This is analogous to the usual adaptation schemes used to adapt individual weights in simple artificial neural networks (ANNs). As with the simple ANNs, however, there is a huge variety of useful but semi-arbitrary tricks which one can use to "grow" or "prune" the overall system. For example, if one frequently uses a given block with different arguments, one may create a "copy" of that block at the same level of the hierarchy, which then permits separate adaptation of the two, as a way of "growing" the repertoire of modules. Blocks which are rarely used can be deleted. Blocks which are frequently used in sequence can be merged (in one step or partial steps) into a larger block, even without deleting the original two blocks. (In fact, the creation of such a new block could explain the experiments on "insight" described by Vernon Brooks, The Neural Basis of Motor Control, Oxford U. Press, 1986.)

Biologically, the levels of this hierarchy are assumed to correspond to the various "loops" (low-level and high-level) in the circuits through the basal ganglia described by Brooks and others. It now appears that a system of only 7 or 8 such levels could replicate the kind of capabilities one observes in the mammalian brain.

In biological systems, the execution of decision modules is not always sequential, even at the higher levels of intelligence that we are trying to reproduce here. At times, certain actions—like walking and talking—can be carried out concurrently. This may require a kind of spatial decomposition of the environment. In effect, it may require an extension of the purely temporal design which will be the main (though not exclusive) focus of this section. This kind of simultaneous commitment to different actions is not an example of fuzzy commitment (section 1.6), because of the issues raised in section 1.5. There is a very powerful system of lateral inhibition in the state of the basal ganglia, which ensures that discrete choices (of a go/no-go variety) are made between competing possible decisions, under normal circumstances. There is a kind of fuzziness or uncertainty in the values (critic estimates) which underlie the decisions made at any time; however, in some sense, the system can really focus only on one goal at a time. It may waver between competing goals, however. It should also be noted that mammals unlike large-scale factories—are extended more in time than they are in space; thus aspects of spatial chunking which are useful in factory control may not always be relevant to mammalian intelligence.

In the discussion which follows, it will generally be assumed that each decision block is made up of independent neural networks "inside" each block, sharing access to some global set of feature variables $\{r_i\}$ available to all modules. In practice, it is also possible—as in the brain—to share many "hidden neurons" between blocks. It is also possible to use growing and pruning schemes which tend to give preference to the use of "neighboring" variables, and so on, as has been done or proposed before for simpler ANNs. For simplicity, however, the discussion below will treat the various decision blocks as if they were made up of independent networks. Also, the discussion below will refer throughout to "neural networks;" however, as discussed in Neurocontrollers, this should be understood as a shorthand term for "ANNs or other learning structures which perform similar tasks, such as supervised learning, etc."

2.3. Structure and Training of a Decision Block

Within each decision block, we will first need neural networks to approximate the $J^{A0}$ and $J^{A1}$ terms in equation 41. For $J^{A0}$, the obvious procedure is to train a neural network using supervised learning, based on equation 38. More precisely, one would insert a neural network to receive as inputs i, A, and $u_A$, and train it to match the targets given in equation 38. Instead of an integer "i," one would use r, the current estimated state vector of the environment, learned primarily through neuroidentification techniques. For $J^{A1}$, however, the situation is much trickier. Ideally—in order to approximate the value updates indicated in equations 41–44—one might want to build a network which inputs r, A, u and $J_j^{A+}$, and again to train it to match the targets implied by equation 39.

However, for a true neural network approximation, we cannot assume the availability of the full vector $J_j^{A+}$!! The vector $J_j^{A+}$ includes values for every possible outcome state of the decision block! This is a central problem. Somehow, the vector $J_j^{A+}$ must be summarized or compressed into the lower-dimensional kind of vector which is suitable for a true neural network system. Such a compressed vector representation will be described as $SI^{A+}$. Note that this vector summarizes $J_j^{A+}$ across all states j in p(A).

The Letters "SI" Stand for "Strategic Information"

In general, the SI vectors can be generated as the output of a decision network (which, by itself, would make them really the same as the $u_A$ vectors described previously), or as a kind of communication which passes back value information explicitly from one decision block to a previous decision block. However, if each block develops its own compression scheme, it becomes extremely difficult to develop translation networks from each possible decision block to each other block which may precede it!

As an alternative, for the 3-brain architecture, we will implement the SI vectors as Quadratic SI (QSI) vectors. In fact, each QSI "vector" will actually be a "goal object" or "fuzzy image," consisting of two scalars—$g_0$ and $g_1$—and two vectors, r* and w. A goal object g will represent the value or critic function:

$$J \approx g_0 + g_1 \sum_i w_i (r_i^* - r_i)^2, \qquad (50)$$

where $r_i$ is one of the global feature or state variables. (As a practical matter, of course, individual decision blocks may "nominate" new features that they need to the global array, or, more easily, ray influence the development of new features indirectly through backpropagation feedback they send back to the r network—something which happens automatically in a full implementation of the appropriate backpropagation learning.)

For a fully active design (as defined in section 1.4.3), we must account for the fact that action policies change as a result of values received from outside. Thus the $J^{A1}$ network, like the $J^{A1}$ network, will be assumed to input r, A, $u_A$ and $g_A^-$, where $g_A^+$ is a goal object input to the decision block. (Because $g_A^+$ is still a vector made up of a fixed number of components, to the same extent that r is, we can still just insert it as an additional input to a standard supervised learning system.) One can then use the targets as described in equations 38 and 39, and train the action network (or lower level decision network) exactly as in section 1.5. In theory, we could certainly merge the two networks into one network, trained to match the sum of the two targets; however, this is not the preferred variant of the method, because it loses some information.

In order to complete this design, however, we also need to include some additional components, some essential and some (though optional) part of the preferred variation.

First of all, in order to permit the backwards flow of goal information, g, we need to create a new network, $J^{A-}$, in each decision block, with the following characteristics. $J^{A-}$ will contain one or more "components" (blocks of hidden units) $g_i^{A-}$; at any given time, we allow i=1 to $n^{A-}$, for a fixed number $n^{A-}$, which may be grown or pruned. Whenever the decision block A is chosen, and the rest of the decision made, in a state r, the network $J^{A-}$ may be trained. $J^{A-}$ inputs the state r and the set of goal objects $g_i^{A-}$. The goal objects $g_i^{A-}$, in turn, input the state r, the goal object $g_1^{A+}$, and $u_A$, plus some additional information to be described below. Both $J^{A-}$ and the hidden component networks $g_i^{A-}$ are trained (either by backpropagation or some other supervised learning method able to adapt such hidden layers) in order to match $J^{A0}(r)+J^{A1}(r)$. This provides a kind of compression technique, similar to the "bottleneck" approach used in encoder/decoder designs or in the SEDP design.

Secondly, in order to improve the training of the system, it is preferred that each decision block also contain a network $J^{A+}$, which is trained to estimate J in the p(A) states. (In theory, $J^{A1}$ could take over this function, but there are potential benefits to learning in decomposing qualitatively different learning tasks.) Thus in training the $J^{A1}$ network, whenever s(t+1) is in p(A) (i.e. when a new decision block is invoked—an explicit representation of p(A) is unnecessary), we can use $J^{A+}$, in effect, as the target. Likewise, we can use the output of this $J^{A-}$ network in evaluating possible simulated results jϵp(A) of choosing decision A in an initial state i. Note the importance of training $J^{A+}$ to match $J^{B0}+J^{B1}$ for the resulting state j, after the subsequent decision B is known; by training to that information, instead of training directly to a fuzzy goal image, one can improve robustness considerably.

For completeness, $J^{A+}$ and the previously mentioned networks should all receive an additional set of inputs. These would represent $g^{\alpha+}$ and $u_\alpha$ and α, where α is the larger decision block in which A is embedded, as well as similar information for the blocks in which a is embedded, and so on. This is a large amount of information. For parsimony, however, one can "channel" this information, by defining a compression network either for all of α or for A in particular. This compression network would receive the three mentioned sources of input, plus r, plus the output of the compression network of the next higher block. It would output information then used as "hidden units" in the various networks associated with block A, trained based on feedback from all those networks. There are other similar methods of compression which could be used instead, but this at least shows that it can be done without too much difficulty. This compression network is providing information about the larger strategic context which could be important in some cases.

Thirdly, the operations described above—including the use of forwards results sampling in order to evaluate possible decisions and to train decision networks—clearly require the existence of a network to predict or simulate an outcome state "j"ϵp(A) based on an entry state r, A, $u_A$ and $g^{A+}$ and larger strategic information. In effect, the network to perform such simulations would really be a network representation of $(J^{A'})^T$, the matrix of (discounted) transition probabilities! To build such a stochastic simulation network, one could either use crude conventional neuroidentification techniques, or insert a full-fledged stochastic prediction network like SEDP or SOM (See H. Ritter, T. Martinetz, and K. Schulten, *Neural Computation and Self-Organizing Maps*, Addison-Wesley, 1992.) (In act, one could build an extension of SEDP, using SOM principles, so that instead of outputting just one estimated R vector, it outputs a discrete set of such R vectors, representing different discrete clusters of possible outcomes. In effect, our $J^{A-}$ network is essentially just a transpose of this; one could also try to unify these two dual network approaches. The R-based probability descriptions generated by SEDP can be thought of as another kind of "fuzzy image," dual to the goal objects.)

Finally, in order to complete this arrangement, we need to have a mechanism available which actually allows us to make decisions at a state "i" (or r) before we know for sure what the resulting state j∈p(A) and the follow-up decision will be. To do this, we need to develop a goal network, $g^{A+}$ (or a unified goal network applicable to all states within α). This network would input the same information as $J^{A+}$ does, except of course for itself. It would be trained by supervised learning, in order to match the goals $g^{B-}$ which are later developed by the following decision block, after the following decision is known. Of course, this kind of training can be used on "simulated" or "imagined" states, as with ordinary critic learning. If $n^{B-} > 1$, the goal which yields the highest evaluation of the result state j is used.

Actually, there are good reasons to weight this supervised learning, to try to match $g^{A-}$ to $g^{B-}$ more energetically in some situations that in others. Higher weights should be given in cases of success, such as cases when $J^{B0} + J^{B1}$ is higher in the result state j than might have been expected. (A variety of similar metrics could be used.) The exact function used to determine the weight of each observation as a function of success is arbitrary, in principle; as with the arbitrary choice of certain parameters in any learning system, it provides a legitimate basis for variation from one learning system to another, leading to variations in "cognitive style" or "personality," all of which are workable but which vary in effectiveness from environment to environment.

For the effective operation of this system, there are two important subsystem issues which need to be considered explicitly.

First, because the time chunks here (from entry to exit of a block) are usually much larger than one computing cycle, the system will work best if there is frequent "arbitrary" simulation or exploration of possible interesting states in the near future. This is also true (though to a lesser extent) in ordinary adaptive critic adaptation, where a wide variety of simulation or exploration approaches have been tried—all valid in theory, but very variable in practice. Clearly this design includes both "backwards chaining" (using $J^{A-}$ to find "subgoals" related to a goal $g^{A+}$) and "forward chaining" (future simulation, perhaps using a supplementary decision network to suggest possible alternative goals $g^{A+}$ instead of just possible A and $u_A$.)

Second, it is critical, in practice to be aware here of the availability of supervised learning systems which learn very rapidly through some kind of local learning or associative memory, and of "syncretism" approaches which permit further generalization from there. In practice, if the $g^{A+}$ network effectively "remembers" the results of forwards and backwards chaining in the current instance of block α, under current circumstances, this type of design—properly implemented—should be able to fully replicate the capabilities of mixed forward-chaining backwards-chaining reasoning systems used in planning in traditional artificial intelligence.

2.4. Possible Variations of This Architecture

There are a number of possible variations of this design, of varying usefulness. In addition to the variations mentioned in previous sections, there are the following variations of increasing relevance here:

(1) Using only $u_A$, not g.
(2) Allowing multiple goals $g^{A-}$ in decision blocks.
(3) Multiplexing the processing of goals at different levels.
(4) Symbolic communication between modules.
(5) Linear SI vectors.
(6) Spatial "convolution" of goals.

Of these six, the first four are not part of the preferred embodiment, the fifth is of marginal interest, and only the sixth is part of the 3-brain architecture proposed here. The sixth anticipates some further extensions to be discussed in section 3.

First of all, the design of the previous section would clearly be radically simplified if goal objects g were not used. To some extent, modifiers $u_A$ can take over some of the same functions, of defining the goals to be pursued in a particular task invocation. In early implementations of our approach, this variation will be extremely useful because of its simplicity. In the long-term, however, the lack of rapid electronic transmission of $J^+$ information, in effect, makes this a more passive, less modular approach than our baseline architecture. It is also less plausible than the base architecture as a description of mammalian thought, in which the inherent ability to focus on a goal is clearly very fundamental. In section 2.3, the opposite simplification was briefly mentioned—the possibility of using goals g in place of scalar critic networks J, in some situations; that simplification would lead to excessive rigidity or robotic character in decision-making, not allowing at all for the robustness of adjusting evaluations so as to account for values which are not entirely translated into specific goals. This corresponds to our natural observation, as human beings, that we can reason very quickly about explicit goals, but that we still need to adjust the resulting conclusions so as to account for "subconscious" feelings, impressions and intuitions which lie beyond the explicitly stated goals.

Secondly, it would seem extremely natural and fairly straightforward to extend this framework to permit multiple goals or outcomes. For example, if a hybrid SEDP/SOM simulation model were trained, within each decision block, it would lead to a very natural way of partitioning p(A), in effect. One could simply use the general $g^+$ network to fill in all of the multiple goals of a decision block, except when exploring particular outcome states, where we could modify only the $g^+$ applying to that state. However, this kind of design would lead to a great deal of additional complexity. As an alternative, in situations where there are a small number of desirable alternative outcomes, one could usually just split the block up into separate blocks, one for each goal. After all, in the pure temporal chunking situation, these different goals are not mutually consistent anyway. When there is a mix of desirable and undesirable outcome possibilities, it is usually enough to focus on the desired outcome (for higher-level planning purposes) and let the decision block learn to reduce the probability of the others to zero. When humans are confronted with multiple attractors, it seems more plausible that they waver between these attractors (or focus on a more abstract goal definition), rather than focus on multiple competing targets. Nevertheless, the multiple goal option is just viable enough that it should be rejected completely at this stage.

Thirdly, when we implement the 3brain architecture on computer hardware, the obvious approach for now is to implement each stratum in parallel, so that each uses its own computational resources as efficiently as possible in making the decisions at its level. Presumably, then, the higher levels would "imagine" more distant future possibilities, etc. In practice, however, if there are 7 strata, there could be a seven-fold saving in hardware if one could somehow multiplex these calculations through a single, unified network system. The resulting complexity is probably not worth the cost, at the present state of the art, but it may be useful eventually. In fact, an introspective view of human thought, imagination and dreaming suggests that such a multiplexed, one-idea-at-a-time approach is probably used in the actual mammalian brain.

Fourth, the communication between decision modules could be made far more complex than a simple fuzzy goal image, g, even without imposing the requirement of complex translation networks. In theory, for example, a decision module A could output, instead of $g^{A-}$, an explicit, structured verbal/symbolic description of the current value function $J^{A0}+J^{A1}$ for the entry states of A. If the preceding decision module B could truly understand symbolic representations, then it could use such a representation directly, and analyze it in very complex detail. Many readers will immediately notice that this sounds more like a society of intelligent, symbolic reasoning units—like a human society—rather than a collection of neurons. It is extremely unlikely that simple task modules in the mammalian brain can communicate with each other in this way, since even whole mammals (except humans) cannot do as much! Furthermore, because of conflicts of goals, human societies certainly do not prove that such a "multimodular" level of intelligence—far beyond the mammalian level—is really possible. Perhaps it will be possible, someday, to build a unified intelligence on this basis, well beyond the human level of intelligence. However, that is both unproven, and beyond the scope of what is proposed here.

Fifth, on a more mundane level, there is a very sensible-looking alternative to the QSI: the Linear SI vector, which consists only of a scalar $v_0$ and a vector v, representing:

$$J \approx v_0 + \sum_i v_i r_i \qquad (51)$$

The LSI approach is not a viable alternative to QSI, because it cannot represent the wide variety in concrete goal states needed for a flexible planning system. However, it is very plausible to consider adding an LSI object to the QSI objects, to provide additional guidance to a decision block based on future expectations. For example, one can imagine trying to walk to a desired location (goal), while placing extra weight on trying to avoid places where rain comes down on your head; this weight may depend on special current information. It is not clear that the additional complexity of allowing such an input would be worth the trouble; however, it may be worth considering as an extension, after the baseline system is more fully tested.

Finally, in the design of $J^{A-}$ networks, it is important to train the goal subnetworks (especially per the growing and pruning aspects of learning) so as to preserve the elements $(r_i^*, w_i)$ of $g^{A+}$ which decision A has little effect on. The practical effect of this is to make $g^{A-}$ into a kind of convolution of $g^{A+}$ and of the effect of A. This, in turn, is crucial to the effectiveness of this system in handling tasks where the various variables $r_i$ actually represent different regions in space, or even when they simply form groups of variables that do not interact so strongly with each other.

2.5 Equations for GDHP, an Upgraded Method for Adapting J Networks

Calculate $$\hat{J}(t+1) = \hat{J}(R(t+1), W)$$

$$\underline{\lambda}(t+1) = F\_\hat{J}_R(R(t+1), W)$$

-continued $$F\_u = F\_U_c(\underline{R}(t), \underline{u}(t)) + F\_f_u(\underline{R}(t), \underline{u}(t), \underline{\lambda}(t+1))$$

$$\underline{\lambda}'(t) = F\_f_R(\underline{R}(t), \underline{u}(t), \underline{\lambda}(t+1)) + F\_U_R((\underline{R}(t), \underline{u}(t)) +$$

$$F\_A_R(\underline{R}(t), \underline{F\_u}(t))$$

$$\hat{J}(t) = \hat{J}(\underline{R}(t), W)$$

$$\underline{\lambda}(t) = F\_J_R(\underline{R}(t), W)$$

$$F\_W = G\_F\_\hat{J}_{RW}(E, \underline{R}(t), W) + A_0 * (\hat{J}(t+1) - U(t) - \hat{J}(t)) *$$

$$F\_\hat{J}_W(\underline{R}(t), W)$$

3. Adapt the weights W by exploiting the gradient F_W. For example, use the update:

$$W_i \text{ new} = W_i \text{ old} + \text{learning\_rate} * i\ F\_W_i$$

These equations assume a scalar critic, J hat, which may be used to adapt the Action component as with any other scalar critic, as shown in the inventor's chapters in Handbook of Intelligent Control. The constant $A_0$ and the vector of weights A may be composed of any positive real numbers; for example, they may all be chosen as 1, or they may be based on time averages of the vector lambda (giving greater weight to components which have a bigger effect on J), etc. Handbook and Intelligent Control describes how to program the dual functions here. To create the dual subroutine G_F_J, simply write out the equations of $F\_J_R(R(t), W)$ (using the methods of Handbook and Intelligent Control), APPEND an equation for a final result equal to:

$$\text{Result} = -\frac{1}{2}\sum_i A_i * (\lambda_i^* - \lambda_i)^2$$

and then use the procedures of chapter 10 of Handbook and Intelligent Control to create the dual subroutine for the resulting ordered system, calculating the derivatives of Result with respect to the weights W.

3. Spatial Chunking and Critical Subsystems 3.1. Summary: Spatial Chunking in General, and Combinatorial Optimization The previous section describes a generalized neural network based intelligent system, to exploit the power of temporal chunking. However, as Albus and others have stressed, the world of our experience also permits a certain degree of "spatial chunking." Spatial effects do appear to be very critical in major parts of the mammalian brain, such as the hippocampus.

This section will suggest that most of the power of exploiting spatial effects can be obtained within the design of section 2, so long as the subsystems used in that design are properly chosen. However, as noted in section 2, the main goal here is to replicate the level of intelligence seen in mammals, who are not so extended in space (at any time) as they are in time.

The simplest form of spatial effect is the concurrent invocation of parallel decision blocks, affecting different kinds of actions. One way to achieve such capabilities is as follows. When there is a decision block currently activated, and a part of the goal which involves other variables not affected by the current decision block (as should be evident from the structure of the $J^{A-}$ network), then one can define a new decision block as the combination of the first block and another block which addresses those other goal components. Note that this is simply one more "arbitrary" rule to be added to the growing(/pruning) system for decision blocks, similar in flavor to the "insight" rule mentioned in section 2. One can the invoke that two-things-at-a-time activity—and either fine-tune it or discard it. No fundamental changes in the underlying design are needed. So add this kind of capability. This additional capability is part of the fullest, mammal-like version of the 3brain architecture.

A second, more fundamental aspect of space is the exploitation of spatial symmetry. Further, Euclidean spatial symmetry can be incorporated into a supervised learning system, which in turn could be used as the critic network of a larger intelligent system. In a similar vein, all of the various neural networks described in the previous section could be implemented as neural networks embodying symmetry principles. For Euclidean symmetry, we could simply use the kind of symmetry in the incorporated papers. But for nonEuclidean symmetry, we must use a further variation, to be described in section 3.2.

A third important aspect of space is true spatial chunking. As an example, John Holland has noted how a roadmap serves as a spatially chunked (simplified) representation of the more detailed pictures one might see from a satellite. This kind of spatial chunking is really nothing more than a compression of information across space. One can achieve this kind of compression by using the compression method, SEDP, with component networks that move across a spatial (Euclidean or nonEuclidean) "window," using the principles of section 3.2.

Finally, a fourth aspect of space is something which may be called the "big world problem." For example, Albus has pointed out that the usual sort of estimated state vector one derives in engineering may really be just a small window into the larger physical environment of a mobile intelligent system, an environment which is mostly far outside the sight of the system. He argues that the system must maintain both an estimated state vector, r, in effect, and also a larger "world model" in which the current r is attached to only one site or node. This is a very persuasive perspective, but this disclosure will not provide a specific technique for addressing it. There is a very deep problem in the "big world" view, in trying to describe how a creature may predict the near-term future of large areas that he has no data on at all, except by simply using the spatially symmetric forecasting tools implied by the previous paragraph.

Most of the subsystems required in section 2 already exist—in many forms and many variations—in the neural network literature and elsewhere. The new papers incorporated here (and section 3.2) provide some basis for improving the subsystems, and thereby improving the overall behavior of the system, but the previous neural networks provide at least some basis for an early implementation. The main exception to this concerns the training of adaptive decision networks, networks to make both continuous and discrete decisions, so as to maximize a rather complex function of these decisions. Section 3.3. will describe some new designs to fill in that gap.

Finally, all these various component neural networks—whether spatially symmetric or not—are ultimately composed mainly of function approximation networks. For an efficient hardware implementation of these systems, the most important aspect is-to implement this computation-intensive "inner loop" —the function approximation networks at the core of the system. At the present time, perhaps the greatest computational throughput of any general-purpose computing system (both today and as expected in 10–20 years) comes from the 3DANN (3-Dimensional ANN) hardware being developed by the Jet Propulsion Laboratory. The 3DANN system is not implementing SRN components, as described in the incorporated papers. However, for SRN networks implemented as a core feed-forward network of a single layer (which can always represent the equivalent of one implemented around a multi-layer network), it would require a relatively straightforward modification of the 3DANN hardware to implement them. With cellular SRNs, where the connections are more limited, the implementation would be far more compact, using the same approach to hardware design. This is the preferred embodiment of the 3-brain architecture—i.e. a system of coupled SRNs, coupled according to the higher-level connections implied above, implemented in modified 3DANN-style hardware.

3.2. Symmetry-Based Networks, Euclidean and nonEuclidean

The present invention enables a Euclidean-symmetric network to be built which inputs an array of spatially-located data, and also outputs an array of spatially located outputs (to match a spatially located array of targets).

There is a straightforward but novel generalization of that design to allow any mixture of spatially located outputs (or targets) and global, nonspatial outputs (or targets). One builds a network with two parts: (1) a "lower" part which is just like the simple spatial-to-spatial network of the incorporated papers (or some other simple spatial-to-spatial design incorporating Euclidean symmetry); and (2) an "upper" part which is a nonspatial (ordinary) network whose inputs may consist of some nonspatial inputs, and up to n special additional inputs, where "n" is the number of neurons in each "cell" of the lower part. Each of these special inputs would represent the sum of the outputs of the corresponding neurons in each of the cells, summed across the cells. (Actually, the number of cells can also be added as an input, when it is expected to vary.) To train this kind of two-level structure, one can still use generalized backpropagation directly. This structure directly reflects the principle of Euclidean Lie group symmetry, discussed in the incorporated papers. It is somewhat interesting that the relation between the amygdala and the hippocampus in the mammalian brain looks somewhat similar to this kind of two-layer arrangement, in which the lower layer is sensitive to spatial encoding.

In the example of the maze, discussed in the incorporated papers, the Euclidean design can be interpreted as the repeated use of the same core "cell" of 5 neurons over and over again, in different locations, with input from the cell itself and from each of its four neighbors. One disadvantage of this design is that it requires input from four neighbors even for edge cells, which do not really have four neighbors.

An alternative spatial-to-spatial design—the noneuclidean approach—would be essentially the same in this case, except that the cells can be sorted into three types—four-neighbor cells, three-neighbor cells, and two-neighbor cells. Instead of reusing one core network in all cells, we can adapt three different core networks, for use on the three different types of cells. The resulting feedforward network is clearly well-defined—for each cell, we simply use the relevant core network to generate its outputs, and then combine them all to generate the entire array. The resulting SRN wrapped around this feedforward network would simply be defined relative to the feedforward network, as in the incorporated papers. Adaptation can again be done by use of generalized backpropagation, as previously mentioned. Then, to add a global layer on top of this spatial-to-spatial structure, one again transfers inputs based on adding up outputs of corresponding cells in similar objects—otherwise exactly following the second paragraph of this section. In general, the noneuclidean approach can be applied to any complex network of nodes, where "space" refers to nodes in a network rather than coordinates in a regular grid. One can again identify objects with similar relations to other objects, applying a the same core model to all similar objects.

(One can use an extremely loose concept of similarity, and let the core model itself learn what distinctions it must pay attention to.) When objects are connected to complex relations, there are two further variations here: (1) to treat the relations themselves as a type of object; (2) to force equal weights for multiple instances of the same relation out of any object (thereby eliminating the need to worry about how many instances there are.). These choices are like the choices of connections in ordinary ANN training—choices to be optimized on the basis of incremental error-based learning—growing, pruning, etc.

Note, as an example, that an SRN structure built on this kind of object-oriented network, with a global classification network on top of it, might be an excellent structure to input structures or maps like representations of chemical molecules, and output predictions of their global properties. It is speculated that the mammalian brain operates mainly on the basis of nonEuclidean symmetry, object-oriented symmetry. The concept of object-oriented symmetry in neural nets is not 100% new. The idea was first conceived by this inventor several years ago, when analyzing problems of forecasting stocks. By building a general network, to be trained over several actual stocks, analogous to pooled cross-sectional time-serioes analysis, it was clear that a major imporvement in accuracy could be acheived. This combination of ideas from econometrics and neural networks was quite novel, in part because few reserachers work at the state of the art in both fields.

In 1996, in Munich, researchers from the University of Dortmund presented a diagnostic system which implicitly uses a special form of object symmetry with simple feed-forwards networks to electric utility grids. In that application (or, even more, in similar applications to manufacturing systems), use of SRNs would have been far more appropriate, but those researchers stated that they did not know how to make such a generalization. The approach here is very new, in that it involves an adaptation of SRN methods Incorporated in this disclosure to make it possible to use object symmetry with SRNs, with spatial-to-global systems and the whole range of prediction and control applications discussed here.

This concept of nonEuclidean or object-oriented symmetry may be interpreted as the neural network extension/version of what statisticians call pooled time-series cross-sectional modeling.

3.3. ANNs for Combinatorial Optimization (Decision Networks)

Even in conventional adaptive critic designs, there are severe limitations in the capabilities of existing "action networks" and in the methods used to train them. The decision networks discussed in section 2 perform essentially the same task as these conventional action networks, but—because they are intended for use in demanding, complex applications—the need for improved capability becomes essential.

In general, the problem here is to build and train a network which outputs an action or decision vector u, composed of both discrete and continuous components. For each observation of inputs, r, and response, u(r), one is provided with some sort of evaluation J(u,r), and—if backpropagation is available—one is also provided with the derivatives of J with respect to each component of u.

There are two conventional approaches to this problem widely used in adaptive critic systems. One approach—when the choices are discrete—is simply to consider all possible choices, or to use a method like Barto's Arp which is also extremely limited in handling large numbers of choices. Neither of these is adequate for handling very complex decisions with continuous aspects. Another approach is to use backpropagation, which introduces the possibility of getting caught in a local minimum. This possibility is typically not a big problem for lower-level action choices, but for large-scale decisions it can be extremely serious, because of the "lumpy" nature of large-scale choices. (An example might be the decision of where to place a stone on a Go board; each of the 381 legal grid points is a kind of "local optimum," superior to placing a stone on the illegal nearby sites off of the grid points. More generally, there is a problem in long-term decision-making of separating the forest from the trees, when seeking the highest point.)

A third common alternative is the use of genetic algorithms at each time t, which would appear radically different from what the circuitry of the brain seems to suggest, and also seems unnecessarily slow for a real-time system.

This section will propose an alternative approach to this problem.

In general, we propose the development and use of a Stochastic Action Network which has the property that:

$$\Pr(\underline{u}\,|\,\underline{r}) = \frac{1}{Z(\underline{r},\,T)} e^{-kTJ(\underline{u},\underline{r})}, \tag{52}$$

where Z is a kind of normalization function (similar to the partition functions of physics) set to insure that the probabilities all add up to one, where k is a constant, and where T—"temperature"—is a global parameter which can be changed over time. In effect, the SAN learns the "forest" instead of the "trees;" it provides options for actions or decisions. For a complete action system, one can simply use the SAN to continually suggest new alternatives (versus the previously chosen alternatives, whatever they may be), and one can update the actual action or decision vector whenever the new option looks better. In a way, these networks may be thought of as a kind of "imagination network." Note that the inputs to the SAN may include information about the previous decision, etc. Also, in the "Error Critic" design, one meet even generate the recurrent values, R, as an action vector in the SAN sense; such an architecture might occasionally produce wavering images of reality in certain situations (as is seen in real mammals).

There are several possible approaches to adapt SAN networks. In such networks, we begin by assuming we can generate vectors e made up of random variables from the usual normal distribution N(0,1). The SAN may then be written as:

$$u = A(\underline{r}, e, W) \tag{53}$$

where A is the neural network.

One possible approach is to first train a "$D^T Q$" net which inputs u and r and then tries to predict "F_e", the gradient of J(A(r,e,W),r) with respect to e. Let us write:

$$(\hat{F}\_e = D^T Q(u,r)) \tag{54}$$

We may try to adapt the weights W so as to minimize:

$$(\hat{F}\_e - e)^2 = (D^T Q(A(\underline{r}, e, W), r) - e)^2 \tag{55}$$

The purpose of this is to make F_e equal e, as it would for the desired normal distribution. In effect, this is arbitrarily choosing a particular value for kT, but by scaling up e in proportion to T one can achieve any desired thermal distribution, especially if T is varied during training, with the adjustments scaled accordingly. Notice that it would be very critical to adapt the DTQ net as quickly or more quickly than we adapt the A network. A more rigorous approach would be to avoid the $D^T Q$ network, and directly minimize $(F\_e-e)^2$, which requires the use of second-order backpropagation, discussed in several sources, such as Chapter 10 of Handbook of Intelligent Control.

One should be warned that these designs have only received a very limited amount of convergence analysis so far, only in the linearized case. Thus it is possible that a variant using an SEDP-based design to provide the SAN component may be worth exploring.

The global "temperature" T is theoretically arbitrary. However, numerous authors, such as Levine and Leven, have discussed how variations in "novelty seeking" (which T represents) can serve the motivations of organisms. (See D. S. Levine and S. J. Leven, *Motivation, Emotion, and Goal Direction in Neural Networks,* Erlbaum, 1992.) Although the rules for adjusting T cannot be specified in a rigid way apriori, they—like the measures of success used in weighting $g^+$ training, discussed in section 2.3—provide an important aspect of the "cognitive style" or "personality" of the intelligent system.

In the mammalian brain, it is very interesting that the lower layers of the neocortex—the most recent part of the brain—provide both the state estimation (with Error Critic, we have argued) and a kind of stochastic SAN-like output to the basal ganglia, where discrete choices are enforced. Clearly that arrangement fits in with the spirit of this design.

4. Adding the Third Brain

Strictly speaking, the architecture described above corresponds to the "upper brain" and "middle brain" as described in Learning in the brain: an engineering interpretation. For reasons discussed therein, this system cannot operate at the maximal sampling rate which the underlying hardware seems capable of. In order to perform true maximal-rate real-time control, one can simply add a "third brain"—a straightforward adaptive critic system as described herein, parallel to the olive-cerebellum system of the brain. One can link this lower-level system to the upper-level system by a simple master-slave arrangement, in which changes in the lowest-level J from the upper system are used to generate the main component of the "U" function maximized over time by the lower system. Also, for the sake of parsimony, it is easiest to define the action outputs of this lower brain relative to the lowest-level action "decisions" of the upper brain; in other words, we can calculate the total actual u as the sum of the lower-level u plus the most recent u output from the upper level. This would correspond to the arrangement in the mammalian brain, in which outputs from motor cortex are added to outputs from the olive-cerebellum system, so as to generate smooth, coordinated movement.

The more general teachings described above will be discussed below with reference to the specifics of flight control. Optimizing control—the most promising segment of the neural net field, and, arguably, a necessary prerequisite to true autonomous intelligence—can be critical to the fuel and weight reductions necessary to a new generation of lower-cost launch vehicles, which in turn are critical to the future of human activity in space. Using related designs, it should be possible to reduce the loss of aircraft in war (or in commercial accidents) even more substantially than NASA's present well-conceived programs now promise. There are substantial potential benefits in obvious areas, such as brain research and remote sensing; however, there is also great synergy with the Partnership for a Next Generation Vehicle, the President's initiative to make internal combustion cars obsolete; Data compression, teleoperation, manufacturing and missile interception are also promising application areas. Strategic coordination in strategic defense may appear to be an obvious application, but there are hazards and stability problems unique to that application which suggest that it should be avoided.

There is a near-exact correspondence between the type of ANN design most critical to NASA's long-term mission objectives and the type of design most critical to fundamental scientific progress in this field. Thus there is excellent reason to believe that an initiative in this area—if properly directed—could have substantial scientific benefits for a number of major strategic goals, while developing fundamental scientific understanding more efficiently than any other ANN funding program on the earth (except for the small-scale efforts at NSF).

The designs of greatest relevance here have been variously described as Approximate Dynamic Programming (ADP), adaptive critics or reinforcement learning. They provide two critical new capabilities: (1) to compute, offline, an approximation to the optimal nonlinear control strategy for a noisy, nonlinear plant or vehicle affected by uncertainty, based on either a conventional model of the system to be controlled or an ANN trained to emulate that system; (2) to perform the same task based on real-time learning, both in the controller and in the model of the plant. More conventional techniques fall short of these capabilities in various ways: some assume linearity; some are capable of stabilizing a plant but not optimizing it in real-time; some become too expensive to implement as the number of variables grows (beyond 1 or 2); some are numerically inefficient (i.e. too slow) in their treatment of noise; and so on. Neural network implementations of ADP also permit the use of high-throughput ANN chips, which can make it more practical to use a highly complex and intelligent control design even within the limitations of an aircraft or spacecraft.

Many analysts believe that NASA's most important mission, in the long-term, is to use research and development to break down the key barriers which support us from a true "space economy." (See Settling space: the prime objective, in America's Future in Space: A Briefing Book of the NSS Family of Organizations, Washington DC: National Space Society, 1989.) In a true "space economy," the unit cost of critical space activities would be reduced down to the point where the economics of space utilization are so favorable that the activity can grow by itself, at a rapid rate, on a private sector basis, delivering more value to the earth than it costs, and eventually leading to a human settlement of the solar system. The most urgent prerequisite here is to reduce the cost per pound to earth orbit, either through single-stage-to-orbit (SSTO) rockets or—at greater risk, but with greater long-term cost reduction potential—Mach 26 hypersonic aircraft. Other key barriers involve the ability to utilize nonterrestrial materials (NTM) at low cost, and to perform space manufacturing on an efficient, modular basis. The concept of a space economy is related to Rostow's concept of the "takeoff effect" in economic development theory.

Pap and Cox of Accurate Automation (AAC) show how ADP is playing a crucial role in controlling the first prototype being built for the US hypersonics program. In the final days of NASP (the predecessor program), it became clear that the weight ratio was the one really serious bottleneck or apparent showstopper in building a Mach 26 hypersonic aircraft; existing control designs could stabilize the craft, but not at an acceptable weight ratio. There was an urgent need to minimize fuel consumption, stringently, and to minimize the effective cost (weight) due to the thermal control system. Earlier work by AAC, by Neurodyne and by McDonnell-Douglas (funded initially by NSF and internal funds) indicated a substantial possibility that ADP could perform this critical high-risk, high-payoff task, with assistance from other ANN subsystems. SSTO rocket work is at an earlier stage; however, there is every reason to expect that weight ratios will be critical in that approach as well.

With NTM utilization, the chief barrier is initial cost. Estimates by Gerard O'Neill—both in his earlier High Frontier discussion (see O'Neill, Gerard K., The High Frontier. New York: Morrow, 1977.) and in later, more detailed studies—were low enough to be worth discussing before Congress. But estimates from NASA Houston of the cost of an initial lunar base—let alone the NTM option—appear to be politically unfeasible. The key difference between the two is that they are cost estimates for different approaches; O'Neill proposed a higher degree of automation on the moon. Paradoxically, to open up the door to a large human presence in space—as in the O'Neill plan—requires low costs, which in turn requires greater automation of the initial lunar activity. ANNs may or may not be necessary here. However, AAC has recently demonstrated a new, far more efficient controller for telerobotic robot arms, tested on a physical prototype of the space shuttle; main arm and on underwater robot arms, based on an ADP outer control loop; this was an extremely difficult control problem, previously attempted unsuccessfully at a number of locations, using a variety of approaches, at great cost. (M. Adkins, C. Cox, R. Pap, C. Thomas and R. Saeks, discuss in Neural joint control for space station robotic manipulator system, Proc. of 1992 IEEE/RSJ International Conference on Intelligent Robots, some of the earlier work, which was initially funded by NSF, through the small grant which actually started the company.) This suggests that ADP and related techniques might also be critical to the use of telerobotics, to make NTM affordable. A purely robotic approach to extracting NTM would require even greater intelligence in the controller, making ADP even more essential as part of a rather complex system.

The long-range requirements for space manufacturing seem far less clearly defined at present. They involve issues such as the ability of humans to live and work in space, the design of mass-producible space structures, the definition of minimal "basic" manufacturing capabilities permitting sustained growth, specific manufacturing processes, automation, net materials flows across different processes, and so forth. (See R. A. Freitas and W. Gilbreath, eds, Advanced Automation for Space Missions, NASA Conference Publication 2255, 1982.)

ADP has demonstrated an ability to automate certain manufacturing processes (see D. White and D. Sofge, eds, Handbook of Intelligent Control, Van Nostrand, 1992) which had been impervious to automation using conventional control and pure rule-based systems; Neurodyne, for example, has extended its earlier work on manufacturing composite parts through to applications in semiconductor manufacturing, a success which has aroused great interest at SEMATECH. The work by AAC, by Jameson (see Examples of continuous reinforcement learning control, in C. Dagli et al, Intelligent Engineering Systems Through Artificial Neural Networks, NY: ASME Press, 1993, Vol. II. (ANNIE 1993 Proceedings)) and by many others on ANNs to control robot arms is also potentially relevant. Likewise, the use of neural network research to better understand the brain may possibly have implications for the human ability to live and work-in space, because the human nervous system plays a central role in the process of adapting to space.

In summary, ADP and related techniques may play a critical role in overcoming the most urgent barriers to a "space economy," and a useful supporting role (possibly critical—we don't yet know) in overcoming others. The most urgent and well-defined tasks involve flight control in the larger sense (including integrated control of propulsion, avionics and of temperature).

Sustainable development on earth is also a leading strategic priority for policy at a national level, cutting across all agencies. Current concerns about sustainable development are in some ways an outgrowth of the old Gore-Gingrich bill for a national foresight capability, a bill which did not pass, but which nevertheless left its mark on thinking at the highest levels of both political parties.

Traditionally, NASA's primary response to this priority has been to expand activities in remote sensing, to permit better monitoring of the environment. The Electrical and Communications Systems Division at NSF also has a long-standing interest in basic research related to remote sensing. Unfortunately, the technologies related to remote sensing are extremely diverse and scattered.

Within the realm of remote sensing, ecologists' greatest need was for help in bridging the gap between voluminous, raw, physical data, on the one hand, and information, on the other. They wanted information on variables like species or genus proliferation, as a time-series. In short, their real need was for better pattern recognition or feature extraction, from extremely voluminous time-series data where computational throughput is a major part of the problem.

This kind of pattern recognition is an ideal application area for ANNs. At this workshop, Leon Cooper (who earlier won the Nobel Prize for the BCS theory of superconductivity) reported great real-world success in applying ANNs to static pattern recognition systems, for clients like financial institutions and the IRS. Post Office officials have told me that the best existing ZIP code recognizers are based on ANNs, which, because of special chips, can also overcome the high-throughput bottleneck, without requiring costly hard-wired application-specific chips. (See L. D. Jackel et al, Hardware requirements for neural-net optical character recognition, IJCNN90 Proceedings, IEEE, 1990, p.II-855–II-861.) (The adjustable weights in ANN chips make them usable on multiple applications, and even permit remote "reprogramming" based on telemetry.) Remote sensing is more difficult, because the patterns there are highly dynamic; however, this merely indicates a need to use ANN designs from the neuroidentification literature. Neuroidentification is important as well to advanced forms of ADP.

In the past, the most advanced work in neuroidentification has occurred in the chemical industry. (Also, there is work by Principe, Fernandez and Feldkamp of importance here). However, the synergy between ADP and neuroidentification is great enough that groups could be formed in the future which are world-class in both areas—neurocontrol and neuroidfentification—if this initiative encourages such development. The development of such groups is of importance to the scientific development of the ANN field.

As an example, what if we could reduce the wastes from chemical plants by a factor of two or more, using intelligent control, while actually reducing costs through greater efficiency? ANNs can be used in such applications, but the private sector is already doing very well in that kind of research, and NSF and EPA already have mechanisms to fund it.

On the other hand, motor vehicles are also a major source of pollution on earth. Transportation, in general, is the main reason for our nonsustainable dependence on oil, which poses large immediate problems for national security. NSF also has an active role in supporting the application of ADP to automobiles, within the context of the larger Partnership for a Next Generation Vehicle, a major Presidential initiative. (See Technologies relevant to next generation vehicles, Small Business InnovationResearch (SBIR), NSF 94–45. Arlington, Va.: National Science Foundation, 1994, p.60–62.)

Despite the size and scale of this initiative, a new initiative at NASA Ames could have major spinoff benefits to PNGV, simply because the technological needs are so similar. Having funded work related to both hypersonic vehicles and to PNGV, I am amazed at the structural similarity of the technical challenges and management issues involved. With PNGV, optimal real-time control under noise, minimizing fuel use (and pollution), is a central issue; likewise, special chips are called for. (In testimony in the summer of 1993 to Marilyn Lloyd's committee in the House, Phil Haley—then representing General Motors—testified that "integration and control" was the main technical challenge outstanding in building a marketable fuel-cell car. Bench-scale work by Neurodyne, funded by NSF, suggests that an ANN controller can convert even existing cars to ultralow emission vehicles; tests on an actual Saturn engine are planned for early 1995.) In both applications, the optimization tools might even be used at the design stage, if ways can be found to hook up ADP to the CAD/CAM software. It is easy to imagine both applications reinforcing each other by supporting the development of dual-use integrated, modular software packages, in small companies working on both applications.

Neurodyne and McDonnell-Douglas also showed that ADP designs can automate the continuous production of carbon composite parts, a problem which did not yield to earlier efforts using more conventional methods and AI. This work was suspended, in part because of cutbacks in submarine programs which helped support it. However, carbon composite parts are also important to the cost of aircraft and to the PNGV initiative. Dr. Rashid of USCAR has described them as absolutely essential to the President's goal of improving fuel efficiency three times over. Resurrecting this work and bringing it to fruition should be given serious consideration as an add-on to NASA work in this field.

Ultimately, sustainable development involves more than just pollution and natural resources. Human resources and population are also critical. In the recent UN conference in Cairo, it was widely agreed that improvements in education worldwide (with special emphasis on female education in poorer countries) will be crucial to all of these human variables. ANNs will not be crucial to such developments, of course. But HPCC—high-performance communications and computing—may in fact offer us a chance to create a leapfrog in the level of education worldwide. ANNs could perform a useful supporting role to HPCC in that context. For example, it is quite possible that compression ratios for voice and video might be improved by a factor of 2 or more, if ANNs were used to learn optimal compression algorithms.

Most people attempting data compression by ANN have used a simple encoder/decoder design described by Hinton in 1987, or a slight generalization of that design. (Such designs are sometimes called "autoassociators.") That design was purely static; it is not surprising that it does less than an optimal job of extracting patterns from time-series information like speech or video. In 1988, I described how one might generalize such designs, to account for dynamics as well. (See P. Werbos, Backpropagation: Past and future, ICNN Proceedings, IEEE, 1988. A transcript of the talk with slides.) But it turns out that all of these designs have fundamental mathematical problems, which may explain the difficulties people have had in using them on real-world compression applications. In 1992, I developed a new design—the Stochastic Encoder/Decoder/Predictor—which overcomes these mathematical problems. Improving compression ratios by a factor of two could cut the cost of voice and video access by a factor of two; this, in turn, would significantly improve the chances of wiring up large parts of the developing world.

In the long-term, ANNs could also help as tools in the design of intelligent agents for educational software, and in the understanding of the human minds to be educated. Because these are very complex, multidisciplinary areas, the short-term potential is difficult to predict. Just as Maxwell's Laws eventually became crucial to our understanding of molecules (molecular orbits and states), a full understanding of learning at the neural network level will eventually be of enormous importance to education; however, the path from here to there is not a quick and narrow line.

Neural networks can be used to understand the underlying, unifying mathematical principles which lie at the base of everything else. Some have argued that there are really only four fundamental questions here:

(1) What are the underlying laws of physics?;
(2) What is the structure of the universe, the space in which these laws operate?;
(3) What are the mathematical principles underlying the phenomena of intelligence or mind?;
(4) what are the mathematical principles underlying the phenomenon of life (or of self-organizing systems in general)?

Many of us became interested in neural networks entirely because of their importance to question number 3. However, ANNs might also be useful in supporting projects relevant to (1) and (2). For example, recent experiments on the Hubble telescope regarding the age of the universe have led to graphic and even startling results, which could have very large implications. (See P. Werbos, Self-organization: Re-examining the basics and an alternative to the Big Bang. In K. Pribram, ed, Origins: Brain and Self-Organization, Erlbaum, 1994.) If the stabilization control of that telescope (or of others) could be improved significantly, using ADP, this could be very exciting. Unfortunately, those experts I have spoken to tell me that stabilization is not a limiting factor at present in such instruments. Likewise, Roger Angel has said that ANN-based adaptive optics will always be far more important to earth-based telescopes than to space-based telescopes, because of the greater noise and complexity of the former. If there should be exceptions to these rules, however, then ADP or other ANN designs might well be useful.

Recent efforts in neuroscience suggest the possibility of a true Newtonian revolution in our understanding of the brain. Prior to Newton, physics—like neuroscience today—was essentially a phenomenological field of research, with lots of empirical results (some quite quantitative) but no real mathematical, scientific unity. In the past, many researchers have despaired of achieving a similar unified understanding of intelligence in the brain; the sheer complexity of the brain seems to preclude the development of simple, unifying principles. However, consider our analogy to Newton: Newton did not find an elegant way to summarize the complex initial conditions of the physical universe; he achieved a unification (for gravity) by changing the focus of attention towards the dynamic laws which govern changes in the state of the universe. In a similar way, there is evidence that the dynamics of learning in the brain apply in a uniform, modular, flexible way within all the major components of the brain, such as the cerebral cortex.

Substantial efforts have gone into computational, mathematical models of learning in the brain, in recent years. However, the bulk of these models have been bottom-up efforts, rooted in very detailed models of membrane chemistry but very little systems-level integration or consideration of other features of the physiology. Models of this sort typically do not-replicate the very high level of engineering functionality that we know is present in the brain.

Researchers in psychology have argued that even a minimal model of brain-like intelligence must include three basic elements:

(1) An "emotional" or "affective" or "secondary reinforcement" or "value-calculation" system. Such a system would evaluate objects or variables in the external world, so as to assess their value—positive or negative—to the goals of the organism.

(2) An "expectations" or "prediction" system.

(3) An "action" or "motor" system, which sends signals to muscles or actuators (or to simple postprocessors controlling muscles or actuators) so as to maximize the values calculated by the "emotional" system.

So far as I know, Grossberg and his coworkers (Levine, Schmajuk, Waxman) are the only people in the psychological community who have ever formulated a model of intelligence in the brain incorporating all three elements, with all three elements governed entirely by some kind of generalized neural learning algorithm. However, this portion of Grossberg's work has never demonstrated real engineering functionality. There is reason to suspect that it would require substantial upgrading—informed by engineering-based ANN studies—in order to pass this test. Explaining the functionality of the brain is really the core of the problem, in explaining intelligence. Some have argued that Grossberg's approach is at least "unsupervised," in some technical sense; however, this is equally true for the engineering-based designs discussed below. (See D. Levine and W. Elsberry, eds, *Optimality in Bioloaical and Artificial Networks?*, Erlbaum, forthcoming (1995), for deeper discussions of the relation between engineering functionality and human psychology.)

In the ANN engineering community, several ADP designs have been developed which meet all three criteria above, motivated by the requirements for greater engineering functionality. These designs already appear to offer a first-order understanding of how the brain "works"—how it achieves that basic capability we call "intelligence." (See P. Werbos, The brain as a neurocontroller: New hypotheses and new experimental possibilities. In K. Pribram, ed., *Origins: Brain and Self-Organization*, Erlbaum, 1994.)

To take this process further, and develop a more serious second-order understanding of the match between ADP and specific connections and cell types in the brain, would require a substantial expansion in the number of people who fully understand these kinds of three-component designs. (See also P. Werbos, Control circuits in the brain: Basic principles, and critical tasks requiring engineers. In K. S. Narendra, *Proc. of 8th Yale Workshop on Adaptive and Learning Systems.* New Haven, Conn.: Prof. Narendra, Dept. of Electrical Eng., Yale U., 1994.) Furthermore, appropriate studies of the brain itself could yield ideas for better and more powerful ADP designs, if the teams doing this research include some intellectual leadership from engineers fully versed in ADP, who know what to look for. Thus it would be appropriate to include collaborative research of this sort in the initiative as well, at least after the basic ADP capability is consolidated. From a NASA viewpoint, there might be particular interest in parallels between artificial control and natural motor control in the cerebellum, which acts as a kind of buffer—like a teleoperation system—between the higher parts of the brain and smooth, coordinated movements like flight control in the bird.

Prior to this workshop, there were only two published examples of three-component ADP designs running successfully—a 1993 report from Jameson (of Jameson Robotics, formerly of Lockheed Texas) and a brief 1994 paper by Santiago and myself. (See R. Santiago and P. Werbos, New progress towards truly brain-like intelligent control, *WCNN94 Proceedings*, Erlbaum, 1994, p.I-27 to I-33.) There are four new examples all appearing in this conference proceedings, all showing substantial results on difficult flight control problems: (1) Wunsch and Prokhorov; (2) Santiago; (3) Pap and Cox; and (4) Balakrishnan. Jameson's work showed that a three-component design can solve the problem of controlling a nonmarkhovian simulated robot arm, a problem which (to his great disappointment) he could not solve by using even the best of the two component designs (essentially what Neurodyne has used). Wunsch and Prokhorov have reported a similar finding for a stiffened, more difficult version of the autolander problem published in W. Miller, R. Sutton and P. Werbos, *Neural Networks for Control*, MIT Press, 1990,(the paperback edition, 1994, contains fixes to some of the pseudocode in this book), supplied by C. Jorgensen of NASA Ames. (More precisely, they report a 100% failure rate for the two-component ADP design and conventional controllers, and an 80% success rate for the three-component design, using a loose definition of "success" in both cases.) Santiago reports significantly better results yet on the same problem when he uses DHP, the most advanced three-component architecture implemented to date. (Santiago's company holds a patent pending on DHP and several related designs, but is currently authorizing use of DHP at no cost conditional on citation of these facts.)

Balakrishnan and Pap and Cox have also reported great success in using DHP. Balakrishnan uses a special simple form for the "value" or "critic" network, which is not an ANN in his case. This underlines the fact that ADP designs are generic learning designs which can be applied to all kinds of sparse or simple nonlinear structures, not only ANNs. He reports substantial success in the missile interception problem, compared with conventional well-tested and well-known algorithms for that problem. Of course, the missile interception problem is a flight control problem of serious strategic importance. Pap and Cox reported a high level of success in using DHP in controlling a prototype hypersonic vehicle, as discussed in section 3; their talk put more emphasis on the application itself, but I hope that their proceedings paper will give some of the neural network details as well. (As is common in real-world projects, however, I might tend to expect a complex array of ANN designs used on different aspects of the problem at different stages.)

Certain concepts from classical artificial intelligence (AI) could also be very useful here, if they could be assimilated into more neural designs, in a more brain-like context. Possibilities of this sort look very promising, but the ADP work needs to be extended further, first, in order to supply the context. The most definitive description of ADP designs is still in Handbook of Intelligent Control; however, Santiago tells me that chapters 8 and 9 of The Roots of Backpropagation: From Ordered Derivatives to Neural Networks and Political Forecasting are valuable as an introduction or prerequisite to some of the more complex ideas in that book.

ADP designs—with certain modifications—can also solve AI-like planning problems, as described in Handbook of Intelligent Control. One might therefore imagine using them on problems like global coordination in strategic defense. Unfortunately, the required design modifications yield a degree of autonomy that makes these designs less predictable than the designs required for flight control. There is good reason (e.g. various Lipschitz criteria and so on) to expect that ordinary ADP systems will actually be more stable than conventional adaptive controllers, when well-designed; however, the modifications required for the global coordination problem erode these phenomena and—in my view—imply a degree of hazard too great for safe operation, in an application where computers might order attacks on human beings. (For a discussion of adaptive controllers, see P. Werbos, Control circuits in the brain: Basic principles, and critical tasks requiring engineers. In K. S. Narendra, *Proc. of 8th Yale Workshop on Adaptive and Learning Systems.* New Haven, Conn.: Prof. Narendra, Dept. of Electrical Eng., Yale U., 1994.)

6. Reconfigurable Flight Control: Practical Issues

Work on reconfigurable flight control is clearly the keystone to the current ANN work at Ames. Extensive presentations were made at this conference by McDonnell-Douglas, by Lockheed, and by people at NASA working with McDonnell-Douglas.

The challenge here is simply to cut in half (or more) the probability of losing an aircraft, when that aircraft is subject to an "involuntary change in configuration," like a wing being shot off or like the kind of glitch which causes commercial aircraft to crash. This is an excellent initial testbed for ANN-based flight control, because the issue of formal stability proofs is obviously not central; even a 50% success rate would still be substantially better than the status quo in terms of safety. Reducing losses in war by 50% or more would have substantial military implications.

The technical strategy presented by Jim Urnes of McDonnell-Douglas permits substantial safety benefits to users of F-15s and commercial aircraft. However, there is also room to get still greater performance, in this critical area, by expanding the program to include an additional phase of effort, a phase which would be very compatible with the testing concerns expressed at this conference by NASA Dryden.

Urnes' strategy involves two "phases." Both phases can be pursued concurrently, but it is expected that Phase I will be completed sooner than Phase II. In Phase I, an ANN is trained to input sensor data and output an estimate of the matrices A and B in the simple, linear classical model:

$$W = Ax + Bu,$$

where x is the state of the aircraft and u the state of the controls. The estimates of A and B are then fed into a classical linear-quadratic optimal controller, of the form given in the classical textbook of Bryson and Ho. (See A. E. Bryson and Y. C. Ho, *Applied Optimal Control.* Ginn, 1969.) Since the controller itself is a classical controller, not itself changing over time, the speaker from NASA Dryden said that this arrangement will be much easier to flight-certify than any design involving true real-time learning in the controller itself.

Phase II is planned to use a true real-time learning system, in collaboration with Neurodyne. Neurodyne is a small company, historically linked to McDonnell-Douglas, initially started up by a Small Grant for Exploratory Research (SGER) from NSF. In 1992, Neurodyne's ADP designs were by far the most advanced and brain-like in operation in the world; White and Sofge at Neurodyne were the editors of the Handbook of Intelligent Control. Their designs are essentially just one step before the three-component designs discussed at this conference. (Neurodyne is also developing a neuroidentification capability, which is crucial to the three-component designs and to more conventional control approaches, but this is still in the research stage.) Unlike the three-component designs (except perhaps the AAC example), their designs have been proven successful on a variety of real engineering tasks, not just simulations of those tasks. In simulated tests of real-time learning, White and Urnes showed readaptation within two second to an involuntary change in aircraft configuration, using the Neurodyne designs. However, Urnes has reported delays of more like 10 seconds to a minute in more recent wind tunnel tests. There is considerable work to be done in bridging the gap between the simulated problem andthe tough, actual problem, and in figuring cut how to flight-qualify the result. There is tremendous potential here, but also a serious potential for delay.

The most serious limitation with Phase I is the assumption that linear equations describe the behavior of an aircraft after it has been hit. In Phase I, the matrices A and B are based on a linear approximation centered on the optimal, stable, equilibrium attitude and velocity (or, at least, the desired attitude and velocity). But after being hit by a gun or a missile, the aircraft is not likely to have anything close to the optimal or desired attitude or velocity. Furthermore, the real challenge in saving an aircraft is to change its state from a highly undesirable state to something in the general vicinity of the desired state; thus quality or accuracy of control is most critical in the region far away from the desired state. Finally, from listening to Urnes, I have the impression that McDonnell-Douglas does have nonlinear aircraft models which are likely to remain reasonably valid (though with changed parameters, and some need to add noise terms) even after the aircraft is hit.

Based on these considerations, I believe that aircraft recovery could be improved substantially if, in Phase IB, we used a McDonnell-Douglas nonlinear, stochastic model instead of the current linear model. It is still a significant task to develop an ANN to estimate the parameters of the model, just as in the-existing Phase I. (Actually, the ideas in Chapter 10 of Handbook of Intelligent Control might be used to improve this component; again, the noise parameters also require some consideration, for optimal performance.) But then we face an interesting task: how to design an optimal controller, offline, like the Bryson and Ho controller, but optimal for the actual nonlinear stochastic model—so as to permit better recovery even when the aircraft starts out with a bad attitude. DHP provides precisely this capability.

Unlike the two-component ADP designs, DHP is a model-based design, whose behavior could be based entirely on the McDonnell-Douglas model (even though that model is not an ANN). Noise in the system and in the parameters can be used (with analogy to recent work by Feldkamp of Ford Motor Company described in L. Feldkamp, Puskorius, Davis and Yuan, Enabling concepts for applications on neurocontrol, in K. S. Narendra, ed., op. cit.[17]) in the offline simulations, in order to be sure that the resulting controller is more robust with respect to the details of the model. This general two-step approach would be exactly like McDonnell-Douglas' existing Phase I approach, except that it is the nonlinear generalization of that approach. As with the Phase I design, it involves the offline development of the controller, which should minimize the problems with flight testing and verification. From a scientific viewpoint, this would also be quite interesting, since it would actually use a more brain-like kind of design, even-though adapted offline. (Also, there is clearly room to perform this task at different levels—quick-and-dirty and very thorough.)

The Phase IB approach does have one advantage over the Phase II approach: it implicitly uses experience (albeit simulated) to learn the specifics of how to cope with fluctuations in specific, familiar parameters like drag coefficients; it does not try to relearn the whole structure of the aircraft from scratch in real time. In general, real-time learning is necessary only for coping with unprecedented fundamental, structural changes which cannot be represented by a simple change in parameters; for more familiar changes, it is better to use higher-order approaches (such as TLRN controllers rather than real-time learning. (The system presented by Lockheed at this conference also exploits this kind of principle; however, the Phase IB approach proposed here would be more flexible in handling a wide spectrum of faults.) The true optimum, like the human brain, would combine both kinds of learning together, to cope with both kinds of shocks; thus eventually, to really minimize the loss of aircraft, we may need a Phase IIB which combines Phase IB and Phase II together. Some early research at universities may be a good way to help prepare for that long-term possibility. For now, however, addressing Phase IB is the most urgent possible addition to this program.

Strictly speaking, the nature of the risk here varies greatly from application to application. For example, there is excellent reason to believe that some kind of neural network model will work, eventually, in explaining intelligence in the brain. Also, the existence proof provided by the brain gives us good reason to believe that some kinds of neural network design can, at least, solve the current kinds of engineering control challenges—challenges requiring optimization in a noisy, nonlinear world, involving a few dozen variables. The risks involve phenomena like debugging, institutional issues, potential delays, and so on; the ultimate technical feasibility of these applications is actually not so much in doubt. It is legitimate to give priority to these kinds of applications for now. Applications like video compression, however, are harder to predict in advance; there is little solid basis for guessing how large an improvement in compression ratios is possible. (It might be a few percent; it might be an order of magnitude.) Complex applications like the intelligent agent are even harder to scope out in advance.

Previous papers have explained why model-based adaptive critic designs—unlike other designs used in neurocontrol—have the potential to replicate some of the key, basic aspects of intelligence as seen in the brain. However, these designs are modular designs, containing "simple" supervised learning systems as modules. The intelligence of the overall system depends on the function approximation abilities of these modules. As described above, for the generalized maze navigation problem, no feedforward networks—MLP, RBF, CMAC, etc.—or networks based on Hebbian learning have good enough approximation abilities. In this problem, one learns to input a maze description, and output a policy or value function, without having to relearn the policy when one encounters a new maze. Thus the present invention implements a new form of simultaneous recurrent network (SRN) based on a cellular structure which has some interesting similarity to the hippocampus.

Several previous papers have argued that model-based adaptive critics—also called model-based approximate dynamic programming (ADP)—offer us the only real hope of achieving true brain-like intelligence in artificial control systems, or of understanding intelligence in the brain itself. (See P. Werbos, "Optimal neurocontrol: Practical benefits, new results and biological evidence," Proc. World Cong. on Neural Networks (WCNN95), Erlbaum, 1995; P. Werbos, "Optimization methods for brain-like intelligent control," Proc. Conf. Decision and Control (CDC95), IEEE, 1995; D. Prokhorov, R. Santiago and D. Wursch, "Adaptive critic designs: a case study for neurocontrol.," Neural Networks, Vol.8, No.9, 1995.; P. Werbos, "Learning in the brain: An engineering interpretation," in K. Pribram, ed., Learning as Self-Organization, Erlbaum, 1996; and P. Werbos, "Optimization: A foundation for understanding consciousness," in D. Levine & W. Elsberry, Optimality in Biological and Artificial Networks, Erlbaum, 1996.)

In principle, ADP systems should be able to approximate the solution to any problem in control or planning which can be formulated as an optimization problem. This includes almost any interesting problem! For example, winning a game of chess or of backgammon can be formulated as the problem of maximizing the probability of victory over time. Using such a formulation, Tesauro has shown that simple adaptive critic systems can in fact play an excellent, master-class game of backgammon. (See G. J. Tesauro, "Practical issues in temporal difference learning," Machine Learning, 1992, 8: p.257–277.) As another example, the most general approach to the classic nonlinear robust control problem involves converting that problem into an optimization problem, which can then be solved by ADP in offline learning. (See J. S. Baras and N. Patel, "Information state for robust control of set-valued discrete time systems," CDC95.)

First a review of what a Critic network is, and an explanation of why we need to use more powerful Critic networks in order to solve difficult problems in intelligent control is given. Next, an embodiment of an SRN network is described, and compared with other recurrent networks. Finally, a very simple but challenging test problem used here is described, along with the empirical results. More complete information on all these points—ranging from literature review through to designs, flow charts and empirical results—is given in X. Pang and P. Werbos, "Neural network design for J function approximation in dynamic programming," Journal on Mathematical Modeling and Scientific Computing (Principia Scientia), special issue on neural networks, planned as No. 1, 1997.

Decades ago, classic researchers in Artificial Intelligence (AI) such as Minsky and Newell, Shaw and Simon showed how the problem of "reinforcement learning"—the problem of maximizing an observed reinforcement signal U(t) over future time—can encompass most of what we mean by "intelligence." In 1968, I described in Elements of Intelligence, Cybernetica (Namur), No.3, how the problem of reinforcement learning is linked to the problem of approximating dynamic programming, and proposed a primitive form of backpropagation as part of an ADP design. Since then, more sophisticated designs and explanations have been developed, but they all are logically based on the Bellman equation, the fundamental equation of dynamic programming.

Dynamic programming gives the exact solution to the problem of how to maximize a utility function U(R(t)) over future times t, in a nonlinear stochastic environment, where the vector R(t) represents the state of the environment at time t. Our ability to do well on the reinforcement learning problem depends on our ability to approximate the exact, optimal solution well—i.e., our ability to approximate the dynamic Programming solution. Dynamic programming converts a difficult problem in optimization over time (maximizing <U(R(t))>, the expected value of U(R(t)) over all future times) into a simpler problem in function maximization.

When there is a finite time horizon (as with the maze), the Bellman equation may be written:

$$J(R(t+1))=\max(U(R(t),u(t))+<J(R(t+1))>), u(t) \quad (MN1)$$

where u(t) represents the actions you take at time t. The problem is to solve for the function J. After J is known, you can find the optimal action u(t) at each time t by performing the maximization shown in the equation MN1.

In classical dynamic programming, we solve for J exactly. In most forms of ADP (or, more precisely, in most forms of adaptive critic design), we approximate J by some kind of function approximation scheme, usually a neural network. Thus we approximate J(R) by some function J (R,W), where W is a set of weights or parameters. J(R, W) is called a Critic network.

For relatively "simple" optimization problems—such as conventional aircraft control or vehicle control—one may expect the true function J to be relatively smooth. Barron has shown that the most common feedforward neural networks—MLPs—can approximate smooth functions well, even as the number of inputs increases; he has also shown that linear basis function approximators (like Taylor series and RBF) do not do quite so well. (Hebbian associative memory systems, like RBF, essentially make predictions on a nearest-neighbor basis; thus one would expect them to have similar limitations, except in cases where the input vectors are limited to certain "clusters" which are a tiny fraction of the input space. One would not expect such severe clustering for the kinds of control and planning problems discussed here.) Note that the ability to handle a large number of distinct input variables is crucial to any model of what goes on in the brain.

Unfortunately, for serious problems in planning or scheduling, the J function will typically not be smooth. We cannot expect ADP systems based on feedforward or Hebbian Critics to perform very well on such problems, if the Critic networks themselves are inherently unable to approximate that kind of J function.

The generalized path planning or spatial navigation problem is an example of a problem which is very difficult for feedforward or Hebbian Critics. It is well known that the brains of animals can solve such problems effectively, though it may take them some time to learn how to do so. But if the Critic network cannot approximate the correct J function, then no amount of learning can lead to high quality performance. Until we implement Critics capable of solving such problems, our "intelligent controllers" will fall short of true brain-like capabilities in a very important way.

The problem of navigating a simple maze, defined over an array of squares, is a simple but challenging example of such a problem. The reason for choosing such a simple example, to begin with, will be explained further below.

Recently many engineers have argued that: (1) recurrent networks should be useful in theory because we know that they are important in the brain; but (2) it is not practical to use them yet, because we know how to use feedforward nets, but the technology of recurrent nets is too fuzzy and underdeveloped. One goal of this work was to create an example where the use of a recurrent network is straightforward and the potential engineering benefits are substantial.

The literature on recurrent networks has confused many people, because there is such a large variety of designs, aimed at performance on so many different tasks. Most of the literature describes classical networks—like the early designs of Grossberg and Hopfield—defined by ordinary differential equations (or even asynchronous binary updates!), trained by some form of Hebbian learning. But this paper will focus exclusively on networks used to approximate a J function, for a moderate to large planning problem. For reasons given above, the Hebbian networks are not appropriate for this particular task.

In practical applications today, computations are mainly based on discrete time cycles or sampling rates, rather than differential equations. In the discrete time formulation, there are two related types of recurrent network, the Time-Lagged Recurrent Network (TLRN) and the Simultaneous Recurrent Network (SRN). One way to define a TLRN is by the equations:

$$Y(t+1)=f_1(X(t),R(t),W) \quad (MN2)$$

$$R(t+1)=f_2(X(t),R(t),W), \quad (MN3)$$

where we are trying to predict a vector X(t+1), where X(t) is the vector of what we observe at time t, where W is an array of weights, and where R represents the recurrent connections. More precisely, R(t) represents some outputs of a set of neurons at time t, which will be remembered and used in the next time period, t+1. The TLRN is trained so as to minimize the error in predicting Y(t+1). The vector R(t) is treated as an intermediate part of the network, just like the output of an ordinary hidden layer. (See "Neural network design for J function approximation in dynamic programming," "Handbook of Intelligent Control," and The Roots of Backpropagation: From Ordered Derivatives to Neural Networks and Political Forecasting, Wiley.) In practice, R serves as a kind of short-term memory, or working memory, or state estimator. TLRNs have had substantial real-world application in several places, such as Feldkamp's group at Ford Motor Company.

By contrast, the SRN is not intended to provide better forecasting over time. It is not intended to provide memory of past events or trends. Instead, it uses recurrence to provide a more general function approximation capability, based on concepts like that of Turing theory and complexity theory. (See Handbook of Intelligent Control.) For more information about why SRNs are expected to be important in theory, see "Neural network design for J function approximation in dynamic programming," P. Werbos, "Supervised learning: Can it escape its local minimum?," WCNN93, and related work by Giles et al. Conceptually, the SRN is defined by the equations:

$$y^{(n+1)}(t)=f(X(t),y^{(n)}(t),W) \quad (MN4)$$

$$Y(t)=y^{(\infty)}(t), \quad (MN5)$$

where Y(t) is the ultimate output of the network at time t, where $y^{(n)}(t)$ is the intermediate output at iteration number n, where X(t) is the input to the network at time t, where W is a set of weights, and where f represents any feedforward network which you choose to use here. In practice, of course, we do not wait for an infinite number of iterations; we use some sort of practical stopping rule to describe when y has "settled down." In the work here, it was good enough to use only 20 iterations; however, in learning, we used only one iteration in the first 20 passes, two iterations in the next twenty, and so on, until we reached 20. At each time t, we initialized the network with a simple vector $y^{(O)}(t)$ chosen on an intuitive basis: −1 for all components of the vector, except for the last one, set to zero.

For some applications requiring brain-like intelligence, we would need to use hybrid networks incorporating both kinds of recurrence, as described in P. Werbos, "Generalization of backpropagation with application to a recurrent gas market model," Neural Networks, Vol.1, p.339–365, 1988, but explained more fully in "Handbook of Intelligent Control." For example, in processing movie images, we might process 32 frames (images) per second, such that the time between "t" and "t+1" is 1/32 second. We might use a fast neural chip, allowing a thousand iterations of recurrent processing per frame, such that the time between "n" and "n+1" is 1/32000 second. This allows us to combine short-term memory and iterative processing, so that our network can learn to exploit both the dynamics of the image and the kinds of recurrence needed for contour processing and segmentation and so on. (Authors such as Grossberg, VonderMalsburg and Hartmann have shown how such recurrence effects can work in the fixed-weight or fixed connection portion of an image processing system.) We would theorize that the cerebral cortex uses a similar style of computation, with a high-speed inner recurrent loop embedded within a lower-speed sampling system, in order to perform the same task. For the maze problem, however, we were dealing with a static function approximation task, for which an SRN by itself is sufficient.

By definition, SRNs are trained to minimize the gap between Y(t) and Y(t), based on the derivatives of error with respect to the weights. For the maze problem, we used the usual measure of square error, summed over all the open squares in the maze. There are five different techniques which can be used to estimate or calculate the derivatives:

(1) Backpropagation Through Time (BTT), which was first implemented on the MIT Multics in 1973(see The Roots of Backpropagation: From Ordered Derivatives to Neural Networks and Political Forecasting), and gives exact derivatives at a cost similar to the cost of a forward pass of the SRN; though convenient in engineering, it is not plausible as a model of biology;

(2) Truncation, which usually means a single pass of ordinary backpropagation—the method normally used with "Simple Recurrent Networks" in psychology (see L. Fausett, "Fundamentals of Neural Networks," Prentice-Hall, 1994);

(3) Forwards Propagation, which has been reinvented many times under many names; it calculates exact derivatives in forwards time, but imposes high computational costs for large networks, and is therefore not a plausible model for anything in the brain;

(4) Simultaneous backpropagation, which gives exact derivatives for a fully converged SRN, assuming in effect that Y(t) does not depend on $y^{(O)}(t)$; special cases of this were developed independently by Werbos (See Generalization of backpropagation with application to a recurrent gas market model), Almeida and Pineda; see "HandbooK of Intelligent Control" and "Supervised learning: Can it escape its local minimum?" for the most general version;

(5) The Error Critic, which approximates BTT, with an approximation valid both for converged and noncon-verged networks, see "Neural network design for J function approximation in dynamic programming" and "Handbook of Intelligent Control."

All but simultaneous backpropagation are also applicable to TLRNs, but the Error Critic is the only one of these choices which could be plausible as a description of how the cerebral cortex handles time-lagged recurrence.

For this work, we used both BTT and Truncation. We used BTT because it had the highest probability of performing the task. We tried truncation because it is the simplest, most popular method here. The implementation of BTT followed very closely the description of Chapter 8 of "The Roots of Backpropagation", or the later part of chapter 10 of "Handbook of Intelligent Control." (See "Neural network design for J function approximation in dynamic programming" for details and flow charts.) To implement truncation, we used almost the same code as with BTT, but cut the backpropagation off after one iteration. We implemented an MLP alternative, simply by limiting both the forward and backward passes of the SRN to one iteration.

Success in this work required a special choice of feedforward core network f (as in equation MN4) and use of the Adaptive Learning Rate algorithm (ALR).

For the core network f, we chose to use a cellular network that may be described as:

$$y^{(n+1)}(ix,iy)=g(X(ix,iy),y^{(n)}(ix,iy),y^{(n)}(ix,iy\pm1),y^{(n)}(ix\pm1,iy),W) \quad (MN6)$$

$$J(ix,iy)=Ws^*y_s^{(20)}(ix,iy) \quad (MN7)$$

which will now be explained in detail. Equations MN6 and MN7 are just one possible way of implementing equation MN4(i.e., of choosing f.) The time index "t" has been suppressed, because all of these quantities are taken at the same time t.

In equations MN6 and MN7, we have added two coordinate indices "ix" and "iy," which correspond to the coordinates of a square in the maze. Thus for a simple 5 by 5 maze, ix varies from 1 to 5 and iy from 1 to 5. For formal mathematical reasons, given in "Neural network design for J function approximation in dynamic programming," we augment the maze by assuming a wall of obstacles to the left of the maze and under it, to fill in squares for which ix=0 and iy=0. When ix=5, we interpret "ix+1" to mean ix=0; for iy=0, "iy−1" means iy=5, and so on; This augmentation does not change the maze problem, but it ensures the exact validity of the classic Lie group symmetry theory which justifies the cellular design.

The key points which make this system cellular are that:
(1) we are choosing $y^{(n)}$ to be a kind of three-dimensional array, with five neurons located "at" or "above" each square;
(2) we use the same weights W and Ws in each cell, even though the inputs and outputs are different at each square. (Of course, W is still a set of weights, not just one weight.) For the function g—the network "at" each square—we used a 5-neuron 5-output 11-input generalized MLP, as described in chapter 8 of "The Roots of Backpropagation," except that we used tanh as the transfer function s(net). The 11 inputs consisted of: (1) two binary inputs $X_1$ and $X_2$, indicating whether the square is covered by an obstacle or is the goal cell; (2) the value of $y_1^{(n)}$ from the four neighboring cells; (3) $y^{(n)}$ from the cell itself. In effect, the network at each cell is composed of two parts, a connector part and a local part. This structure was used both with SRN runs and MLP runs.

Because the same weights are used ("shared") across different squares or cells, this design dramatically reduces the number of weights, compared with conventional networks. This is crucial to rapid learning and good generalization. If we had allowed different cells to use different weights, the symmetry of the augmented maze problem guarantees that the best set of weights would have used the same weights in every cell anyway; thus we are simplifying our network at no cost at all, relative to the generalized maze navigation problem.

Lie group symmetry or "weight sharing" has been used for decades in image processing, by authors like Laveen Kanal, Lee Giles, Ysabel Guyon, LeCun, etc. Chua has shown how cellular networks in general have far better throughput than conventional networks in VLSI implementation. Our design here does not seem very brain-like, but can we be sure? In fact, many neuroscientists now believe that the hippocampus does have an explicit, built-in representation of spatial location. Pribram has described the hippocampus as the recurrent hidden layer of the highest Critic network in the brain, the limbic system. These parallels are worthy of further, more careful evaluation.

To adapt this structure, we used the ALR algorithm over three groups of weights: (1) Ws; (2) the bias or intercept weights in W; (3) the rest of W. We also injected a cutoff to prevent gross overshoot. See "Neural network design for J function approximation in dynamic programming" for details.

In the work so far, we have only used a very simple example of the maze navigation problem, strictly because of time limitations. We used a single 5 by 5 maze, with a goal at the square (4,4) and obstacles at (2,4), (3,3) and (4,2). If we had not imposed a cellular structure, to reduce the number of weights, this use of a single training example would have led to gross overtraining and zero error with all methods. However, with the cellular constraints—dictated by the generalized maze navigation problem, as discussed above—we did not have this problem.

There is a strong analogy between this simple 5 by 5 maze problem and the simple XOR problem posed by Minsky decades ago and later solved by Rumelhart, Hinton and Williams. (See Rumelhart & McClelland eds, Parallel Distributed Processing, Vol. 1, MIT Press, 1986.) In both cases, the example itself was of no inherent importance. The problem could be solved easily enough without neural networks. The example was chosen in order to provide the simplest possible, minimal representation of a more general problem. If neural networks could not have found a solution to the XOR problem, through learning, that would have been a show-stopper all by itself; there would have been no need (according to Minsky) to study them further, until this initial challenge could be met. In a similar way, if neural networks could not solve this very simple maze problem, it would seriously undermine all our hopes to build intelligent controllers with neural networks. This particular maze was chosen—in advance—to be especially tricky, with the same kind of multiple choice confusion that the XOR problem exhibits.

In essence, we found that conventional neural networks could not solve the problem. As discussed above, the MLP was by far the best conventional candidate to solve this problem. However, it essentially stopped learning after only 80 iterations. It froze up with a total square error (over all clear squares) of about 500. Using an SRN trained by truncation, we reached an error of 115 after 30,000 iterations, and little if any sign of further progress. With an SRN trained by BTT, total error reached 0.87 after 30,000 iterations, and was still continuing to decrease.

Furthermore, the J function as predicted by SRN-BTT was close enough that it led to a correct choice of which way to go on all squares of the maze. But with SRN-truncation, the estimated J pointed in the wrong direction from 11 squares, in the right direction from 10, and a tie on 1.(Here I assume that the robot traveling the maze will stop if the square it is on has a J lower than all its neighbors.) Again, the MLP was still worse.

In these tests, we also found that the SRN-BTT was far more sensitive to initial weights—as expected—than the other two alternatives. With the MLP and SRN-truncation, the results were very similar for all the initial weights tried out. But with the SRN-BTT, we tried out three or four distinct initial sets of weights, only one of which led to rapid initial learning. (These initial weights were set by hand, very arbitrarily; unfortunately, since we had problems seeding the Unix random number generator.) This experience fits in with a kind of Murphy's Law mentioned by Werbos in a 1987 paper: that networks with a relatively high accuracy and ability to reduce error substantially also tend to be the hardest to make converge. Thus the issue of local minima are more serious for true SRNs than for MLPs. This highlights the need for a "syncretic" design in those applications where one wants to combine high accuracy and generalization (as in SRNs) together with rapid real-time learning (as in RBFs or associative memory networks).

In the next phase of this work, we intend to explore several practical applications, as well as the true generalized maze problem, over many mazes. Because of the importance of the local minimum issue, we intend to rely heavily on step-by-step learning or "shaping", as well as features like modified error functions to prevent premature overtraining. The need to use step-by-step learning may seem discouraging at first, but even the human brain depends very heavily on that kind of strategy when learning to solve truly difficult planning and control problems. Naturally, the next step will be to embed all this into larger, modular optimization designs.

It is described below that a new neural network design can solve an example of difficult function approximation problems which are crucial to the field of approximate dynamic programming(ADP). Although conventional neural networks have been proven to approximate smooth functions very well, the use of ADP for problems of intelligent control or planning requires the approximation of functions which are not so smooth. As an example, the present invention addresses the problem of approximating the J function of dynamic programming applied to the task of navigating mazes in general without the need to learn each individual maze. Conventional neural networks, like multi-layer perceptions (MLPs), cannot learn this task. But a new type of neural networks, simultaneous recurrent networks (SRNs), can do so according to successful initial tests. The present invention also examines the ability of recurrent neural networks to approximate MLPs and vice versa.

In implementing the present invention, at least three goals are addressed: (1) to demonstrate the value of a new class of neural network which provides a crucial component needed for brain-like intelligent control systems for the future, (2) to demonstrate that this new kind of neural network provides better function approximate ability for use in more ordinary kind of neural network applications for supervised learning, and (3) to demonstrate some practical implementation techniques necessary to make this kind of network actually work in practice.

Figure 12:
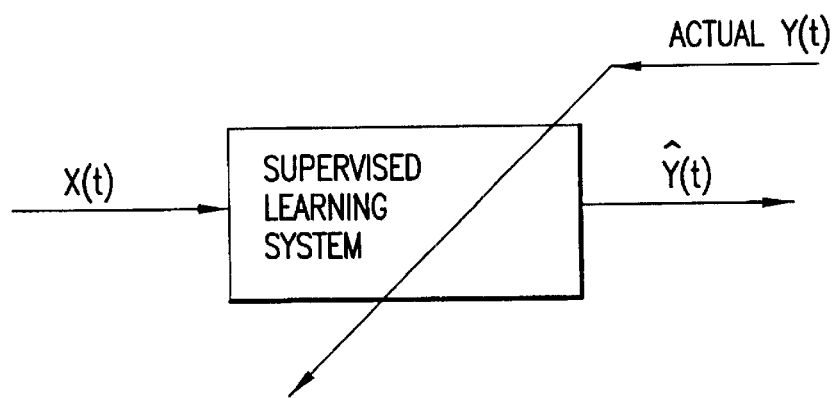
FIG. 12 is a block diagram of a supervised learning system.

At present, in the neural network field perhaps 90% of neural network applications involve the use of neural networks designed to perform a task called supervised learning, shown in FIG. 12. Supervised learning is the task of learning a nonlinear function which may have several inputs and several outputs based on some examples of the function. For example, in character recognition, the inputs may be an array of pixels seen from a camera. The desired outputs of the network may be a classification of character being seen. Another example would be for intelligent sensing in the chemical industry where the inputs might be spectral data from observing a batch of chemicals, and the desired outputs would be the concentrations of the different chemicals in the batch. The purpose of this application is to predict or estimate what is in the batch without the need for expensive analytical tests.

The present invention focuses on certain tasks in supervised learning. Even though existing neural networks can be used in supervised learning, there can be performance problems depending on what kind of function is learned. Many people have proved many theorems to show that neural networks, fuzzy logic, Taylor theories and other function approximation have a universal ability to approximate functions on the condition that the function have certain properties and that there is no limit on the complexity of the approximation. In practice, many approximation schemes become useless when there are many input variables because the required complexity grows at an exponential rate.

For example, one way to approximate a function would be to construct a table of the values of the function at certain points in the space of possible inputs. Suppose that there are 30 input variables and we consider 10 possible values of each input. In that case, the table must have $10^{30}$ numbers in it. This is not useful in practice for many reasons. Actually, however, many popular approximation methods like radial basis function (RBF) are similar in spirit to a table of values.

In the field of supervised learning, Andrew Barron has proved some function approximation theorems which are much more useful in practice. He has proven that the most popular form of neural networks, the multi-layer perceptron (MLP), can approximate any smooth function. Unlike the case with the linear basis functions (like RBF and Taylor series), the complexity of the network does not grow rapidly as the number of input variables grows.

Unfortunately there are many practical applications where the function to be approximated is not smooth. In some cases, it is good enough just to add extra layers to an MLP (see "Feedback stabilization using two-hidden-layer nets") or to use a generalized MLP (see "The Roots of Backpropagation"). However, there are some difficult problems which arise in fields like intelligent control or image processing or even stochastic search where feed-forward networks do not appear powerful enough.

The present invention demonstrates the capability of a different kind of supervised learning system based on a kind of recurrent network called simultaneous recurrent network (SRN). Later, an explanation is given of why this kind of improved supervised learning system will be very important to intelligent control and to approximate dynamic programming. In effect this work on supervised learning is the first step in a multi-step effort to build more brain-like intelligent systems. The next step would be to apply the SRN to static optimization problems, and then to integrate SRNs into large systems for ADP.

Even though intelligent control is the main motivation for this work, the work may be useful for other areas as well. For example, in zip code recognition, AT&T has demonstrated that feed-forward networks can achieve a high level of accuracy in classifying individual digits. (See I. Guyon, I. Poujaud, L. Personnaz, G. Dreyfus, J. Denker, and Y. Le Cun, "Comparing different neural network architectures for classifying handwritten digits", Proceedings of the IEEE International Joint Conference on Neural Networks, June 1989.)

However, AT&T and the others still have difficulty in segmenting the total zip code into individual digits. Research on human vision by von der Malsburg and others has suggested that some kinds of recurrency in neural networks are crucial to their abilities in image segmentation and binocular vision. (See C. von der Malsburg W. Schneider, Biol. Cybernetic, Vol. 54, pp. 29–40, 1986.) Furthermore, researchers in image processing like Laveen Kanal have showed that iterative relaxation algorithms are necessary even to moderate success in such image processing tasks. Conceptually the SRN can learn an optimal iterative algorithm, but the MLP cannot represent any iterative algorithms. In summary, though we are most interested in brain-like intelligent control, the development of SRNs could lead to very important applications in areas such as image processing in the future.

The network described by the present invention is unique in several respects. However, it is certainly not the first serious use of a recurrent neural network. The relationship between this new design and other designs in the literature is discussed. Roughly speaking, the vast bulk of research in recurrent networks has been academic research using designs based on ordinary differential equations (ODE) to perform some tasks very different from supervised learning—tasks like clustering, associative memory and feature extraction. The simple Hebbian learning methods used for those tasks do not lead to the best performance in supervised learning. (See D. O. Hebb, Organization of Behavior, Wiley, N.Y., 1949.) Many engineers have used another type of recurrent network, the time lagged recurrent network (TLRN), where the recurrency is used to provide memory of past time periods for use in forecasting the future. However, that kind of recurrency cannot provide the iterative analysis capability mentioned above. Very few researchers have written about SRNs, a type of recurrent network designed to minimize error and learn an optimal iterative approximation to a function. This is certainly the first use of SRNs to learn a J function from dynamic programming which will be explained below. This may also be the first empirical demonstration of the need for advanced training methods to permit SRNs to learn difficult functions. Then, a more in depth analysis is given of two test problems using the SRN and the MLP. The first test problem was used mainly as an initial test of a simple form of SRNs. In this problem, the hypothesis that an SRN can always learn to approximate a randomly chosen MLP, but not vice versa was tested. The results are consistent with that hypothesis.

The main test problem in this work was the problem of learning the J function of dynamic programming. For a maze navigation problem, many neural network researchers have written about neural networks which learn an optimal policy of action for one particular maze. (See W. Miller, R. Sutton & P. Werbos (eds.), Neural Networks for Control, MIT Press, 1990.) The present invention addresses the more difficult problem of training a neural network to input a picture of a maze and output the J function for this maze. When the J function is known, it is a trivial local calculation to find the best direction of movement. This kind of neural network should not require retraining whenever a new maze is encountered. Instead it should be able to look at the maze and immediately "see" the optimal strategy. Training such a network is a very difficult problem which has never been solved in the past with any kind of neural network. Also it is typical of the challenges one encounters in true intelligent control and planning. The present invention demonstrates a working solution to this problem for the first time. Now that a system is working on a very simple form for this problem, it would be possible in the future to perform many tests of the ability of this system to generalize its success to many mazes.

In order to solve the maze problem, it was not sufficient only to use an SRN. There are many choices to make when implementing the general idea of SRNs or MLPs. How these choices are made is described below. The most important choices were:

1. Both for the MLP and for the feed-forward core of the SRN we used the generalized MLP design which eliminates the need to decide on the number of layers.
2. For the maze problem, we used a cellular or weight-sharing architecture which exploits the spatial symmetry of the problem and reduces dramatically the number of weights. In effect we solved the maze problem using only five distinct neurons. There are interesting parallels between this network and the hippocampus of the human brain.
3. For the maze problem, an adaptive learning rate (ALR) procedure was used to prevent oscillation and ensure convergence.
4. Initial values for the weights and the initial input vector for the SRN were chosen essentially at random, by hand. In the future, more systematic methods are available. But this was sufficient for success in this case.

As discussed above, the present invention teaches how to use a new type of neural network in order to achieve better function approximation than what is available from the types of neural networks which are popular today. Better function approximation is important to approximate dynamic programming (ADP), intelligent control and understanding the brain. Image processing and other applications have already been discussed above. These three topics—ADP, intelligent control and understanding the brain—are all closely related to each other and provide part of the original motivation for the present invention.

In order to build the best intelligent control systems, we need to combine the most suitable mathematics together with some understanding of natural intelligence in the brain. There is a lot of interest in intelligent control in the world. Some control systems which are called intelligent are actually very quick and easy things. There are many people who try to move step by step to add intelligence into control, but a step-by-step approach may not be enough by itself.

Sometimes to achieve a complex difficult goal, it is necessary to have a plan, thus some parts of the intelligent control community have developed a more systematic vision or plan for how it could be possible to achieve real intelligent control. First, one must think about the question of what is intelligent control. Then, instead of trying to answer this question in one step, we try to develop a plan to reach the design. Actually there are two questions:

1. How could we build an artificial system which replicates the main capabilities of brain-like intelligence, somehow unified together as they are unified together in the brain?
2. How can we understand what are the capabilities in the brain and how they are organized in a functional engineering view? i.e. how are those circuits in the human brain arranged to learn to perform different tasks?

It would be best to understand how the human brain works before building an artificial system. However, at the present time, our understanding of the brain is limited. But at least we know that local recurrency plays critical rule in the higher part of the human brain. (See W. Biol. Cybernetic, Vol. 54; V. B. Brooks, The Neural Basis of Motor Control, Oxford press; K. Pribram, Brain and Perception: Holonomy and Structure in Fi+gural Processing, Erlbaum, 1991; and H. Chang, W. J. Freeman, "Parameter optimization in models of the olfactory nerual system", Neural Networks, Vol. 9, No. 1, pp 1–14,1996.)

Another reason to use SRNs is that SRNs can be very useful in ADP mathematically. Now we will discuss what ADP can do for intelligent control and understanding the brain by addressing three questions in order: 1. What is ADP? 2. What is the importance of ADP to intelligent control and understanding the brain? 3. What is the importance of SRNs to ADP?

To explain what is ADP, let us consider the original Bellman equation (see "Handbook of Intelligent Control"):

$$J(R(t))=\max\ (U(R(t),\ u(t))+<J(R(t+1))>)/(1+r)-U_0\ u(t) \quad (J1)$$

where r and $U_0$ are constants that are used only in infinite-time-horizon problems and then only sometimes, and where the angle brackets refer to expectation value. In this paper, we actually use:

$$J(R(t))=\max\ (U(R(t),\ u(t))+<J(R(t+1))>)u(t) \quad (J2)$$

since the maze problem does not involve an infinite time-horizon.

Instead of solving for the value of J in every possible state, R(t), we can use a function approximation method like neural networks to approximate the J function. This is called approximate dynamic programming (ADP). This embodiment of the present invention does not do true ADP because in true ADP we do not know what the J function is and must therefore use indirect methods to approximate it. However, before we try to use SRNs as a component of an ADP system, it makes sense to first test the ability of an SRN to approximate a J function, in principle.

Now we will try to explain what is the intuitive meaning of the Bellman equation (equation (J1)) and the J function according to the treatment taken from "The Roots of Backpropagation." To understand ADP, one must first review the basics of classical dynamic programming, especially the versions developed by Howard ("Dynamic Programming and Markhov Processes, MIT Press, Cambridge, Mass., 1960) and Bertsekas. Classical dynamic programming is the only exact and efficient method to compute the optimal control policy over time, in a general nonlinear stochastic environment. The only reason to approximate it is to reduce computational cost, so as to make the method affordable (feasible) across a wide range of applications. In dynamic programming, the user supplies a utility function which may take the form U(R(t); u(t))—where the vector R is a representation or estimate of the state of the environment (i.e. the state vector)—and a stochastic model of the plant or environment. Then "dynamic programming" (i.e. solution of the Bellman equation) gives us back a secondary or strategic utility function J(R). The basic theorem is that maximizing U(R(t), u(t))+J(R(t+1)) yields the optimal strategy, the policy which will maximize the expected value of U added up over all future time. Thus dynamic programming converts a difficult problem in optimizing over many time intervals into a straightforward problem in short-term maximization. In classical dynamic programming, we find the exact function J which exactly solves the Bellman equation. In ADP, we learn a kind of "model" of the function J; this "model" is called a "Critic." (Alternatively, some methods learn a model of the derivatives of J with respect to the variables R i; these correspond to Lagrange multipliers, λi, and to the "price variables" of macroeconomic theory. Some methods learn a function related to J, as in the Action-Dependent Adaptive Critic (ADAC).

To understand the human brain scientifically, we must have some suitable mathematical concepts. Since the human brain makes decisions like a control system, it is an example of an intelligent control system. Neuroscientists do not yet understand the general ability of the human brain to learn to perform new tasks and solve new problems even though they have studied the brain for decades. Some people compare the past research in this field to what would happen if we spent years to study radios without knowing the mathematics of signal processing.

We first need some mathematical ideas of how it is possible for a computing system to have this kind of capability based on distributed parallel computation. Then we must ask what are the most important abilities of the human brain which unify all of its more specific abilities in specific tasks. It would be seen that the most important ability of brain is the ability to learn over time how to make better decisions in order to better maximize the goals of the organism. The natural way to imitate this capability in engineering systems is to build systems which learn over time how to make decisions which maximize some measure of success or utility over future time. In this context, dynamic programming is important because it is the only exact and efficient method for maximizing utility over future time. In the general situation, where random disturbances and nonlinearity are expected, ADP is important because it provides both the learning capability and the possibility of reducing computational cost to an affordable level. For this reason, ADP is the only approach we have to imitating this kind ability of brain.

The similarity between some ADP designs and the circuitry of the brain has been discussed at length. (See P. Werbos, "The brain as a neurocontroller: New hypotheses and new experimental possibilities", In K. Pribram (eds.), Origins: Brain and Self-Organization, Erlbaum, 1994; and P. Werbos, "Learning in the brain: engineering interpretation", In K. Pribram, (eds.), Learning as Self-organization, Erlbaum, 1996.) For example, there is an important structure in the brain called the limbic system which performs some kind of evaluation or reinforcement function, very similar to the function of the neural networks that must approximate the J function of dynamic programming. The largest part of the limbic system, called the hippocampus, is known to possess a higher degree of local recurrency. In general, there are two ways to make classical controllers stable despite great uncertainty about parameters of the plant to be controlled. For example, in controlling a high speed aircraft, the location of the center of the gravity is not known. The gravity is not known exactly because it depends on the cargo of the air plane and the location of the passengers. One way to account for such uncertainties is to use adaptive control methods. We can get similar results, but more assurance of stability in most cases by using related neural network methods, such as adaptive critics with recurrent networks. It is like adaptive control but more general. There is another approach called robust control or H∞control, which trys to design a fixed controller which remains stable over a large range in parameter space. Baras and Patel have for the first time solved the general problem of H∞control for general partially observed nonlinear plants. (See J. S. Baras and N. S. Patel, "Information state for robust control of set-valued discret time systems", Proceedings of 34th Conference on Decision and Control, IEEE, 1995, p. 2302.) They have shown this problem reduces to a problem in nonlinear, stochastic optimization. Adaptive dynamic programming makes it possible to solve large scale problems of this type.

ADP systems already exist which perform relatively simple control tasks like stabilizing an aircraft as it lands under windy conditions. (See D. Prokhorov, R. Santiago & D. Wunsch, "Adaptive critic designs: a case study for neurocontrol", Neural Networks, Vol.8, No.9, 1995.) However this kind of task does not really represent the highest level of intelligence or planning. True intelligent control requires the ability to make decisions when future time periods will follow a complicated, unknown path starting from the initial state. One example of a challenge for intelligent control is the problem of navigating a maze which we will discuss below. A true intelligent control system should be able to learn this kind of task. However, the ADP systems in use today could never learn this kind of task. They use conventional neural networks to approximate the J function. Because the conventional MLP cannot approximate such a J function, we may deduce that ADP system constructed only from MLPs will never be able to display this kind of intelligent control. Therefore, it is essential that we can find a kind of neural network which can perform this kind of task. As we will show, the SRN can fill this crucial gap. There are additional reasons for believing that the SRN may be crucial to intelligent control.

Figure 13:
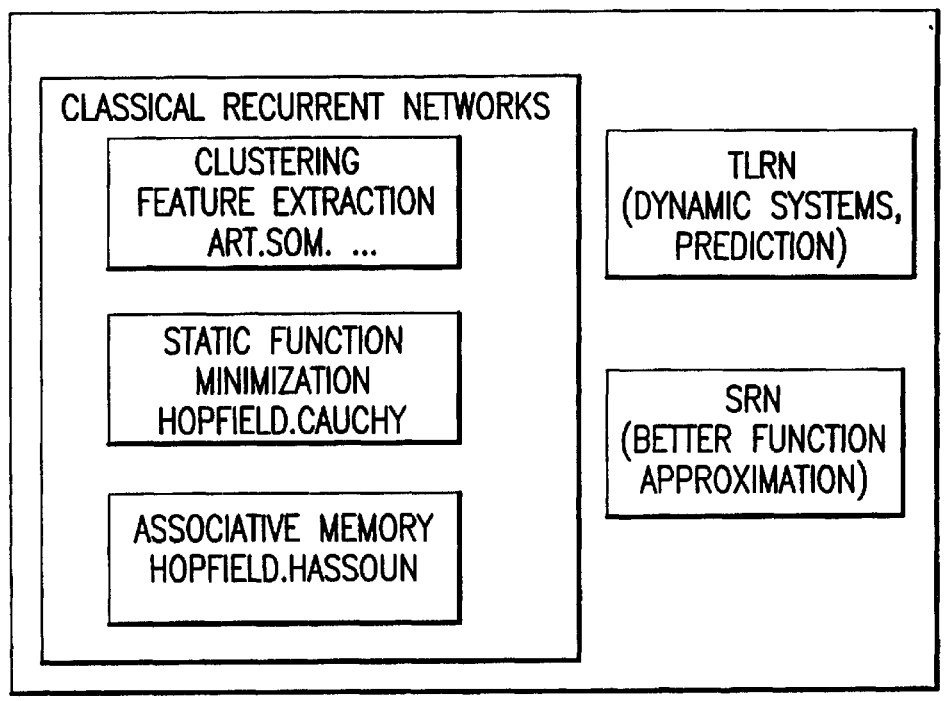
FIG. 13 is a block diagram of a system of recurrent networks (SRN)

There is a huge literature. on recurrent networks. Biologists have used many recurrent models because the existence of recurrency in the brain is obvious. However, most of the recurrent networks implemented so far have been classic style recurrent networks, as shown on the left hand of FIG. 13. Most of these networks are formulated from ordinary differential equation (ODE) systems. Usually their learning is based on a restricted concept of Hebbian learning. Originally in the neural network field, the most popular neural networks were recurrent networks like those which Hopfield and Grossberg used to provide associative memory. (See J. Hopfield and D. Tank, "Computing with neural circuits: A model", Science, Vol. 233, pp. 625–633, 1986, and S. Grossberg, The Adaptive brain I, North-Holland, 1987.) Associative memory networks can actually be applied to supervised learning. But in actuality their capabilities are very similar to those of look-up tables and radial basis functions. They make predictions based on similarity to previous examples or prototypes. They do not really try to estimate general functional relationships. As a result these methods have become unpopular in practical applications of supervised learning. The theorems of Barron discussed in the Introduction show that MLPs do provide better function approximation than do simple methods based on similarity.

There has been substantial progress in the past few years in developing new associative memory designs. Nevertheless, the MLP still is better for the specific task of function approximation. In a similar way, classic recurrent networks have been used for tasks like clustering, feature extraction and static function optimization. But these are different problems from what we are trying to solve here.

Actually the problem of static optimization will be considered in future stages of this research. We hope that the SRN can be useful in such applications after we have used it for supervised learning. When people use the classic Hopfield networks for static optimization, they specify all the weights and connections in advance. This has limited the success of this network for large scale problems where it is difficult to guess the weights. With the SRN we have methods to train the weights in that kind of structure. Thus the guessing is no longer needed.

There have also been researchers using ODE neural networks who have tried to use training schemes based on a minimization of error instead of Hebbian approaches. However, in practical applications of such networks, it is important to consider the clock rates of computation and data sampling. For that reason, it is both easier and better to use error minimizing designs based on discrete time rather than ODE.

Figure 14:
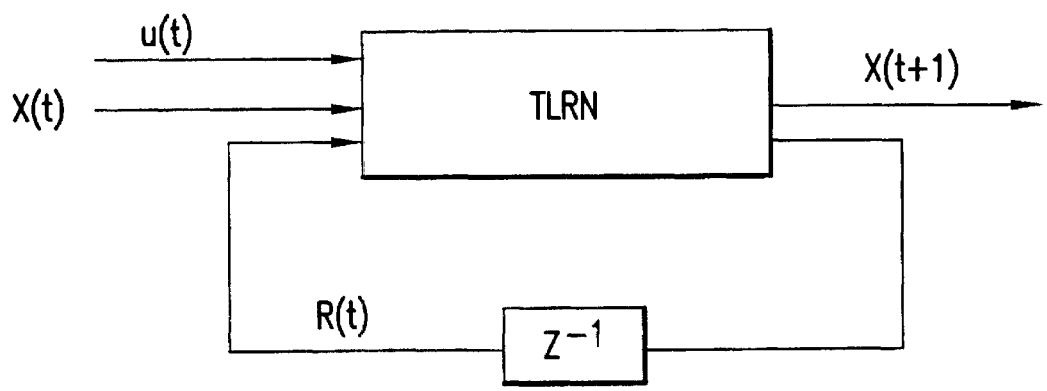
FIG. 14 is a block diagram of a time lagged recurrent network.
Figure 15:
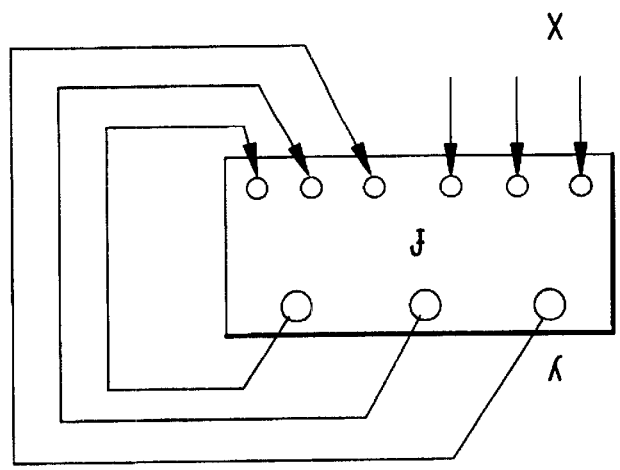
FIG. 15 is a block diagram of a simultaneous recurrent network.

If the importance of neural networks is measured by the number of words published, then the classic networks dominate the field of recurrent networks. However, if the value is measured based on economic value of practical application, then the field is dominated by time-lagged recurrent networks (TLRNs). The purpose of the TLRN is to predict or classify time-varying systems using recurrency as a way to provide memory of the past. The SRN has some relation with the TLRN but it is designed to perform a fundamentally different task. The SRN uses recurrency to represent more complex relationships between one input vector X(t) and one output Y(t) without consideration of the other times t. FIG. 14 and FIG. 15 show us more details about the TLRN and the SRN.

In control applications, u(t) represents the control variables which we use to control the plant. For example, if we design a controller for a car engine, the X(t) variables are the data we get from our sensors. The u(t) variables would include the valve settings which we use to try to control the process of combustion. The R(t) variables provide a way for the neural networks to remember past time cycles, and to implicitly estimate important variables which cannot be observed directly. In fact, the application of TLRNs to automobile control is the most valuable application of recurrent networks ever developed so far.

A simultaneous recurrent network (FIG. 15) is defined as a mapping:

$$\hat{Y}(t)=F(X(t),W) \tag{J3}$$

which is computed by iterating over the following equation:

$$y^{(n+1)}(t)=f(y^{(n)}(t), X(t), W) \tag{J4}$$

where f is some sort of feed-forward network or system, and $\hat{Y}$ is defined as:

$$\hat{Y}(t) = \lim_{n \to \infty} y^{(n)}(t) \tag{J5}$$

When we use $\hat{Y}$ herein, we use n=20 instead of ∞ here.

In FIG. 15, the outputs of the neural network come back again as inputs to the same network. However, in concept there is no time delay. The inputs and outputs should be simultaneous. That is why it is called a simultaneous recurrent network (SRN). In practice, of course, there will always be some physical time delay between the outputs and the inputs. However if the SRN is implemented in fast computers, this time delay may be very small compared to the delay between different frames of input data. in FIG. 15, X refers to the input data at the current time frame t. The vector y represents the temporary output of the network, which is then recycled as an additional set of inputs to the network. At the center of the SRN actually is the feed-forward network which implements the function f. (In designing an SRN, you can choose any feed-forward network or system as you like. The function f simply describes which network you use). The output of the SRN at any time t is simply the limit of the temporary output y. In equation (J3) and (J4), notice that there are two integers—n and t—which could both represent some kind of time. The integer t represents a slower kind of time cycle, like the delay between frames of incoming data. The integer n represents a faster kind of time, like the computing cycle of a fast electronic chip. For example, if we build a computer to analyze images coming from a movie camera, "t" and "t+1" represent two successive incoming pictures with a movie camera. There are usually only 32 frames per second. (In the human brain, it seems that there are only about 10 frames per second coming into the neoccrtex.) But if we use a fast neural network chip, the computational cycle—the time between "n" and "n+1"—could be as small as a microsecond.

In actuality, it is not necessary to choose between time-lagged recurrency (from t to t+1) and simultaneous recurrency (from n to n+1). It is possible to build a hybrid system which contains both types of recurrency. This could be very useful in analyzing data like movie pictures, where we need both memory and some ability to segment the images. D. White & D. Sofge (eds.), Handbook of Intelligent Control: Neural, Adaptive and Fuzzy Approaches, Van Nostrand, 1992, discusses how to build such a hybrid. However, before building such a hybrid, we must first learn to make SRNs work by themselves.

Figure 16:
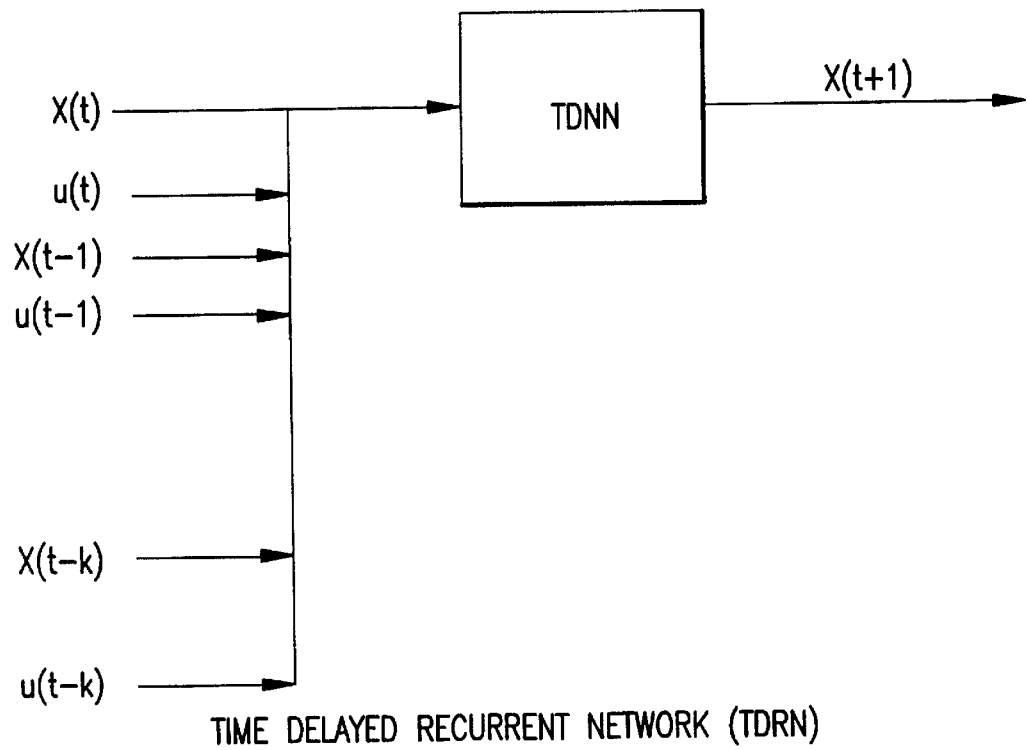
FIG. 16 is a block diagram of a time delayed recurrent network (TDRN)

Finally, please note that the TLRN is not the only kind of neural network used in predicting dynamical systems. Even more popular is the TDNN, shown in FIG. 16. The TDNN is popular because it is easy to use. However, it has less capability, in principle, because it has no ability to estimate unknown variables. It is especially weak when some of these variables change slowly over time and require memory which persists over long time periods. In addition, the TLRN fits the requirements of ADP directly, while the TDNN does not.

There are many types of training that have been used for recurrent networks. Different types of training give rise to different kinds of capabilities for different tasks. For the tasks which we have described for the SRN and the TLRN, the proper forms of training all involve some calculation of the derivatives of error with respects to the weights. Usually after these derivatives are known, the weights are adapted according to a simple formula as follows:

$$newW_{i,j} = oldW_{i,j} - LR * \frac{\partial Error}{\partial W_{i,j}} \tag{J6}$$

where LR is called the learning rate.

There are five main ways to trains SRNs, all based on different methods for calculating or approximating the derivatives. Four of these methods can also be used with TLRNs. Some can be used with TLRNs. Some can be used for control applications. These five types of training are listed in FIG. 17. One embodiment of the present invention uses two of these methods: Backpropagation through time (BTT) and Truncation.

The five methods are:

1. Backpropagation through time (BTT). This method and forward propagation are the two methods which calculate the derivatives exactly. BTT is also less expensive than forward propagation.
2. Truncation. This is the simplest and least expensive method. It uses only one simple pass of back-propagation through the last iteration of the model. Truncation is probably the most popular method used to adapt SRNs even though the people who use it mostly just call it ordinary backpropagation.

3. Simultaneous backpropagation. This is more complex than truncation, but it still can be used in real time learning. It calculates derivatives which are exact in the neighborhood of equilibrium but it does not account for the difficulties of the network before it reaches the neighborhood of equilibrium.
4. Error critics (shown in FIG. 18). This provides a general approximation to BTT which is suitable for use in real-time learning.
5. Forward propagation. This, like BTT, calculates exact derivatives. It is often considered suitable for real-time learning because the calculations go forward in time. However, when there are n neurons and m connections, the cost of this method per unit of time is proportional to n Δm. Because of this high cost, forward propagation is not really brain-like any more than BTT.

BTT is a general method for calculating the derivative of any outcome or result of a process which involves repeated calls to the same network or networks used to help calculate some kind of final outcome variable or result E. In some applications, E could represent utility, performance, cost or other such variables. But herein, E will be used to represent error. BTT was first proposed and implemented in [17]. The general form of BTT is as follows: for k=1 to T do forward calculation(k); calculate result E; calculate direct derivatives of E with respect to outputs of forwards calculations; for k=T to 1 backpropagate through forwards calculation(k), calculating running totals where appropriate.

Figure 19:
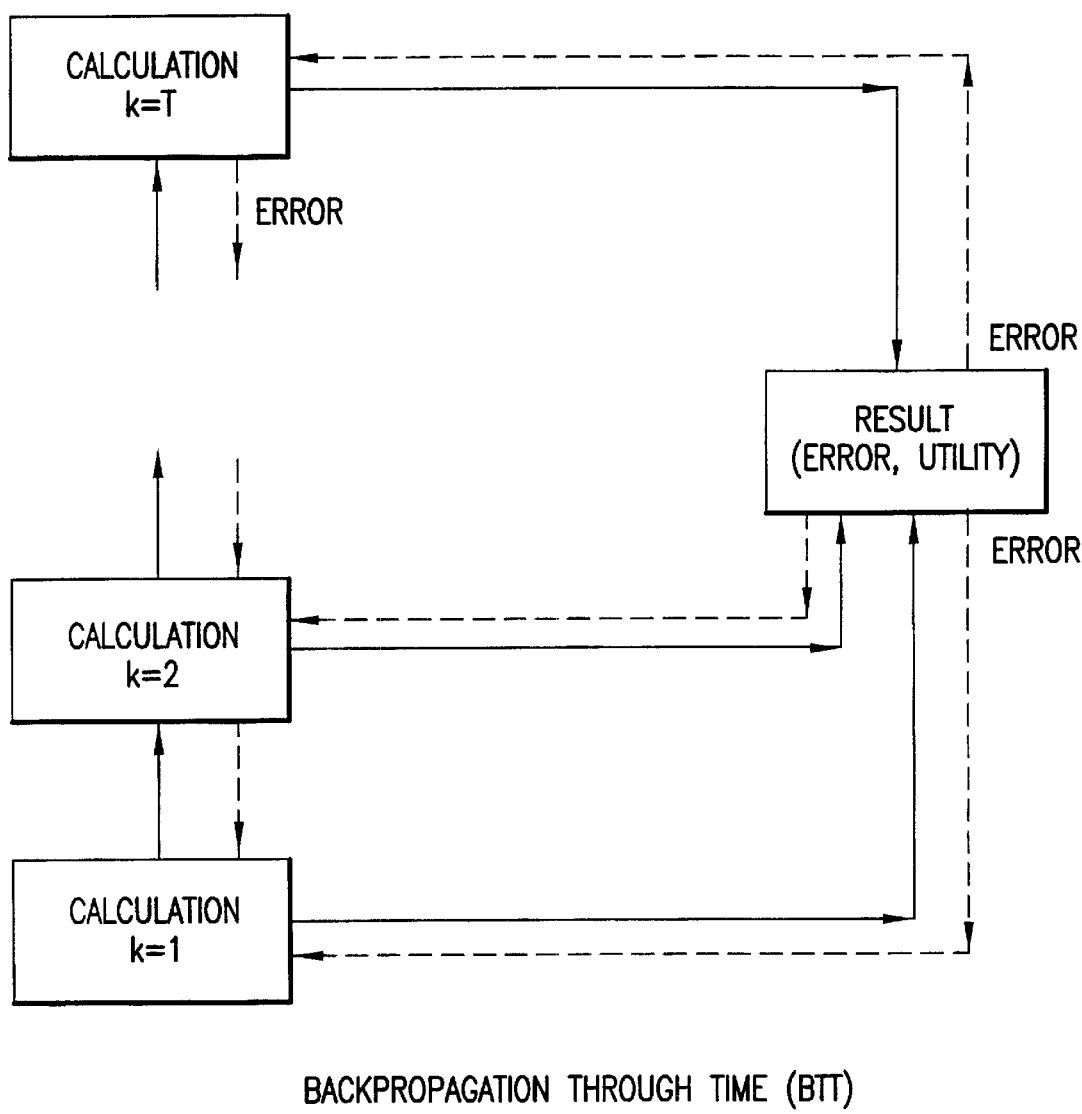
FIG. 19 is a block diagram showing a technique for performing a backpropagation through time calculation.

These steps are illustrated in FIG. 19. Notice that this algorithm can be applied to all kinds of calculations. Thus we can apply it to cases where k represents data frames t as in TLRNs, or to cases where k represents internal iterations n as in SRNS. Also note that each box of calculation receives input from some dashed lines which represent the derivatives of E with respect to the output of the box. In order to calculate the derivatives coming out of each calculation box, one simply uses backpropagation through the calculation of that box starting out from the incoming derivatives. We will explain in more detail how this works in the SRN case and the TLRN case.

So far as we know BTT has been applied in published working systems for TLRNs and for control, but not yet for SRNs until now. However, Rumelhart, Hinton and Williams did suggest that someone should try this.

The application of BTT for TLRNs is described at length in P. Werbos, The Roots of Backpropagation: From Ordered Derivatives to Neural Networks and Political Forecasting, Wiley, 1994, and D. White & D. Sofge (eds.),Handbook of Intelligent Control: Neural, Adaptive and Fuzzy Approaches, Van Nostrand, 1992. The procedure is illustrated in FIG. 20. In this example the total error is actually the sum of error over each time t where t goes from 1 to T. Therefore the outputs of the TLRN at each time have two ways of changing total error:

(1) A direct way when the current predictions $\hat{Y}$ (t) are different from the current targets Y (t);
(2) An indirect way based on the impact of R(t) on errors in later time periods.

Therefore the derivative feedback coming into the TLRN is actually the sum of two feedbacks from two different sources. As a technical detail, note that R(0) needs to be specified somehow.

Figure 21:
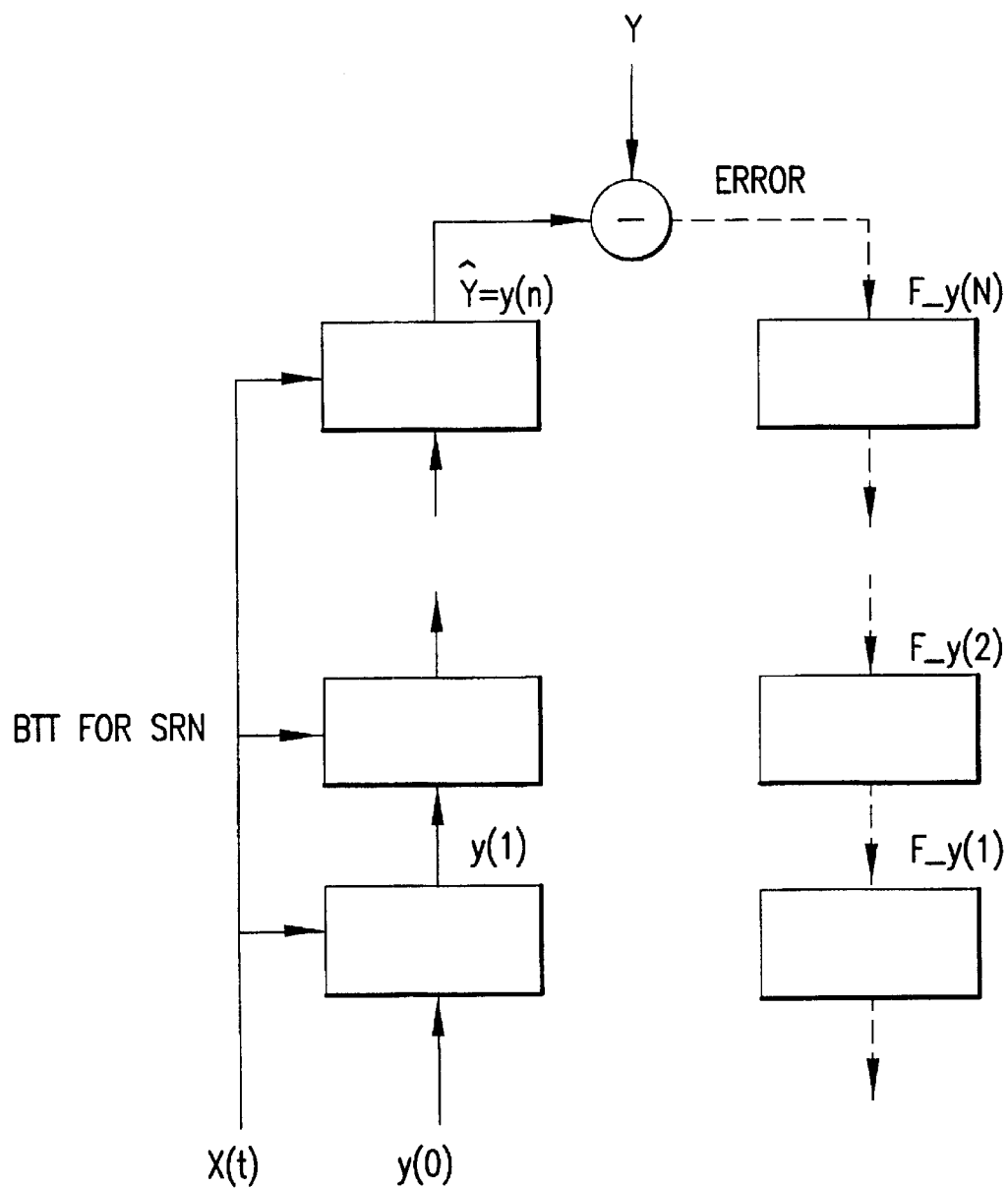
FIG. 21 is a block diagram showing backpropagation through time using a SRN.

FIG. 21 shows the application of BTT to training an SRN. This figure also provides some explanation of a computer implementation. In this figure, the left-hand side (the solid arrows) represents the neural network which predicts our desired output Y. (In our example, Y represents the true values of the J function across all points in the maze). Each box on the left represents a call to a feed-forward system. The vector X(t) represents the external inputs to the entire system. In our case, X(t) consists of two variables, indicating which squares in the maze contain obstacles and which contains the goal respectively. For simplicity, we selected the initial vector y(0) as a constant vector as we will describe below. Each call to the feed-forward system includes calls to a subroutine which implements the generalized MLP.

On the right-hand side of FIG. 21, we illustrate the backpropagation calculation used to calculate the derivatives. For the SRN, unlike the TLRN, the final error depends directly only on the output of the last iteration. Therefore the last iteration receives feedback only from the final error but the other iterations receive feedback only from the iterations just after them. Each box on the right-hand side represents a backpropagation calculation through the feed-forward system on its left. The actual backpropagation calculation involves multiple calls to the dual subroutine F_net2, which is similar to a subroutine in chapter 8 of "The Roots of Backpropagation".

Notice that the derivative calculation here costs about the same amount as the forward calculation on the left-hand side. Thus BTT is very inexpensive in terms of computer time. However, the backpropagation calculations do require the storage of many intermediate results. Also we know that the human brain does not perform such extended calculations backward through time. Therefore BTT is not a plausible model of true brain-like intelligence. We use it here because it is exact and therefore has the best chance to solve this difficult problem never before solved. In future research, we may try to see whether this problem can also be solved in a more brain-like fashion.

Truncation is probably the most popular method to train SRNs even though the term truncation is not often used. For example, the "simple recurrent networks" used in psychology are typically just SRNs adapted by truncation. (See L. Fausett, Fundamentals of Neural Networks: architectures, algorithms and applications, Prentice Hall, 1994.)

Figure 22:
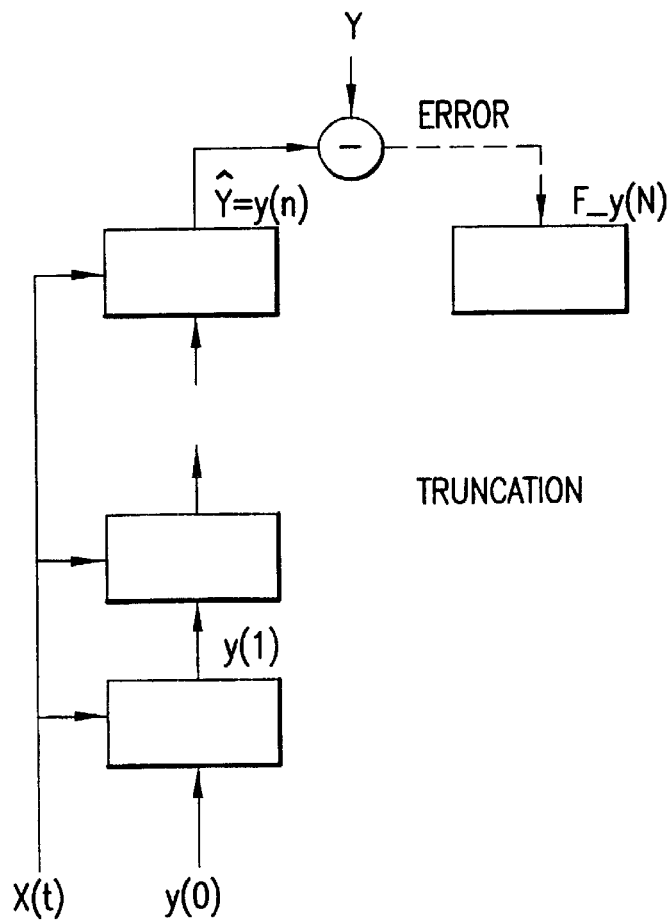
FIG. 22 is a block diagram showing an interconnection using truncation.

Strictly speaking there are two kinds of truncation—ordinary one-step truncation (FIG. 22) and multi-step truncation which is actually a form of BTT. Ordinary truncation is by far the most popular. In the derivative calculation of ordinary truncation, the memory inputs to the last iteration are treated as if they were fixed external inputs to the network. In truncation there is only one pass of ordinary backpropagation involving only the last iteration of the network. Many people have adapted recurrent networks in this simple way because it seems so obvious. However, the derivatives calculated in this way are not exactly the same because they do not totally represent the impact of changing the weights on the final error. The reason for this is that changing the weights will change the inputs to the final iteration.

It is not right to treat these inputs as constants because they are changed when the weights are changed. The difference between truncation and BTT can be seen even in a simple scalar example, where n=2 and the feed-forward calculation is linear. In this case, the feed-forward calculation is:

$$y(1)=A*y(0)+B*X \tag{J7}$$

$$y(2)=A*y(1)+B*X \tag{J8}$$

In additon, $$E = \text{Error} = \frac{1}{2}(Y - y(2))^2 \qquad (J9)$$

$$\frac{\partial E}{\partial y(2)} = y(2) - Y \qquad (J10)$$

In truncation, we use equation (J8) and deduce:

$$\frac{\partial E}{\partial B} = \frac{\partial E}{\partial y(2)} * \frac{\partial y(2)}{\partial B} = (y(2) - Y) * X \qquad (J11)$$

But for a complete calculation, we substitute (J7) into (J8), deriving:

$$y(2) = A^2 * y(0) + A * B * X + B * X \qquad (J12)$$

which yields:

$$\partial E / \partial B = (y(2) - Y) * (A * X + X). \qquad (J13)$$

The result in equation (J11) is usually different from the result in equation (J13), which is the true result and comes from BTT. Depending on the value of A, these results could even have opposite signs. We have used truncation because it is so easy and so popular.

Simultaneous backpropagation is a method developed independently in different form by Werbos, Almeida and Pineda. The most general form of this method for SRNs can be found in chapter 3 of D. White & D. Sofge (eds.), Handbook of Intelligent Control: Neural, Adaptive and Fuzzy Approaches, Van Nostrand, 1992, and in P. Werbos, "Supervised learning: can it escape its local minimum", WCNN93 Proceedings, Erlbaum, 1993. Reprinted in V. Roychowdhury et al (eds.), Theoretical Advances in Neural Computation and Learning, Kluwer, 1994. This method is guaranteed to converge to the exact derivatives for the neighborhood of the equilibrium y(1) in the case where the forward calculations have reached equilibrium. (See P. Werbos, "Generalization of backpropagation with application to a recurrent gas market model, neural networks", Vol. 1, pp. 339–365, 1988.)

As with BTT, the derivative calculations are not expensive. Unlike BTT there is no need for intermediate storage or for calculation backward through time. Therefore simultaneous backpropagation could be plausible as a model of learning in the brain. On the other hand, these derivative calculations do not account for the details of what happened in the early iterations. Unlike BTT, they are not guaranteed to be exact in the case where the final y(n) is not an exact equilibrium. Even in modeling the brain there may be some need to train SRNs so as to improve the calculation in early iterations. In summary, though simultaneous backpropagation may be powerful enough to solve this problem, there was sufficient doubt that we decided to wait for later before experimenting with this method.

The Error Critic, like simultaneous backpropagation, provides approximate derivatives. Unlike simultaneous backpropagation, it has no guarantee of yielding exact results in equilibrium. On the other hand, because it approximates BTT directly in a statistically consistent manner, it can account for the early iterations. Chapter 13 of "Handbook of Intelligent Control" has argued that the Error Critic is the only plausible model for how the human brain adapts the TLRNs in the neocortex. It would be straightforward in principle to apply the Error Critic to training SRNs as well.

Figure 18:
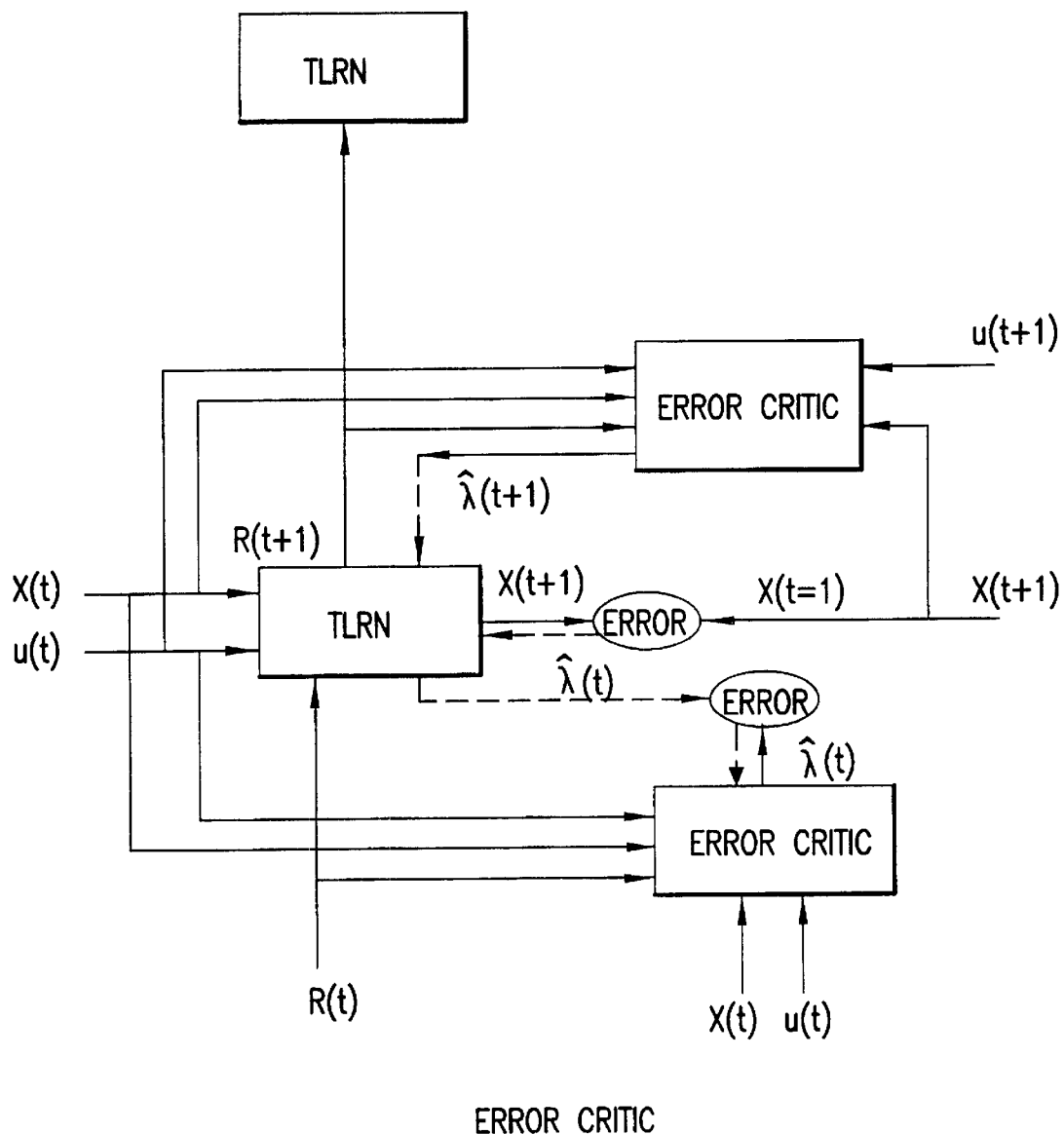
FIG. 18 is a block diagram of an interconnection using an error critic.

FIG. 18 shows the idea of an Error Critic for TLRNs. This figure should be compared with FIG. 21. The dashed input coming into the TLRN in FIG. 18 is intended to be an approximation of the same dashed line coming into the TLRN in the BTT figure. In effect, the Error Critic is simply a neural network trained to approximate the complex calculations which lead up to that dashed line in the FIG. 19. The line which ends as the dashed line in FIG. 18 begins as a solid line because those derivatives are estimated as the ordinary output of a neural network, the Error Critic. In order to train the Error Critic to output such approximations, we use the error calculation illustrated on the lower right of FIG. 18. In this case, the output of the Error Critic from the previous time period is compared against a set of targets coming from the TLRN. These targets are simply the derivatives which come out of the TLRN after one pass of backpropagation starting from these estimated derivatives from the later time period. This kind of training may seem a bit circular but in fact it has an exact parallel to the kind of bootstrapping used in the well known designs for adaptive critics or ADP. As with simultaneous backpropagation, we intend to explore this kind of design in the future, now that we have shown how SRNs can in fact solve the maze problem.

The major characteristics of this method have been described above. This method has been independently rediscovered many times with minor variations. For example, in 1981 Werbos called it conventional perturbation. Williams has called it the Williams—Zipser method. (See Neural Networks for Control.) Narendra has called it dynamic backpropagation. Nevertheless, because this method is more expensive than BTT, has no performance advantage over BTT, and is not plausible as a model of learning in the brain, we see no reason to use this method.

To describe the system, two examples are used to show that the SRN design has more general function approximation capabilities than does the MLP. The primary focus was on the maze problem because of its relation to intelligent control. However; before studying this more specialized example, a few experiments were performed on a more general problem which we call Net A/Net B.

In the Net A/Net B problem, the fundamental goal is to explore the idea that the functions that an MLP can approximate are a subset of what an SRN can. In other words, we hypothesize that an SRN can learn to approximate any functions which an MLP can represent without adding too much complexity, but not vice versa. To consider the functions which an MLP can represent, we can simply sample a set of randomly selected MLPs, and then test the ability of SRNs to learn those functions. Similarly we can generate SRNs at random and test the ability of MLPs to learn to approximate the SRNs.

Figure 23:
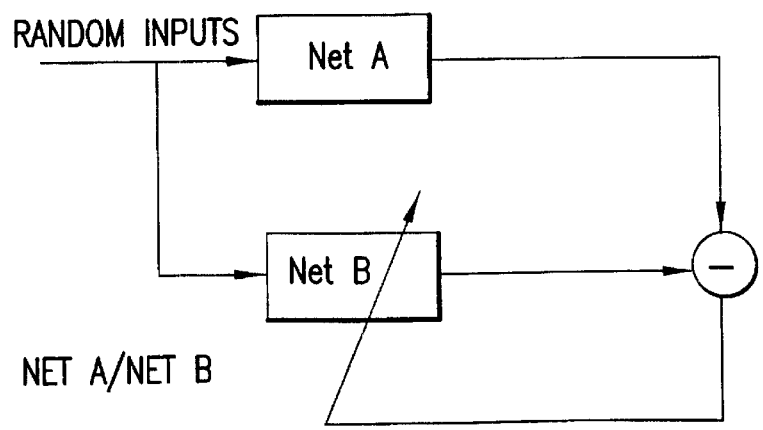
FIG. 23 is a block diagram showing a pair of inputs being used with two different networks, A and B.

In order to implement this idea, we used the approach shown in FIG. 23. The first step in the process was to pick Net A at random. In some experiments, Net A was an SRN, while in the other experiments, it was an MLP. In all these experiments, Net B was chosen to be the opposite kind of network from Net A. In picking Net A, we always used the same feed-forward structure. But we used a random number generator to set the weights. After Net A was chosen and Net B was initialized, we generated a stream of random inputs between −1 and +1 following a uniform distribution. For each set of inputs, we trained Net B to try to imitate the output of Net A. Of course Net A was fixed. The results gave an indication of the ability of Net B to approximate Net A.

The preliminary experiments did show that SRNs have some advantage over MLPs. However, in all of these experiments, the SRN was trained with truncation, not BTT. To fully explore all the theoretical issues would require a much larger set of computer runs. Still, these initial experiments were very useful in testing some general computer code in order to prepare for the complexities of the maze problem.

In the classic form of the maze problem, a little robot is asked to find the shortest path from the starting position to a goal position on a two-dimensional surface where there are some obstacles. For simplicity, this surface is usually represented as a kind of chess board or grid of squares in which every square is either clear or blocked by an obstacle. In formal terms, this means that we can describe the state of the maze by providing three pieces of information:

(1) An array A[ix] [iy] which has the value 0 when the square is clear and 1 when it is covered by an obstacle;
(2) The coordinates of the goal;
(3) The coordinates of the start.

In actuality, for our purpose, it was better to represent the goal as an array B[ix] [iy] which is zero everywhere except the goal.

As discussed in the introduction, many researchers have trained neural networks to learn an individual maze[5]. Our goal was to train a network to input the arrays A and B and to output J [ix] [iy] for all the clear squares. According to dynamic programming, the best strategy of motion for a robot is simply to move to that neighboring square which has the smallest J.

This more general problem has not been solved before with neural networks. For example, Houillon initially attempted to solve this problem with MLPs, but were unsuccessful. (See P. Houillon and A. Caron, "Planar robot control in cluttered space by artificial neural network", Math Modeling and Science Computing, Vol. 2, pp. 498–502, 1993.) Widrow in several plenary talks has reported that his neural truck backer upper has some ability to see and avoid obstacles. However, this ability was based on an externally developed potential function which was not itself learned by neural networks. Such potential functions are analogous to the J function which we are trying to learn.

In fact, this maze problem can always be solved directly and economically by dynamic programming. Why then do we bother to use a neural network on this problem? The reason for using this test is not because this simple maze is important for its own sake, but because this is a very difficult problem for a learning system, and because the availability of the correct solution is very useful for testing. It is one thing for a human being to know the answer to a problem. It is a different thing to build a learning system which can figure out the answer for itself. Once the simple maze problem is fully conquered, we can then move on to solve more difficult navigation problem which are too complex for exact dynamic programming.

In order to represent the maze problem as a problem for supervised learning, we need to generate both the inputs to the network(the arrays A and B) and the desired outputs (J). For this basic experiment, we chose to study the example maze shown in FIG. 24. In this figure, G represents the goal position, which is assigned a value of "1"; the other numbers represent the true values of the J function as calculated by dynamic programming (subroutine "Synthesis" in the attached code in the appendix). Intuitively each J value represents the length of the shortest path from that square to the goal.

Initially we chose to study this particular maze because it poses some very unique difficulties. In particular there are four equally good directions starting from one of these squares in this maze—a feature which can be very confusing to neural networks, even human. If we had used a fully connected conventional neural network, then the use of a single test maze would have led to over-training and meaningless results. However, as we will discuss in the next chapter, we constrained all of our networks to prevent this problem. Nevertheless, a major goal of our future research will be to test the ability of SRNs to predict new mazes after training on different mazes.

This problem of maze navigation has some similarity to the problem of connectedness described by Minsky (Perceptrons, MIT Press, 1990, expanded edition). Logically we know that the desired output in any square can depend on the situation in any other square. Therefore, it is hard to believe that a simple feed-forward calculation can solve this kind of problem. On the other hand, the Bellman equation (equation J1) itself is a simple recurrent equation based on relationships between "neighboring"(successive) states. Therefore it is natural to expect that a recurrent structure could approximate a J function. The empirical results in this thesis confirm these expectations.

The architecture and learning used for the Net A/Net B problem will be discussed briefly, then two special features—cellular architecture and adaptive learning rate (ALR) used for the maze problem, will be discussed.

In all these experiments, the MLP network and the feed-forward network f in the SRN was a standard MLP with two hidden layers. The input vector X consisted of six numbers between −1 and +1. The two hidden layers and the output layers all had three neurons. The initial weights were chosen at random according to a uniform distribution between −1 and +1. Training was done by standard backpropagation with a learning rate of 0.1.

In theoretical terms, weight-sharing is a generalized technique for exploiting prior knowledge about some symmetry in the function to be approximated. Weight-sharing has sometimes been called "windowing" or "Lie Group" techniques.

Weight-sharing has been used almost exclusively for applications like character recognition or image processing where the inputs form a two-dimensional array of pixels. In our maze problem the inputs and outputs also form arrays of pixels. Weight-sharing leads to a reduction in the number of weights. Fewer weights lead in turn to better generalization and easier learning.

As an example, suppose that we have an array of hidden neurons with voltages net[ix] [iy], while the input pixels form an array X [ix] [iy]. In that case, the voltages for a conventional MLP would be determined by the equation:

$$net[i][j] = \sum_{ix,iy} W(i, j, ix, iy) * X(ix, iy) \qquad (J14)$$

Thus if each array has a size 20 * 20, the weights form an array of size 20 * 20 * 20 * 20. This means 160,000 weights—a very big problem. In basic weight-sharing, this equation would be replaced by:

$$net[i][j] = \sum_{ix,iy} W(d1, d2) * X(i+d1, i+d2) \qquad (J15)$$

Furthermore, if d1 and d2 are limited to a range like [−5, 5], then the number of weights can be reduced to just over 100. Actually this would make it possible to add two or three additional types of hidden neurons without exceeding 1,000 weights. This trick was used by Guyon. They used it to develop the most successful zip code digit recognizer in existence. Intuitively AT&T justified this idea by arguing that similar patterns in different locations have similar meanings. However, there is a more rigorous mathematical justification for this procedure as we will see.

The technique of weight-sharing in neural networks is really just a special case of the Lie-group method pioneered much earlier by Laveen Kanal and others in image processing. Formally speaking, if we know that the function F to be approximated must obey a certain symmetry requirement then we can impose the same symmetry on the neural network which we use to approximate F. More preciously, if Y=F (x) always implies that MY=F (Mx), where M is some kind of transformation, then we can require that the neural network possess the same symmetry.

Both in image processing and in the maze problem, we can use the symmetry with respect to those transformations M which move all the pixels by the same distance to the left, to the right or up and down. In the language of physics, these are called spatial translations. Because we know that the best form of the neural network must also obey this symmetry, we have nothing to lose by restricting our weights as required by the symmetry.

In order to exploit Lie group symmetry in a rigorous way, we first reformulated the task to be solved so as to ensure exact Lie group symmetry. To do this, we designed our neural network to solve the problem of maze defined over a torus. For our purposes, a torus was simply an N by N square where the right-hand neighbor of [i; N] is the point [i; 0], and likewise for the other edges. This system can still solve an ordinary maze as in FIG. 24, where the maze is surrounded by walls of obstacles.

Next we used a cellular structure for our neural networks including both the MLPs and SRNs. A cellular structure means that the network is made up of a set of cells each made up of a set of neurons. There is one cell for each square in the maze. The neurons and the weights in each cell are the same as those in any other cell. Only the inputs and outputs are different because they come from different locations.

The general idea of our design is shown in FIG. 25. Notice that each cell is made up of two parts: a connector part and a local memory part. The connector part receives the inputs to the cell and transmits its output to all four neighboring cells. The local memory part inputs all the inputs to the cell and also the output of its connector part. In addition, the local memory part sends all its outputs back as inputs, but only to the same cell. Finally the forecast of J is based on the output of the local memory part.

Figure 26:
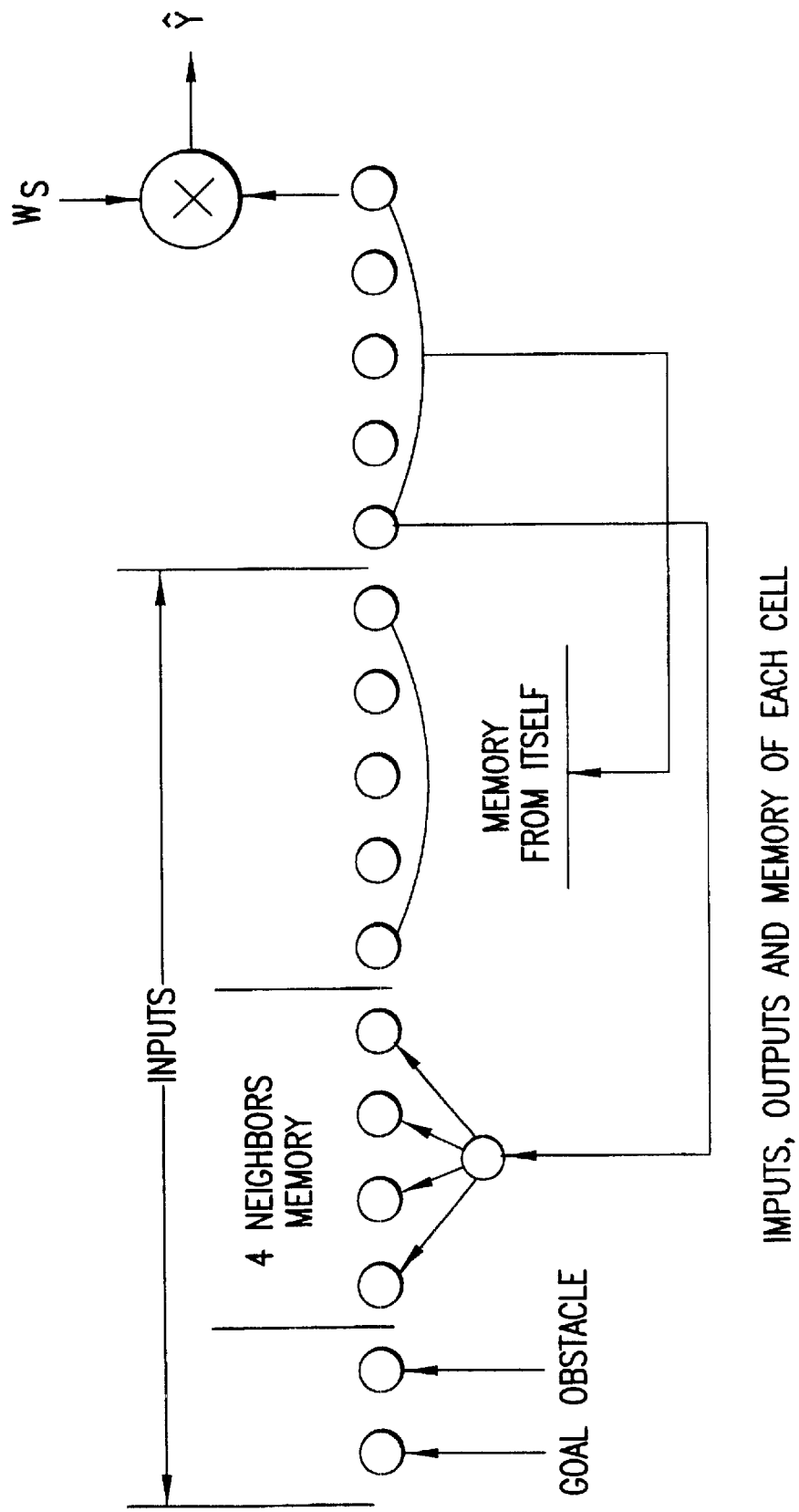
FIG. 26 is a block diagram of inputs, outputs and memory of a cell in an interconnection.
Figure 27:
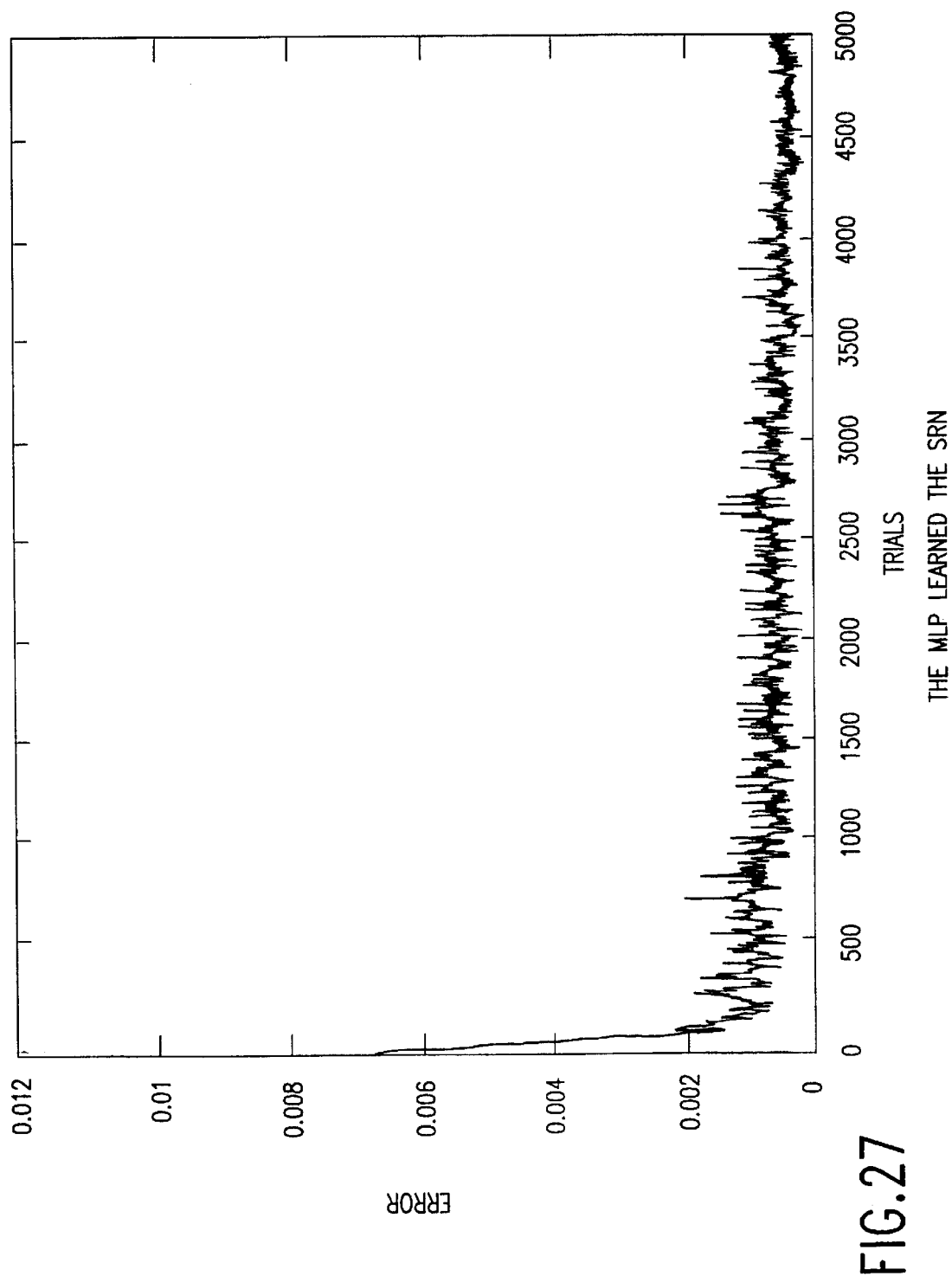
FIGS. 27–30 are graphs showing error versus training iterations.
Figure 28:
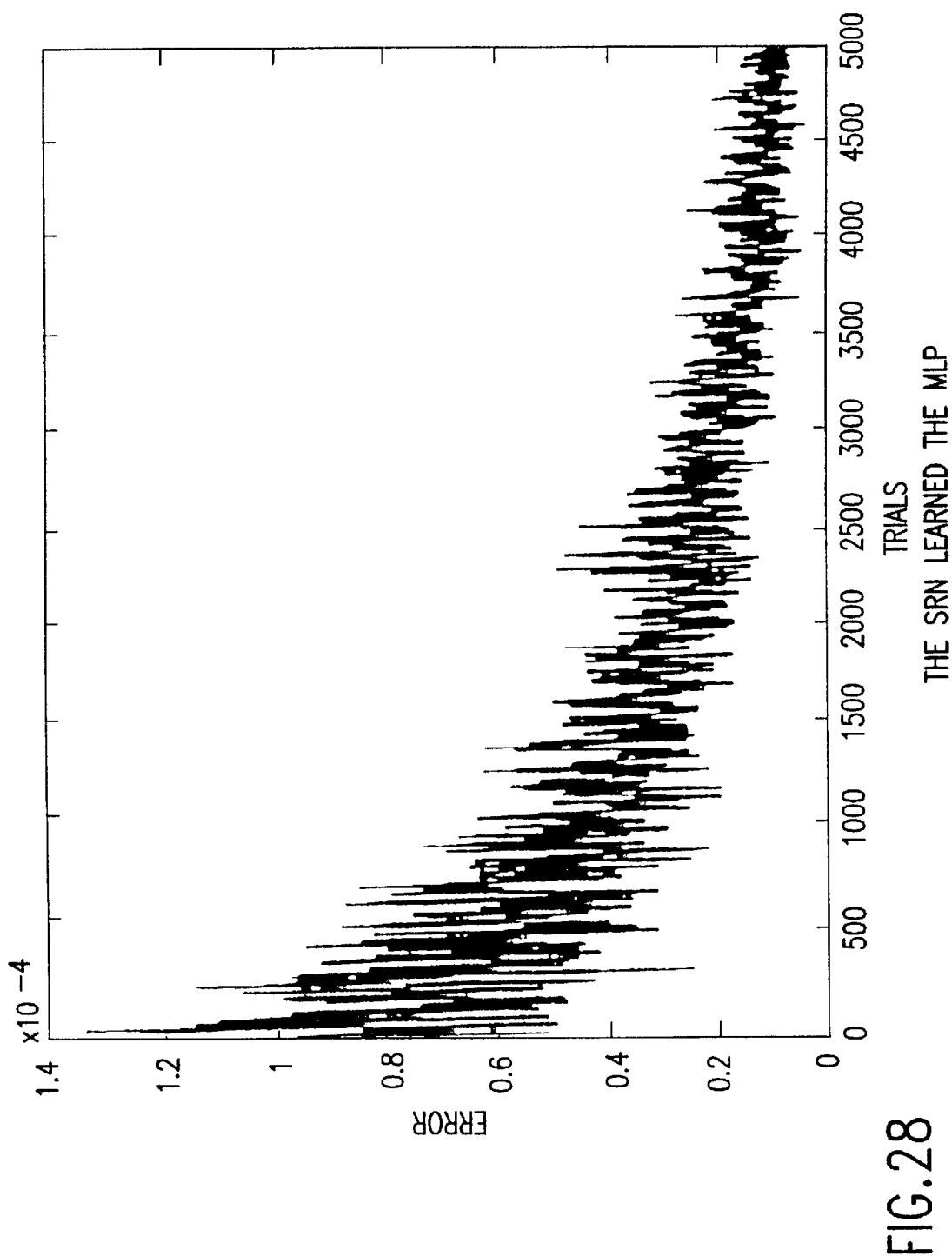
Figure 29:
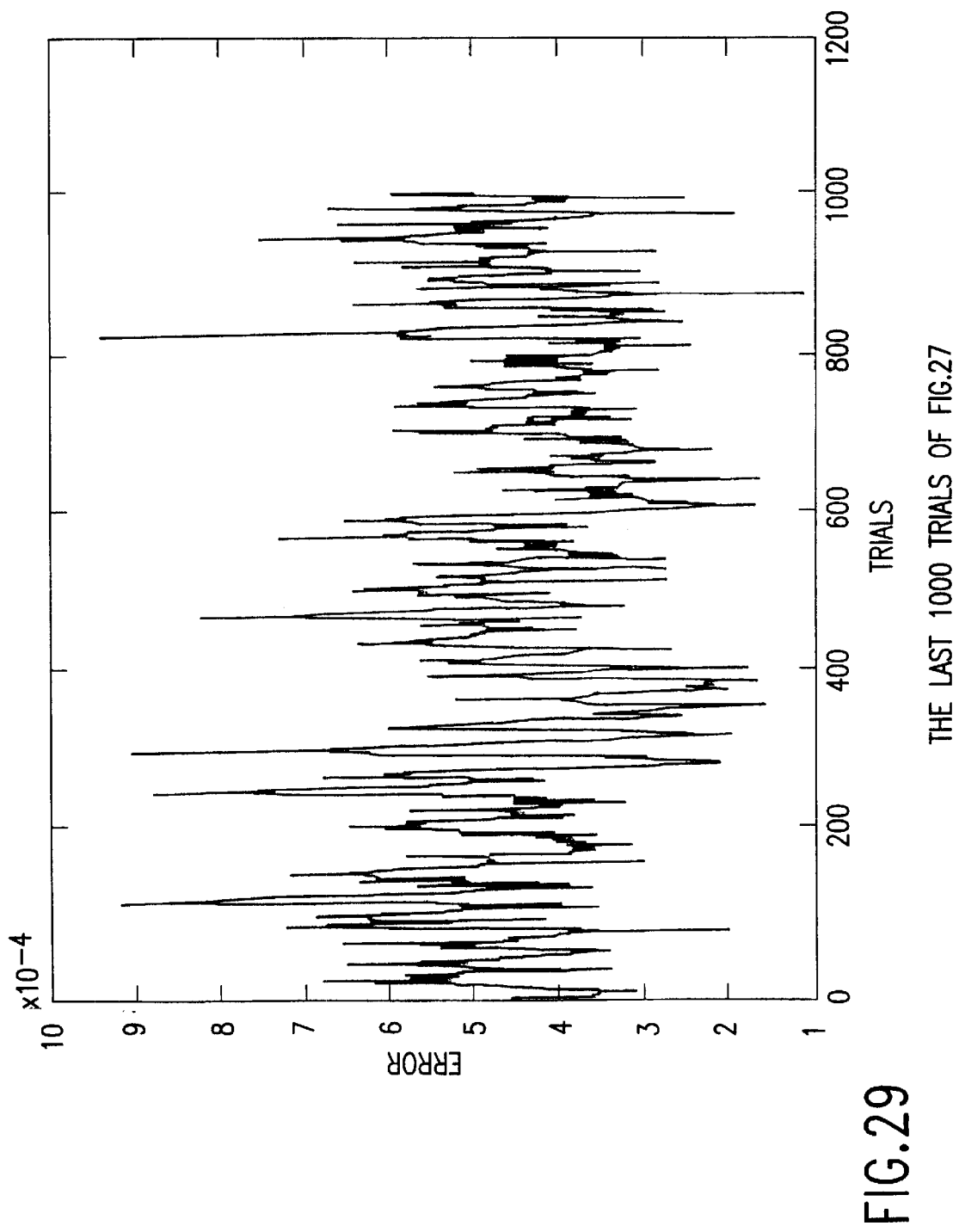
Figure 30:
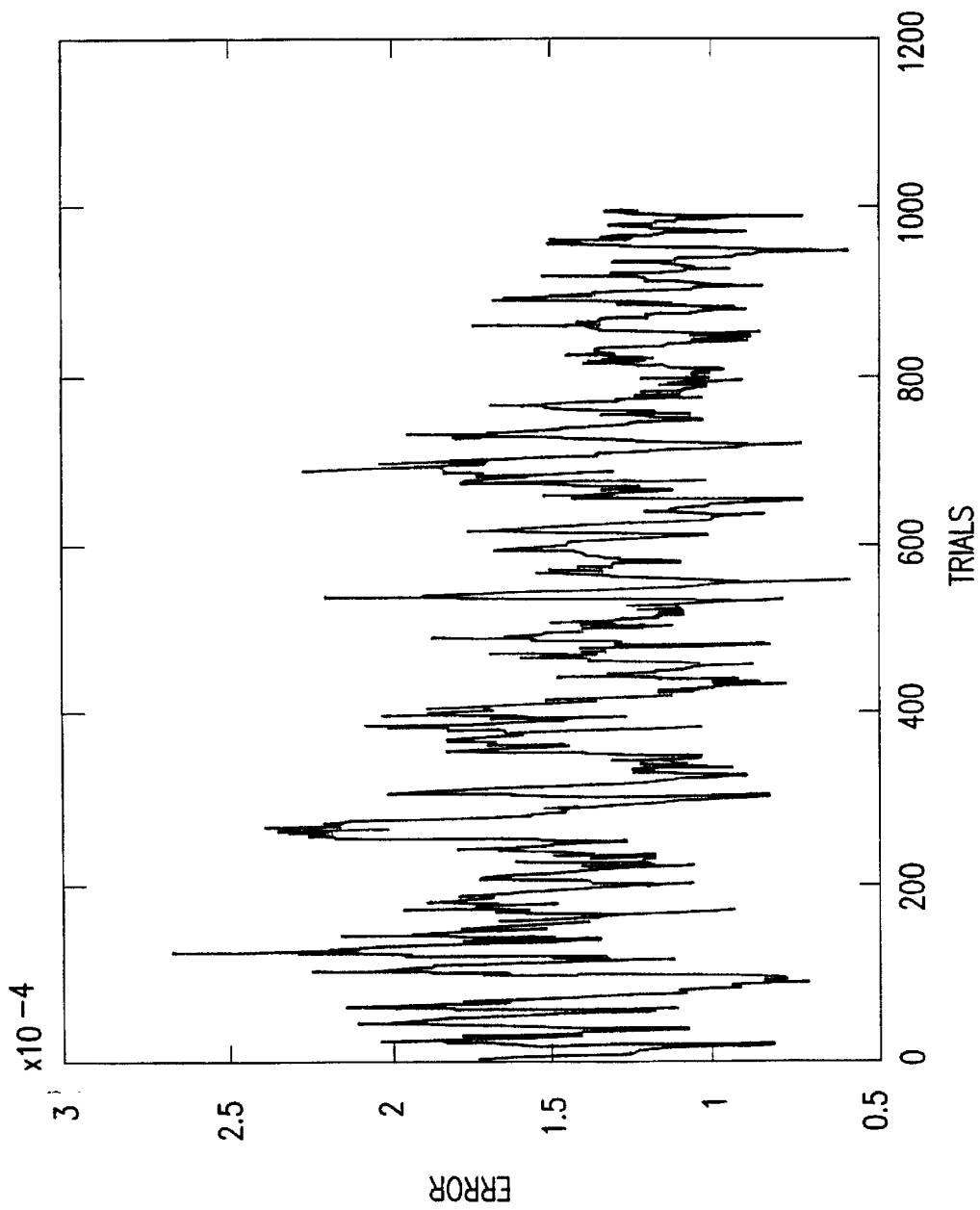

The exact structure which we used is shown completely in FIG. 26. In this figure it can be seen that each cell receives 11 inputs on each iteration. Two of these inputs represent the goal and obstacle variables, A[ix][iy] and B[ix][iy], for the current pixel. The next four inputs represent the outputs of the connector neuron from the four neighboring cells from the previous iteration. The final five inputs are simply the outputs of the same cell from the previous iteration. Then after the inputs, there are only five actual neurons. The connector part is only one neuron in our case. The local memory part is four neurons. The prediction of J [ix][iy] results from multiplying the output of the last neuron by W s, a weight used to rescale the output.

To complete this description, we must specify how the five active neurons work. In this case, each neuron takes inputs from all of the neurons to its left, as in the generalized MLP design. Except for Ĵ, all of the inputs and outputs range between −1 and 1, and the tanh function is used in place of the usual sigmoid function.

To initialize the SRN on iteration zero, we simply picked a reasonable looking constant vector for the first four neurons out of the five. We set the initial starting value to −1. For the last neuron, we set it to 0. In future work, we shall probably experiment with the adaptation of the starting vector y(0). In order to backpropagate through this entire cellular structure, we simply applied the chain rule for ordered derivatives as described in "The Roots of Backpropagation."

In our initial experiments with this structure, we used ordinary dynamic programming with only one special trick. The trick was that we set the number of iterations for SRN to only 1 on the first 20 trials, and then to 2 for the next 20 trials . . . and so on up until there were 20 iterations. We found that ordinary weight adjustment led to extremely slow learning due to oscillation. This was not totally unexpected because slow learning and oscillation are a common result of simple steepest descent methods. There are many methods available to accelerate the learning. Some of these like the DEKF method developed by Ford Motor Company are similar to quasi-Newton methods which are very powerful but also somewhat expensive. (See P. K. H. Phua AND S. B. W. Chew, Symmetric rank-one update and quasi-Newton methods, Optimization Techniques and Applications, Proceedings of the International Conference on Optimization Techniques and Applications, K. H. Phua et al., eds., World Scientific, 1992, Singapore, pp. 52–63.) For this work we chose to use a method called the adaptive learning rate (ALR) as described in chapter 3 of Handbook of Intelligent Control: Neural, Adaptive and Fuzzy Approaches. This method is relatively simple and cheap, but far more flexible and powerful than other simple alternatives.

In this method, we maintain a single adapted learning rate for each group of weights. In this case, we chose three groups of weights:

1. The weight Ws used for rescaling of the output; 2. The constant or bias weights ww; 3. All the other weights W.

For each group of weights the learning rate is updated on each trial according to the following formula:

$$LR(t+1) = LR(t) * \left( 0.9 + 0.2 * \frac{\sum_k W_k(t) * W_k(t-1)}{\sum_k W_k(t-1) * W_k(t-1)} \right) \quad (J16)$$

where the sum over k actually refers to the sum over all weights in the same group. In addition, to prevent overshoot, we would reset the learning rate to:

$$\frac{LR * E}{\sum_k \left( \frac{\partial E}{\partial W_k} \right)^2} \quad (J17)$$

where the sum is taken over all weights, in the special case where the error on the next iteration would be predicted to be less than zero, i.e.:

$$E - \sum_k (W_k(t+1) - W_k(t)) * \frac{\partial E}{\partial W_k}(t) \quad (J18)$$

-continued $$= E - \sum_k \left( LR * \frac{\partial E}{\partial W_k}(t) \right) * \frac{\partial E}{\partial W_k}(t)$$

$$= E - LR * \sum_k \left( \frac{\partial E}{\partial W_k}(t) \right)^2 < 0$$

where W k (t+1) is the new value for the weights which would be used if the learning rates were not reset. In our case, we modified this procedure slightly to apply it separately to each group of weights.

After the adaptive learning rates were installed the process of learning became far more reliable. Nevertheless, because of the complex nature of the function J, there was still some degree of local minimum problem. For our purposes, it was good enough to simply try out a handful of initial values which we guessed at random. However, in future research, we would like to explore the concept of shaping as described in [9].

Simulation results are presented below for the two test problems discussed above. From analyzing the results, we can conclude that compared to MLPs, SRNs are more powerful in nonsmooth function approximation. In addition, our new design—the cellular structure—can really solve the maze problem.

From FIGS. 27 to 30 we can see that the SRN using the same three-layered neural network structure(9 inputs, 3 outputs, and 3 neurons for each hidden layer) as the MLP can achieve better simulation result. The SRN not only converged more rapidly than the MLP (FIGS. 27 and 28, but also reached a smaller error(FIGS. 29 and 30), about 1:25 * $10^{-4}$, while the MLP reached 5 * $10^{-4}$. Thus, we can say that, in this typical case, an SRN has better ability to learn an MLP than an MLP to learn an SRN.

Figure 31:
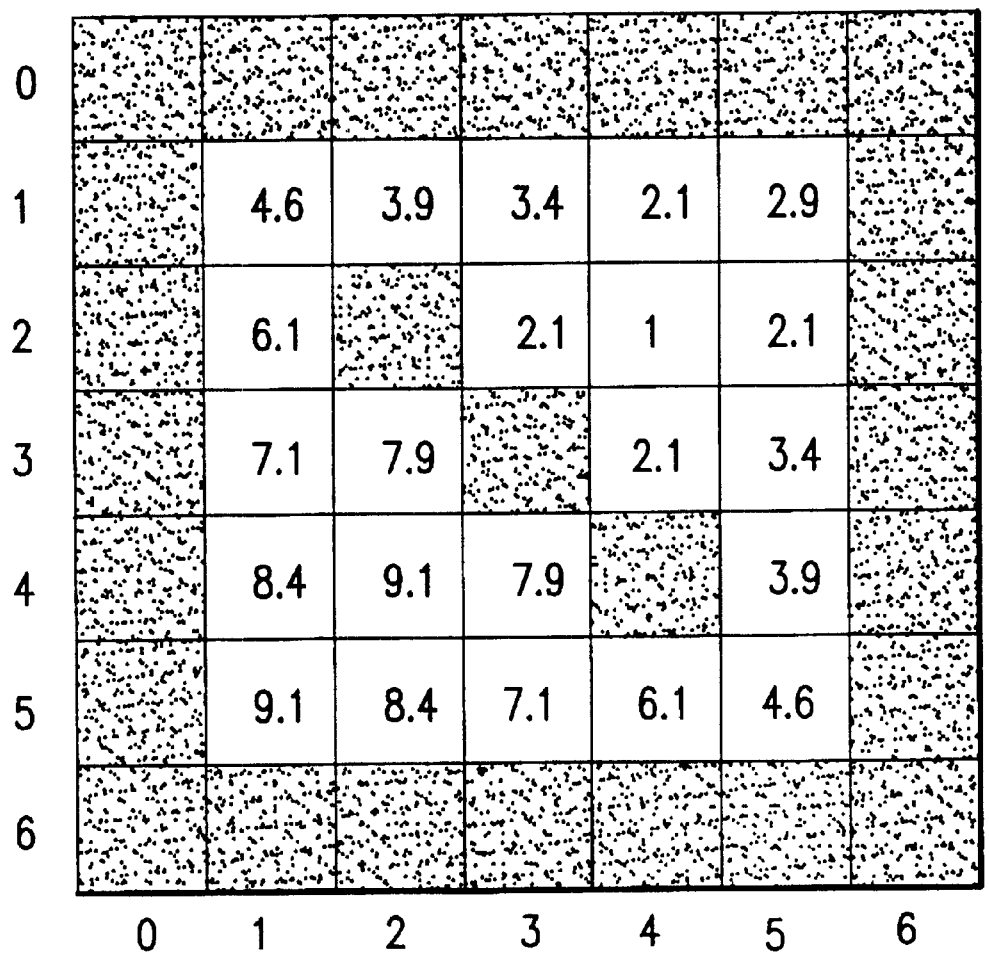
FIG. 31 is a J function as predicted by a SRN using backpropagation through time.
Figure 34:
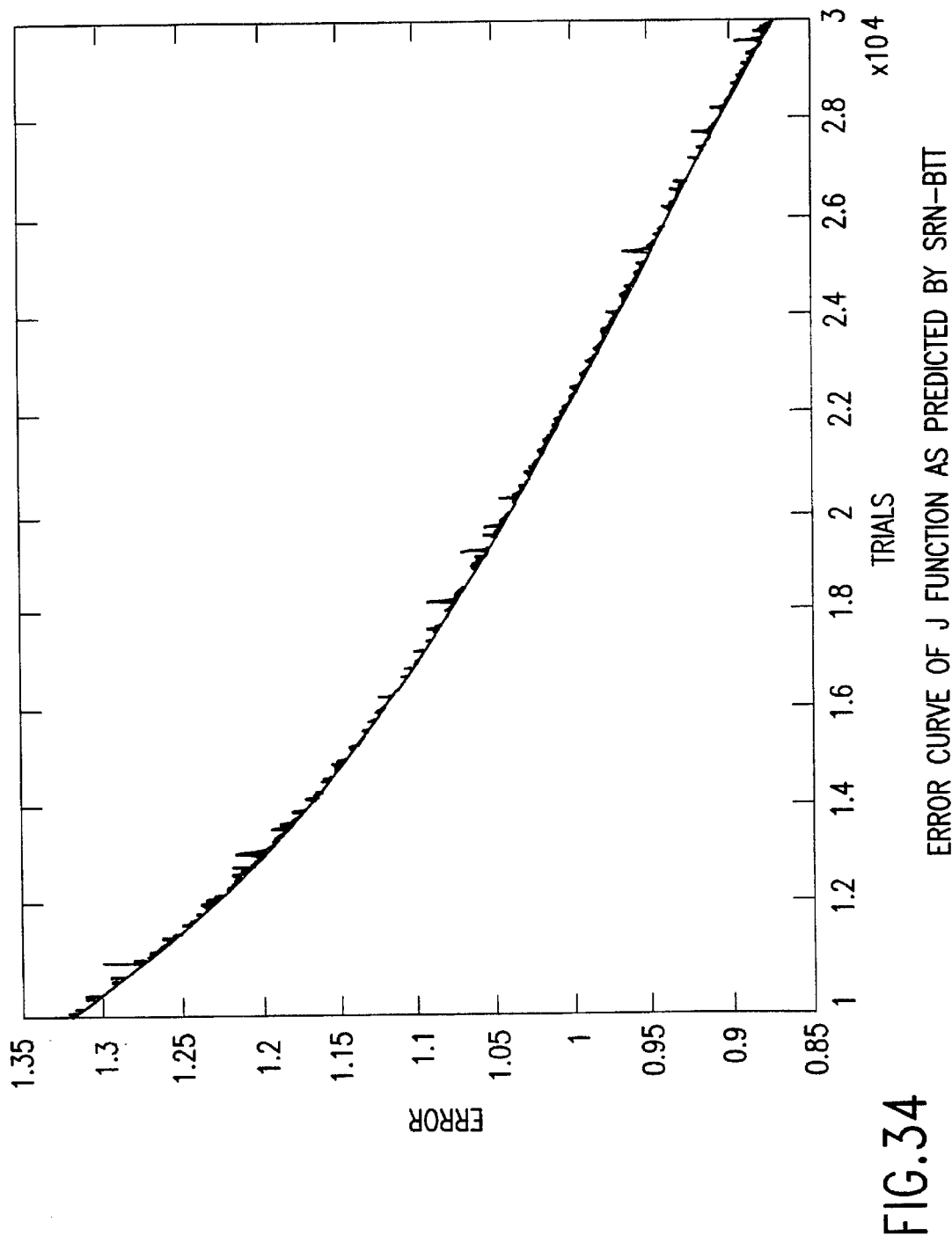
Figure 35:
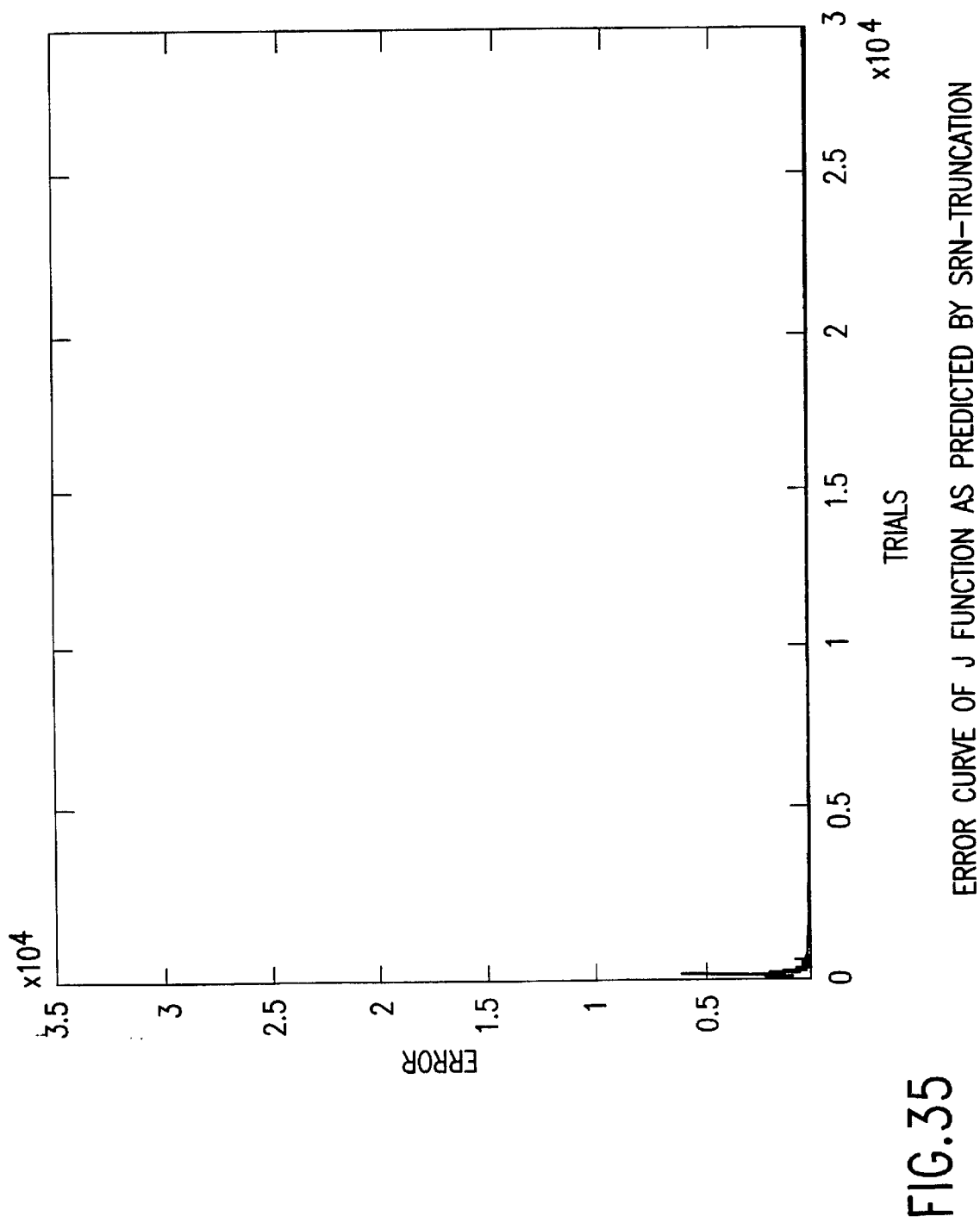
Figure 36:
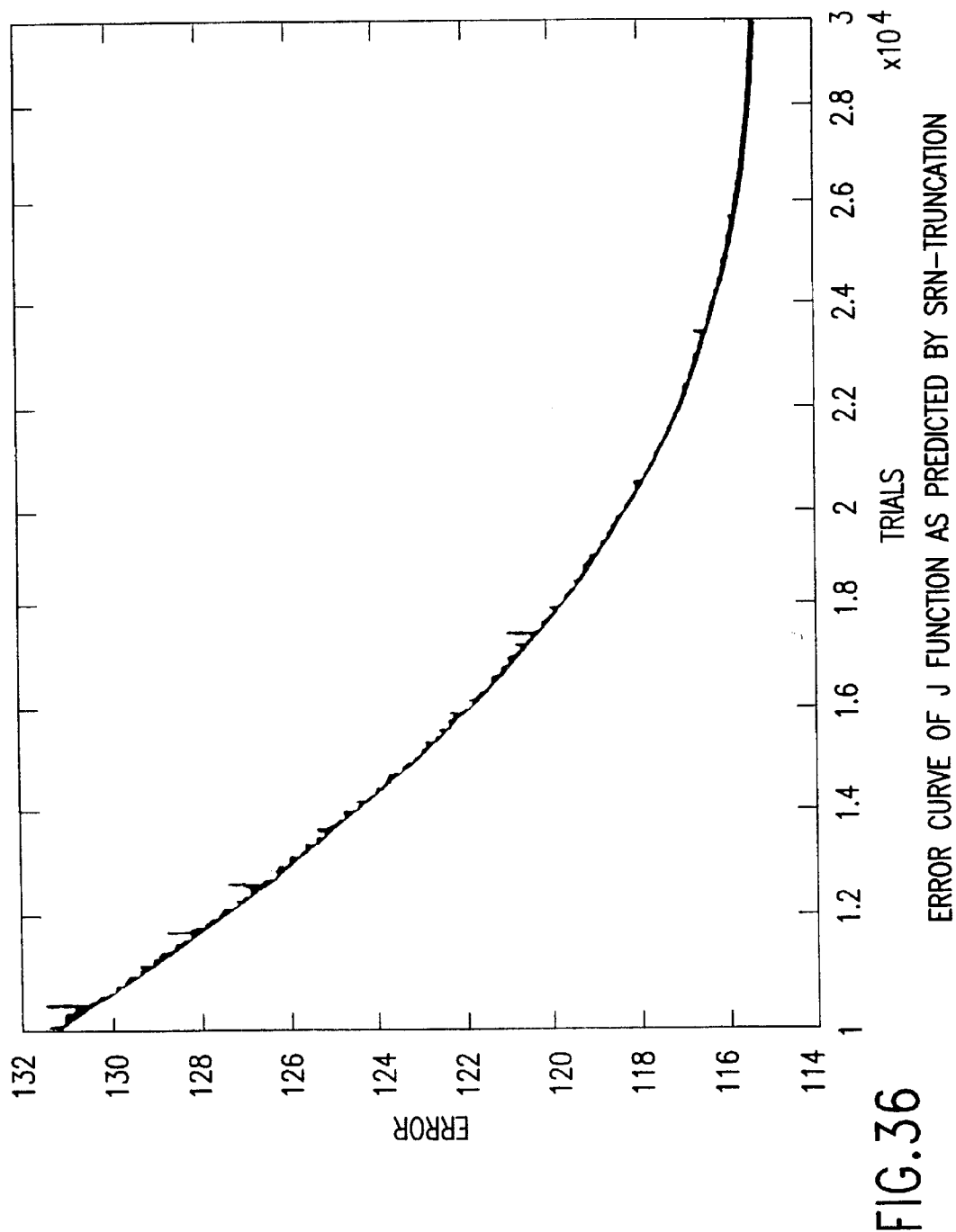

There are two parts of the results for the maze problem. First, we compare the J function in each pixels of the same maze as predicted by an SRN trained by BTT and an SRN trained by truncation respectively with the actual J function for the maze. FIGS. 31 and 32 show that the SRN trained by BTT can really approximate the J function, but the SRN trained by truncation cannot. Moreover, the SRN trained by BTT can learn the ability to find the optimal path from the start to the goal as calculated by dynamic programming. Although there is some error in the approximation of J by the SRN trained by BTT, the errors are small enough that a system governed by the approximation of J would always move in an optimal direction.

Figure 37:
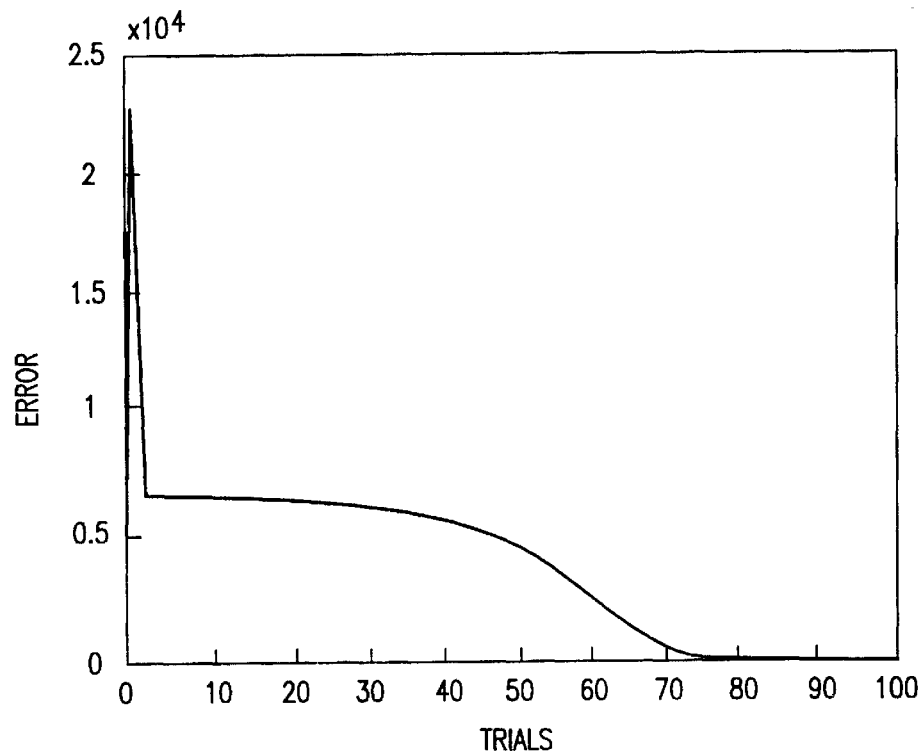
Figure 38:
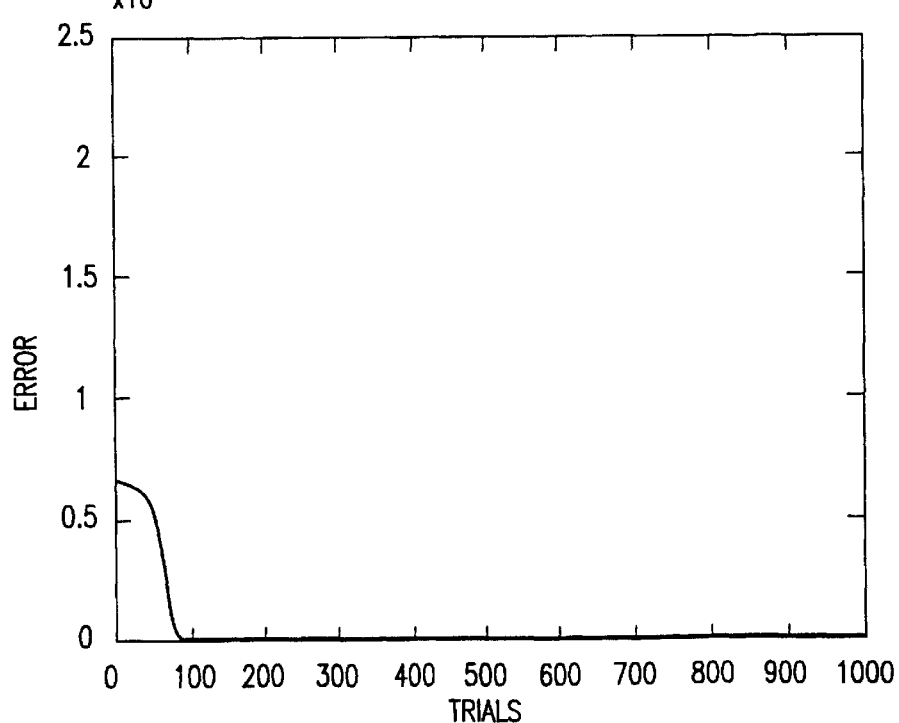

Second, we show some error curves from FIGS. 33 to 38. From the figures we can see the error curve of SRN trained by BTT not only converged more rapidly than the curve of the SRN trained by truncation, but also reach a much smaller level of error. The errors with the MLP did not improved at all after about 80 trials (FIGS. 37 and 38).

Thus, a new neural network design for J function approximation in dynamic programming can be achieved. We have tested this design in two test problems: Net A/Net B and the maze problem. In the Net A/Net B problem, we showed that SRNs can learn to approximate MLPs better than MLPs can learn SRNs. In the maze problem, a much more complex problem, we showed that we can achieve good results only by training an SRN with a combination of BTT and adaptive learning rates. In addition, we needed to use a special design—a cellular structure—to solve this problem. On the other hand, neither an MLP nor an SRN trained by truncation could solve this problem. Now that it has been proven that neural networks can solve these kinds of problems, the next step in research is to consider many variations of these problems in order to demonstrate generalization ability and the ability to solve optimization problems while the J function is not known.

In addition to 'demonstrated, intelligible engineering functionality, a "brain-like" system should contain at least three major general-purpose adaptive components: (1) an Action or Motor system, capable of outputting effective control signals to the plant or environment; (2) an "Emotional" or "Evaluation" system or "Critic," used to assess the long-term costs and benefits of near-term alternative outcomes; (3) an "Expectations" or "System Identification" component, which serves as a model or emulator of the external environment or of the plant to be controlled. This specification will: (1) summarize the practical advantages of moving from more classical designs to more brain-like designs, in today's engineering applications; (2) summarize the recent accomplishments of researchers; (3) argue that these designs (with some enhancement) do constitute a worthwhile theory of how intelligence works in the brain, generating testable predictions and proposed experiments; and (4) scope out some key areas of research needed to implement the required enhancements in engineering.

Back in 1981 and 1987, I published a simplified "straw man" model of the brain as an intelligent learning system, based on a form of reinforcement learning or optimization, with backpropagation (but not supervised learning) as a pervasive tool down in the lowest-level subsystems. (See P. Werbos, Applications of advances in nonlinear sensitivity analysis, in R. Drenick & F. Kozin (eds), "System Modeling and Optimization," Proc. IFIP Conf. (1981), Springer 1992; and P. Werbos, "Building and understanding adaptive systems: a statistical/numerical approach to factory automation and brain research," IEEE Trans. SMC, March/April 1987.) This model was oversimplified (for reasons discussed at length therein), but it did promise to reproduce four basic attributes required in any credible model of intelligence in the brain: (1) It contained an "emotional system," a subsystem to estimate the values of observed objects or variables to the organism (i.e., secondary reinforcement); (2) It contained an "expectations" or "prediction" subsystem, which—as Grossberg has often stressed—is essential to replicating basic experiments in "classical conditioning"; (3) It contained an "action" or "motor" system, a system to calculate the movements of muscles or other actuators required in order to implement the values calculated by the value system; (4) It made sense, purely as an engineering system, designed to solve very difficult, generic problems in optimal control based on learning.

So far as I know, it is still the only model which anyone has ever formulated which meets all four basic conditions above. There are many biologically-inspired models which meet the first three conditions, or which come a little closer to a fifth desirable condition (to match all the specific cell types in the brain in a comprehensive, testable manner), but none of them really address the phenomenon of "intelligence" in a generic, functional way; typically they provide some form of associative memory, some narrow task-specific competence or the ability to replicate some simple behavioral experiments (as in the work of Klopf).

The original "simple" model has been enhanced to improve both its engineering capabilities and its detailed fit to the brain, in part by linking up with "bottoms up" biological information and models. The engineering constraints have been addressed in a slow step-by-step process, but improvements are being made.

Feldkamp and Prokhorov, among others—have gone far beyond the early truck-backer-upper kind of design. (See "Neural Networks for Control.") They understood the truck-backer-upper technology long ago, and have moved on to new work. The present invention discloses the specialized designs in use today, their weaknesses, the specific benefits of moving just one step "up the ladder" to more brain-like designs, and the specific techniques and examples which make this now easier to do. (See P. Werbos, Why neural networks (ch.A.2) and Control (ch.F1.10). In E. Fiesler & R. Beale (eds), "Handbook of Neural Computation," Oxford. U. Press, New York, 1995; and K. S. Narendra (ed), "Proc. of 8th Yale Workshop on Adaptive and Learning Systems," New Haven, Conn.: Prof. Narendra, Dept. of Electrical Eng., Yale U., 1994.)

Every useful example of neurocontrol to date rests on a generic capability to perform one or more of three basic tasks: (1) cloning of a human or other expert; (2) tracking a set-point or desired reference trajectory; (3) dynamic optimization, maximization of a performance measure over time, accounting for the impact of present actions on performance many periods into the future.

Cloning is still quite useful as a way to initialize neural nets. (It is very popular in adaptive fuzzy control, but losing popularity in neurocontrol.) In practical applications, tracking error or performance is the real objective; it is better to use cloning designs as a starting point, and then adapt them further to do better, using tracking or optimization approaches. Often there are better ways to do the initialization. Tracking is now mainly done by using neural nets instead of matrices in classical model-based adaptive control designs. Narendra of Yale—who pioneered stability theorems for classical adaptive control—has proven similar theorems for the neural versions, and many others have followed him. In essence, these designs use some form of backpropagation to train an Action network to output those actions, u(t), which maximize a measure of tracking error at time t+1.

These designs have 3 major limitations. First, the requirements for stability are very restrictive, both for classical and for neural designs. (Actual stability, not theorems, is a major concern at decision-making levels in industry.) Minimizing error at time t+1 will often cause overshoots or other problems, which result in more error at later times, and outright instability and explosions. (E.g., see the bioreactor test problem in "Neural Networks for Control.") Thus chemical plants typically will not consider classical or neural adaptive control; instead, they often use "Model-Predictive Control" (MPC), explicitly optimizing over many time periods into the future, accounting for process constraints as well. (Experts in adaptive control may note that stabilization is often possible by a very clever (very difficult) choice of error measure at time t+1; however, some forms of optimal neurocontrol may be interpreted as constructive methods to find such an error measure, which is normally quite difficult.)

A second problem is that generic real-time learning is a slow way to adapt to changes in familiar parameters like mass and friction; it results in unnecessarily long transient responses and unnecessarily weak performance during transients. A better approach is to "learn offline to be adaptive online," so as to tune the adaptation parameters themselves, in effect, to the specific parameters. This requires the use of optimization over time (which could be done in real-time as well) applied to a time-lagged recurrent network used as an Action network. As Feldkamp has stressed, it is critical to know how to calculate the required derivatives correctly here, and the literature is now pervaded by inaccurate shortcuts and unnecessarily expensive methods for doing this.

Third, if we wish to directly optimize performance measures like fuel consumption, mass ratios and pollution over time in a highly dynamic system, we must move on to the designs for optimization over time. (Some people try to optimize performance by use of hand-tweaking here, or the equivalent, but this is not as effective as an automated, rigorous approach directly addressing the nonlinear dynamic optimization problem.) These kinds of performance metrics are absolutely critical in many applications, particularly in the automotive, aerospace and chemical sectors.

A few researchers still perform model-free tracking based on "learning the mapping from spatial to motor coordinates." There have even been a couple of designs which achieved useful, practical levels of performance—the early work by Miller (see "Neural Networks for Control") and recent work by Gaudiano and Grossberg. But the direct approach has many limitations relative to the indirect approach, as discussed by many authors, including Narendra, Kawato, Jordan and myself.

In optimization over time, there are two dominant practical approaches: (1) an explicit model-based approach (like MPC), using backpropagation through time (as defined in "The Roots of Backpropagation") to calculate the derivatives of total future performance with respect to current actions; (2) an implicit approach, which is sometimes (loosely) called "reinforcement learning," "adaptive critics" or "approximate dynamic programming." The first approach—the basis of Widrow's famous truck-backer-upper (see "Neural Networks for Control")—was first spelled out in an example in my 1974 Ph.D. thesis. The second approach was first implemented in neural networks by Widrow, who invented the term "Critic."

Strictly speaking, these approaches are not mutually exclusive in engineering. For example, one could use MPC to look ahead 30 time steps, and use a Critic network to initialize the backwards derivative calculations. In effect, the Critic would try to approximate the derivatives which would have been calculated at time t+30, if we could have afforded to compute all the way from t to t+∞ in MPC. (The Critic may actually be more accurate than an explicit calculation would have been, if uncertainty or noise tend to grow over long time intervals.) For example, in battery control, a Critic might be trained to assess conditions which affect the future lifetime and performance of the battery (in effect), while MPC could be used to optimize some combination of current performance and battery damage over the coming 10–60 seconds.

The MPC approach clearly is not plausible as part of any model of the brain, because of the structure of the derivative calculations, no matter how the derivatives are calculated. But in engineering, using fast chips, it does have some advantages—not least of them, exactness. Still, it cannot address noise or uncertainty in a numerically efficient manner, and the cost of the computations can become a problem, especially when millisecond sampling times are required.

The adaptive critic approach—broadly defined—is the only type of design which anyone has ever formulated, in engineering or biology or elsewhere, with any hope of explaining the generic kinds of capabilities we see in the brain. But the adaptive critic approach, like neurocontrol in general, is a complex field of study, with its own "ladder" of designs from the simplest and most limited all the way up to the brain itself. (Please bear in mind that adaptive critics are not intended to be an alternative to backpropagation in simple pattern classification problems; they are systems for solving a different type of problem, an optimal control problem over time.)

Roughly speaking, level zero of this ladder is the original Widrow design, which no one uses any more. Level one is the 1983 Barto-Sutton-Anderson (BSA) design, which uses a global reward system ("Arp") to train an Action network and "TD" methods to adapt the Critic. It learns very slowly in medium-sized problems involving continuous variables, but it is very robust. It is still extremely popular among computer scientists, who often deal with a smaller number of action variables, all of them binary rather than continuous. "TD" is a special case of Heuristic Dynamic Programming (HDP), a method which I first published in 1977.

From 1990 to 1993, many people in the community climbed one step up the ladder, to level 2, which I once called "advanced adaptive critics." The idea was to use an Action-Dependent Adaptive Critic (ADAC), which I first defined in 1989, and discussed in several other places, culminating in D. White & D. Sofge (eds), Handbook of Intelligent Control: Neural, Fuzzy and Adaptive Approaches, Van Nostrand, 1992. In ADAC, the Critic sends derivative signals back to the Action network, so that backpropagation (but not supervised learning) can be used to adapt the Action network. The rich feedback to the Action network makes it possible to control more action variables, more effectively. ADAC was the basis for the numerous practical applications by White and Sofge, ranging from carbon-carbon composite parts fabrication, through to rapid stabilization of a simulated F-15 after battle damage, through to recent work in semiconductor manufacturing which has achieved great visibility in that industry. The basic equation for "J" given in P. Werbos, "Neural networks for control and system identification," IEEE Conference of Decision and Control, IEEE, New York, 1989. CDC 89 paper is identical to that for "Q" in Watkins 1989 Ph.D. thesis; however, Watkins' "Q learning" used an explicit enumeration and evaluation of alternative action vectors, rather than an Action network adapted by backpropagation. In recent years, several people have reinvented ADAC as a "modified form of Q-learning," sometimes (e.g., in a recent workshop) replicating whole chunks of equations previously published. Still, these designs are all a step up from the 1983 BSA design.

In criticizing this entire literature, Grossberg has explained again and again that an "expectations system" is essential in explaining the wide range of experiments in "classical conditioning." Likewise, there are good engineering-based reasons to believe that an expectations subsystem is crucial to functionality, in coping with very complex control problems. Unfortunately, some computer scientists seem to believe that it is "cheating" to use a model of the external environment or plant (even a neural network model.). Yet in many practical applications, industrial people would actually prefer to use their own model, with offline adaptation, in developing a controller. (The "noise wrapper" techniques used by Feldkamp are an important part of making this work.) From a research point of view, there are many advantages to accepting this preference for the time being, in part of our work, in order to learn. more about Critic and Action networks without the complications caused by concurrent Model adaptation. Again, such approaches are more "brain-like" than the model-free approaches at lower levels.

"Brain-like control", represents levels 3 and above on the ladder. Level 3 is to use HDP to adapt a Critic, and backpropagate through a Model to adapt the Action network. Levels 4 and 5 respectively use more powerful techniques to adapt the Critic—Dual Heuristic Programming (DHP) and Globalized DHP (GDHP). These last two techniques explicitly minimize the error in the derivatives which would be passed back in the battery example which I gave above. In 1981 and 1987, I proposed a 3-network system (Critic, Action, Model) based on GDHP as a strawman model of the brain. From late 1993 to March 1995, 5 groups have developed the capability to build such systems—including one reported at this conference, the first published successful implementation of a level 5 system, by Prokhorov.

As a technical matter, note that "The Roots of Backpropagation" and "The Handbook of Intelligent Control" are important prerequisites to success in this kind of work. In Chapter 13, of the "Handbook of Intelligent Control", equation 10 has a typo which some have found a problem: it uses $\lambda$-hat where it should be $\lambda^*$ on the left of equation 10. Likewise in equation 1 "$s_x$" should be "$x_j$". In FIG. 3.6, the middle block should be labeled "Model." The pseudocode in "Neural Networks for Control" has much more serious typos.

This section will refer often to the "levels" of adaptive critics defined in the previous section, where level 3 and above is "brain-like." Jameson has reported efforts to develop a controller for a simple but nonMarkhovian model of a robot arm. In a nonMarkhovian system, the controller does not get to observe all the variables needed to characterize the state of the plant; this is an important real-world challenge. Jameson reported that a simple model-free (level 2, ADAC) adaptive critic simply could not control the system. However, a model-based controller (level 3) could. While Jameson found this result extremely discouraging, I consider it good confirmation of the need to climb up the ladder in order to achieve more capability. Admittedly, one can convert a nonMarkhovian system into a roughly Markhovian system by doing some supplementary state estimation to give more inputs to the controller; however, the best way to do this in most applications still requires that we train a Model network. (See "Handbook of Intelligent control.")

Santiago and I reported that a level 4 critic was more robust than a level 1 system, even in the simple pole-balancing problem used by BSA in their classical work. We also reported that the use of an SRN instead of a traditional MLP improved the results. More recently, Santiago has developed generic, industrial-grade software to implement many of these designs (including those now used for revenue management at USAir and a more accurate variation thereof).

Wunsch and Prokhorov reported at Ames on their efforts to use a well-tuned classical controller (PID), a level 2 critic and a level 3 critic on the bioreactor and autolander test problems in "Neural Networks for Control", problems which are extremely difficult for less powerful methods. They solved both problems cleanly with a level 2 critic, and solved the autolander using PID, even in the "noisy" version of the problem. However, when they added still more noise, and drastically shortened the runway, both the PID and the level 2 critic crashed the airplane 100% of the time. The level 3 critic was able to land the plane (more or less, using tolerant criteria) 80% of the time. (With stringent criteria, it was only 40%.) The present invention shows still more accurate control as one climbs up to level 5 of the ladder. Naturally, there is a great deal of research still to be done in optimizing the use of such designs.

Balakrishnan has compared a level 4 critic against half a dozen classical methods normally used in the missile interception problem. (Part of his system used parametrized models instead of neural networks, but the adaptation methods given in are generic.) He showed a very substantial improvement in performance. This is quite interesting, insofar as this as a well-studied problem of rather extreme interest to the military. A version of this work may be forthcoming in Neural Networks.

Also at Ames, AAC reported work much closer to real-world application—use of a level 4 critic to control the first physical prototype of "LoFlite" (built by AAC and subcontractors), the first US prototype of a class of airplanes able to reach earth orbit as an airplane, at airplane-like costs. AAC has reported (in conversation) that this level of capability was absolutely essential to solving this very difficult control problem, and that the results have been uniformly successful in actual wind-tunnel tests to date. AAC stated that the details of the neural net design as such would be in their paper transmitted to NASA for the conference proceedings.

In my chapters in K. Pribram (ed), Origins: Brain and Self-Organization, Erlbaum, 1994; and .D. Levine & W. Elsberry (eds) Optimality in Biological and Artificial Networks, Erlbaum, 1995, I have summarized these links at some length, along with a strategic analysis of how we can better understand the brain and the mind, respectively. I have previously discussed more specifically the essential role of engineers in collaborative engineering-neuroscience ventures, which would be crucial to any really scientific understanding in the future of "intelligence" in the brain. (NSF has several initiatives now specifically to fund engineering-neuroscience collaborations.) In this section, I will mainly just add some new points (which will be more understandable to those who read the previous papers and tree back).

I have previously proposed that the human brain might be a level 5 adaptive critic system, made up of 3 major (interpenetrating) components, made up in turn of complex subcomponents necessary for maximum capability, and so on. But that complex model was in fact too simple. New evidence suggests that the higher-order, learning part of the brain is actually made up of three entire "subbrains," three entire adaptive critic control systems linked up in a master-slave kind of arrangement. The upper brain (the "decision-making system") must be a true adaptive critic system, unlike the "planning" systems studied in classical artificial intelligence (AI), simply because there is too much uncertainty and complexity over long time intervals to permit a deterministic Soviet-like planning-based approach. Furthermore, continuous variables (like the level of one's health or economic assets) play an important role in human thought at this level. The upper brain consists mainly of the cerebral cortex, the limbic system and the thalamus. The lower brain is mainly a high-speed motion smoother or coordinator, and the middle brain—less well-understood—seems more like a task executor or implementer of "intentions."

The 1987 paper was not so far off in describing the upper brain. For example, new work by Nicolelis of Duke (to be discussed in Pribram's next edited collection) tends to support my claim that the cerebro-thalamic system works like a system identification component, yielding persistent predictive relations between thalamic cells which are very different from those expected in classical circuit models. Likewise, as Grossberg and Pribram have tried to explain again and again, the hippocampus works mainly as a "salience" input when it affects memory storage in the cerebral cortex; it is not "the storehouse of memory" (though it does contain some memories).

More recently, I have followed up on Houk's suggestion that the olive-cerebellum system is itself an adaptive critic "brain," with the olive serving as a Critic. Houk and Barto have proposed that it is a BSA Critic, but this simply doesn't make sense with this kind of circuitry or capability, in my view; however, more sophisticated Critic designs do appear to fit even at the level of specific circuits. More precisely, our present knowledge of the biology fits several possible interpretations in terms of advanced Critic designs—some of them quite heretical at present; thus new experiments are needed to discriminate between them.

The cerebellum already is known to follow learning rules which fit these designs. The next big step is to analyze learning in t he olive—which first requires that we create examples of learning in the olive (presumably in culture), which in turn requires that we create viable cultures of olive cells. Houk's group has failed to create such cultures, when they use only spinal and olive cells, as suggested by the BSA model; however, J. Mariani of Paris has created viable olive cultures, when he adds cerebellar cells to the cultures (which, in my model, should be critical to success in the learning experiments). The next step is to demonstrate learning in such cultures, and so on, as discussed in the previous papers. From an engineering viewpoint, it is not surprising that the lowest "brain"—responsible for the highest bandwidth control as discussed in the previous papers—should be similar in flavor to engineering-style designs based on continuous variables.

Most recently, I have begun to face up to the growing evidence for a "third brain," primarily consisting of the basal ganglia, which implements the closest thing we have to an AI-like task-oriented (or, more properly, intention-oriented) planning in the neural networks of the brain. Houk has reported that parts of the basal ganglia do appear to provide Barto-like reinforcement signals, themselves learning according to something like an HDP/TD rule. Mishkin has shown that the basal ganglia—even without the limbic system being intact—can learn visual discrimination tasks (or "habits") over some time interval, albeit not as long an interval as the upper system can handle. Pribram's group has linked the role of the basal ganglia to the kind of intense intentionality (a single goal image) felt by a pilot in the process of trying to land a plane; curiously enough, the basal ganglia are very well developed in birds. In general, in order to maximize the effective "foresight horizon" of an adaptive critic controller, it is necessary to have some mechanism for "vision" or "chunking" which makes it easier for the organism to leap over multiple time intervals in a single cycle of thought. At a middle level of human thought, a more AI-like discrete-choice approach may also have some value.

I have previously summarized some of the evidence for backpropagation in the brain. The evidence is stronger now but more complex. Gardner's classic work, for example, mainly addressed reverse synapses, not the whole of backpropagation. But George Mpitsos has stated that even simple organisms like aplysia display both classical and operant conditioning; if so, it is conceivable that they might possess capabilities requiring retrograde information flow in learning. If true, this might make it possible to demonstrate the existence of backpropagation in such organisms. (There may be an analogy here to Bell's Theorem in physics, which shows that certain empirical results are inconsistent with any time-forwards information flows.) Robert Malinow, in revisiting his earlier evidence for presynaptic mechanisms in modifying synapse strengths, has arrived at compelling reasons to discount that idea; this, in turn, leaves backpropagation as a much stronger explanation for the reverse NMDA-like receptors identified by Bliss and-others. Also, there are some new possible mechanisms for backpropagation, such as a strong backwards electrical flow within a cell (now well demonstrated) coupled with flows outside of the cell conveying error signals for the entire cell back to all of the dendrite of that cell. (Jim Bower has some very compelling color videos which stimulate this impression, at least in my own mind.) Finally, Marc Bear of Brown has recently reported some results on learning (LTP) in the cortex (involving links from layer 6 to layer 1), which appear to be modulated by signals from cells in layer 4 which do not directly connect either to these axons or synapses. These new results from Malinow, Bower and Bear were reported at a recent workshop on computational neuroscience in Washington D.C., sponsored by John Wooley and others at the Department of Energy through Oak Ridge National Laboratories.

Likewise, as previously explained, certain novel approaches to supervised learning and to the construction of more robust Model networks—like SRNs, robust estimation, error critics, and possibly even the Stochastic Encoder/Decoder/Predictor—may play a crucial role. We will also need to pay more attention to how best to incorporate noise into such rational designs, so as to achieve some of the benefits of random search without the biologically implausible aspects of systems like genetic algorithms and so on.

None of these research possibilities should detract from the need to better understand and exploit what has already been achieved this past year on the engineering side. In fact, some of these gaps may even be filled in naturally, in an incremental fashion, as people gradually improve the network components of these brain-like systems, in modular software, so as to achieve ever greater efficiency and scope in handling challenging real-world applications. Some, however, will require serious, sustained investigation—probably by iconoclastic young graduate students or the equivalent—of how to fill the remaining gap between theoretical concepts and working designs.

If one thinks of "intelligence" as the kind of capability we see in the brains of mammals, then of course there is no such thing as an "intelligent control" system in operation today on any kind of computer hardware on earth. However, it is now possible to discern a kind of pathway or "ladder" of designs which should, in principle, be able to bring us up to that level, through sustained future research. In some previous papers, I have identified a kind of watershed along this path which I have called "brain-like intelligent control," for want of a better term.

Prior to November 1993, there were no working, implemented systems in existence which fulfilled my requirements for a brain-like intelligent control system. However, just in the past two years, a least 4–7 groups have managed to meet this standard, using various mixes of ANN, classical and fuzzy designs. These groups have demonstrated that these designs do indeed lead to better performance in a number of difficult benchmark problems obtained from the aerospace and chemical sectors. At least one useful stability result has been obtained for a supervisory control scheme using these designs, and there is excellent reason to expect much stronger results through future research. (See D. Prokhorov & D. Wunsch, Stability of control with adaptive critic, *IEEE Trans. Neural Networks,* Submitted 1995, and P. Werbos, New methods for the automatic construction of Liapunov functions. In P. Pribram, ed., *Origins: Brain and Self-Organization,* Erlbaum, 1994, p.46–52.) The parallels between these designs and the circuitry of mammalian brains are already strong enough that they do lead to useful suggestions for empirical work in neuroscience to enhance our understanding of how the brain works.

The present application provides a discussion of the grand strategy of how to replicate and explain the kind of intelligence we see in living brains, including the tradeoffs between neural networks, AI and classical approaches, and the challenges involved in reverse-engineering the nervous system. This is followed by a discussion on how to design systems which achieve "intelligence" by learning to solve problems requiring optimization over time. It will review the basics and the history of adaptive critic systems. Adaptive critic systems are often referred to as approximate dynamic programming (ADP) or as reinforcement learning systems, because they are based on a general approach to approximating dynamic programming, so as to permit real-time learning in the optimization of complex plants or environments. Included therein is the concept of "brain-like intelligent control" which, in more neutral terms, may also be called "model-based adaptive critics." Also described are the practical tradeoffs in using such controllers (including stability issues) relative to the other types of design now used in control—neurocontrol, classical control and fuzzy control, reported useful implementations, and a theory of how intelligence works in the brain. This, in turn, will point towards many important possibilities for future research, both in engineering proper and in collaborations between engineers and neuroscientists.

Success in science, like success on the battlefield, often requires complex strategic thinking—especially when the goal is elusive, the terrain ahead is unknown, and changing conditions require frequent reassessments. Strategic planning for the Neuroengineering program at NSF is based upon the following fundamental question: how could the scientific community develop the kind of mathematics or designs which will be necessary as a prerequisite to understanding (or replicating) intelligence as it exists in the brain and in the mind? This section will try to analyze this question, and explain why and how an emphasis on learning may be a crucial part of the answer.

Five-years ago, when neuroscientists were asked their view of this question, the usual response was one of despair. Brain circuits are incredibly complex, and it is hard enough for neuroscientists to keep track of all the emerging data about the brain, let alone to understand its true functional significance. The argument was made that the sheer information content of any one human brain exceeds what could ever be contained by another human brain; therefore, it should be impossible for one human brain to understand another (or itself). According to this argument, neuroscience can never become a true mathematical science like physics; it must always be a more anecdotal or ad hoc collection of observations, rather like the science of classifying species of plants before Darwin.

In order to escape from this difficulty, one may go back and reconsider the example of Isaac Newton, who played the crucial role in permitting physics to make the transition from an anecdotal science to a true mathematical science. Newton never did find a simple and precise way to describe the state of the entire physical universe. Instead, he changed the focus of his work away from describing the state of the universe towards uncovering the dynamical laws which change that state over time. The state of the universe at any time may be impossibly complex to know, but the underlying dynamics may be far more uniform and simple.

In the case of the brain, the present state includes more than just the present levels of voltage and current in the brain cells (neurons) which perform the basic computations. It also includes the strengths of connections or gains between these cells, connections which reflect what the brain has learned through a lifetime of experience. Thus in order to turn neuroscience into a true mathematical science, analogous to physics, we must try to unravel the dynamic laws of learning, the laws which create the observed patterns of connections, and which may be far more universal and intelligible than the connections themselves. In this way, we could hope to achieve a Newtonian Revolution in our understanding of the brain. This vision is essentially just an extension of the original vision by D. O. Hebb which helped inspire the first wave of neural network research back in the 1950s and 1960s.

Before one can begin to implement (or justify) this vision, one must first deduce more of the details of what it requires, both in term of biology and in terms of engineering mathematics. On the biological side, one must admit that there are some parts of the nervous system whose operation cannot be explained on the basis of learning. There are systems like the retina and the cochlea and the "motor pools"which serve as application-specific ad hoc preprocessors and postprocessors of data. These systems may indeed be very complex and genetically determined. However, the phenomenon of intelligence is more a matter of higher centers in the brain, like the cerebral cortex, which display a high degree of flexibility. They display a high level of what engineers call "modularity"—a widespread use of elementary components which are similar in structure, and governed by similar dynamics, which can be re-used over and over again with different parameters in order to perform a wide variety of different tasks; for example, when one column of cells in the cerebral cortex is badly damaged, it is normal for another column to learn to take over the same function. This kind of learning can take place even when one column is in the "language" region and another is in the "image recognition" region, and so on. Nevertheless, there are different types of neurons present in the brain, forming different major circuit blocks (like layers in the cerebral cortex) which perform different generic types of functions; thus we would expect to use different equations to describe the learning in different types of cell. (The brain also contains mechanisms to change one type of cell into another, at least in early development and emergency situations; however, such mechanisms do not appear to be part of the normal learning mechanism as such.)

On the engineering side, the goal here is to build generic designs which can learn to perform Qeneric tasks—like pattern recognition or system identification—across a wide variety of applications or environments or plants.

In the engineering literature, there have been intense debates over the differences between "feedback control." "adaptive control" and "learning control." It is difficult or impossible to define a formal mathematical distinction between these various concepts, because all three depend on some kind of feedback mechanism. There are many applications where one can actually choose between adaptive or learning designs. Nevertheless, from a practical point of view—applicable both to engineering systems and to the brain—these distinctions are extremely important.

Intuitively, simple feedback systems are something like a thermostat or the usual PID controller. In such systems, the feedback loop is designed around a specific variable, and it responds to an observed state variable. In adaptive control, there is usually an estimate of a slowly-changing system parameter, such as friction or wear or heat capacity. In conventional adaptive control, the response to such a variable may be based on a aeneric adaptation rule, but better performance can usually be obtained by tailoring the adaptation gain and the adaptation rule itself to the specific variables involved. In learning, the system learns higher-order functional relations which, in principle, should be more universal in nature. For example, one may design a higher-order system which learns what the gain should be in an adaptive control system. In such systems, there may be a high-level loop doing learning, which adjusts a lower-level loop doing adaptation, which in turn issues commands to some sort of PID controllers at the lowest level. Multilevel structures of this general sort are quite apparent in the brain.

In summary, the concept of learning—while not all-encompassing—could be expected to give us a parsimonious understanding of the highest level of intelligence, as well as engineering systems substantially more powerful than those which are used most often today.

There is an analogy here to the development of sensors for the automotive industry; even when new sensors are critical, such research is often useful only when it is integrated into a specific plan to use the sensors within a larger control loop. In studying the brain, a deeper form of engineering-neuroscience collaboration may be needed to establish that larger context. Instrument development, while of continuing importance, is already funded through existing mechanisms such as NSF's programs in Biological Instrumentation.

Also popular is the new work on hexapod locomotion which tries to build robots to imitate the walking patterns of cockroaches and other insects. In this work, serious studies of stabilization and nonlinearity in control are being linked to empirical studies of how the cockroach moves. Such work involves a more substantial intellectual collaboration. It provides useful new information in the mainstream of tads neuroscience. Nevertheless, it does not contribute directly to the Newtonian Revolution discussed above, because it does not seriously address learning. In fact, it is not clear at present whether invertebrate species really do have a very generic kind of learning capacity, except for a handful of species—like the honeybee and the octopus—which may be even harder to understand than vertebrates. There is some reason to hope that they might, but much more analytical work would be needed to flesh out this possibility.

Some researchers have proposed that we simply use system identification techniques to model the brain, just as we would model any nonlinear dynamical system. Certainly there is a place for this approach. Some advocates have gone further, and suggested that intelligence in the brain could be understood as a direct consequence of the sheer complexity of the brain, due the universal properties of all complex dynamical systems based on universal principles of self-organization that would apply equally to a swamp or to a brain; however, many of us believe that intelligent systems have many special characteristics, compared with other complex systems, which need to be fully accounted for here.

The most exciting opportunities here result from the fact that the brain is not just a randomly configured dynamical system, but is in fact specially evolved/designed to function as a "controller." Note the quotation marks around the word "controller." Some people actually define a controller as a system which tracks pre-specified setpoints or reference trajectories. Tracking systems like thermostats are indeed one type of controller, but there are other types of controller as well. For purposes of this paper, a controller is simply defined as any system which outputs control signals or decisions, so as to achieve some kind of desired results. Since the outputs of the brain as a whole system are in fact control signals, the brain as a whole system is a controller, in this broad sense.

The last few years have seen a substantial growth in the use of a common class of mathematical designs—"neural networks"—in engineering, in psychology and in neuroscience. In engineering, efforts like those supported by the Neuroengineering program have shown how ANNs can be used as one convenient way to implement more general designs for learning control, designs which are properly viewed as a subset of control theory. In psychology, simpler ANN designs have been used to predict or describe human behavior, most notably in the field called "connectionist cognitive science." Finally, in neuroscience, there has been a substantial growth in computational neuroscience, especially involving neural network models of associative memory.

Unfortunately, these three communities have still developed only a very limited degree of intellectual collaboration. All too often the people in one community will mislabel the work of the others as "pure Lheory" or as "airballs." Thus a neuroscientist may look at a design developed by an engineer, and call it "pure theory" because there are no biological experiments to support it—even if the design has been thoroughly analyzed mathematically, and tested rigorously on its ability to control complex real-world physical plants. An engineer may look at the neural networks published by a psychologist, and call them "airballs," because there is no argument given that the designs would actually work, except under very simple special circumstances; the successful links to psychological experiments may simply be ignored by the engineer.

In short, the three communities are now using similar types of designs, but are using different standards of validation, different definitions of what constitutes real empirical evidence in support of a neural network design. But in actuality, a valid model of learning in the brains of vertebrates should try to meet all three validation standards—it should match the neural circuitry, it should match the existing behavioral experiments, and it must explain how the brain achieves a very high level of functionality in performing very difficult engineering control (or planning) tasks. Thus to really understand intelligence in the brain, one would need to combine all three validation standards, both in testing designs and in developing new designs. Engineers—as the experts in functionality—must play a central role, to make this possible. Indeed, explaining "intelligence" really has more to do with explaining functionality than it does with the specifics of biomolecular mechanisms and the like. Engineers can also play a crucial role in assisting the design of new experiments, designed to bring out the capabilities of the brain as a general-purpose learning controller.

The discussion up to this point has neglected to mention the philosophers and the folk psychologists, who have also written a great deal about these issues. Because of the complexity of these issues, this paper will focus solely on the issue of how we can build up to someday understanding that level of intelligence which is implemented by the mechanisms of the mammalian brain. It will not address such controversies as the fundamental differences between the human brain and the brains of other mammals, or the prospects for true quantum computing. It seems reasonable, however, that an understanding of intelligence in the mammalian brain would be a prerequisite to an understanding of the proposed more complex forms of intelligence, just as algebra is a prerequisite to calculus. Naturally, this should not be taken to mean that research in those other areas is premature; however, one should not expect a complete understanding of those other areas prior to a more complete understanding of the mammalian brain.

This section has also neglected the potential role of AI, which was also a major topic in the recent NSF workshop. This is because the key insights from AI will appear at a more technical level, as we consider the various components and tasks of-artificial intelligent controllers.

In order to replicate or explain the capabilities of the brain as a learning-based intelligent controller, would one have to use neural networks? Many researchers have very strong opinions about this question. However, in practice, the answer really depends on semantics and definitions, to the point where a simple "yes" or "no" would be misleading.

For example, what is a neural network? If a "neural network" is defined as the particular versions of ANN in use on computers in 1988, taken without any modifications or upgrading at all, then one could never build a brain out of neural networks. However, if a "neural network" is defined as a fairly broad class of mathematical designs, to include at least any plausible model of real biological neurons, then the brain itself must of course be a neural network system. The challenge to research is then to develop better and better neural network designs, so that they can gradually grow to encompass the kinds of capabilities and computational principles which exist in the brain. This is the main thrust of the Neuroengineering program at NSF. In this approach, AI can be viewed as a source of insights or of desired characteristics which must be embedded into some kind of neural network design before they can serve as realistic models of biological circuitry.

On the other hand, modeling the brain is not the only way to achieve brain-like capabilities. Most of the useful designs using ANNs in control can be expressed in a more general form, as block diagrams or modular designs in which we can use either ANNs or other useful functional forms to fill in the boxes. From a mathematical viewpoint, it makes a lot of sense to study intelligent control in this general framework.

Nevertheless, for anything even approaching brain-like capabilities, it is necessary to use components which perform a task called "supervised learning" or "learning from examples." These components may be anything from ANNs through to gain-scheduling schemes or simple lookup tables.

In general, a brain-like intelligent system should have a generic ability to learn to cope with arbitrary plants or environments, requiring arbitrary nonlinear functional relations between inputs and outputs. Thus there is a need for components which can take a vector of inputs $X(t)$, at each time point t, and then generate a vector of outputs $Y(t)$, and somehow learn to approximate "any" nonlinear functional relation from $X(t)$ to $Y(t)$. Learning would normally involve changes in the parameters or weights W in that system, or in the structure or connections within that system. In the ANN field, a generic system which learns to generate outputs $X(t)$ which match some desired target values $Y^*(t)$, over time, is called a "supervised learning system." But there are other nonlinear structures which we can use to approximate nonlinear input-output relationships, such as gain-scheduling tables or the like. (In fact, some classes of ANNs are really just glorified lookup tables.) The practical choice here is not a choice between ANNs and other designs; rather, it is a choice between a wide variety of function approximation schemes, some of which are labeled as "ANNs," some of which are labeled as "classical," and some of which have multiple aliases in multiple communities.

In order to achieve truly brain-like capabilities, one would need to develop new supervised learning schemes which have better function approximation capability and faster learning speeds than any systems now in existence, "neural" or "nonneural." There are many obvious possibilities here for future research, drawing in part on biology and AI. Nevertheless, even the existing supervised learning systems with ANNs have demonstrated function approximation capabilities which are good enough for many practical applications, and superior to those of earlier methods.

In the past, it has been proposed that we define an intelligent system as "a Generalized system which takes action to maximize some measure of success over the log-term in an uncertain environment which it must learn to adapt to in an open-minded way." More precisely, it was proposed that an intelligent system should: input a vector of sensor observations, X(t), in every time period t; output a vector of control signals u(t); and try to maximize the long-term expectation over all future times τ of U(X(τ),u(τ)), for some utility function U. Because at is not computationally feasible to build a system which can do this exactly for all possible stochastic environments, the real challenge is to build a system which learns to approximate the optimal strategy of action, without any requirement for prior knowledge about the environment. (Having designed such a system, one may then ask how to use whatever prior knowledge is in fact available; however, that is a later step. Likewise, the strict philosopher will note that one implicitly assumes some kind of generic prior information in any learning system, as is explained in chapter 10 of "Handbook of Intelligent Control.")

Is this a good definition of "intelligence?" Formally speaking, it is meaningless to try to prove that any definition of any word is "correct." Nevertheless, this definition of "intelligence" does have some advantages, both as a concept and as a focus for research, which are worth discussing further.

Alternative definitions of intelligent control have often required "goal seeking" or "task accomplishment" rather than utility maximization. However, it is generally possible to translate a "desired task" into a corresponding utility function. Furthermore, when there is any uncertainty at all about the possibility of reaching some desired goal (as in most practical situations), it is necessary to have a utility function in order to specify the desired tradeoffs in the presence of uncertainty. In practical applications, it is essential-that the user of optimization systems learn to "communicate" with the controller, by formulating a utility function which represents what the user actually wants the system to do (or a reasonably smoothed out version of that).

Numerous researchers in numerous disciplines—ranging from John Stuart Mill through to John Von Neumann, Herbert Simon and Marvin Minsky, among others—have argued for some form of utility maximization as a model of human intelligence. From a practical point of view, one may argue that a brain-like intelligent system should at least be able to maximize some measure of goal satisfaction, and should contain circuitry able to demonstrate this capability across a wide variety of tasks or environments; thus the development of such circuits would be a crucial milestone in the achievement of true brain-like intelligence. It is known that humans and animals do not achieve perfect optimality or rationality in their decisions; however, realistic approximate optimization designs have remarkably similar deficiencies.

Both in classical control and in ANN control, virtually all useful designs are built up from designs to achieve one of three basic capabilities: (1) the ability to clone an expert; (2) the ability to track a desired setpoint or reference trajectory; (3) the ability to maximize some kind of performance measure (or, equivalently, to minimize some measure of cost or disutility). It is obvious that human learning is not just a matter of slavish imitation. It is also obvious that no one gives us a reference trajectory telling us where to move our bodies every moment of our lives; therefore, optimization over time is the only plausible starting point now available for understanding how brain-like intelligence might work in a practical, operational sense. Furthermore, problems in tracking control can always be reformulated as optimization problems anyway (as is done in conventional indirect adaptive control). Recent work in formal control theory has demonstrated that the problem of nonlinear robust control maps directly into a stochastic optimization problem, which can be solved most effectively in the general case by the use of methods like those described in this paper, with offline learning.

K. S. Narendra has proposed an alternative definition of intelligent control, based on the use of switching mechanisms to choose between arrays of models or controllers. In actuality, there is good reason to theorize that multiple controllers or action schemata play a crucial role in the human brain; however, to achieve brain-like capabilities in such a scheme, it is important to use schemata designed for a broader range of tasks than pure tracking problems. It is important to think about generic systems which could learn to solve problems like playing chess, or scheduling airlines, or training robots to quickly "see" the best path through a cluttered workspace. There is a need to put some effort into proving theorems about such learning systems; however. the first and most basic tasks are to map out and improve the basic designs themselves and to understand their behavior in qualitative terms.

How can we design systems to address the optimization problem defined above (with or without additional constraints or discount factors), when the system parameters must be based entirely on learning?

Broadly speaking, there are three traditional ways to address this problem.

First, there is the brute-force use of static optimization methods, such as simulated annealing or genetic algorithms. But random search, uninformed by derivatives, is typically very slow and inefficient, compared with search strategies informed by derivatives, when the size of a system is large and derivative information is used intelligently. This is a devastating problem, when we are looking for brain-like designs, because brain-like systems should be able to scale effectively to extremely large problems. Stochastic search algorithms can play a crucial role when properly embedded within larger control designs; however, when such algorithms are used by themselves, as an overarching control structure, they clearly have little resemblance to the well-known characteristics of global organization in the brain.

Second, there are straightforward gradient-based methods, based on explicit forecasts of a future stream of events. Such methods include the ordinary calculus of variations, differential dynamic programming, model-predictive control using matrices, model-predictive control accelerated by use of backpropagation and optimization based upon a real-time forwards calculation of derivatives, etc. These designs have tremendous practical applications. However, they are not truly brain-like, for three reasons. First, they require derivative calculations which (for exact or robust results) cost $O(N^2)$ calculations in each time period or which require a kind of chaining or backpropagation backwards through time; neither is brain-like. Second, they tend to assume the validity of a noise-free forecasting model, except in differential dynamic programming, which is still not numerically efficient in handling complex patterns of noise over time. Third, they usually impose an explicit, finite planning horizon—usually a strict near-term boundary line between an interval which is totally planned and a more distant future which is totally ignored. These limitations are not serious in many near-term engineering applications, especially where N is small, but they do have some practical consequences (e.g. computational cost), and they are quite enough to rule out these designs as brain-like.

This leaves us with only one candidate for brain-like intelligent control—the adaptive critics. The basic ideas and history leading up to the adaptive critic will be described in the following section. The key mathematical concepts and equations will be given below. As we will see, many of these designs resulted from an explicit effort to overcome the problems of computational cost in other types of design. The connection between these designs and real psychology has been present—albeit far from straightforward—from their very inception.

The core researchers working in the field of adaptive critics come from a variety of disciplines—control engineering, artificial intelligence, animal psychology, and so on.

The term "adaptive critic" itself came from Bernard Widrow, whose work is extremely well-known in many branches of electrical engineering. In 1973, Widrow developed a simple blackjack-playing program, using simple ANNs that he had developed in earlier years. This was in fact the first ANN implementation of any adaptive critic design. The design was based almost entirely on Widrow's intuition about how to solve the practical problem at hand.

Researchers in the engineering branch of this field often use the term "approximate dynamic programming" (ADP) to refer to this class of designs. This term highlights the fact that these designs can be understood entirely within the framework of control theory, permitting but not requiring the use of ANNs, and so on. Nevertheless, the term "ADP" is not so specific as the term "adaptive critic," because there are many other ways to approximate dynamic programming, which do not lead to anything like a generic learning capability.

So far as I know, the idea of using an approximation to dynamic programming to produce real-time reinforcement learning systems originated in 1968, in a paper which also included the basic intuition behind backpropagation, which is now the backbone of the ANN field. (See P. Werbos, The elements of intelligence. Cybernetica (Namur), No.3, 1968.) A series of papers from 1977–1981 provided more mathematical detail—describing methods called Heuristic Dynamic Programming (HDP), Dual Heuristic Programming (DHP), and Globalized DHP (GDHP), and describing how to use backpropagation with ANNs as one highly efficient way to implement such designs. (See P. Werbos, Advanced forecasting for global crisis warning and models of intelligence, *General Systems Yearbook*, 1977 issue; P. Werbos, Changes in global policy analysis procedures suggested by new methods of optimization, *Policy Analysis and Information Systems*, Vol.3, No.1, June 1979; P. Werbos, Applications of advances in nonlinear sensitivity analysis, in R. Drenick & F. Kozin (eds), *System Modeling and Optimization: Proc. IFIP Conf.* (1981), Springer 1992.) The 1981 paper, in particular, described a generalized form of backpropagation which can be applied either to ANNs or to other sparse nonlinear differentiable structures, based on a theorem proved in my 1974 PhD thesis. Even though that thesis is now widely cited as the original source for true backpropagation, the 1981 paper was probably the key causal event linked to the later development of ANN simulations popularized by psychologists in 1986. The 1981 paper also discussed the use of piecewise linear model neurons, which are still in use today.

This early work on ADP was substantially influenced by the earlier work of Ron Howard. That work has been extended and expanded more recently by Bertsekas, who is also now using a mix of classical and neural systems.

Many other researchers, especially those coming from the traditions of animal learning and AI, often use the term "reinforcement learning" as a synonym for adaptive critics.

The concept of reinforcement learning, in a broad sense, has an extremely long history, originating in the field of animal psychology. One important player was B. F. Skinner. Skinner was the leader of a movement called "behaviorism," which dominated the field of psychology until the 1980's or so. Because Skinner expressed some strong views about how to do research in psychology, there have been a number of strong countermovements which have gone to opposite extremes at times. (For example, some psychologists have tried to model the human mind as a system devoid of pain, pleasure, emotion, motivation, values, etc.)

Whatever one may think about his philosophy, Skinner did stimulate a number of important experiments using rewards and punishments (reinforcement) as a basis for training animals. Even today, about half of the important experiments in animal behavior are based on rewards or punishments, ala Skinner; such experiments are referred to as "instrumental conditioning" or "operant conditioning." Skinner often criticized the idea of modeling the mind as a computational system; however, when his ideas about reinforcement were translated into mathematical learning models, they often turned out to involve the maximization of some net reinforcement measure, U(t), over time. (Even today, some researchers from that tradition will use the letter "r" for reinforcement instead of "U" for utility.)

This early work in psychology stimulated a great deal of attention in AI in the "reinforcement learning problem," as expounded by people like Marvin Minsky. Even today, the "reinforcement learning problem" is usually defined as an optimization problem, except that we are not assumed to know the utility function U(X). In this problem, we are only allowed to observe the actual level of utility, $U(\tau)$, at each time $\tau$. We have no prior knowledge about the relationship between the observed level of utility or reinforcement (U) and the observed data on other variables (X).

The term "reinforcement learning," like the term "ADP," is far less specific than the concept of adaptive critic. In the ANN field, all three terms are mostly used as synonyms; however, the term "reinforcement learning" is still used in a much broader, diffuse sense in the field of psychology. Furthermore, one can still use simple, direct optimization methods to address the reinforcement learning problem; even though those methods are not brain-like, their developers sometimes like to call them "reinforcement learning" methods. Finally, there is good reason to believe that the original optimization problem is a better description of the tasks faced in engineering, and also a better description of what the brain does.

Among the key figures in reinforcement learning have been Harry Klopf, of the Air Force's Wright Laboratory, and Andrew Barto. In the period when neural networks were extremely unpopular, Klopf began to develop reinforcement learning models based on neural network structures to model animal behavior. Klopf did not make the link to engineering by himself, but he located Air Force money to support the development of this connection. Using this support, he persuaded Andrew Barto to start building a connection between Klopf's world and the world of AI. Barto and his students drew on a wide variety of sources in both fields, culminating in the development in 1983 of an improved version of Widrow's original design.

The work of Barto and his students has played a seminal role in building up an awareness of adaptive critic designs, particularly in the field of computer science. The work in this tradition is particularly important to discrete problems, where the decisions to be made—like moves in the game of backgammon—involve binary rather than continuous variables. Tesauro of IBM has developed a backgammon oiayer based on Barto's ideas which Is said to have matched world-class human levels of performance. Tesauro's work may contain important and unique ideas for how to handle larger-scale optimization problems.

The ADP and reinforcement learning groups worked essentially independently of each other until 1987, when Richard Sutton—a leading student of Barto—noticed a paper of mine in the IEEE SMC Transactions. This led to a meeting at GTE, where we both learned how equivalent designs had been developed under different names, where his group learned about the connection to dynamic programming, and where I learned about—and adopted—the term "adaptive critic."

In 1988, the NSF Neuroengineering program arranged a workshop on neurocontrol—cochaired by Miller and Sutton—which brought together (created) the new discipline of neurocontrol, and stimulated a substantial growth in all branches of that field, including the adaptive critics. Later workshops sponsored by several programs at NSF led to a more definitive book on intelligent control, which is still the primary technical source for adaptive critics in engineering, and still contains many ideas for future research. The material in is somewhat difficult; see the later chapters of for some useful introductory material, and the material cited in section 5 for some further implementation details.

3.4 Mathematical Principles Behind Adaptive Critics in General

Adaptive critics are simply one way to approximate dynamic programming. Thus to explain them properly, one must first discuss their relationship with dynamic programming proper.

In conventional control, one speaks of a control system receiving input from a "plant." In intelligent control, one may use the word "environment" instead of the word "plant," because it is more general. For example, most of the sensor inputs coming into the brain of an animal are best described as coming from the "external environment" of the animal. Other important inputs come from the internal environment, like the stomach.

Reinforcement learning systems try to learn the optimal strategy of action in an unknown environment. As the system learns the environment better and better, its strategy may improve. However, the best it could ever do is to approach the optimal strategy which would result from exact knowledge of how the environment works.

In classical control, dynamic programming is the only exact and efficient method to compute the optimal control policy over time in a general nonlinear stochastic environment, governed by known dynamics. The only reasons to use approximate dynamic programming instead of exact dynamic programming in reinforcement learning are: (1) the computational cost of exact dynamic programming is not acceptable, Dr general environments described by more than a handful of state variables; (2) the dynamics of the environment are not initially known (though they may be learned).

In dynamic programming, the user supplies a utility function, $U(R(t),u(t))$, where the vector $R(t)$ represents the actual state of the environment, as opposed to the vector of sensor observations $X(t)$. This is a slight generalization of section 3.1. The user also supplies a dynamic model f of the environment, a model which may be written:

$$R(t+1) f(R(t), u(t), \text{noise}) \tag{P1}$$

Dynamic programming then specifies how to calculate another function, $J(R)$, which has the following property: if you pick $u(t)$ at all times t so as to maximize the expected value of $J(R(t+1))+U(R(t), u(t))$, then you will automatically be following the optimal strategy—the strategy which maximizes the sum of U over all future times. Thus dynamic programming can convert a difficult problem in planning or scheduling over future times into a much simpler problem, a problem in short-term static function maximization. In some cases, when there is an infinite time horizon, some of the key equations can break down; however, this does not have a significant practical impact in engineering or psychology.

In dynamic programming, one constructs the function $J(R)$ by solving some form of the Bellman equation. For purposes of this paper, an appropriate form of the Bellman equation is:

$$J(R(t))=\max \ (U(R(t),u(t))+<J(f(R(t),u(t), \text{noise})>/(1+r)-U_0),u(t) \tag{P2}$$

where the angle brackets denote the expectation value, where r is a "discount factor" (exactly like an interest rate in economics), and where $U_0$ is a kind of normalization constant (following Howard).

In conventional dynamic programming, there are two approaches to solving for J: (1) to use exact analytical techniques; (2) to use computational methods. However, when we cannot make any special assumptions about the function f, we cannot expect to find the analytical solution in a useful form apriori! Likewise, under these conditions, the function J could be any function at all; therefore the usual computational methods allow for any possible function $J(R)$. They try to calculate the value of J, explicitly, for each possible state of the system. For example, if you are controlling a plant defined by 10 state variables, each of which takes on 8 possible values, you need to set aside an array of $8^{10}$ numbers just to hold the function J. To describe this as computationally expensive is really an understatement. For brain-like control, we require an ability to cope with much larger problems, for which the computational costs would be astronomical.

Adaptive critic methods are defined as methods which approximate J in a far more natural fashion. In adaptive critic methods, the user or designer specifies some sort of parametrized model of the function J, or some kind of nonlinear function approximation method to approximate J. For example, the user may choose to approximate the function J. using some type of ANN, or a Taylor series, or so on. The model or network which is used to approximate the function J is called a Critic.

To specify an adaptive critic design, it is not enough to specify the form of the Critic. One must also specify a technique for adapting the Critic—for adjusting the parameters or weights or coefficients within the Critic, so as to obtain a useful approximation to the function J. In addition, for an adaptive critic control system, one must also specify the remainder of the system—including the mechanism for generating actual actions u(t) somehow based on the use of the Critic.

More generally, a Critic network or model may be defined as any component which learns how to approximate J or the derivatives of J or something closely related to J which is a valid basis for adapting a controller, involving a similar translation of a planning problem into a short-term maximization problem.

This duality between J and U is a fundamental aspect of optimization, across all fields of science. For example, in human psychology, "U" would correspond to phenomena like pain or pleasure, which are immediate responses built into our nervous system; "J" would correspond to phenomena like hope or fear or anxiety—learned emotional responses, reflecting an implicit awareness of future possibilities. In Skinnerian psychology, U would correspond to primary reinforcement, and J would correspond with secondary reinforcement. J is also related to things like "static position evaluators" in classical AI. Intuitively, when one suggests that the human mind itself must be some sort of adaptive critic controller, one is simply suggesting that our behavior may be governed by our hopes and fears, which are learned from experience over time. Many, many systems in this category have now been implemented by engineers and computer scientists.

In order to design a generic adaptive critic learning system, one must specify three things: (1) the functional form of the Critic itself—ANN, lookup table or whatever; (2) the method used to adapt the parameters of the Critics; (3) how to use the Critic in learning to generate control signals u(t).

Suppose that we have already decided on the form of the Critic. Suppose that we will use the most basic kind of Critic, the kind which learns to output an approximation of J itself. In other words, we will use a Critic which inputs the vector R(t), and outputs J, an approximation to J(R(t)). The output of the Critic will depend on some set of parameters, W, which we can adapt. Thus the output of the Critic may be written as J(R,W), which is intended to approximate the true function J(R) which solves equation P2. Also assume for the moment that the control actions u(t) are a known, fixed function of R(t).

The adaptation problem is as follows: how can we adapt the set of weights W, without knowing the true function J(R) so as to make J(R,W) a good approximation to the true function J(R) which solves equation 2?

There is an obvious, naive way to solve this problem, in the spirit of basic backpropagation. At each time t, we can define a measure of error e(t) which measures the degree to which our present approximation J(R,W) satisfies equation 2:

$$e(t)=\hat{J}(R(t),W)-(U(R(t),u(t)+\hat{J}(f(R(t),u(t),\text{noise}), W)) \quad (3)$$

where we will now consider only the case $U_0=r=0$ (to avoid cluttering up the equations), and where the set of random numbers "noise" may either be simulated by use of a random number generator or deduced from an actual estimate of R(t). We can try to adapt the weights W so as to minimize the average value, across time, of $(e(t))^2$. We can do this by adjusting each individual weight, $W_{ij}$, at each time, in proportion to:

$$\frac{\partial}{\partial W_{i,j}}(e(t))^2 = 2e(t) * \left( \frac{\partial \hat{J}}{\partial W_{ij}}(R(t), W) - \frac{\partial \hat{J}}{\partial W_{ij}}(\underline{f}(R(t), u(t), \text{noise}), W) \right) \quad (4)$$

$$ "\frac{\partial'}{\partial W_{ij}}(e(t))^{2"} = 2e(t) * \left( \frac{\partial \hat{J}}{\partial W_{ij}}(R(t), W) \right) \quad (5)$$

$$e(t) = \hat{J}(\underline{R}(t), W) - \left( U(\underline{R}(t), \underline{u}(t)) + \hat{J}(t+1) \right) \quad (6)$$

This obvious method does not work. More precisely, in 1990, I showed that this method almost always gives the wrong answer for W, when it is applied to a simple linear-quadratic system (where U is quadratic and f represents a linear stochastic model). However, I also showed that we will always converge to the right answer, in that example, if we use a procedure I called HDP. For example, we may adapt each weight in proportion to the simpler expression:

$$ "\frac{\partial'}{\partial W_{ij}}(e(t))^{2"} = 2e(t) * \left( \frac{\partial \hat{J}}{\partial W_{ij}}(\underline{R}(t), W) \right) \quad (5)$$

Equation 5 actually would represent a correct partial derivative of $(e(t))^2$ if we change the definition of e(t) to:

$$e(t)=\hat{J}(\underline{R}(t),W)-(U(\underline{R}(t),\underline{u}(t))+\hat{J}(t+1)) \quad (6)$$

Equation 6 appears equivalent to equation 3, but it represents a different functional dependency on W; in other words, it treats J(t+1) as a kind of external constant. This kind of paradoxical situation occurs very often in this kind of complex system. The chain rule for ordered derivatives is one of the key tools needed to sort out such situations in a rigorous mathematical way.

In any event, the procedure implied by equation 5 is actually just a special case of a more general method which I called Heuristic Dynamic Programming (HDP) in 1977, and which Barto et al called Temporal Difference (TD) methods in 1983. Strictly speaking, the modern form of HDP is considerably more general than any of he original formulations.

In HDP, the procedure is generalized so that the user is no longer required to use derivative-based learning. The user can plug in any supervised learning system (SLS), neural or nonneural. An SLS is any system which can cycle through the following steps, in order:

1. At time t, input some vector X(t)
2. Output Y(t), based on X(t) and on some weights W
3. Input Y*(t), a vector of desired outputs or targets
4. Modify W based on X(t), Y(t) and Y*(t)

Of course, the weights W must be modified in such a way that Y will approximate Y*, after enough cycles of learning. (Strictly speaking, most SLS designs also allow for a "batch option," where the weights are modified only after a pass through an entire database of training examples, as in classical statistics.)

In HDP, we would use such an SLS to adapt the Critic by cycling through the following steps at each time t:

1. First inject R(t) into the SLS; tn other words, use R(t) as the input vector ("X") of the SLS.
2. Use the SLS to output just one number, which we will interpret as J(R(t),W).
3. Simulate the vector R(t+1)=f(R(t),u(t),noise) by simulating random values for the components of the vector "noise," or else wait until time t+1 and use the actual (estimated) value.
4. Calculate J*(t) as $U(R(t), u(t))+J(R(t+1),W)/(1+r)-U_0$.

Note that we have to use the SLS again to calculate the value
   of J inside this expression!

5. Send J*(t) back to the SLS as the desired output or target,
6. Use the SLS to modify W based on R(t), J and J*(t).

Again, in Consistency of HDP applied to a simple reinforcement learning problem, Neural Networks, March 1990, I showed that this will converge to the correct Critic, for any fixed controller u(R(t)), in a simple linear-quadratic system. In the ANN case, these steps may be described equivalently in simpler language. Before getting started, we first construct a neural net with one output, and enough inputs to accommodate R(t). The six steps are then:

1. Plug in R(t) as the input to the network.
2. Call the network, and remember its output, which we will call J.
3. Generate the vector R(t+1) as before.
4. Plug in R(t+1) into the Critic network, divide the resulting output by 1+r, and add the result to $U(R(t),u(R(t)))-U_0$. Call the final result J*.
5. Send J* to the network as its desired output or target.
6. Update the weights in the network based on an input of R(t), the output J, and the target J*.

This method is very closely related to the iteration scheme developed earlier by Howard, and proven to be convergent. In Howard's scheme, one alternates between two kinds of updates: (1) a "value update," in which we update our estimates of J(R), for every possible state R, based on the current controller or "policy" u(R); (2) a "policy update," in which we update the controller u(R) based on the current Critic. Thus to approximate Howard's method more completely, we can use HDP in parallel with methods to adapt the action network u(R). Naturally, the details of this concurrent learning are a major subject for both empirical and theoretical research in this community.

Despite some attractive theoretical properties, HDP or TD also has some important limitations. In this algorithm, we update the Critic in each time period based on only one number, J*—one piece of feedback. Common sense and statistical theory both tell us that we should not expect to do a good job of fine-tuning a very complex controller, with a huge number of inputs and outputs, based on only one piece of feedback. Thus there are limitations on the ability of HDP to scale up to very large problems in real-time learning. HDP is not a truly brain-like approach, for that reason. Therefore, I have developed a variety of alternative methods, including a "vector critic" version of HDP, Action-Dependent HDP (ADHDP), DHP and GDHP.

In essence, the first two are "like" HDP, and share its basic limitations; however, they provide at least some ability to do better than the Barto design on somewhat larger problems. DHP and GDHP take a fundamentally different approach In DHP, we adapt a Critic which learns to approximate the derivatives of J with respect to the variables $R_1$, the components of the vector R. These derivatives may be denoted as $\lambda_i$ (BR). To develop an adaptation procedure, we begin by differentiating equation 2:

$$\lambda_i(\underline{R}(t)) \equiv \frac{\partial J(\underline{R}(t))}{\partial R_i(t)} = \frac{\partial}{\partial R_i(t)} U(\underline{R}(t), u(\underline{R}(t))) + \qquad (7)$$

$$\left\langle \frac{\partial J(\underline{R}(t+1))}{\partial R_i(t)} \right\rangle / (1+r)$$

$$= \frac{\partial U(\underline{R}(t), \underline{u}(t))}{\partial R_i(t)} + \sum_l \frac{\partial U(\underline{R}, \underline{u})}{\partial u_j} \cdot \frac{\partial u_i(\underline{R}(t))}{\partial R_i(t)} +$$

$$\left(\frac{1}{1+r}\right)\left(\sum_j \left\langle \frac{\partial J(\underline{R}(t+1))}{\partial R_j(t+1)} \cdot \frac{\partial R_j(t+1)}{\partial R_i(t)} \right\rangle \right) +$$

$$\sum_{j,k} \left\langle \frac{\partial J(\underline{R}(t+1))}{\partial R_j(t+1)} \cdot \frac{\partial R_j(t+1)}{\partial u_k(t)} \cdot \frac{\partial u_k(t)}{\partial R_j(t)} \right\rangle$$

$$\frac{\partial}{\partial W_{i,j}}(U(\underline{R}(t),\underline{u}(t)) + J(\underline{f}(\underline{R}(t),\underline{u}(t), noise)/(1+r) - U_0) \qquad (9)$$

$$= \sum_k \left( \frac{\partial U(\underline{R}(t),\underline{u}(t))}{\partial u_k(t)} + \frac{1}{1+r} \sum_l \frac{\partial J}{\partial f_i} \cdot \right.$$

$$\left. \frac{\partial f_i}{\partial u_k(t)}(\underline{R}(t),\underline{u}(t), noise) \cdot \frac{\partial A_k(t)}{\partial W_{i,j}} \right)$$

To adapt the Critic, we can still use any SLS, exactly as we did with HDP. The sequence of steps is quite similar:

1. At each time t, insert R(t) as the input to the SLS.
2. Ask the SLS to output a vector of numbers, to be used as λ(R(t),W).
3. Simulate or generate the vector "noise," as before, and the resulting $R(t+1)=f(R(t),u(R(t)), noise)$.

4. Calculate λ* as the right-hand side of equation 7, using the Critic itself to estimate the derivatives of J at time t+1.
5. Send back λ* to the SLS, to be used as its vector of targets.
6. Modify W based on R(t), λ and λ*.

Of course, step 4 is not entirely trivial. Equation 7 requires knowledge of $(\partial R_j(t+1)/\partial R_j(t))$, which, in principle, requires a model of the plant or environment to be controlled! Using brute force matrix multiplication and derivative calculations, it would be a relatively expensive proposition to perform this calculation. However, generalized backpropagation provides an exact method to calculate the right-hand side of equation 7 at minimum cost—essentially just O(N) cost, as with the simpler form of backpropagation used in supervised learning. The details of this procedure are spread across chapters 10 and 13 of "Handbook of Intelligent Control". With generalized backpropagation in a neural network, these calculations all turn out to be "local" in nature—a critical requirement for a brain-like design.

The issue of learning speed is also important, in a simple linear-quadratic example, and gives some explanation of how this method can indeed learn more quickly than HDP and related methods on large-scale problems. Intuitively, DHP makes use of an entire vector of feedbacks, λ*. Furthermore, in a system governed by continuous variables, it is the derivatives of J which really drive the controls u(t); DHP explicitly maximizes the accuracy in approximating these derivatives, but HDP does not. The derivatives of J also correspond to important concepts—like price, value, emotional charge and force—which are fundamental in the behavioral sciences.

Globalized DHP (GDHP) generates an approximation of J itself, just like HDP. However, it uses a modified error function, which is essentially just a weighted sum of the error functions used in HDP and DHP. To minimize such an error function requires the use of second derivatives. Generalized backpropagation does permit such calculations in O(N) time, but the details are complex.

Both in DHP and in GDHP, it is assumed that derivatives exist. What happens when we face a very large number of binary decisions (or even just binary state variables $R_i$), such that HDP is too slow but DHP and GDHP may break down? Such problems are inherently less tractable than problems involving continuous variables, but the human brain clearly has some ability to muddle through in such situations. This suggests that large games like Go might be good testbeds for future research designed to address this question. Approaches like DHP, using stochastic networks instead of ordinary SLS, may be the answer; again, however, this is a subject for future research (and patents pending).

3.6 Ways to Adapt an Action Net or Controller

After we have a Critic network, such as J(R,W) or $\lambda$(R,W), how do we actually use that network in order to improve our strategy of action or controller? How do we perform something like Howard's "policy update"?

For simplicity, let us change notation somewhat. Let us assume that the weights in the Critic are fixed for now, so that we can represent it as J(R) or $\lambda$(R). Let us assume that our actual control signals will be generated by some other adaptable component, which may or may not be a neural network:

$$u(t)=A(R(t), W), \quad (8)$$

where our goal for now is to adapt the weights W in this component. The letter A here represents "Action."

The general approach used by Barto et al (see A. Barto, R. Sutton and C. Anderson, Neuronlike adaptive elements that can solve difficult learning control problems, IEEE *Trans. SMC,* Vol. 13, No.5, 1983, p.834–846), which has had many variants through the years (e.g. Y. Hu & R. Fellman, A state history queue foe efficient implementation of a reinforcement learning system, *Proc. WCNN94,* Erlbaum, 1994.) (Also, there is a family of methods called "ALOPEX" which is similar.) In this approach, the output of the Critic is used as a kind of gross reward or punishment signal to the Action network. The weights of the Action network are increased or decreased in response to the global reward or punishment signal.

The approach has a number of limitations. Most of all, it uses only one piece of feedback to adapt what could be a very complex network. Thus engineers have found that the approach tends to become very slow as the plant to be controlled is scaled up. In fact, this behavior has given rise to a conventional wisdom saying that "reinforcement learning is extremely slow." This conventional wisdom is very misleading; it is based on experience with a particular form of reinforcement learning.

In my own work with J or Critics, I have emphasized a different approach called "Backpropagated Adaptive Critic" (BAC), though there are other ways of using backpropagation in adaptive critic systems.

We simply try to adapt the Action system A so as to maximize the quantity which equation 2 tells us to maximize. More precisely, we adapt the weights W at each time t in proportion to:

$$\frac{\partial}{\partial W_{i,j}}(U(\underline{R}(t), \underline{u}(t)) + J(\underline{f}(\underline{R}(t), \underline{u}(t), noise)/(1+r) - U_0)$$

-continued $$= \sum_k \left( \frac{\partial U(\underline{R}(t), \underline{u}(t))}{\partial u_k(t)} + \frac{1}{1+r} \sum_l \frac{\partial J}{\partial f_l} \cdot \frac{\partial f_l}{\partial u_k(t)}(\underline{R}(t), \underline{u}(t), noise) \right) \cdot \frac{\partial A_k(t)}{\partial W_{i,j}}$$

As with DHP, one needs to have a model of the environment, f, in order to calculate the derivatives of f (i.e., of R(t+1)) with respect to its arguments. As with DHP, the equation appears fairly complex, but generalized backpropagation can be used to perform these calculations in a very inexpensive way. The derivatives shown in equation 9 provide a rich stream of feedback, which should allow much faster learning in cases where there are many action variables. As with DHP, however, there are some subtle issues in how to handle problems where the action variables are not continuous.

For completeness, one should note that there exist two other methods—Action-Dependent HDP (AD HDP) and Q-learning—which are based up on a different kind of Critic, and a different way of adapting an Action network. These closely related methods were discovered by two different groups in 1989—by Lukes, Thompson and myself and by Watkins, respectively. As discussed in the previous section, neither is really brain-like. ADHDP uses an Action network and backpropagation in order to generate control signals, while Q-learning uses an exhaustive search of alternative possible actions. In recent years, several groups have reinvented ADHDP under names like "modified Q-learning," or "modified BAC" or "policy Q learning." ADHDP was first really applied by White and Sofge, then at McDonnell-Douglas, to solve a problem in the continuous manufacturing of high-quality composite parts, a problem which had been resistant to all previous designs, including the Barto design.

Since they succeeded in using that design on a real physical plant, the method has been applied successfully in a number of simulation studies, and in more applied work by White and Sofge.

It was previously mentioned one of the capabilities of the mammalian brain which has yet to be replicated in any true learning-based artificial system. We are now very far away from building systems which are brain-like in the strictest possible sense. On the other hand, the term "intelligent control" has been weakened to the point where it has little relation, at times, to the kind of research that will help us eventually achieve an understanding of the brain. This section will propose an alternative concept, weak enough to include both the mammalian brain and some artificial systems now in existence, but strong enough to provide a serious, focused challenge for engineering research. For lack of an alternative, it is proposed that we name this concept "brain-like intelligent control."

Some earlier reviews of the adaptive critic field have described a more detailed "ladder" of designs, in which levels zero through five have all been implemented as of 1995. In that framework, "brain-like intelligent control" corresponds to levels three or above of the ladder.

There are four basic requirements for a brain-like intelligent control system. Most of the adaptive critic systems now in use do meet the first three 1. The design must be a serious engineering-based design, able to solve difficult problems in optimization over time, based on learning, allowing for ANN implementation. This requirement rules out those reinforcement learning designs derived from computational neuroscience which have no well-defined engineering functionality. Note that the brain itself—unlike most bottom-up physiological models of learning in the brain—does in fact have a high level of engineering functionality across a wide range of complex control tasks.

2. The design must include a Critic component, which corresponds to the "emotional" or "secondary reinforcement" system which is known to be a major component of animal learning, supported by well-known structures in the brain.

3. The design must include an Action component, a component which actually outputs the control vector u(t), based on some kind of learning, where the learning is based on some sort of reinforcement signals originating in the Critic.

Nevertheless, as Grossberg has stressed in many discussions, these requirements are not enough by themselves. The most popular adaptive critic designs—the Barto et al design, Q-learning and ADHDP—all have a huge, obvious limitation in addressing the kind of intelligence observed in animal learning: they lack an "expectations" or "prediction" system. Crudely speaking, about half the experiments in animal learning demonstrate "Skinnerian" learning (reward versus punishment, and secondary reinforcement), but half demonstrate "Pavlovian" learning, which is based on the learning of expectations. Focusing on just a few very simple, limited experiments on Pavlovian learning, one can actually find ways to fit the data using some simple reinforcement learning models (as demonstrated by Klopf); however, more complex experiments do indicate the need for an explicit expectations system. There is also some compelling new work in neuroscience supporting this idea. From an engineering viewpoint, there are many technical and institutional reasons to prefer the use of designs which exploit a system identification component, which could either be an ANN or a first-principles system model. Thus for a brain-like intelligent system, one may add a fourth requirement:

4. It must include a "Model" component, a component which could be implemented as a learning system adapted by system identification techniques, used to generate the primary training feedback which adapts the Action network, and used to estimate the state vector R in partially observed environments. This requirement is not satisfied by systems which use Models only as simulators to generate artificial training data, as in "dreaming" or in the "Dyna" architecture]. For a "level four" or higher ADP system, it is required that the Model generate primary training feedback to adapt the Critic as well, as in DHP.

Until November 1993, designs in this class existed only on paper, and only in my own publications. Only in the past two years have they been brought into serious implementations. As expected, they have shown significant improvements in performance over simpler reinforcement learning designs; however, more research will be needed to better understand their properties, to make them available in for a wider range of applications, and to replicate additional capabilities of the brain. Theoretical work on classical dynamic programming or on level-one ADP systems can be a useful preliminary step towards the understanding of more brain-like designs, but only if we make a conscious effort to "climb up the ladder" one step at a time as soon as we can.

This paper will certainly not try to argue that brain-like control is the best approach to use in all practical applications, or even in all theoretical research!

Instead, it will argue that neurocontrol and classical control both offer something like a large "ladder" of designs, rising up from simple designs of limited power, up through more difficult designs of greater power and generality, culminating in the degree of generality and capability possible in brain-like control. At each step of the ladder, there are specific benefits in specific applications which may justify climbing up just one step more up the ladder; however, if one is fully satisfied with one's present capabilities and markets, there may be no need to pay the price of rising higher. As more and better software becomes available—either in one's own institution or on the open market—the difficulty of climbing higher should be reduced, and brain-like approaches should become more and more attractive. New neural chips will also play a role.

At the coarsest level, the "ladder" consists of three types of design, to perform three types of tasks: (1) cloning of a human or other expert; (2) tracking a setpoint or desired reference trajectory; (3) dynamic optimization, the maximization of a performance measure over time, accounting for the impact of present actions on performance many time-periods into the future.

Cloning is typically done by use of expert systems, fuzzy or classical, or by ANNs. In expert systems, the expert provides a set of rules, expressed in words, and various methods are used to convert the rules into a fixed controller. To use ANNs, one records the inputs and outputs of the existing controller, which could even be a classical computer controller too expensive to implement in the actual plant. (Likewise, it could be a human being hooked up to a kind of telerobotics exercise.) One then trains an ANN to emulate the actual behavior of the expert.

Strictly speaking, ANN cloning is an exercise in system identification of the expert's behavior; therefore, the "ladder" of system identification designs given in chapter 10 of "Handbook of Intelligent Control" would apply here. Sometimes it is worth the effort to combine information from what an expert says with information about what an expert does; in such cases, one can use elastic fuzzy logic, which permits full use of all the techniques of neurocontrol to adapt a controller, starting from the initial rules from the expert, and resulting in modified rules which are still understandable to the human expert.

In practical applications, controllers are usually desired to follow a reference trajectory or to optimize some kind of performance measure. Therefore, even if experts provide a good initial version of a controller, one can usually achieve better performance by adapting the controller further to improve performance explicitly. One can do this by initializing the controller based on the expert, and then applying learning techniques designed for tracking or for optimization.

As an example, Accurate Automation Corporation (AAC) began an effort several years ago to apply neurocontrol to a model of a hypersonic aircraft. Before encouraging this effort, the National Aerospace Office requested that AAC demonstrate their ability to stabilize this difficult nonlinear plant. AAC implemented this model (at slowed-down speed) as a video game on a graphics workstation, for human beings to play. They recorded the actions of the human players, and saved the data from those humans who were able to control the aircraft. Then they trained an ANN to emulate those human beings, and they were able to run the ANN at faster (electronic) speeds. Thus within just a few weeks they were able to demonstrate a high-bandwidth controller able to stabilize the aircraft at extremely high speeds. This controller could provide a good starting point for later work designed to optimize performance—to meet the very high performance standards required for this class of vehicle.

Using an expert to initialize a learning system can be extremely useful when there are "local minimum" problems making it difficult to find an adequate stable controller at any level of performance. However, one can often take an easier approach. For example, one can train one ANN to solve a simplified version of a control task, simple enough that a local minimum problem is unlikely. One can the use the resulting, adapted ANN as the starting point for another network, trained to solve a slightly more difficult version of the task, and so on. This kind of strategy is called "shaping." As a practical matter, shaping often requires a careful use of techniques like adaptive learning rates to keep the learning system from getting fixated on the first problem it encounters. Shaping is crucial to overcoming practical bottlenecks in a wide variety of complex ANN applications.

Tracking control is a huge subject, by itself, both in classical control and in neurocontrol. Therefore, this section will mention only a few key points.

In most practical applications, tracking accuracy per se is not the only concern, or even the greatest concern, of the user. For example, one would really like to optimize a performance measure which is some combination of tracking error, fuel use, pollution, cost, revenue, jerkiness or wear and tear of equipment, etc. Thus the problem to be solved in principle is usually more of an optimization task. One can always try to tweak a fixed controller, at the design stage or debugging stage, so as to improve its performance; however, one could usually do better by using learning instead of tweaking, so as to explore parameter space more systematically and effectively, and permit the exploitation of larger controllers with more degrees of freedom. (Good learning designs should nevertheless not lead to a proliferation of complexity beyond what the data strongly call for.) This is especially true for stochastic plants with long time-lags.

Nevertheless, before optimizing a plant, one must first stabilize it. For example, one can start out by designing a stabilizing controller, and then using that to initialize an optimizing controller. But one must still be concerned about maintaining stability throughout.

Conventional tracking controllers are usually designed as fixed controllers, based on fixed linear models of a plant. One can often make strong statements about the stability of such systems—assuming that the model is exactly true, and that there are no nonlinearities (which is usually not true in practice).

The latest international conference on hypersonic flight contained a fascinating example of stability issues with standard H∞control. Ranges of control parameters were developed which could stabilize the aircraft assuming a center of gravity located at 12 meters. Ranges were then developed for 11.3 meters. The regions were basically nonoverlapping. Thus for this extremely high-performance aircraft, stability can be a huge challenge. (It reminds me of the problem of walking in a canoe.) No matter how hard one works to control the center of the gravity in advance, it would be somewhat dangerous—unnecessarily dangerous— to rely on any fixed-parameter controller. This leads directly to a need for some sort of adaptive or learning-based control, in order to maximize stability, in examples like this. As a practical matter, in rue nonlinear applications where feedback linearization is not sufficient (the usual situation), the problem of nonlinear H> control reduces in any case to a stochastic optimization problem; such problems can most effectively solved by use of approximate dynamic programming, in offline mode, in any case.

With conventional adaptive control, as with ordinary ANN adaptive control, dozens upon dozens of stability theorems now exist. But in both cases, the theorems have many, many conditions, which are usually not satisfied in complex real-world systems. As a practical matter, the conventional off-the-shelf designs generally involve a myopic minimization of tracking error (or a closely related function) at time t+1. Because of deadtimes, and sign reversals of impulse responses, etc., myopia commonly leads to instability in real systems. Thus in complex chemical plants, for example, adaptive control is rarely used, because of the stability issue; instead, it is more common to use model-predictive control, one of the methods for non-myopic optimization over time. Adaptive control can usually be made to work, by use of hard work in finding appropriate Liapunov functions, specially crafted for each application; however, approximate dynamic programming could be used in this context as a more constructive, more automated technique to actually find such a Liapunov function.

A second problem with classical adaptive control is that generic real-time learning is a slow way to adapt to changes in familiar parameters like mass and friction; it results in unnecessarily long transient responses and unnecessarily weak performance during transients. A better approach is to "learn offline to be adaptive online", so as to tune the adaptation parameters themselves, in effect, to the specific parameters. This requires the use of optimization over time (which could be done in real-time as well) applied to a time-lagged recurrent network used as an Action network, exactly as described in a recent plenary talk by Feldkamp of Ford. As Feldkamp has stressed, it is critical to know how to calculate the required derivatives correctly here, and the literature is now pervaded by inaccurate shortcuts and unnecessarily expensive methods for doing this. The recent results at Ford could well turn out to be the most important near-term real-world application of sophisticated ANNs; for example, Vice-President McTague of Ford recently gave a speech to the National Academy of Sciences, describing how such methods—applied on cars at a test track at Ford—appear to permit an affordable way to meet certain new clean air standards which are of central importance to automobile markets in the U.S.

A few researchers still perform model-free tracking based on "learning the mapping from spatial to motor coordinates." There have even been a few designs which achieved useful, practical levels of performance—the early work by Miller and recent work by Gaudiano and Grossberg. But the direct approach has many limitations relative to the indirect approach, as discussed by many authors, including Narendra, Kawato, Jordan and myself.

In summary, methods for optimization over time have substantial advantages in terms of actually achieving greater stability. The pros and cons of different methods in that class were mentioned briefly in section 3.2.

Some adaptive critic systems, such as systems using elastic fuzzy logic systems as Critics, may give us Critic networks which are Liapunov functions for classical adaptive control; however, considerable research will be needed to create a working computer tool which verifies this after the fact for a wide range of nonlinear problems. Likewise, in some applications it may be best to use a brain-like controller simply to calculate the local value measures (Q,R) fed into a classic LQR controller, in order to combine global optimality with existing local stability theorems. Wunsch and Prokhorov have recently developed a stability result for this kind of supervisory control scheme.

With adaptive critic systems, one can even make use of a stochastic model of the environment, and adapt a controller by explicitly minimizing the probability of leaving the acceptable (stable) region of state space. In other words, one can maximize a realistic assessment of stability in a way that conventional methods cannot. (As a practical matter, it usually helps to represent U as a function which gets worse at a smooth but accelerating rate as one leaves the desirable zone. Sharp binary transitions tend to make learning more difficult.)

One could even use these methods in an offline fashion, similar to what Ford has done with direct optimization methods. Approaches of this sort now seem extremely promising in the field of "reconfigurable flight control." (When airplanes are damaged through war or accidents, reconfigurable control tries to change the control algorithm, through real-time learning or adaptation, so as to minimize the probability of a crash. The success of early simulations by White and Urnes has stimulated major efforts in this area.)

Section 1 referred to "4–7" groups which have implemented brain-like control. The four groups which certainly meet this test, based on open publications and detailed talks which I have been able to check over, are: (1) John Jameson; (2) Rob Santiago and collaborators; (3) Wunsch and Prokhorov of Texas Tech; (4) S. Balakrishnan of the University of Missourri-Rolla. In addition, Benito Fernandez of the University of Texas-Austin, has reported in conversation on results with HDP and DHP, including both empirical and theoretical results, which sound very encouraging. AAC of Tennessee is also building up its internal capabilities. As this paper goes to press, Richard Saeks of AAC reports having proven a direct stability theorem applicable to two of the three brain-like designs to be discussed here. H. Berenji of IIS, working with NASA Ames, has developed adaptive fuzzy systems which do not quite meet the requirements above, but are beginning to come close, at least if more recent plans are pursued further. Feldkamp and Prokhorov have mentioned some preliminary explorations of a related design (the Error Critic) which could conceivably become extremely important in this area. Wendy Tang of the SUNY Stony Brook and George Lendaris of Oregon State are reporting successful implementations as well, as this paper goes to press.

Note that this list does not include implementations of level 1 designs, where a model is appended only in order to provide simulated experience or "dreaming," as proposed in and implemented by Sutton. In all of the work discussed here, the model component was an integral part of the adaptation procedure itself.

Jameson performed the first successful implementation in 1993 of a level 3 adaptive critic system (i.e., HDP with BAC). He tested both a level 2 (ADHDP) and level 3 system on a very simple but nonMarkhovian (i.e., partially observed) model of a robot arm. Despite his best efforts, the level 2 system simply could not control the system, but level 3 could. Jameson found this discouraging, but it supports my claim that we need to "climb up the ladder" to cope with more difficult problems. One can avoid nonMarkhovian problems by doing prior state estimation, but this requires system identification in any case; thus one might as well use a brain-like design. (Still, there may be advantages for hybrid level 2/3 designs.)

Santiago and I reported results on a simple level 4 ADP system in mid-1994. The system was much more robust than a level 1 (Barto) system, even on the simple pole-balancing problem used by Barto et al in their classic work. More recently, Santiago has collaborated with Wunsch and Prokhorov, and developed more general-purpose modular software for adaptive critics and ANN system identification, working with several private companies. He has recently worked with Accurate Automation (the prime contractor for LoFlyte, the major remaining U.S. hypersonics effort) in developing adaptive critic systems to handle crucial control problems in that area, resistant to conventional techniques. It now seems likely that advanced nonlinear control capabilities like this will be crucial to cost-effective earth-to-orbit aircraft, in part because of the need to add even more coupled nonlinear controls to fully exploit the possibilities of shaping plasmas and magnetic fields in high-speed flight.

At this recent conference in Mexico by the present invention61], Santiago presented a detailed two-hour talk on all the low-level tricks he found most useful in implementing a level-3 critic. Among the tricks was an alternation between several value updates in a row (enough to converge), followed by several policy updates, and so on; his algorithm automatically reduced the length of these series of updates as the Critic and Action networks came into alignment with each other. I would speculate, however, that the use of separate Adaptive Learning Rates could have similar benefits.

More recently, Santiago stresses the need to use a large discount factor (r=0.15) in initial training, and to lower it gradually to achieve long-term foresight; Wendy Tang states that this has been important in her experience as well. Santiago also multiplies J(t+1) in equation 6 by a factor "m", initially set to zero and increased to one. Finally, Santiago reports good results using backpropagation through a crude estimate of J (itself based on a fuzzy, low resolution HDP) to estimate derivative targets for pretraining DHP Critics.

Wunsch and Prokhorov have compared a well-tuned PID controller, a level 2 critic and a level 3 critic on the bioreactor and autolander test problems in, problems which have proven extremely difficult for conventional methods. (Nonminimum phase, etc.) They solved both problems cleanly with a level 2 critic, and solved the autolander with PID, even using the "noisy" version of the problem. But when they added more noise and shortened the runway by a factor of 4, the PID and the level 2 crashed 100% of the time. The level 3 crashed 60%, but came very close to landing in 2/3 of those cases. Later, in WCNN95, they reported 80% success in that problem, even using stringent landing criteria, using level 4 and 5 critics (DHP and GDHP). It is interesting that the performance of Prokhorov's bioreactor controller was only about equal to that of Feldkamp and Puskorius, using direct optimization over time, while the autolander performance is far above that of any other method; this may be related to the fact that the bioreactor problem is deterministic while the autolander problem is highly stochastic.

Balakrishnan has mainly studied problems in aircraft and missile control. Some of the best results, presented several times to the government, are still in press. For example, he has compared a number of standard well-developed designs in missile interception against a level 4 critic; he found that the latter could come closer to a true globally optimal trajectory, by at least an order of magnitude, compared with competing methods. He has done tests demonstrating robustness and closed-loop "re-adaptation."

Back in 1981 and 1987, I published a "cartoon model" of is brain function (or, more precisely, of higher-level learning) as a model-based adaptive critic system. The 1987 paper was very apologetic in tone, because it left out a lot of key brain circuits—such as the basal ganglia—whose computational significance is only now starting to emerge.

Since that time, however, I have come to appreciate that the apologies were excessive. So far as I know, that 1987 model is still the only model ever published which meets all the four basic tests above, tests which would have to be passed by any more accurate model. I would claim that this model does provide a valid first-order explanation of what is going on in the brain. It provides a first-pass starting point for an iterative process, aimed at explaining more and more detail in the future. New experiments, guided by adaptive critic models, would be a crucial part of refining this understanding. This section will try to summarize a few major conclusions, and discuss a few of the many more recent developments in this field.

In the early papers, it was proposed that the human brain might be a GDHP-type adaptive critic system, made up of 3 major (interpenetrating) components, made up in turn of complex subcomponents necessary for maximum capability, and so on. But that complex model was in fact too simple. New evidence suggests that the higher-order, learning part of the brain is actually made up of three entire "subbrains," three entire adaptive critic control systems linked up in a master-slave kind of arrangement. The upper brain (the "decision-making system") must be a true adaptive critic system, unlike the "planning" systems studied in classical artificial intelligence (AI), simply because there is too much uncertainty and complexity over long time intervals to permit a deterministic Soviet-like planning-based approach. Furthermore, continuous variables (like the level of one's health or economic assets) play an important role in human thought at this level. The upper brain consists mainly of the cerebral cortex, the limbic system and the thalamus. The lower brain is mainly a high-speed motion smoother or coordinator, and the middle brain—less well-understood—seems more like a task executor or implementer of "intentions." In some respects, the "middle brain" is actually more like a parallel loop supporting the upper system.

In the upper system, the "limbic system"—known for decades as the main locus of "secondary reinforcement" or "emotion"—acts as the Critic. The largest part of the human brain—the cerebral cortex plus thalamus—is adapted, primarily, to perform system identification. It builds up an "image of the world" or "working memory" based on circuitry which has a striking analogy to Kalman filtering. (See Handbook of Intelligent Control, chapter 10, for the neural net generalizations of Kalman filtering.) In this system, the thalamus—the "input gate" to the cerebral cortex—conveys the vector of (preprocessed) observables X. The cortex estimates the state vector R. A crucial aspect of Kalman filtering is the comparison between predictions of $X(t+1)$ based on the predicted $R(t+1)$, versus the actual observations $X(t+1)$. In fact, reciprocal fibers going back from layer VI of the cerebral cortex to the thalamus are all-pervasive. New research shows that some cells in the thalamus act as advanced predictors of other cells, and that they learn to remain good predictors even after the dynamics of the environment are changed artificially.

In the ANN versions of Kalman filtering, one requires a high degree of global synchronization. There is generally a forward pass, in which the network calculates all the various estimates and predictions and intermediate results. Then there is a backwards pass, devoted to the calculations (including derivative calculations) required to adapt the network. Physicists and others who attempt to model the brain using only ordinary differential equations would consider this anathema; they generally seek "asynchronous" models. Yet Llinas and others have shown that there are substantial and precise "clocks" in this system. Recent work by Barry Richmond at NIH substantiates the existence of an alternating computing cycle in the cerebral cortex strikingly consistent with what is necessary in effective ANNs.

Paradoxically, explicit clocks are needed here precisely because there is also a need for a very high speed inner loop of recurrence, running at a higher frequency. Higher order problems in spatial navigation, planning or scheduling require the use of a certain kind of recurrent network, which in turn requires a slower global clock to control external inputs and outputs.

Generally speaking, there are several outstanding issues here: (1) How does the brain achieve a high level of robustness over time in its system identification component? Notions of underdetermined modeling discussed by Ljung and by the later parts of chapter 10 of Handbook of Intelligent Control, may give us some clues, related to the biologists' notions of "learning dynamical invariants."; (2) How does the brain handle the "temporal chunking problem"—closely related to the first question—especially in medium time-scales, where AI approaches may be somewhat workable but neural net implementations are still called for?; (3) How does the brain handle the interface between digital (discrete) decisions and continuous variables (including high-level variables like wealth and low-level variables like muscle force)?; (4) When do components of R become so unchanging that they become stored in more permanent chemical form, even though they are not properly treated as parameters of a Critic or Model? The basal ganglia clearly have something to do with these issues, but they—like the cerebral cortex—seem to operate at multiple levels of abstraction and multiple time-scales, all within a relatively uniform, modular and nonhierarchical structure.

The need for a master-slave kind of arrangement follows from the need for more powerful (but slower) neural network components at the highest level, combined with a need for high bandwidth at the lowest level. It would be easy enough to imagine a supervisory control arrangement in which the $J(t+1)-J(t)+U(t)$ estimated by the upper system is then inserted as the utility function U for a lower-level adaptive critic system. However, because the lower system is based on a higher sampling rate, one would expect it to add in a few additional components of utility, such as additional terms representing the smoothness of motion.

In studying the lower system, there is strong evidence to support Houk's suggestion that the olive-cerebellum system is itself an adaptive critic "brain," with the olive serving as a Critic. Houk and Barto have proposed that it is a Barto-style Critic, but this simply doesn't make sense with this kind of circuitry or capability, in my view; however, more sophisticated Critic designs do appear to fit even at the level of specific circuits. More precisely, our present ;knowledge of the biology fits several possible interpretations in terms of advanced Critic designs—some of them quite heretical at present; thus new experiments are needed to discriminate between them.

The cerebellum already is known to follow learning rules which fit these designs. The next big step is to analyze learning in the olive—which first requires that we create examples of learning in the olive (presumably in culture), which in turn requires that we create viable cultures of olive cells. Houk's group has failed to create such cultures, when they use only spinal and olive cells, as suggested by the Barto model; however, J. Mariani of Paris has created viable olive cultures, when he adds cerebellar cells to the cultures (which, in my model, should be critical to success in the learning experiments). The next step is to demonstrate learning in such cultures, and so on, as discussed in the previous papers. From an engineering viewpoint, it is not surprising that the lowest "brain"—responsible for the highest bandwidth control as discussed in the previous papers— should be similar in flavor to engineering-style designs based on continuous variables.

It is curious that the training signals to the cerebellum from the olive do seem to involve a low-frequency sampling rate (like that of the upper brain), even though the cerebellum itself operates with an effectively higher frequency. This fits in with the idea that there is some additional training signal, more local in nature, based on something like an "Error Critic" design.

Most recently, I have begun to face up to the growing evidence for a "third brain," primarily consisting of the basal ganglia, which implements the closest thing we have to an AI-like task-oriented (or, more properly, intention-oriented) planning in the neural networks of the brain. In the absence of a clear model of this middle brain, I will try to describe where we stand now, in terms of modeling ideas and the qualitative nature of what is now known empirically.

Houk has reported that parts of the basal ganglia do appear to provide Barto-like reinforcement signals, themselves learning according to something like an HDP/TD rule. Mishkin has shown that the basal ganglia—even without the limbic system being intact—can learn visual discrimination tasks (or "habits") over some time interval, albeit not as long an interval as the upper system can handle. (Pribram has also helped in clarifying the meaning of these experiments.) Pribram's group has linked the role of the basal ganglia to the kind of intense intentionality (a single goal image) felt by a pilot in the process of trying to land a plane; curiously enough, the basal ganglia are very well developed in birds. In general, in order to maximize the effective "foresight horizon" of an adaptive critic controller, it is necessary to have some mechanism for "vision" or "chunking" which makes it easier for the organism to leap over multiple time intervals in a single cycle of thought. At a middle level of human thought, a more AI-like discrete-choice approach may also have some value.

Every time I think about this mysterious (still unproven) middle brain, I think of the time when I drove my daughter all the way to school instead of just driving her to the car-pool site, because I was so wrapped up in conversation that I wasn't paying a lot of attention. Perhaps the basal ganglia were doing most of the driving, while the upper brain was mainly paying attention to the conversation (and only incidentally seeing the road).

A careful examination of the circuitry of this system suggests that the upper brain functions as a kind of boss, a kind of idea-man full of continuous variables and stochastic imagination. The middle brain seems to be more like a kind of secretary—extracting yes-or-no decisions, keeping track of agreed-on intentions (and binary variables), and reminding the boss of what he was planning to do. In fact, the cerebral cortex really seems to be more like a dual-use network, combining both f and A as described above, within the upper brain, with outputs of one type emerging from layer V and the other from layer VI.

The important outputs of the basal ganglia are signals going back to lower levels of the cerebral cortex, like reminders from a secretary to the boss; however, there are still some independent outputs to the lower motor system, to carry out preparations for action. (These may be compared to the secretary laying out coffee to prepare for the boss's big meeting.) The basal ganglia pay attention to all of the cerebral cortex (from the layer which tends to represents decisions or actions), and they also receive major input from the limbic system.

A major challenge here is to extract some sort of intuitive understanding from the emerging knowledge base here, sufficiently clear to help guide more operational engineering models or even new biological experiments which permit sharper distinctions between different metaphors.

As this paper goes to press, a more explicit theory about this system has been developed, based on action schemata using internal local critic networks, with a stochastic search mechanism attached to the circuit yielding fuzzy decisions to trigger or not trigger such schemata. A related patent disclosure is being filed.

In some communities, there is a conventional wisdom that backpropagation could not possibly exist in the brain. However, the control designs above all require some form of generalized backpropagation—which is not the same as the popularized versions most familiar to psychologists. Evidence has been accumulating recently to suggest that generalized backpropagation does fit biological mechanisms, and is unavoidable as part of an explanation of certain capabilities of the brain.

See by the present invention6] for a summary of some of the evidence for backpropagation in the brain. The evidence is stronger now but more complex. Gardner's classic work, for example, mainly addressed reverse synapses, not the whole of backpropagation. But George Mpitsos has stated that even simple organisms like aplysia display both classical and operant conditioning; if so, it is conceivable that they might possess capabilities requiring retrograde information flow in learning. If true, this might make it possible to demonstrate the existence of backpropagation in such organisms. (There may be an analogy here to Bell's Theorem in physics, which shows that certain empirical results are inconsistent with any time-forwards information flows.) Robert Malinow, in revisiting his earlier evidence for presynaptic mechanisms in modifying synapse strengths, has arrived at compelling reasons to discount that idea; this, in turn, leaves backpropagation as a much stronger (unique?) explanation for the reverse NMDA-like receptors identified by Bliss and others. Also, there are some new possible mechanisms for backpropagation, such as a strong backwards electrical flow within a cell (now well demonstrated) coupled with flows outside of the cell conveying error signals for the entire cell back to all of the dendrite of that cell. (Jim Bower has some very compelling color videos which stimulate this impression, at least in my own mind.) Finally, Marc Bear of Brown has recently reported some results on learning (LTP) in the cortex (involving links from layer 6 to layer 1), which appear to be modulated by signals from cells in layer 4 which do not directly connect either to these axons or synapses! These new results from Malinow, Bower and Bear were reported at a recent workshop on computational neuroscience in Washington D.C., sponsored by John Wooley and others at the Department of Energy through Oak Ridge National Laboratories.

In summary, we still have a great deal to learn about how to implement the ideas we already have for brain-like control, about how to upgrade these ideas to account for more of the brain's capabilities, and how to link all this to biological experiments. But these new opportunities for future research are all extremely exciting, in a field which seemed far murkier and resistant to such approaches in the past. Already, we can begin to develop a serious functional understanding of how intelligence works.

The term "intelligent control" has become increasingly fuzzy, as the words "intelligent" and "smart" are used for everything from cleverly designed toasters through to government reorganizations. This paper defines a more restricted class of designs, to be called "brain-like intelligent control." The paper: (1) explains the definition and concepts behind it; (2) describes benefits in control engineering, emphasizing stability; (3) mentions 4 groups who have implemented such designs, for the first time, since late 1993; (4) discusses the brain as a member of this class, one which suggests features to be sought in future research. These designs involve approximate dynamic programming—dynamic programming approximated in generic ways to make it affordable on large-scale nonlinear control problems. These designs are based on learning. They permit a neural net implementation—like the brain—but do not require it. They include some but not all "reinforcement learning" or "adaptive critic" designs.

In classical control and in neural network control (neurocontrol), useful real-world systems are usually built up from designs which perform one or more of three basic tasks: (1) cloning of an existing expert or controller; (2) tracking of a setpoint or reference model, etc.; (3) optimization over time, with or without constraints. Neither of the first two is remotely plausible as a model of real intelligence—of what human brains do as a whole system. Even though humans do learn from observing other people, we do not simply "clone" them, and we have an ability to go beyond what we learn from other people. Even when we do track some desired path, we ourselves choose our paths, and we change our paths adaptively in real time.

Humans are not perfect optimizers; however, the idea of optimization over time fits with human and animal behavior so well that it has served as a kind of reference model in psychology, politics and economic for decades. For example, Herbert Simon and Howard Raiff showed decades ago that all kinds of complex problem-solving behavior, goal-seeking behavior and economic decision-making can be produced as an application of optimization over time. Simon's work is the foundation of much of the literature on "planning" in artificial intelligence (AI).

To implement a general-purpose method to learn nonlinear control laws, we must first have a general-purpose method to represent or approximate nonlinear functions. Such a method could be an artificial neural network (ANN). In the ANN field, the task of learning to approximate a nonlinear function from examples is called "supervised learning." But we could also use other methods such as lookup tables, gain scheduling or Taylor series to approximate a nonlinear relationship. This paper will not address the issue of ANNs versus these other approximation techniques. These other techniques will all be taken as examples of alternative networks which can be used in "supervised learning" in the broadest sense. This paper will focus on how to adapt such systems—ANNs or gain-scheduling or whatever—as components of a larger system.

The designs here are mainly based on chapters 3, 10 and 13 of the *Handbook of Intelligent Control,* which carefully presents all designs and pseudocode in a generic, modular fashion, calling on subroutines to perform the supervised learning tasks. These subroutines, in turn could be ANNs, elastic fuzzy logic systems, econometric models, or anything else which is manageable and differentiable.

To merit being called "brain-like," our designs must allow for the possibility that the components of the system could in fact be neural networks of some sort—because the brain is in fact made up of neural networks, by definition. Likewise, our designs should explicitly include an option for real-time learning; however, in many engineering applications, "learning" from examples taken from a simulator or a database may actually be more useful.

In brief, we are looking for "brain-like" designs which address the classic problem of optimization over time—the problem of outputting control vectors u(t), based on knowledge of a vector of observables (sensor inputs) X(t) and of the past, so as to maximize the expected value of some utility function $U(X(\tau),u(\tau))$ over all future times $\tau>t$. (Of course, "discount rates" and constraints may also be considered.) We are looking for designs which could in principle solve this problem entirely on the basis of learning, without any specific prior assumptions about the stochastic plant or environment to be controlled.

Broadly speaking, there are three traditional ways to address such problems. First, there is the brute-force use of static optimization methods, such as simulated annealing or genetic algorithms. But random search, uninformed by derivatives, is typically very slow and inefficient, compared with search strategies informed by derivatives, when the size of a system is large and derivative information is used intelligently. Such designs do not meet the basic requirement, mentioned in the Abstract, that they should be able to scale effectively to large problems. (Still, I would not question the potential importance of stochastic methods in some secondary roles, within larger control systems.) The mismatch between these designs and the brain should be intuitively obvious.

Second, there are straightforward gradient-based methods, based on explicit forecasts of a future stream of events. Such methods include the ordinary calculus of variations, differential dynamic programming, model-predictive control using matrices, and model-predictive control accelerated by use of backpropagation. These designs have tremendous practical applications. However, they are not truly brain-like, for three reasons. First, they require derivative calculations which (for exact or robust results) cost $O(N^2)$ calculations in each time period or which require a kind of chaining or backpropagation backwards through time; neither is brain-like. Second, they tend to assume the validity of a noise-free forecasting model, except in differential dynamic programming, which is still not numerically efficient in handling complex patterns of noise over time. Third, they usually impose an explicit, finite planning horizon—usually a strict near-term boundary line between an interval which is totally planned and a more distant future which is totally ignored. These limitations are not so bad in many near-term engineering applications, but they do have some practical consequences (e.g. computational cost), and they are quite enough to rule out these designs as brain-like.

This leaves us with only one candidate for brain-like intelligent control—systems based on approximate dynamic programming (ADP), or "reinforcement learning" or "adaptive critics." These three terms—ADP, reinforcement learning and adaptive critics—have become approximate synonyms in recent years, in engineering. The concept of reinforcement learning, maximizing an observed measure of utility U(t), is very old, both in psychology and in AI. The link between reinforcement learning and dynamic programming was first discussed in an old paper of mine, but became well-known more as a result of my later papers. Bernie Widrow implemented the first working ANN version, and coined the term "adaptive critic," in 1973. Despite the long history of "reinforcement learning" in biology, there is now reason to believe that the ADP formulation is actually more plausible as a model of biological intelligence.

To understand ADP, one must first review the basics of classical dynamic programming, especially the versions developed by Howard and Bertsekas. Classical dynamic programming is the only exact and efficient method to compute the optimal control policy over time, in a general nonlinear stochastic environment. The only reason to approximate it is to reduce computational cost, so as to make the method affordable (feasible) across a wide range of applications.

In dynamic programming, the user supplies a utility function which may take the form U(R(t),u(t))—where the vector R is a Representation or estimate of the state of the environment (i.e. the state vector)—and a stochastic model of the plant or environment. Then "dynamic programming" (i.e. solution of the Bellman equation) gives us back a secondary or strategic utility function J(R). The basic theorem is that maximizing <U(R(t),u(t))+J(R(t+1))>yields the optimal strategy, the policy which will maximize the expected value of U added up over all future time. Thus dynamic programming coverts a difficult problem in optimizing over many time intervals into a straightforward problem in short-term maximization. In classical dynamic programming, we find the exact function J which exactly solves the Bellman equation. In ADP, we learn a kind of "model" of the function J; this "model" is called a "Critic." (Alternatively, some methods learn a model of the derivatives of J with respect to the variables $R_i$; these correspond to Lagrange multipliers $\lambda_i$, and to the "price variables" of microeconomic theory. Some methods learn a function related to J, as in the Action-Dependent Adaptive Critic (ADAC).)

The family of ADP designs is extremely large. I have argued that it forms a kind of "ladder," starting from the simplest methods—which are a good starting place but limited in power—and rising all the way up to the mammalian brain itself, and perhaps beyond. The simplest designs learn slowly when confronted with medium-sized engineering control problems, but the higher-level designs can learn much faster even on large problems, if implemented correctly.

Level zero of the ladder is the original Widrow critic. Level one is the Barto-Sutton-Anderson critic of 1983 and the Q-learning lookup-table design of Watkins from 1989, both reviewed by Barto in. Level two is the full implementation of ADAC, using derivative feedback from a Critic network to an Action network, as originally proposed by Lukes, Thompson and myself, and later extended and applied to several real-world problems by White and Sofge (ADAC has been reinvented several times in the last year or two under the name of "modified Q-learning".)

Even these three simple designs meet three of the four basic requirements which I would use to define brain-like intelligent control:

(1) They are serious engineering-based designs, able to solve difficult problems in optimization over time, based on learning, allowing for ANN implementation. This requirement rules out those reinforcement learning designs derived from computational neuroscience which have no well-defined engineering functionality. Note that the brain itself—unlike most bottom-up physiological models of learning in the brain—does in fact have a high level of engineering functionality across a wide range of complex control tasks.

(2) They include a Critic component, which corresponds to the "emotional" or "secondary reinforcement" system which is known to be a major component of animal learning, supported by well-known structures in the brain.

(3) They include an Action component, a component which actually outputs the control vector u(t), based on some kind of learning, where the learning is based on some sort of reinforcement signals originating in the Critic.

Nevertheless, as Grossberg has stressed in many discussions, these designs have a huge, gaping limitation in addressing the kind of intelligence we see demonstrated in animal learning: they lack an "expectations" or "prediction" system. Crudely speaking, about half the experiments in animal learning demonstrate "Skinnerian" learning (reward versus punishment, and secondary reinforcement), but half demonstrate "Pavlovian" learning, which is based on the learning of expectations. Focusing on just a few very simple, limited experiments on Pavlovian learning, one can actually find ways to fit the data using some simple reinforcement learning models (as demonstrated by Klopf); however, more complex experiments do indicate the need for an explicit expectations system. There is also some compelling new work in neuroscience supporting this idea. From an engineering viewpoint, there are many technical and institutional reasons to prefer the use of designs which exploit a system identification component, which could either be an ANN or a first-principles system model. Thus for a brain-like intelligent system, I would add a fourth requirement:

(4) They must include a "Model" component, a component which could be implemented as a learning system adapted by system identification techniques, used to generate the primary training feedback which adapts the Action network, and used to estimate the state vector R in partially observed environments. For a "level four" or higher ADP system, I would also require that the Model generate primary training feedback to adapt the Critic as well, as in the "DHP" design. This requirement is not satisfied by systems which use Models only as simulators to generate artificial training data, as in "dreaming" or in the "Dyna" architecture.

Designs which meet these four requirements were first proposed in several of my earlier papers. But only in the past two years have they been brought into serious implementations. As expected, they have shown significant improvements in performance over simpler reinforcement learning designs; however, more research will be needed to better understand their properties, to make them available in for a wider range of applications, and to replicate additional capabilities of the brain. Theoretical work on classical dynamic programming or on level-one ADP systems can be a useful preliminary step towards the understanding of more brain-like designs, but only if we make a conscious effort to "climb up the ladder" one step at a time as soon as we can.

There is a very complex "ladder" of designs and applications, including both classical and ANN control designs. Usually there are significant benefits from going "up the ladder" just one step—but the costs and benefits vary greatly from application to application. Of course, stability actual stability more than theorems—is a key concern in real-world applications.

The latest international conference on hypersonic flight contained a fascinating example of stability issues with standard H∞control. Ranges of control parameters were developed which could stabilize the aircraft assuming a center of gravity located at 12 meters. Ranges were then developed for 11.3 meters. The regions were basically nonoverlapping. Thus for this extremely high-performance aircraft, stability can be a huge challenge. (It reminds me of the problem of walking in a canoe.) No matter how hard one works to control the center of the gravity in advance, it would be somewhat dangerous—unnecessarily dangerous— to rely on any fixed-parameter controller. This leads directly to a need for some sort of adaptive or learning-based control, in order to maximize stability, in examples like this.

With conventional adaptive control, as with ordinary ANN adaptive control, dozens upon dozens of stability theorems now exist. But in both cases, the theorems have many, many conditions, which are usually not satisfied in complex real-world systems. As a practical matter, the conventional designs generally involve a myopic minimization of tracking error (or a closely related function) at time t+1. Because of deadtimes, and sign reversals of impulse responses, etc., myopia commonly leads to instability in real systems. (With complex nonlinear systems, one can sometimes find Liapunov functions to overcome such problems, but this is quite difficult in practice; it is analogous to solving systems of nonlinear algebraic equations by exact analytical means.) Thus in complex chemical plants, for example, adaptive control is rarely used, because of the stability issue; instead, it is more common to use model-predictive control, one of the methods for nonmyopic optimization over time.

In summary, methods for optimization over time have substantial advantages in terms of actually achieving greater stability. The pros and cons of different methods in that class were mentioned briefly earlier. Such methods allow one to define a utility function which includes concepts like energy use, cost, pollution and depreciation, in addition to tracking error; such terms are crucial in many applications.

Some ADP systems, such as systems using elastic fuzzy logic systems as Critics, may give us Critic networks which are Liapunov functions for classical adaptive control; however, considerable research will be needed to create a working computer cool which verifies this after the fact for a wide range of nonlinear problems. Likewise, in some applications it may be best to use a brain-like controller simply to calculate the local value measures (Q,R) fed into a classic LQR controller, in order to combine global optimality with existing local stability theorems. ADP systems, however, allow one to explicitly minimize the probability of ever entering a catastrophic state, based on a nonlinear stochastic model of the plant (which may of course include uncertainty in plant parameters).

Jameson performed the first successful implementation in 1993 of a level 3 ADP system. (See section 1 for how I define these Òlevels.Ó) He tested both a level 2 and level 3 system on a very simple but nonMarkhovian (i.e., partially observed) model of a robot arm. Despite his best efforts, the level 2 system simply could not control the system, but level 3 could. Jameson found this discouraging, but it supports my claim that we need to "climb up the ladder" to cope with more difficult problems. One can avoid nonMarkhovian problems by doing prior state estimation, but this requires system identification in any case; thus one might as well use a brain-like design. (Still, there may be advantages for hybrid level 2/3 designs.)

Santiago and I reported results on a simple level 4 ADP system in mid-1994 (WCNN94). The system was much more robust than a level 1 system, even on the simple pole-balancing problem used by Barto et al in their classic work. More recently, Santiago has collaborated with Wunsch and Prokhorov, and developed more general-purpose modular software for ADP and ANN system identification, working with several private companies. He has recently worked with Accurate Automation (the prime contractor for LoFlyte, the major remaining U.S. hypersonics effort) in developing ADP systems to handle crucial control problems in that area, resistant to conventional techniques. It now seems likely that advanced nonlinear control capabilities like this will be crucial to cost-effective earth-to-orbit aircraft, in part because of the need to add even more coupled nonlinear controls to fully exploit the possibilities of shaping plasmas and magnetic fields in high-speed flight.

Wunsch and Prokhorov have compared a well-tuned PID controller, a level 2 critic and a level 3 critic on the bioreactor and autolander test problems, problems which have proven extremely difficult for conventional methods. (Nonminimum phase, etc.) They solved both problems cleanly with a level 2 critic, and solved the autolander with PID, even using the "noisy" version of the problem. But when they added more noise and shortened the runway by a factor of 40%, the PID and the level 2 crashed 100% of the time. The level 3 crashed 60%, but came very close to landing in 2/3 of those cases. Later, in WCNN95, they reported 80% success in that problem, even using stringent landing criteria, using level 4 and 5 critics.

Balakrishnan has mainly studied problems in aircraft and missile control. Some of the best results, presented several times to the government, are still in press. For example, he has compared a number of standard well-developed designs in missile interception against a level 4 critic; he found that the latter could come closer to a true globally optimal trajectory, by at least an order of magnitude, compared with competing methods. He has done tests demonstrating robustness and closed-loop "re-adaptation."

Finally, Berenji has implemented a system which is essentially equivalent to a level 3 critic (with adaptive fuzzy logic modules), except that the model network is replaced by a constant multiplier, in applications where the Jacobian of the model has fixed signs.

Since that time, however, I have come to appreciate that the apologies were excessive. So far as I know, that 1987 model is still the only model ever published which meets all the four basic tests above, tests which would have to be passed by any more accurate model. I would claim that this model does provide a valid first-order explanation of what is going on in the brain. It provides a first-pass starting point for an iterative process, aimed at explaining more and more detail in the future. New experiments, guided by ADP models, would be a crucial part of refining this understanding.

Why should engineers imagine that they have any hope at all of contributing to the understanding of something as complex as the brain? In essence, however, the key problem is that an understanding of the brain—a control system more complex than any we build today—requires more knowledge of control mathematics than do engineering devices; therefore, the engineering mathematics is a crucial prerequisite to a serious understanding of the functional capabilities of the brain, in learning, and of the circuitry which gives rise to these capabilities. Through the Collaborative Research Initiation (CRI) effort, and other funding initiatives in the planning stage, NSF and other agencies are now opening the door to the engineering-neuroscience collaborations needed to follow through on opportunities of this sort.

There is not enough room in this paper to discuss the current state of knowledge here in serious detail; in any case, this has been done elsewhere. Crudely speaking, however, it seems clear that the brain is almost entirely a combination of three major pieces: (1) fixed, unlearned systems for preprocessing, postprocessing and definition of utility (U); (2) an upper-level ADP system which operates on a (clocked) sampling time on the order of $\frac{1}{10}$–$\frac{1}{4}$ second; (3) a lower-level ADP system which operates on an effective sampling time on the order of 0.01 second. In other words, there is a kind of supervisory control arrangement here, required by the high complexity and long processing cycle of the upper-level system.

In the upper system, the "limbic system"—known for decades as the main locus of "secondary reinforcement" or "emotion"—acts as the Critic. The largest part of the human brain—the cerebral cortex plus thalamus—is adapted, primarily, to perform system identification. It builds up an "image of the world" or "working memory" based on circuitry which has a striking analogy to Kalman filtering. (See [4] for the neural net generalizations of Kalman filtering.) In this system, the thalamus—the "input gate" to the cerebral cortex—conveys the vector of (preprocessed) observables X. The cortex estimates the state vector R. A crucial aspect of Kalman filtering is the comparison between predictions of X(t+1) based on the predicted R(t+1), versus the actual observations X(t+1). In fact, reciprocal fibers going back from the cerebral cortex to the thalamus are all-pervasive. New research shows that some cells in the thalamus act as advanced predictors of other cells, and that they learn to remain good predictors even after the dynamics of the environment are changed artificially. (See [23] and more recent work by the same authors.)

In the ANN versions of Kalman filtering, one requires a high degree of global synchronization. There is generally a forward pass, in which the network calculates all the various estimates and predictions and intermediate results. Then there is a backwards pass, devoted to the calculations (including derivative calculations) required to adapt the network. Physicists and others who attempt to model the brain using only ordinary differential equations would consider this anathema; they generally seek OasynchronousO models. Yet Llinas and others have shown that there are substantial and precise Oclocksb in this system. Recent work by Barry Richmond at NIH substantiates the existence of an alternating computing cycle in the cerebral cortex strikingly consistent with what is necessary in effective ANNs.

Generally speaking, there are several outstanding issues here: (1) How does the brain achieve a high level of robustness over time in its system identification component? Notions of underdetermined modeling discussed by Ljung and by the later parts of chapter 10 of Handbook of Intelligent Control may give us some clues, related to the biologists' notions of "learning dynamical invariants."; (2) How does the brain handle the "temporal chunking problem"—closely related to the first question—especially in medium time-scales, where AT approaches may be somewhat workable but neural net implementations are still called for?; (3) How does the brain handle the interface between digital (discrete) decisions and continuous variables (including high-level variables like wealth and low-level variables like muscle force)?; (4) When do components of R become so unchanging that they become stored in more permanent chemical form, even though they are not properly treated as parameters of a Critic or Model? The basal ganglia clearly have something to do with these issues, but they—like the cerebral cortex—seem to operate at multiple levels of abstraction and multiple time-scales, all within a relatively uniform, modular and nonhierarchical structure.

"Control theory" encompasses any system whose outputs control or recommend overt, physical actions, like movements of motors, muscles or dollars. Logically, the entire brain is one example. Neurocontrol—a subset of control theory—offers cost, learning and simplicity advantages, plus specific new capabilities in three areas—"cloning," "tracking" and "optimization"—plus methods to blend multiple capabilities.

Conventional AI or fuzzy control "clone" experts by implementing what the experts say, in a database of rules. Neural nets can imitate what experts do as a function of sensor inputs and past information. Similarly, they can clone the input-output behavior of existing automatic controllers; this may not improve controller performance, but it may allow a vast reduction in implementation cost, by permitting the use of high-throughput neural chips in place of large computers.

Conventional "adaptive control" maintains a desired set point or tracks a reference model, using direct or indirect (i.e., model-based) designs. (For example, a thermometer tracks or maintains a desired temperature.) Neural adaptive control does likewise, but offers: generalized nonlinearity; and the ability to learn the parameters of the adaptation process itself, thereby permitting rapid response to changes in familiar variables like center of gravity, mass and friction. Many stability theorems exist for conventional and neural adaptive control, but delays or sign changes over time easily destabilize both; however, designs based on optimization over time can overcome such instabilities. If a system can learn to maximize any arbitrary utility function summed over future time, in an arbitrary environment, then logically it should automatically have the ability to "plan," to solve problems, etc. The field of neurocontrol includes designs which enhance conventional deterministic optimization methods, like calculus of variations or model-predictive control. It also includes designs which approximate dynamic programming and promise truly brain-like capabilities. Critical applications include, among others, minimizing fuel consumption, pollution or product loss in the chemical process, automotive and aerospace industries.

The field of "control" encompasses a vast and heterogeneous collection of applications, designs and fundamental theory. Some historians claim that the field began in earnest when James Watt developed a very elaborate feedback control mechanism to keep a steam engine within its operating range. The simple thermostat—a feedback mechanism designed to keep temperature close to a desired set-point (a point set by the consumer)—served as a dominant paradigm in the early days of the field. As the field developed, it focused more and more on two fundamental design challenges, which permeate a wide variety of application domains:

The challenge of tracking—the challenge of making systems settle down into a fixed desired set-point, or into a moving set-point (a desired trajectory or a "reference model").

The challenge of optimization over time—the challenge of finding a strategy or policy which maximizes the sum of some utility function over future time (Von Neumann and Morgenstern, Raiffa). Utility functions can be formulated which represent a wide variety of concepts—maximizing profit, minimizing cost or pollution or energy use, maximizing throughput, maximizing satisfaction of particular long-term goals, etc. In principle, the user formulates the utility function (Werbos 1990a); the control system only maximizes it. (In some designs, the system or the control engineer must devise a kind of secondary utility function, as will be discussed.)

Furthermore, success on these tasks often depends on one's ability to model or predict the environment or plant that one is trying to control; therefore, research into "system identification" (Ljung) and "system dynamics" (Peterson) has become a large part of the control field.

As the field evolved, it became apparent that engineers and economists were both studying different examples of the same underlying mathematical challenges. Therefore, these groups came together in large conferences and university programs in "Decision and Control." It also became apparent that "control" was a central issue both in engineering and in biology (Wiener). Wiener's term "cybernetics" was perhaps a better name for this field than "control," but the word lost favor in the U.S. decades ago because of its popularization and misuse by enthusiasts and consultants who were ignorant of the underlying mathematics. Despite the semantic problems, the field of decision and control began, by 1970, to view itself as a unified approach to all problems involving the design or understanding of systems which output "control signals"—signals to control or recommend actions such as the movement of motors or muscles or levels of investment, etc.

Note that the human brain itself is a "control system" in this broad sense. The entire brain—not just the "motor centers"—is part of a unified computing system, whose sole purpose is to calculate control signals—signals to control muscles or glands.

(Some authors have argued that there are other, more spiritual purposes of the brain; however, even that does not invalidate this paradigm. See Levine and Elsberry 1996.) In describing the wiring of this system, Nauta and Feirtag have shown very concretely how futile and misleading it is to try to separate out the parts of the brain which support motor control and those which do not; they all do.

Circa 1970, the emerging field of Artificial Intelligence (AI) challenged the existing paradigms of control theory, by suggesting alternative ways to solve control problems, most notably:

To optimize goal-satisfaction over time, formal task-oriented planning designs will sometimes work on problems which are too nonlinear and too complex to respond to conventional control techniques. (Miller et al 1990.) Typically such designs involve complex hierarchies of discrete goals, subgoals, tasks, subtasks etc. (Albus 1991).

As an alternative to tracking and optimization, one may simply "clone" a human expert. One may ask a human expert for if-then rules which state how to perform a complex decision or control task.

The field of neurocontrol includes generic designs to perform all three fundamental tasks described above—cloning, tracking and optimization over time. These designs are generic in the sense that a single computer program could be used, in principle, on a wide variety of applications, without changing anything but a few parameters like the number of inputs and outputs; the other differences between applications could be handled by the program itself, as it learns the dynamics of the plant or environment it is trying to control.

Thus the underlying program or design is not application-specific. (There are, however, a variety of tricks for exploiting whatever application-specific information may be available.)

Neural networks can also be used to perform subordinate tasks—such as pattern recognition, sensor fusion, diagnostics and system identification—within a larger control system; however, in neurocontrol proper, the actual control signals are output directly from a neural network. (See Werbos (1989) and W. Miller et al for the first published definition of "neurocontrol." The latter book was the output of the 1988 NSF conference which essentially created neurocontrol as an organized, self-conscious field.) This section will focus mainly on neurocontrol proper.

This definition does not exclude the possibility of using a fixed, nonadaptive postprocessor to provide a buffer between the decisions of the neural network and the low-level actuators. For example, many people have used standard neurocontrol designs to output "actions" which set the weights of a simple classical PID controller, which in turn sets the industrial plant. This is similar to what the human nervous system does, in using signals from the brain as inputs to low-level "spindle cells" and "gamma efferents" which provide low-level feedback control of human muscles.

Unlike AI, neurocontrol is logically a subset of control theory. The basic designs now used in neurocontrol can all be completely understood within the broad framework of control theory. Nevertheless, there is significant novelty in these designs. For example, classical control theory included only two popular methods to perform optimization over time in a noisy (stochastic) environment: (1) linear-quadratic (LQ) methods (Bryson and Ho 1969); (2) dynamic programming (Howard 1960). Neither was suitable for solving complex planning problems, because the first required linearity, and the second was computationally infeasible for problems with many possible states. Neurocontrol contains new methods for approximate dynamic programming (ADP) which overcome both problems, and provide an alternative to the more rigid rule-based methods used in AI planning. Usefu ? designs for reinforcement learning—described in chapter A2—are a special case of ADP. Simple forms of reinforcement learning, developed in a neurocontrol context, have been widely popularized and reassimilated into the AI field, largely through the efforts of Andrew Barto and collaborators. (See chapters by Barto in W. Miller et al 1990 and in White and Sofge 1992.) Tesauro at IBM has demonstrated that such designs can be very effective in solving classical, difficult AI problems such as beating human beings in board games like backgammon.

Complex neurocontrol designs typically do not consist of "a" neural network. Typically, they consist of a higher-level recipe for how to combine several neural networks (and/or nonneural networks) together, to perform a higher-level task. Usually, there is at least one module in the design which can be filled in by "any supervised learning design. Successful research teams usually begin by implementing very simple designs, of limited power, in a modular software system. Then, when the simple designs fail on harder problems, they gradually enhance their software system, and progress to more sophisticated, optimization-based designs. They usually make it easy to switch the choices of supervised learning methods used in the various component modules, so as to accommodate different types of applications.

There are some applications in the control field which are even more difficult than the previous paragraph suggests. For example, consider the problem of balancing three poles, one on top of the other, like a team of acrobats in a circus. There is probably no neural network system which could learn to perform that task, "starting from zero prior information. Logically, this is an example of the "local minimum" problem discussed in chapter C1.

Local minimum problems are far more serious, in practice, in complex decision and control tasks than in applications like pattern recognition. Random search techniques like genetic algorithms can be useful in small problems of this sort. But for large problems, the most valuable technique by far is something which Barto calls "shaping." (White and Sofge 1992.) In shaping, one first adapts an "entire neural network system to solve a " simplified version of the task at hand. One then uses the resulting network and weights as the "initial values of a network trained to solve a " more realistic version of the task. One may construct a graded series of tasks, ranging from the easiest through to the most realistic, and adapt a series of neural systems to solve them. In a similar fashion, one may initialize a neural network with a fuzzy controller, and so on. (Werbos 1993a). One may use cloning techniques, at an early stage, to "stabilize a system, and then use optimization at a later stage to "improve performance while retaining stability. The parallels with human learning are many. (In practice, shaping requires the use of flexible learning rules, such as the Adaptive Learning Rate given in chapter 3 of White and Sofge, to avoid locking in a new network to the old problem.)

Probably the first example of neurocontrol actually working in simulation was the original broom balancer developed by Widrow in the 1960s. (Widrow 1987).WidrowÕs approach has been reinvented many times in the past decade, in part because it seems very obvious to people who know nothing about control theory.

Widrow began by training "human students to balance a broom. Then he recorded how the humans do it. At each sampling time, for each student, he recorded two things: (1) what the student " saw (the state of the broom); (2) what the student "did (the correct action). He built a database or "training set" out of these records. He then trained a simple neural network to learn the mapping from what the student saw to what the student did. This was a straightforward application of supervised learning. This particular work was later refined by Guez and Selinky (1988).

Most of the people reinventing this approach did not place great emphasis on the human expert. They simply reported that they had trained a neural network to input sensor data and to output the correct control action. Clearly, the performance of this approach depends critically on how one constructs the database containing the "correct actions." This must unavoidably come from some other existing controller—either a human expert, or an animal expert, or a computer program.

High quality human operators of chemical plants or high-performance aircraft typically do "not base their actions solely on sensor data at the current time. Like good automatic controllers, they typically account for things like trends, or experience over multiple time periods, or a sense of how the underlying system parameters are changing. Therefore, one cannot capture their expertise in a static supervised learning exercise.

A better approach to cloning is to treat it as a task in "dynamic modeling or system identification. As McAvoy has said, it is an exercise in "modeling the human operator." (White and Sofge.) The first step in this approach is to collect a "time series of what the expert sees and what the expert does; then, one may simply apply neuroidentification techniques to build a model of this data—using more difficult and more advanced techniques (White and Sofge, chapter 10) only if the simpler ones do not perform well enough.

An instructive example of this approach came from Accurate Automation Corporation (AAC) circa 1992. AAC proposed that "optimizing neurocontrol could be used to solve the critical efficiency and weight problems in controlling the National Aerospace Plane (NASP), a prototype under design for a future airplane fast enough to reach earth orbit "as an airplane, at airplane-like costs. Before exploring the neural option, the NASP program office first challenged AAC to prove it could even stabilize this craft—a highly nontrivial, nonlinear control problem, for which the conventional solution had required a great deal of development work. AAC first built a simple but credible "simulation of the vehicle, running on a Silicon Graphics, at a slowed-down rate so that humans could stabilize the simulation. AAC recorded the vehicle states and human actions for those humans able to control the simulation. Then they "modeled the human response pattern, using a simple time-delay neural network to perform the neuroidentification. The result—within just a few weeks—was a well-defined algorithm, able to perform at electronic speeds. The resulting neural network was also suitable for use as the "initial state of a network to be improved on, later, via optimization designs. Because of this and later successes, AAC is now the prime contractor on the follow-up to NASP (LoFlyte), and is currently wind-tunnel testing a physical prototype which they have built.

Another, more proprietary example from the robotics industry is also interesting. In 1994, a major corporation considered using neural networks to replace human workers in a very difficult process which had resisted conventional techniques. They did not know where the real problem was—in the robots themselves, or in the computer programs, or whatever. I proposed that they begin with a kind of "virtual reality" exercise—equipping human beings with visual displays showing only what the robot would see, and dressing them up in data gloves to directly control the robot arms. Naturally, the humans would be permitted to take their time, and would be rewarded if successful. The virtual reality approach would not be of "direct economic benefit here, because it would not reduce labor costs. However, it would make it possible to test whether the given sensors and actuators might be good enough, in principle. If the exercise were in fact successful, one might then simply "clone" the successful operators based on data recorded during this exercise. (In other kinds of plants, such as big chemical plants or electric utilities, there is often enough data recorded already to permit "cloning" without such a special exercise.)

The two-step strategy of cloning followed by improvement does have a crude analogy to what happens in human learning. The phenomenon of "imitation is amazingly pervasive in early learning by human beings in natural settings. Nevertheless, the phenomenon of imitation in human children is far more complex and subtle than the cloning approaches described above. I would speculate that it involves new, higher-order capabilities which can only be understood at the most advanced level. (See chapter 10 of Werbos 1994.)

There are two main approaches to solving tracking problems, both in classical adaptive control and in neurocontrol: the "direct" approach, and the "indirect" approach.

In the direct approach, one tries to learn the mapping from the location of the plant back to the actuator settings which could move the plant to that location. In the indirect approach, one constructs a "model of the plant (e.g., by using neuroidentification), and one then uses "optimization techniques to train a neural network to minimize tracking error.

Robot arm control is the classic paradigm of the direct approach. Suppose that the location of your robot hand is specified by three spatial coordinates—$x_1$, $x_2$, and $X_3$, forming a three-dimensional vector "x. Suppose that you control three joint angles in the robot arm—$\theta_1$, $\theta_2$, and $\theta_3$, forming a vector $\theta$. Then we would expect x to be a function f of $\theta$. However, if the function f is a one-to-one invertible function, then $\theta$ is also a function $f^{-1}$ of x. Our goal, in tracking, is to calculate the joint angles $\theta$ which would move the robot hand to some desired location in space, x. To solve this problem, we can simply train a neural network to approximate the function $f_{-1}$. We can do this simply by moving the robot arm around, and recording actual values of x and $\theta$, and training the neural network to learn the mapping from x to $\theta$. Any supervised learning design can be used to learn this mapping.

The first working example of direct neural adaptive control was a physical robot developed by Kuperstein (1988). Kuperstein used a very elaborate fixed, biologically-based preprocessor as his neural network, topped off by a simple adaptive output layer trained by WidrowÔs LMS algorithm. KupersteinÔs tracking error was circa 3%—enough to be interesting scientifically, but not enough to be useful in practice. Miller (W. Miller et al 1990) later used a similar approach, but with a CMAC network augmented by time-delayed inputs. In other words, Miller treated this as a problem in neuroidentification, rather than a problem in static supervised learning. This led to tracking errors less than 0.1%. Miller produced an impressive video of his robot arm, pushing an unstable cart around a figure-8 track, at great accuracy. Even after he put a heavy new weight on the cart, it would re-adapt and return to high accuracy within three trips around the track. Similar accuracies have been achieved by a few researchers using static supervised learning, but not with this real-time readaptation capability.

One disadvantage of Miller's approach is that it uses real-time learning to adapt to simple, routine changes like changes in mass. Whenever the mass or the friction change, the network acts as if it is learning a totally new problem, unrelated to anything experienced before. This is similar to the behavior of primitive organisms when confronted with pattern reversals (Bitterman 1965). Werbos (1990b) proposed a different approach: to use a time-lagged recurrent network (TLRN) here. If powerful enough neuroidentification methods were used, then the recurrent nodes themselves should learn to detect changes in familiar variables like mass and friction, so long as these variables do in fact vary during the training period. This kind of detection—tuned to specific variables and exploiting past experience—should be much more rapid than real-time learning. We could even use this approach to build systems which "learn offline to be adaptive online." To my knowledge, no one has applied this approach as yet to direct tracking designs; however, Feldkamp of Ford Motor (in Narendra 1994) reports great success with this general approach, plus a few additional features, which he calls "multi-streaming," applied to model-based designs.

An advantage of real-time methods, like Miller's, is the ability to cope with unfamiliar, fundamental structural changes in the plant to be controlled. It is possible to combine real-time learning with TLRNs in any efficient way, but no one has done this yet, to my knowledge. (See chapter 13 of White and Sofge 1992.)

Indirect tracking designs are more complicated than direct designs, but also more powerful. There is no need to assume that f is a one-to-one function. Direct designs have been developed which do not become invalid when the number of controls (components of "θe) exceeds the number of state variables (x); however, they generally waste the additional degrees of freedom. Indirect designs can make good use of such additional controls, especially if they are adapted to minimize a "sum of tracking error plus some measure of jerkiness or energy consumption. (See Kawato in W. Miller et al 1990.) In the U.S., classical adaptive control is dominated by the indirect approach, in part because of the well-known work of Narendra (Narendra and Annaswamy 1989). The same is true of neural adaptive control. (See the papers by Narendra in W. Miller et al 1990, in White and Sofge 1992, and in Narendra 1994.)

Most of the neural tracking systems in the literature today are indirect systems which fit the following general description. At every time t, there are M sensor inputs $X_1(t), \ldots, X_M(t)$, forming a vector X. The desired set-point or trajectory can be represented, for all practical purposes, as a set of desired values $X_1^*(t), \ldots, X_m^*(t)$ for the first m components of X; they form a vector x. (Usually m=M, but not always.) The control signals at time t form a vector u(t). Sometimes the neural system is represented as a time-sampled system (proceeding from time t to t+1 to t2+2, etc.), and sometimes (as in Narendra's case) it is represented in terms of ordinary differential equations (ODE). The neural system consists of three components: (1) a function v(X,x*) representing tracking error—usually just square error; (2) a Model of the plant—either a neural network or a first-principles model—which predicts changes in X as a function of X and u; (3) an Action network (or "controller") which inputs X(t), x*(t) and (in many cases) other information from the Model network, and outputs u(t).

In true adaptive control, the Model network and the Action network are both adapted in real time. The Model network is usually adapted by one of the neuroidentification methods described by Narendra. The Action network is adapted so as to minimize v in the immediate future; we do this by using some form of backpropagation, and adapting the weights in the Action network in proportion to the derivatives of v. (Werbos 1994 and White and Sofge explain these forms of backpropagation, which antedate the simplified versions popularized in the 1980s.) This is a straightforward generalization of classical adaptive control, where the Model and Action networks are usually just matrices. (Section F1.10.5.2 discusses exceptions.)

When the plant to be controlled is truly linear, or when it stays so close to a desired set-point that it can be treated as linear, then conventional adaptive control can perform just as well as the neural version. The neural version tends to stabilize nonlinear plants more effectively, but stability is harder to prove in the nonlinear case. Many, many stability theorems have been proved both for classical adaptive control and for neural adaptive control; however, all of these theorems involve stringent assumptions which are often violated in practical applications. The problem for practical applications here is not that the mathematics is hard (though it is) or that we need more theorems (though we do). The problem is that all forms of adaptive control can go unstable in practical applications, either when learning rates are too high or when effects like deadtimes or sign reversals exist.

The underlying problem with "deadtimes" and "sign reversals" is that actions which reduce tracking error in the "immediate future (or which have no immediate effect) may actually result in " greater error over time. I would call this the problem of "myopia." Myopia is a central issue in many control problems. For example, consider the problem of deciding how many fish to harvest, so as to maximize long-term profits. The myopic strategy is simply to harvest the largest possible number of fish, using all the boats and nets available, in order to maximize profits in the "immediate future. However, this strategy could actually wipe out the fish population, and zero out profits in future years. The bioreactor benchmark problem in W. Miller et al exemplifies this issue; it is an excellent first test for neurocontrol designs. To my knowledge, this test has only been passed by designs which "explicitly perform optimization over time (by Feldkamp, and by, lunsch and Prokhorov). When classical adaptive control led to unstable results in the chemical industry, in the 1970s, the industry moved towards Model-Predictive Control—an explicit design for optimization over time—which is now a mainstay of the industry.

Strictly speaking, there is reason to believe that neural adaptive controllers "could be devised which could stabilize almost any plant which can in fact be stabilized. The challenge lies in finding a loss function v(X,x, etc.) which is appropriate for the particular plant. It can be extremely difficult to find good enough loss functions simply by "guessing"; however, several approximate dynamic programming (ADP) designs can be used to "learn the optimal function v for specific plants. (See chapter 2 in Pribram 1994.) The Wunsch-Prokhorov work can be interpreted in this way. This is a difficult but promising area for future research. As this book goes to press, Prokhorov and Wunsch (1995) have developed some preliminary stability theorems for a hybrid optimal control scheme, in which an ADP design acts as a kind of supervisor, sending value signals to a lower-level clasical linear controller.

In addition to the usual direct and indirect designs, several alternative arrangements have been tried. Probably the most important is the use of a neural network to estimate the current "parameters of the plant to be controlled, followed by use of a controller—neural or nonneural—which inputs those estimates. Lapedes and Farber, and Farrell (White and Sofge), used this approach in earlier years. Urnes of McDonnell-Douglas is using this approach for a Phase I reconfigurable flight control system, which helps F-15s to recover from "involuntary configuration changes" (like being hit in war). This approach has some of the same advantages as "learning offline to be adaptive online," "if the controller is properly designed. Offline training also simplifies the process of flight qualification—the rigorous testing process by which new aircraft and aircraft controllers are certified as reliable enough to permit their routine use, with human lives at stake. As this book goes to press, C. Jorgensen of NASA Ames has stated that NASA flight testers have certified a neural network controller (trained offline) which was recently used to land a huge MD-11 aircraft with all of its hydraulic actuators disabled.

Also significant is Kawato's Feedback Error Learning (W. Miller et al 1990), which is really just a way to "blend a classical feedback controller with a neural network. It is formally equivalent to a particular ADP design (DHP) with the Critic network hard-wired in advance. Less interesting are "model free" indirect designs which, instead of a Model network or matrix, use a kind of correlation matrix, explicitly or implicitly; such designs are not truly model-free, because the correlation matrix (or equivalent) is simply a naive form of plant model.

Optimization over time accounts for a smaller share of the published academic literature on neurocontrol than do cloning or basic tracking designs. However, it probably accounts for the hulk of the dollar value of neurocontrol products actually working in industry. In some cases, optimization over time is used to minimize tracking error "plus some measure of cost," accounting for linkages over time. There is reason to believe that the human brain itself is a member of this family of designs (Pribram, chapter 31).

There are two major approaches to optimization over time: (1) the "explicit approach, involving a backpropagation of utility; (2) an " implicit approach, based on approximate dynamic programming (ADP).

The explicit approach is similar to indirect adaptive control, discussed in the previous section. The control system usually consists of a Model (neural or nonneural), a utility function U(X), and an Action network. The main difference is that we pick actions "u(t) so as to maximize the " sum of $U(X(\tau))$ over future times $\tau \geq t$. To do this, we must choose between two forms of backpropagation: (1) backpropagation through time (BTT), a method which I first implemented in 1974 (Werbos 1994); (2) a forwards propagation of derivatives. BTT is exact and efficient, like simple backpropagation, but—because it uses calculations which proceed backwards through time through an explicit record of past experience—it is not even remotely plausible as a model of biology. The latter operates in a more real-time mode, but the cost of calculating derivatives is proportional to mN, where N is the number of neurons in the network and m is the "total number of weights; this, too, is biologically implausible, because the cost rises substantially with the size of the network, and the calculations do not even remotely resemble anything found in the brain.

By 1988, there were already four working examples of explicit optimization based on BTT—Widrow's truck-backer-upper, the simulated robot arm controllers of Kawato and of Jordan, and an official (nonneural) Department of Energy model of the natural gas industry which I developed. (W. Miller et al 1990.) In recent years, Widrow's system has demonstrated ever more interesting capabilities, outperforming human experts both on simulated trucks and on a physical model of a two-trailer truck. Hrycej (1992) of Daimler-Benz and Feldkamp of Ford (in Narendra 1994) have reported many important applications, some of them leading to proprietary products still in the pipeline. McAvoy has used this approach in a nonlinear generalization of Model Predictive Control, for use in the chemical process industries (White and Sofge, chapter 10). MPC is not a "real-time" technique, in a formal sense; however, because special-purpose chips can perform calculations very quickly (compared with changes in chemical plants), it can still provide real-time control in a practical sense in these applications. McAvoy's Neural Network Club includes more than twenty large corporate sponsors who have deployed a variety of the techniques he has developed in profit-making applications, albeit on a proprietary basis. Feldkamp and Narendra have also worked with the time-forwards propagation of derivatives, but less so now than in the past, because of the cost issue (and perhaps because of some stability questions).

Explicit optimization methods depend critically on the assumption that the user's model is an exact, deterministic model of the plant to be controlled. Subject to this assumption, they yield "exact answers, at least for the planning horizon used in the training process. Implicit designs, based on ADP, provide a true "real-time capability; however, the solutions they provide are " approximate. ADP—like dynamic programming itself—is explicitly designed to control stochastic plants, and to use a stochastic plant model (if such a model is available).

The ADP family of designs is far too complex to review thoroughly here. These designs form a kind of ladder, rising up from the simplest but least powerful designs, up to more complex designs like the human brain itself. The simplest reinforcement learning designs work very well on small problems, especially when the choice of actions is small and discrete; however, their learning speed becomes quite slow on larger, more continuous problems. The most powerful designs in operation today are "brain-like" designs which include at least three components, in addition to the utility function U(X):

(1) a Critic network, which provides a kind of "emotional system," or strategic assessment system; (2) a Model network, which may be thought of as an "expectations" system; (3) an Action network, adapted at least in part by the backpropagation of "value" signals computed by the Critic and backpropagated through the Model to the Action net. Between late 1993 and late 1994, five groups reported working systems of this sort, including Wunsch and Prokhorov, Santiago and myself, AAC, Balakrishnan, and Jameson. AAC claims that these designs provide unique capabilities crucial to solving the problems of hypersonic flight, as discussed above. Balakrishnan (of the University of Missouri) reports far less error than with the usual methods used on missile interception problems. The other three groups also report substantial improvements in performance, relative to various alternatives, on the bioreactor benchmark problem, an autolander benchmark problem, and a robot arm simulation. Most of this work was presented at a recent NASA Ames workshop organized by Jorgensen and Pellionisz; the papers are still in press. The underlying principles are described in White and Sofge and in Pribram (chapter 31). For some additional information, see Narendra (1994).

The major classical alternatives to these methods have already been discussed. The neurocontrol designs themselves can be applied directly to adapt "nonneural networks as well, as discussed in chapter A2. This section will mention only a few additional fine points.

In cloning, the neural net copies what an expert " does, while the AI approach implements what an expert "says to do. As an example, consider what would happen if you asked a child how to ride a bicycle; the resulting rules would not be enough to keep the bicycle from falling over. But the child may nevertheless know how to ride a bicycle, on a nonverbal level. Usually, what an expert" does will work better than what he "says; however, when there is a local minimum problem—as discussed above—then fuzzy logic or simpler neural designs may be crucial to providing a good enough starting point for the neural system. When there is very complex reasoning required, then classical AI systems may often be adequate in some applications and far simpler to set up (depending on software availability) than neural networks with similar capability.

In tracking control, there are two techniques often used to keep the classical systems from blowing up when applied to nonlinear systems—gain scheduling and feedback linearization.

In gain scheduling, we try to patch together a nonlinear control rule, by switching back and forth between different linear controllers, designed to operate in different regions of space. Similar improvements in capability can be had with neural networks, by using "mixture of experts" networks ala Jordan and Jacobs (Jacobs et al 1991), or recent work by Neurodyne (Long 1993), or some proposals I have made for "syncretism" (Werbos 1993b). (Intuitively, "syncretism" involves "remembering observations in real-time, adapting a " generalized model by a combination of ordinary real-time learning and learning from memory, and making predictions based on a "combination of memory association and generalized model.) With classical systems, gain scheduling patches together linear domains to try to approximate a smooth surface; however, the same sort of additional complexity allows neural nets to patch together smooth nonlinear surfaces to represent the harder idea of fundamental structural change across different regions of space. See White and Sofge 1992 for a more detailed criticism of gain scheduling.

In feedback linearization, we try to make a plant "behave as if it were linear, by canceling out simple forms of linearity in restricted parts of a plant model. This process only works on a limited class of plants. Furthermore, Slotine of MIT has shown how neural nets can be useful even in feedback linearization. (Sanner and Slotine 1992).

In optimization over time, I have neglected to mention many methods which are less well-known but of serious practical value. Balakrishnan, for example, tests his designs against a variety of methods found (after much investment) to be useful in the missile interception area. The missile interception work has yet to be published, but similar (albeit simpler) work in aircraft control is in the open literature (Balakrishnan 1995).The explicit methods used most often with BTT are equivalent, in some sense, to the calculus of variations (Bryson and Ho 1969) or to Differential Dynamic Programming (Jacobson and Mayne 1970). True backpropagation simply reduces the cost of calculating derivatives in these applications. The use of a neural network as an Action network provides a greater degree of open-loop flexibility than the usual alternatives (a fixed action schedule or a fixed-form policy). DDP is an "explicit method which nevertheless" does use stochastic models, in a very interesting way; however, for reasons beyond the scope of this paper, its convergence rate grows worse than that of well-designed ADP systems when the effective planning horizon goes further into the future.

Because decision and control are such all-pervasive tasks, drawing on inputs from a multitude of sources—it is not possible here to review all the many forms of preprocessing which can be useful. However, there is one form of preprocessing which is especially crucial: the effort to build up a representation, "R, of the true state of the plant or environment to be controlled.

Many neural network papers do not emphasize the difference between the current state of the world, R(t), and the state of the variables observed or sensed by the control system, X(t). However, virtually all of the designs in neurocontrol "impLicitly assume that the controller does in fact "see" the true state of the world. They assume that there is an approximate one-to-one relation between states of the world and states of the vector input to the network. As a result, the performance of neurocontrol systems depends critically on obtaining such inputs.

There are three common ways to obtain such inputs: (1) simply obtain more sensor inputs when necessary; (2) use Kalman filtering (Bryson and Ho 1969) or extended Kalman filtering to calculate an estimated state vector, which is then fed into the network; (3) use neuroidentification methods (White and Sofge 1992, chapter 10, and Werbos 1994) to adapt a TLRN Model of the plant, and then feed in the outputs of the recurrent nodes of the TLRN as additional inputs to the control system. The third is the most brain-like approach.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

I claim:

1. A computer program product, comprising:

a computer storage medium and a computer program code mechanism embedded in the computer storage medium for causing a computer to control an external physical device, the computer program code mechanism comprising:

a first computer code device configured to create plural decision blocks, each such decision block including plural action choices, a set of exit states, and a set of post-exit states, wherein a subset of the plural decision blocks can be entered from each post-exit state;

a second computer code device configured to receive inputs;

a third computer code device configured to select a post-exit state of one of the plural decision blocks based on the received inputs;

a fourth computer code device configured to select one of the plural decision blocks that can be entered from the selected post-exit state and that maximizes a local cost function for the selected post-exit state; and a fifth computer code device configured to produce at least one output based on the selected one of the plural decision blocks.

2. The computer code device as claimed in claim 1, wherein the post-exit states of at least one block includes states for failure and changes in goal objectives.

3. The computer code device as claimed in claim 1, further comprising a sixth computer code device configured to update a global cost function based on the selected one of the plural decision blocks.

4. The computer code device as claimed in claim 1, further comprising a sixth computer code device configured to update a local cost estimate corresponding to the selected one of the plural decision blocks without updating a local cost estimate of the plural decision blocks not selected by the fourth computer code device.

* * * * *